United States Patent
Diallo et al.

(10) Patent No.: US 10,532,330 B2
(45) Date of Patent: *Jan. 14, 2020

(54) FILTRATION MEMBRANES, AND RELATED NANO AND/OR MICRO FIBERS, COMPOSITES, METHODS AND SYSTEMS

(71) Applicant: CALIFORNIA INSTITUTE OF TECHNOLOGY, Pasadena, CA (US)

(72) Inventors: Mamadou S. Diallo, Pasadena, CA (US); William A. Goddard, III, Pasadena, CA (US); Seong-Jik Park, Seoul (KR); Manki Cho, Changwon (KR)

(73) Assignees: CALIFORNIA INSTITUTE OF TECHNOLOGY, Pasadena, CA (US); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/497,174

(22) Filed: Apr. 25, 2017

(65) Prior Publication Data

US 2018/0071693 A1    Mar. 15, 2018

Related U.S. Application Data

(63) Continuation of application No. 13/570,221, filed on Aug. 8, 2012, now abandoned.
(Continued)

(51) Int. Cl.
*B01D 71/76* (2006.01)
*B01D 71/82* (2006.01)
(Continued)

(52) U.S. Cl.
CPC ........ *B01D 71/82* (2013.01); *B01D 63/021* (2013.01); *B01D 69/08* (2013.01); *B01D 69/087* (2013.01);
(Continued)

(58) Field of Classification Search
CPC .......... B01D 2323/30; B01D 2323/40; B01D 2323/39; B01D 69/02; B01D 69/10;
(Continued)

(56) References Cited

U.S. PATENT DOCUMENTS 5,338,532 A   8/1994  Tomalia et al.
5,527,524 A   6/1996  Tomalia et al.
(Continued)

FOREIGN PATENT DOCUMENTS

CN    101254417 B     9/2010
JP    2014046305 A    3/2014
(Continued)

OTHER PUBLICATIONS

Kai et al.; Development of commercial-sized dendrimer composite membrane modules for CO2 removal from flue gas; Separation and Purification Technology 63 (2008) 524-530. (Year: 2008).*
(Continued)

*Primary Examiner* — Pranav N Patel
(74) *Attorney, Agent, or Firm* — Steinfl + Bruno LLP

(57) ABSTRACT

Filtration membrane comprising polymeric nanofibers and/or microfibers attaching dendrimer component presenting reactive sites selective for chemicals to be filtered, and related nanofibers and microfibers, composite materials, compositions, methods and system.

45 Claims, 59 Drawing Sheets

Related U.S. Application Data

(60) Provisional application No. 61/601,410, filed on Feb. 21, 2012, provisional application No. 61/592,409, filed on Jan. 30, 2012, provisional application No. 61/521,290, filed on Aug. 8, 2011.

(51) Int. Cl.
| | |
|---|---|
| B01D 69/12 | (2006.01) |
| D01D 5/00 | (2006.01) |
| D01F 11/04 | (2006.01) |
| B01D 63/02 | (2006.01) |
| B01D 69/08 | (2006.01) |

(52) U.S. Cl.
CPC ........... *B01D 69/12* (2013.01); *B01D 69/125* (2013.01); *B01D 71/76* (2013.01); *D01D 5/0007* (2013.01); *D01F 11/04* (2013.01); B01D 2323/39 (2013.01); B01D 2325/14 (2013.01); B01D 2325/16 (2013.01); B01D 2325/40 (2013.01); Y10T 428/249921 (2015.04); Y10T 442/10 (2015.04)

(58) Field of Classification Search
CPC ...... B01D 69/12; B01D 69/125; B01D 69/08; B01D 69/087; B01D 71/52; B01D 71/56; B01D 71/68; B01D 71/36; B01D 71/34; B01D 71/76; B01D 71/82; B01D 63/08; B01D 63/021; B01D 2239/025; B01D 2239/049; B01D 2325/40; B01D 2325/14; B01D 2325/16; D01D 5/0007; D01F 11/04; Y10T 428/249921; Y10T 442/10
See application file for complete search history.

(56) References Cited

U.S. PATENT DOCUMENTS

| | | | |
|---|---|---|---|
| 7,981,444 B2 | 7/2011 | Tomalia et al. | |
| 7,985,424 B2 | 7/2011 | Tomalia et al. | |
| 8,277,664 B2 | 10/2012 | Frechet et al. | |
| 8,505,743 B2 | 8/2013 | Sarkar et al. | |
| 8,658,702 B2 | 2/2014 | Diallo et al. | |
| 8,956,437 B2 | 2/2015 | Sealey et al. | |
| 9,302,922 B2 | 4/2016 | Diallo et al. | |
| 10,058,822 B2 | 8/2018 | Diallo et al. | |
| 2003/0022216 A1* | 1/2003 | Mao | G01N 33/5306 435/6.13 |
| 2005/0171298 A1 | 8/2005 | Tomalia et al. | |
| 2006/0016685 A1* | 1/2006 | Hawkins | B01D 61/445 204/296 |
| 2006/0160988 A1 | 7/2006 | Tomalia et al. | |
| 2007/0175766 A1* | 8/2007 | Holmes | B01D 61/445 205/687 |
| 2007/0244296 A1 | 10/2007 | Tomalia et al. | |
| 2007/0298006 A1 | 12/2007 | Tomalia et al. | |
| 2009/0012033 A1 | 1/2009 | DeMattei et al. | |
| 2010/0038306 A1 | 2/2010 | Livingston et al. | |
| 2010/0224555 A1* | 9/2010 | Hoek | B01D 67/0088 210/500.42 |
| 2010/0326278 A1* | 12/2010 | Nakamura | B01D 53/22 96/8 |
| 2011/0027599 A1 | 2/2011 | Hoek et al. | |
| 2012/0024789 A1 | 2/2012 | Sarkar et al. | |
| 2013/0136697 A1 | 5/2013 | Kannan et al. | |
| 2014/0137734 A1 | 5/2014 | Liu et al. | |
| 2015/0053610 A1 | 2/2015 | Diallo et al. | |
| 2015/0217236 A1 | 8/2015 | Nishimura et al. | |
| 2016/0243504 A1 | 8/2016 | Diallo et al. | |
| 2016/0303517 A1 | 10/2016 | Diallo et al. | |
| 2019/0046934 A1 | 2/2019 | Diallo et al. | |

FOREIGN PATENT DOCUMENTS

| | | |
|---|---|---|
| WO | 2013/023006 A2 | 2/2013 |
| WO | 2015/017588 A1 | 2/2015 |
| WO | 2016/123594 A1 | 8/2016 |

OTHER PUBLICATIONS

Puniredd et al.; Covalent molecular assembly of multilayer dendrimer ultrathin films in supercritical medium; Journal of Colloid and Interface Science 306 (2007) 118-127. (Year: 2007).*
Kouketsu et al; PAMAM dendrimer composite membrane for CO2 separation: Formation of a chitosan gutter layer; Journal of Membrane Science 287 (2007) 51-59. (Year: 2007).*
Liu et al.; Angewandte Chemie International Edition in English, 1997, vol. 36, Issue 19, pp. 2114-2116. (Year: 1997).*
Gopal et al; Journal of Membrane Science 289 (2007) 210-219. (Year: 2007).*
Madani et al.; Journal of Applied Polymer Science, 2009, 113: 3005-3011. (Year: 2009).*
Xu et al; Ind. Eng. Chem. Res. 2005, 44, 8113-8119. (Year: 2005).*
Zhai et al; Macromolecules 2003, 36, 3101-3110. (Year: 2003).*
Xiao et al.; Langmuir 2004, 20, 8230-8238. (Year: 2004).*
Balogh, L. and Tomalia, D.A. "Poly(Amidoamine) Dendrimer-Templated Nanocomposites. 1. Synthesis of Zerovalent Copper Nanoclusters" J. Am. Chem. Sci. 1998, 120, 7355-7356.
Busch M. et al., "Boron Removal in Sea Water Desalination" *International Desalination Association* May 25, 2013. BAH03-039. 16 pages. https://web.archive.org/web/2013*/http://www.idswater.com/Common/Paper/Paper_58/Paper_MarkusBusch.pdf.
Ramakrishna S, Fujihara K, Teo W-E, Lim T-C, Ma Z (2005) "An introduction to electrospinning and nanofibers" *Tables 2.3(d) and 2.3(3). Electrospun polymer fibers.* World Scientific Publishing Co., Singapore. pp. 46-47.
Abramoff, M. D., et al. "Image Processing with ImageJ", *Biophotonics International* 11, 36-42, (2004). 7 pages.
Advisory Action for U.S. Appl. No. 13/754,883, filed Jan. 30, 2013 on behalf of California Institute of Technology. dated Oct. 7, 2015. 3 pages.
Aroon, A. F., et al. "Performance studies of mixed matrix membranes for gas separation: A review", *Separation and Purification Technology* 75, 229-242, (2010). 14 pages.
Bae, T.-H., et al. "A High-Performance Gas-Separation Membrane Containing Submicrometer-Sized Metal—Organic Framework Crystals", *Angewandte Chemie International Edition* 49, 9863-9866, (2010). 4 pages.
Bessbousse, H., et al. "Removal of heavy metal ions from aqueous solutions by filtration with a novel complexing membrane containing poly(ethyleneimine) in a poly(vinyl alcohol) matrix", *Journal of Membrane Science* 307, 249-259, (2008). 11 pages.
Biodendrimers International http://www.biodendrimers.com/Products/ (2013). Accessed via http://www.biodendrimers.com/Products/ on Jan. 16, 2018. 2 pgs.
Boccaccio, T., et al. "Characterization of PVDF membranes by vibrational spectroscopy" *Journal of Membrane Science* (2002), 210(2): 315-329.
Bronstein, L.M., et al. "Dendrimers as Encapsulating, Stabilizing, Or Directing Agents for Inorganic Nanoparticles" *Chemical Reviews* (2011), 111: 5301-5344.
Camarada, M., et al. "Computational study of the complexation of metals ions with poly(amidoamine) PAMAM G0 dendrimers" *Chemical Physics Letters* (2014), 616-617: 171-177.
Chen, W., et al. "Efficient Wastewater Treatment by Membranes through Constructing Tunable Antifouling Membrane Surfaces", *Environmental Science & Technology* 45, 6545-6552, (2011). 8 pages.
Chen, X., et al. "Harvesting of microalgae Scenedesmus sp.using polyvinylidene flouride microfiltration membrane", *Desalination and Water Treatment* 45, 177-181, (2012). 5 pages.
Cheng, S., et al. "Positively charged nanofiltration membranes: Review of current fabrication methods and introduction of a novel approach", *Advances in Colloid and Interface Science* 164, 12-20, (2011). 9 pages.

(56) References Cited

OTHER PUBLICATIONS

Chiag, Y-C., et al. "Biofouling Resistance of Ultrafiltration Membranes Controlled by Surface Self-Assembled Coating with PEGylated Copolymers", *Langmuir* 28, 1399-1407, (2012). 9 pages.
Chiang, Y-C., et al. "Nanofiltration membranes synthesized from hyperbranched polyethyleneimine", *Journal of Membrane Science* 326, 19-26, (2009). 8 pages.
Costentin, C., et al. "Catalysis of the electrochemical reduction of carbon dioxide" *Chemical Society Reviews* (2013), 42: 2423-2436.
Designing temperature and pH sensitive NIPAM based polymers. Gangadhar Panambur, Ilya Koltover and Scott Batcheller, Sigma-Aldrich. Accessed fromhttp.//www.sigmaaldrich.com/materials-science/polymer-science/nipam-polymers.html on Jun. 5, 2015. 4 pages.
Diallo, M.S., et al. "Poly(amidoamine) Dendrimers: A New Class of High Capacity Chelating Agents for Cu (II) Ions" *Environmental Science & Technology* (1999), 33(5): 820-824.
Du, J. R., et al. "Modification of poly(vinylidene flouride) ultrafiltration membranes with poly(vinyl alcohol) for fouling control in drinking water treatment", *Water Research* 43, 4559-4568, (2009). 10 pages.
Duff, M.C. "Uranium Co-Precipitation With Iron Oxide Minerals" *Geochimica et Cosmochimica Acta* (2002), 66: p. 15. 41 pages.
EIC Searches U.S. Appl. No. 15/011,547, filed Jan. 2018, 179 pages.
Final Office Action for U.S. Appl. No. 13/754,883, filed Jan. 30, 2013 on behalf of California Institute of Technology et al. dated Jul. 7, 2015. 7 pages.
Final Office Action for U.S. Appl. No. 14/447,574, filed Jul. 30, 2014 on behalf of California Institute of Technology et al. dated Jul. 12, 2018. 21 pages.
Fromer, N. A., et al. "Nanotechnology and clean energy: sustainable utilization and supply of critical materials", *Journal of Nanoparticle Research* 15, 2011, (2013). 15 pages.
Hadjoudja, S., et al. "Cell surface characterisation of *Microcystis aeruginosa* and *Chlorella vulgaris*", *Journal of Colloid and Interface Science* 342, 293-299, (2010). 7 pages.
Hester, J. F., et al. "Preparation of Protein-Resistant Surfaces on Poly(vinylidene flouride Membranes via Surface Segregation", *Macromolecules* 32, 1643-1650, (1999). 8 pages.
Hester, J.F., et al. "Design and performance of foul-resistant poly(vinylidene flouride) membranes prepared in a single-step by surface segregation", *Journal of Membrane Science* 202, 119-135, (2002). 17 pages.
Hwang, T., et al. "Microalgae recovery by ultrafiltration using novel fouling-resistant PVDF membranes within situ PEGylated polyethyleneimine particles" *Water Research* (2015), 73: 181-192.
International Preliminary Report on Patentability for International Application No. PCT/US2012/050043 filed Aug. 8, 2012 on behalf of California Institute of Technology. dated Feb. 11, 2014. 9 pages.
International Preliminary Report on Patentability for International Application No. PCT/US2014/048980 filed Jul. 30, 2014 on behalf of California Institute of Technology. dated Feb. 2, 2016.11 pages.
International Preliminary Report on Patentability for International Application No. PCT/US2013/023947 filed Jan. 30, 2013 on behalf of California Institute of Technology. dated Aug. 5, 2014. 6 pages.
International Preliminary Report on Patentability for International Application No. PCT/US2016/015859 filed Jan. 30, 2016 on behalf of California Institute of Technology. dated Aug. 1, 2017. 12 pages.
International Search Report for International Application No. PCT/US2016/015859 filed Jan. 30, 2016 on behalf of California Institute of Technology et al. dated May 24, 2016. 4 pages.
Jiang, L. Y., et al. "Fundamental understanding of nano-sized zeolite distribution in the formation of the mixed matrix single- and dual-layer asymmetric hollow fiber membranes", *Journal of Membrane Science* 252, 89-100, (2005). 12 pages.
Karamat, S., et al. "Structural, compositional and magnetic characterization of bulk V2O5 doped ZnO system", *Applied Surface Science*, 256, 2309-2314, (2010). 6 pages.

Ke, F.-Y., et al. "Effect of Overlap Concentration and Persistence Length on DNA Separation in Polymer Solutions by Electrophoresis" *Chinese Journal of Polymer Science* (2009), 27(5): 601-610. 13 pages.
Kim, S., et al. "Polysulfone and functionalized carbon nanotube mixed matrix membranes for gas separation: Theory and experiment", *Journal of Membrane Science* 294, 147-158, (2007). 12 pages.
Kotte, M.R., et al. "A one-pot method for the preparation of mixed matrix polyvinylidene fluoride membranes with in situ synthesized and PEGylated polyethyleneimine particles" *Journal of Membrane Science* (2015), 474: 277-287.
Krot, K. A., et al. "Speciation, stability constants and structures of complexes of copper(II), nickel(II), silver(I) and mercury(II) with PAMAM dendrimer and related tetraamide ligands", *Inorganica Chemica Acta* 358, 3497-3505, (2005). 9 pages.
Kuhl, K. P., et al. "Electrocatalytic Conversion of Carbon Dioxide to Methane and Methanol on Transition Metal Surfaces", *Journal of the American Chemical Society* 136, 14107-14113, (2014). 7 pages.
Liang, S., et al. "Highly Hydrophilic polyvinylidene Flouride (PVDF) Ultrafiltration Membranes via Postfabrication Grafting of Surface-Tailored Silica Nanoparticles", *Applied Materials & Interfaces* 5, 6694-6703, (2013). 10 pages.
Lin, N.-J., et al. "Suface Self-Assembled PEGylation of Fluoro-Based PVDF Membranes via Hydrophobic-Driven Copolymer Anchoring for Ultra-Stable Biofouling Resistance", *Langmuir* 29 10183-10193, (2013). 11 pages.
Lin, S-T., et al. "Thermodynamic Stability of Zimmerman Self-Assembled Dendritic Supramolecules from Atomistic Molecular Dynamics Simulations", *The Journal of Physical Chemistry B* 108, 10041-10052, (2004). 12 pages.
Liu, F., et al. "Surface immobilization of polymer brushes onto porous poly(vinylidene flourid) membrane by electron beam to improve the hydrophilicity and fouling resistance", *Polymer* 48, 2910-2918, (2007). 9 pages.
Liyanage, A. D., et al. "Nafionsulfonated dendrimer composite membranes for fuel cell applications", *Journal of Membrane Science* 392-392, 175-180, (2012). 6 pages.
Majeed, S., et al. "Multiwalled carbon nanotubes (MWCNTs) mixed polyacrylonitrile (PAN) ultrafiltration membranes", *Journal of Membrane Science* 403-404, 101-109, (2012). 9 pages.
Meyer, D. E., et al. "Impact of Membrane Immobilization on Particle Formation and Trichloroethylene Dechlorination for Bimetallic Fe/Ni Nanoparticles in Cellulose Acetate Membranes",*Journal of Physical Chemistry B* 111, 7142-7154, (2007). 13 pages.
Mijovic, J., et al. "A Study of Reaction Kinetics by Near-Infrared Spectroscopy. 1. Comprehensive Analysis of a Model Epoxy/Amine System", *Macromolecules* 28, 2787-2796, (1995). 10 pages.
Mittal, V. "Chapter 1: Polymer Latex Technology: An Overview", in *Advanced Polymer Nanoparticles: Synthesis and Surface Modifications*, CRC Press; Boca Raton (Florida), 2011. 30 pages.
Myers, V.S., et al. "Dendrimer-encapsulated nanoparticles: New synthetic and characterization methods and catalytic applications" *Chemical Science* (2011), 2: 1632-1646.
Non-Final Office Action for U.S. Appl. No. 15/011,547, filed Jan. 30, 2016 on behalf of California Institute of Technology. dated Dec. 18, 2018. 24 pages.
Non-Final Office Action for U.S. Appl. No. 14/447,574, filed Jul. 30, 2014 on behalf of California Institute of Technology et al. dated Sep. 26, 2017. 29 pages.
Non-Final Office Action for U.S. Appl. No. 15/011,547, filed Jan. 30, 2016 on behalf of California Institute of Technology et al. dated Jul. 11, 2018. 14 pages.
Non-Final Office Action for U.S. Appl. No. 15/497,174, filed Apr. 25, 2017 on behalf of the California Institute of Technology. dated Mar. 4, 2019. 30 pages.
Notice of Abandonment for U.S. Appl. No. 13/570,221, filed Aug. 8, 2012 on behalf of California Institute of Technology. dated May 3, 2017. 2 pages.
Notice of Allowance for U.S. Appl. No. 14/447,574, filed Jul. 30, 2014, on behalf of California Institute of Technology. dated Apr. 2, 2019. 18 pages.

(56) References Cited

OTHER PUBLICATIONS

Notice of Allowance for U.S. Appl. No. 14/447,574, filed Jul. 30, 2014, on behalf of California Institute of Technology. dated Nov. 14, 2018. 15 pages.
Notice of Allowance for U.S. Appl. No. 13/754,883, filed Jan. 30, 2013 on behalf of California Institute of Technology et al. dated Nov. 16, 2015. 8 pages.
Notice of Allowance for U.S. Appl. No. 15/043,489, filed Feb. 12, 2016 on behalf of California Institute of Technology et al. dated Apr. 19, 2018. 10 pages.
Ottaviani, M.F., et al. "Characterization of Starburst Dendrimers by the EPR Technique. Copper (II) Ions Binding Full-Generation Dendrimers" *Journal of Physical Chemistry B* (1997), 101(2): 158-166.
Park, J. B. K., et al. "Algal production in wastewater treatment high rate algal ponds for potential biofuel use", *Water Science & Technology* 63.10, 2403-2410, (2011). 8 pages.
Pittman, J. K., et al. "The potential of sustainable algal biofuel production using wastewater resources", *Bioresource Technology* 102, 17-25, (2011). 9 pages.
Poly(N-isopropylacrylamide-co-methacrylic acid) Sigma-Aldrich. Accessed from http://www.sigmaaldrich.com/catalog/product/aldrich/724858?lang=enregion=US on Jun. 5, 2015. 1 page.
Popescu, M.-C., et al. "Characterization by Fourier Transform Infrared Spectroscopy (FT-IR) And 2d IR Correlation Spectroscopy of PAMAM Dendrimer" *Journal of Physical Chemistry B* (2006), 110(29): 14198-14211.
Razzak, S. A., et al. "Integrated $CO_2$ capture, wastewater treatment and biofuel production by microalgae culturing—A review", *Renewable and Sustainable Energy Reviews* 27, 622-653, (2013). 32 pages.
Restriction Requirement for U.S. Appl. No. 14/447,574, filed Jul. 30, 2014 on behalf of California Institute of Technology et al. dated Jan. 4, 2017. 20 pages.
Restriction Requirement for U.S. Appl. No. 15/011,547, filed Jan. 30, 2016 on behalf of California Institute of Technology et al. dated Jan. 8, 2018. 14 pages.
Scott, R.W.J., et al. "Synthesis, Characterization, and Applications of Dendrimer-Encapsulated Nanoparticles" *Journal of Physical Chemistry B* (2005), 109: 692-704.
Singh, A., et al. "Mechanism and challenges in commercialisation of algal biofuels", *Bioresource Technology* 102, 26-34, (2011). 9 pages.
Alexeev, et al., "EXAFS characterization of dendrimer-pt nanocomposites used for the preparation of Pt/ç-AI2O3 Catalysts", J. Phys. Chem. B, 2006, 110, 24903-24914.
Diallo, et al., "Mining critical metals and elements from seawater: opportunities and challenges", Environ. Sci. Technol. 2015, 49, 9390-9399.
Kai, et al., "Development of commercial-sized dendrimer composite membrane modules for $CO_2$ removal from flue gas", Separation and Purification Technology 63 (2008), 524-530.
Kotte, et al., "Mixed Matrix PVDF Membranes With In Situ Synthesized PAMAM Dendrimer-Like Particles: A new class of sorbents for CU(II) recovery from aqueous solutions by ultrafiltration", EEWS KAIST. Environ. Sci Technology, Published Web: Jul. 29, 2015. 27 pages.
Puniredd, et al., "Covalent molecular assembly of multilayer dendrimer ultrathin films in supercritical medium", Journal of Colloid and Interface Science, 306 (2007), 118-127.
Takke, et al, "Surface and adhesion properties of poly(ethylene glycol) on polyester(polyethylene terephthalate) fabric surface: effect of air-atmospheric plasma treatment", Journal of applied polymer science, vol. 122, 2621-2629 (2011).
Teoh, et al., "Micelle-like macrovoids in mixed matrix PVDF-PTFE hollow fiber membranes", Journal of Membrane Science 338, 2009, 5-10.
Tomalia, D., "Dendritic effects: dependency of dendritic nanoperiodic property patterns on critical nanoscale design parameters (CNDPs)", New J. Chem., 2012, 36, 264-281.
Tomalia, D., "Dendrons/dendrimers: quantized, nano-element like building blocks for soft-soft and soft-hard nano-compound synthesis", Soft Matter, 2010, 6, 456,474.
Xiao, et al., "Surface characterization, modification chemistry, and separation of performance of polyimide and polyamidoamine dendrimer composite films", Langmuir 2004, 20, 8230-8238.
Stengaard, F. F. "Characteristics and Performance of New Types of Ultrafiltration Membranes with Chemically Modified Surfaces", *Desalination* 70, 207-224, (1988). 18 pages.
Stephenson, C.J., et al. "Pt@ZIF-8 composite for the regioselective hydrogenation of terminal unsaturations in 1,3-dienes and alkynes" *Inorganic Chemistry Frontiers* (2015), 2 (5): 448-452.
Sun, X., et al. "A comparative study of microfiltration and ultrafiltration for algae harvesting", *Algal Research* 2, 437-444, (2013). 8 pages.
Tomalia, D.A., et al. "Ch. 16: Dendrimers: Synthetic Science to Controlled Organic Nanostructures and a Window to a New Systematic Framework for Unifying Nanoscience", *Handbook of Nanoscience, Engineering and Technology,3rd Ed.*, (2012), p. 413-467. 56 pages.
Tran, M.L., et al. "Structural Studies of Copper (II)-Amine Terminated Dendrimer Complexes by EXAFS" *Journal of Physical Chemistry B* (2004), 108(52): 20130-20136.
Van Krevelen, D.W. et al. "Properties of Polymers: Their Correlation With Chemical Structure; their Numerical Estimation and Prediction from Additive Group Contributions" (2009), Elsevier Science. 4th Edition. 1031 pages.
Vu, D. Q., et al. "Mixed matrix membranes using carbon molecular sieves I. Preparation and experimental results", *Journal of Membrane Science* 211, 311-334, (2003). 24 pages.
Vu, D. Q., et al. "Mixed matrix membranes using carbon molecular sieves II. Modeling permeation behavior", *Journal of Membrane Science* 211, 335-348, (2003). 14 pages.
Wang, J., et al. "Current Patents of Dendrimers and Hyperbranched Polymers in Membranes", *Recent Patents in Chemical Engineering* 1, 41-51, (2008). 11 pages.
Wei, J., et al. "Characterization of a non-fouling ultrafiltration membrane", *Desalination* 192, 252-261, (2006). 10 pages.
Wikipedia "Poly(methyl methacrylate)" Downloaded Jan. 20, 2015. http://en.wikipedia.org/wiki/Poly(methyl_methacrylate). 14 pages.
Written Opinion for International Application No. PCT/US2016/015859 filed Jan. 30, 2016 on behalf of California Institute of Technology et al. dated May 24, 2016. 11 pages.
Xu, J., et al. "Fe/Pd Nanoparticle Immobilization in Microfiltration Membrane Pores: Synthesis, Characterization, and Application in the Dechlorination of Polychlorinated Biphenyls", *Industrial & Engineering Chemistry Research* 46, 2348-2359, (2007). 12 pages.
Yan, L., et al. "Effect of nano-sized AI2O3-particle addition on PVDF ultrafiltration membrane performance", *Journal of Membrane Science* 276, 162-167, (2006). 6 pages.
Yang, Y., et al. "The influence of nano-sized TiO2 fillers on the morphologies and properties of PSF UF membrane", *Journal of Membrane Science* 288, 231-238, (2007). 8 pages.
Yoo, H., et al. "Surface functionalization of PTFE membranes with hyperbranched poly (amidoamine) for the removal of $Cu^{2+}$ ions from aqueous solution", *Journal of Membrane Science* (2013), 448: 125-134.
Zhang, W., et al. "Characterization of dissolved organic matters responsible for ultrafiltration membrane fouling in algal harvesting" *Algal Research* (2013), 2(3): 223-229. 9 pages.
Zhang, X., et al. "Harvesting algal biomass for biofuels using ultrafiltration membranes", *Bioresource Technology* 101, 5297-5304, (2010). 8 pages.
Zhao, M., et al. "Preparation of Cu Nanoclusters within Dendrimer Templates" *Journal of the American Chemical Society* (1998),120: 4877-4878.
Zhao, Y.-H., et al. "Improving Hydrophilicity and Protein Resistance of Poly(vinylidene fluoride) Membranes by Blending with Amphiphilic Hyperbranched-Star Polymer", *Langmuir* 23, 5779-5786, (2007). 8 pages.

(56) References Cited

OTHER PUBLICATIONS

Zhou, L., et al. "Characterization of Poly(amidoamine) Dendrimers and Their Complexes with Cu2+ by Matrix-Assisted Laser Desorption Ionization Mass Spectrometry" *Macromolecules* (2001), 34: 3567-3573.

Zornoza, B., et al. "Functionalized flexible MOFs as fillers in mixed matrix membranes for highly selective separation of CO2 from CH4 at elevated pressures", *Chemical Communications* 47, 9522-9524, (2011). 3 pages.

\* cited by examiner

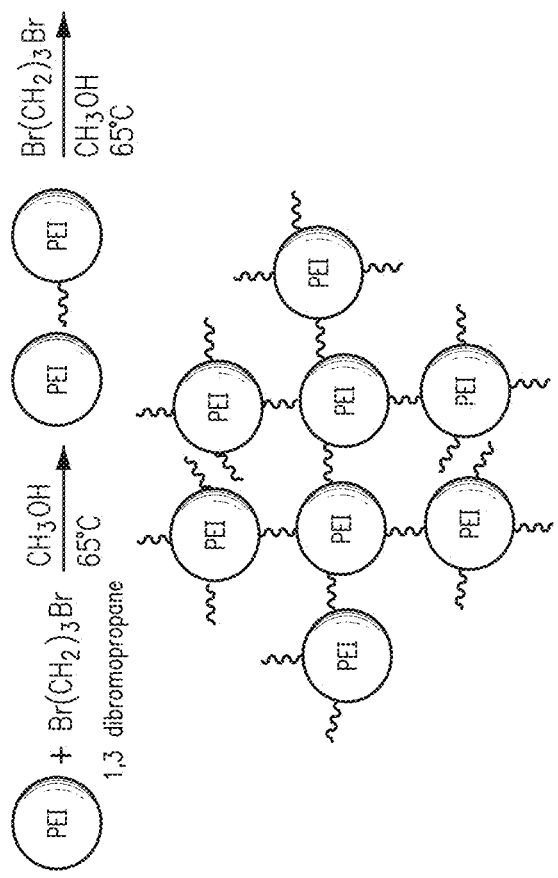
FIG. 2A Hyberbranched PEI
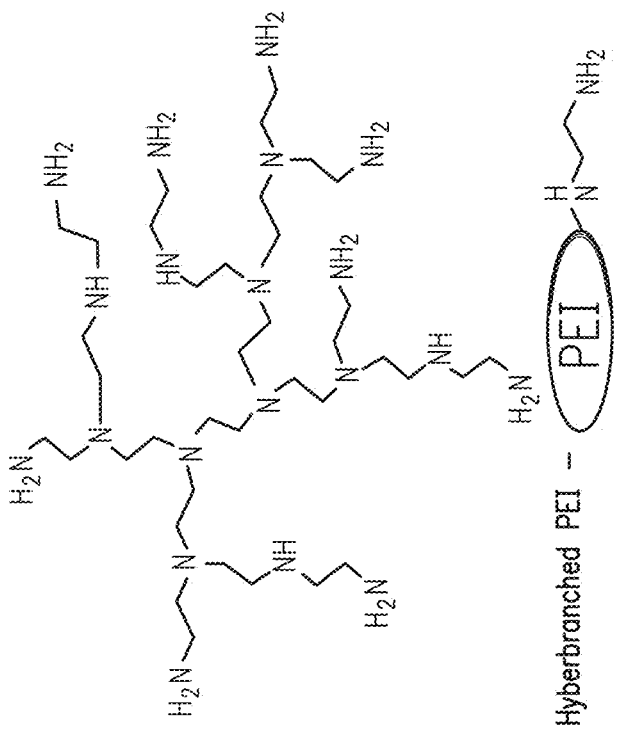
FIG. 2B
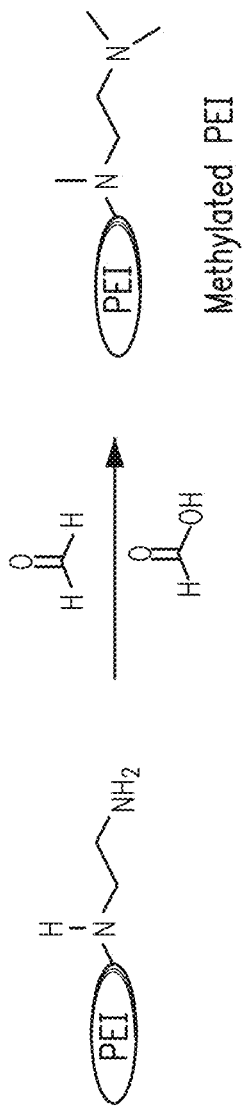
FIG. 2C Methylated PEI

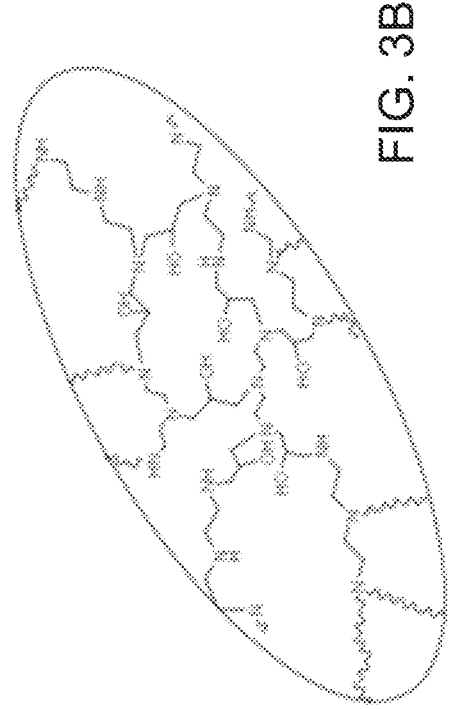
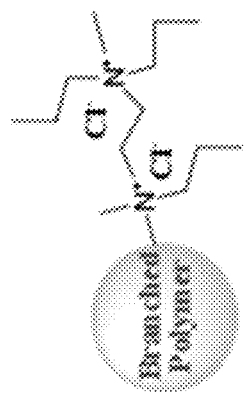
FIG. 3B
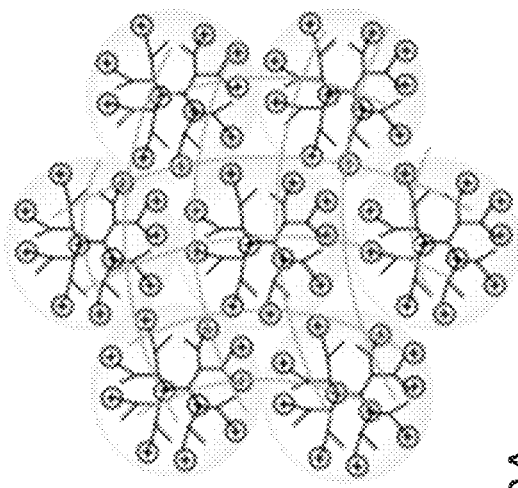
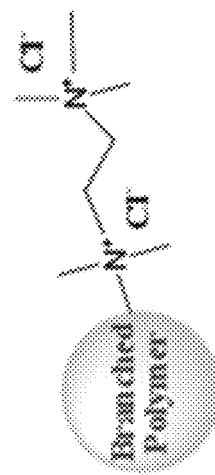
FIG. 3A
FIG. 3C
FIG. 3D

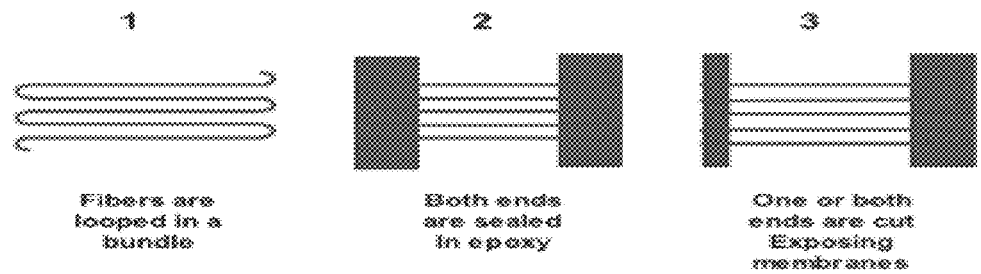
FIG. 5A
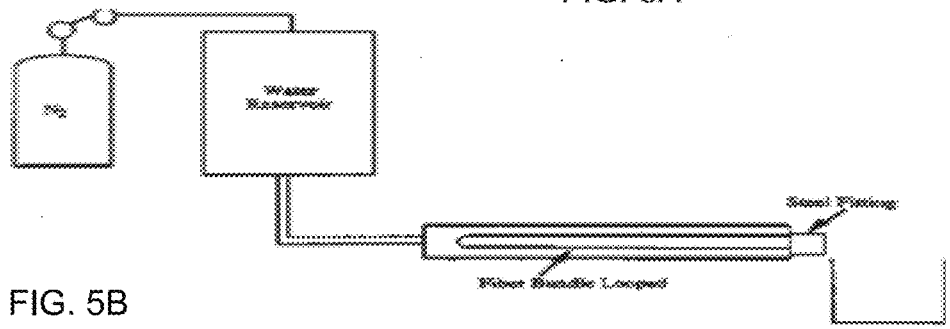
FIG. 5B
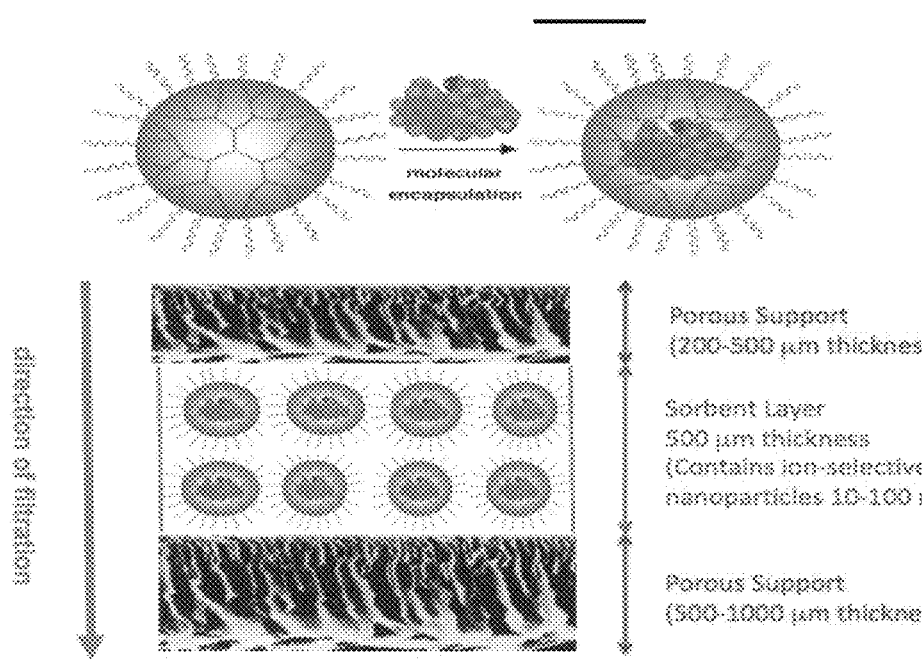
FIG. 6A
FIG. 6B

FIG. 15A
Module Configuration
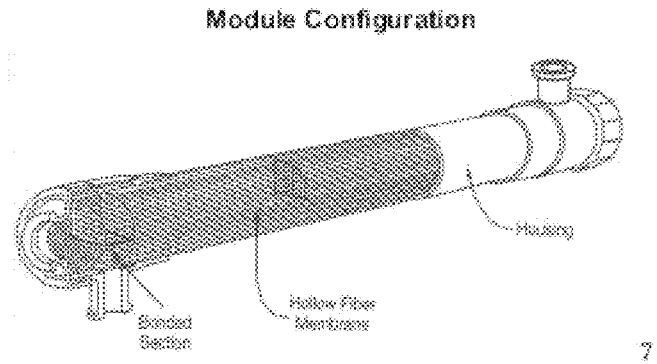
FIG. 15B
Cation Rejecting Hollow-Fiber
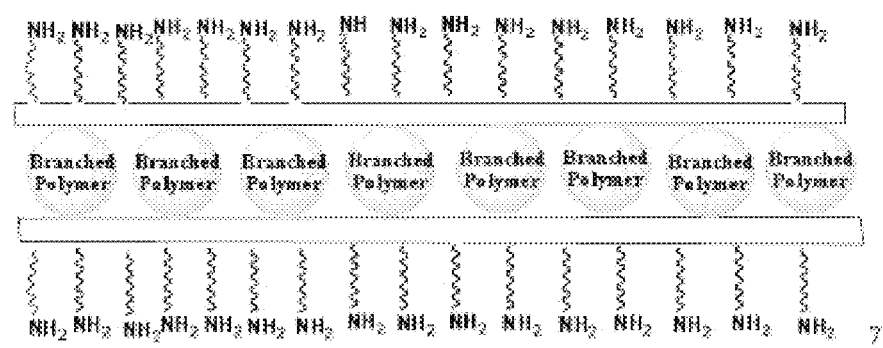
Anion Rejecting Hollow-Fiber
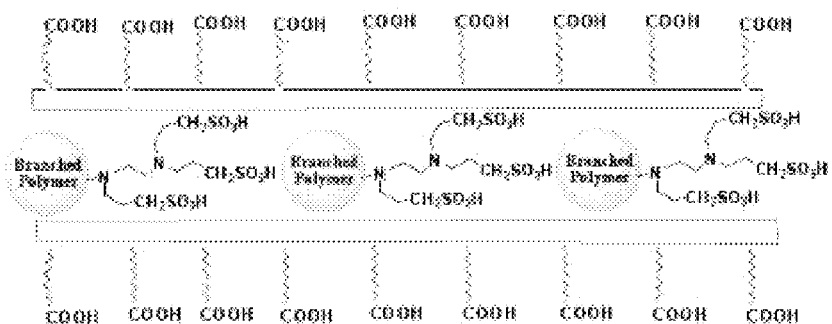
FIG. 15C Anion Selective Hyperbranched Macromolecules
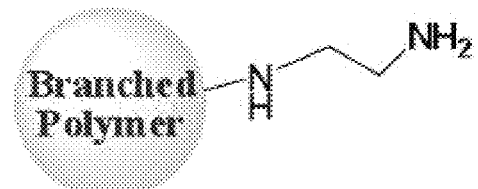
FIG. 17A
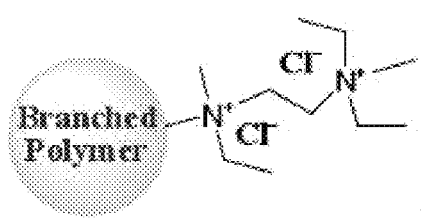
Cation Selective Hyperbranched Macromolecules
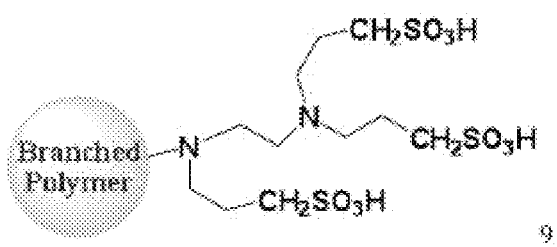
FIG. 17B
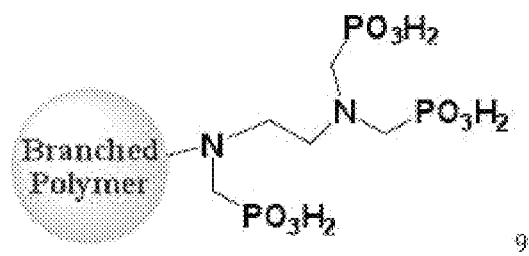
FIG. 17

2,2-bis(methylol)propionic acid (MPA) hyperbranched macromolecule

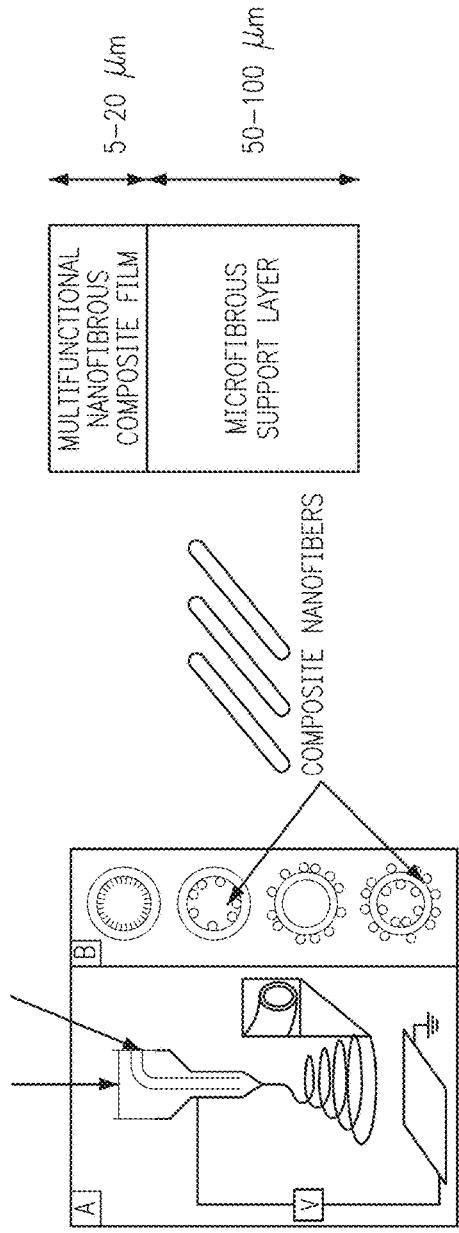
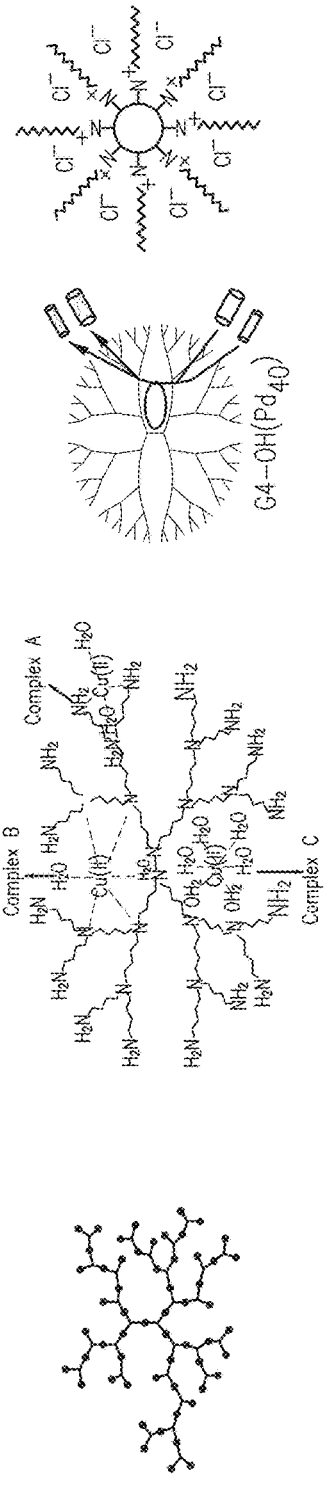
FIG. 23A
FIG. 23B

FIG. 26A             FIG. 26B
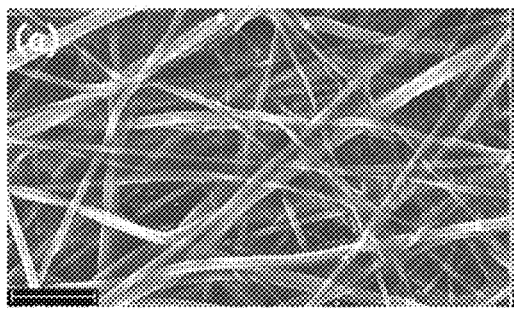 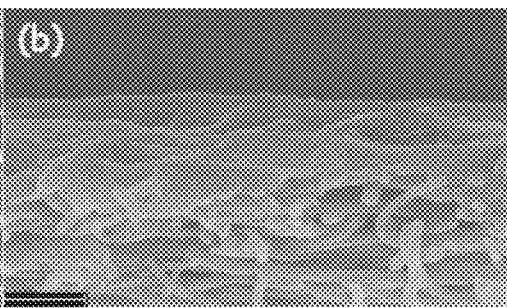
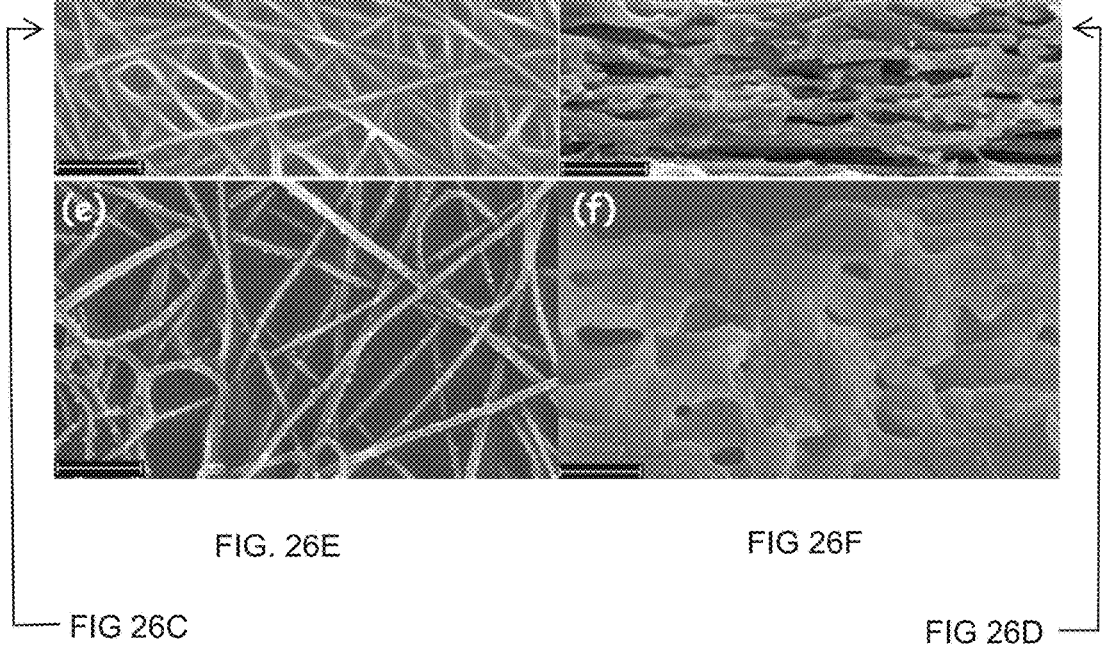
FIG. 26E             FIG 26F
FIG 26C                          FIG 26D

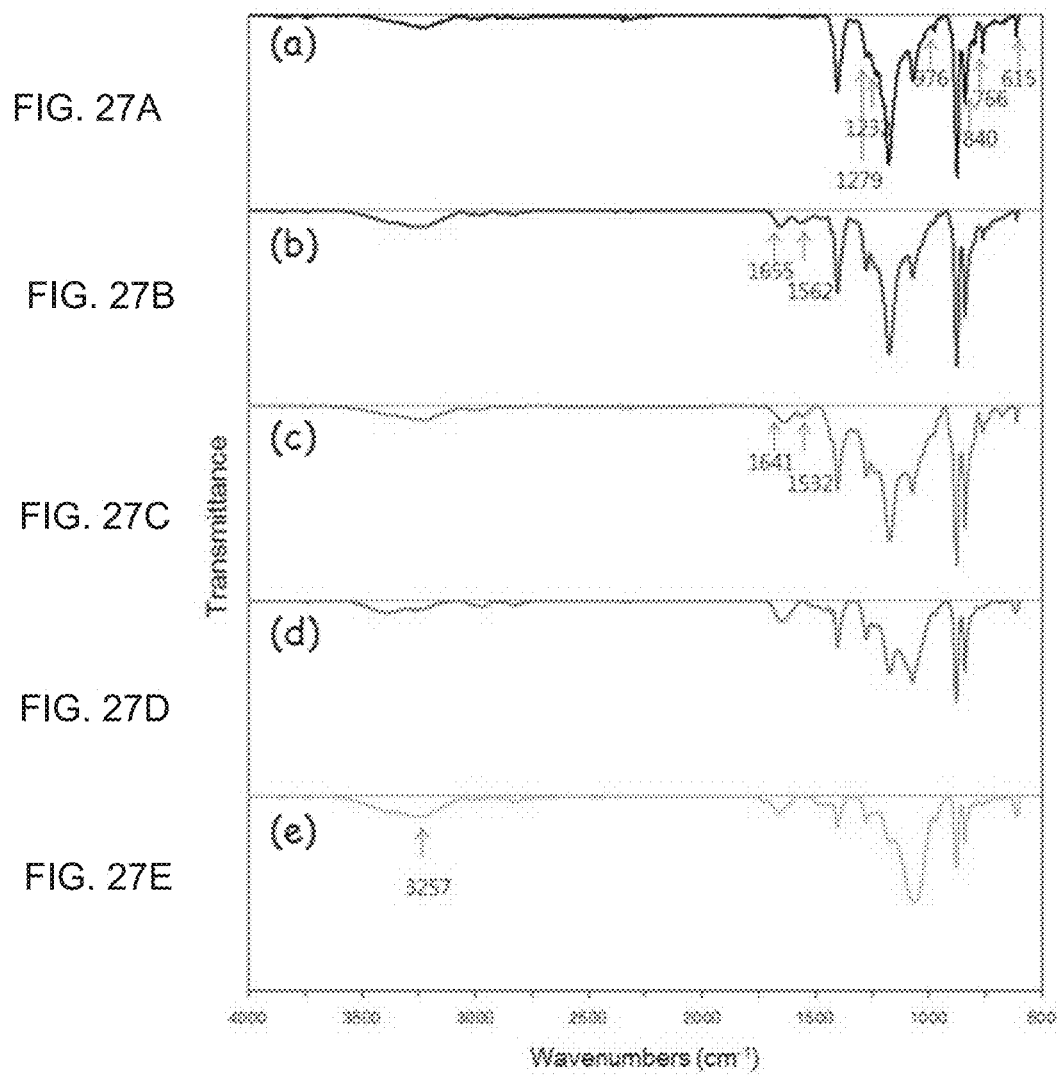

the World the United States the Middle East

PEI
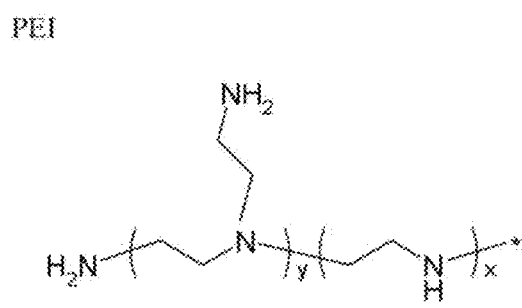
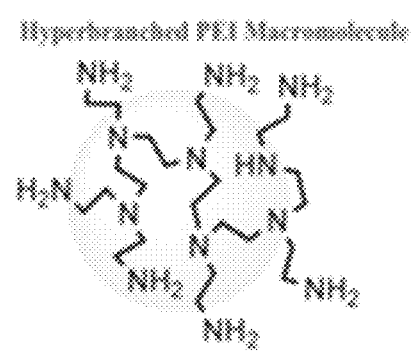
FIG. 44A
FIG. 44B
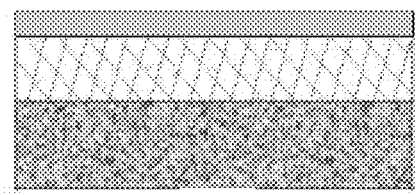
FIG. 45A
FIG. 45B

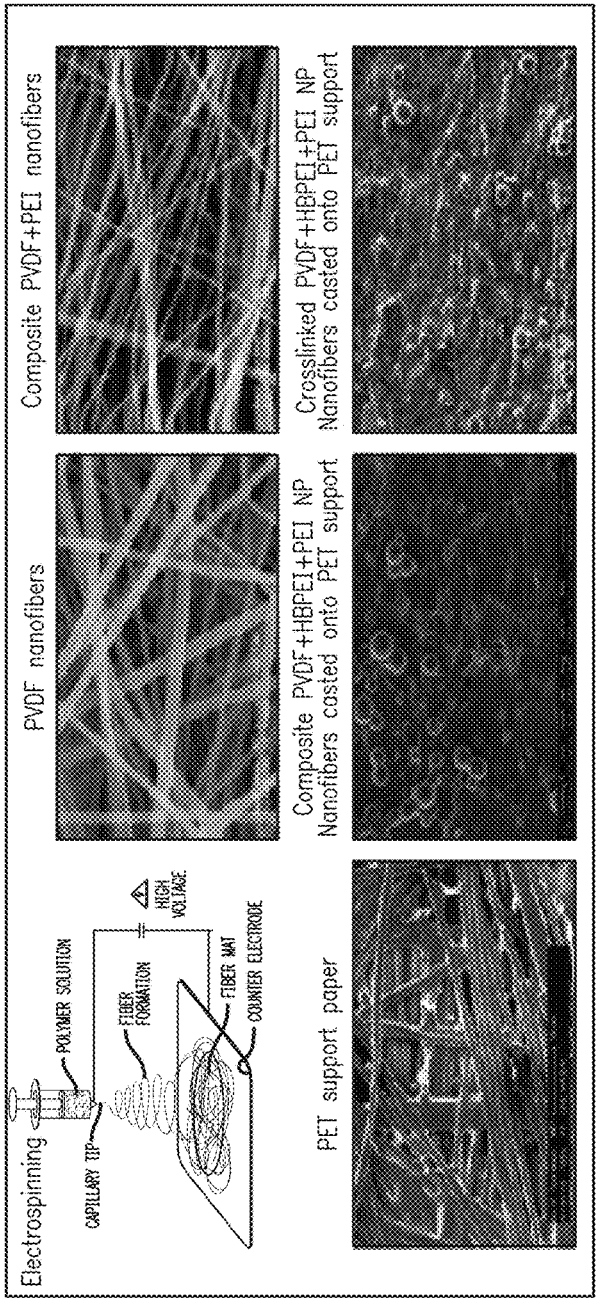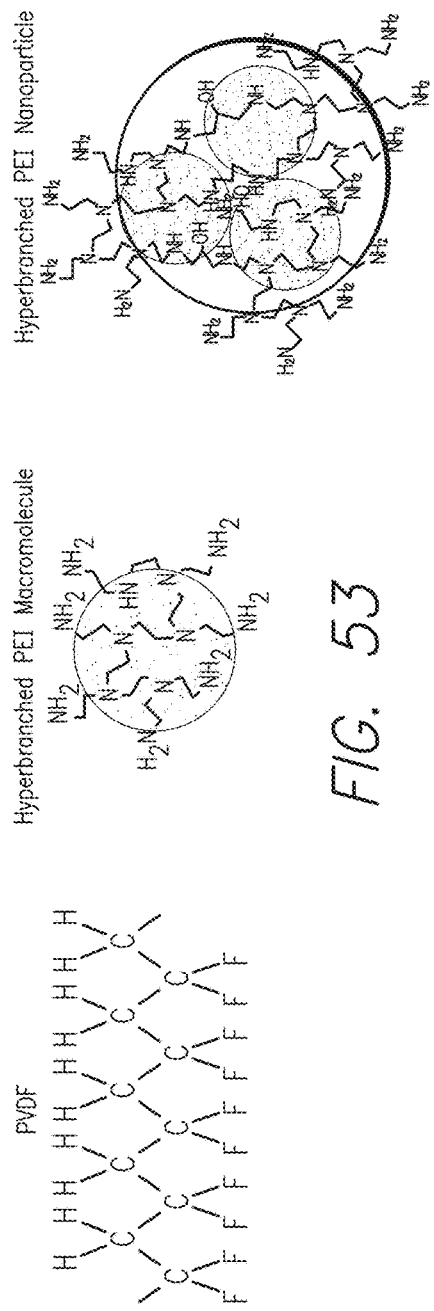
FIG. 53

| | TMC (wt%) | Rxn T (s) | Pure Water Flux (LMH), pH 4 | R_MgCl2 (%) | R_MgSO4 (%) | R_NaCl (%) | R_Na2SO4 (%) |
|---|---|---|---|---|---|---|---|
| 1 | 1.0 | 20 | 50.00 (Approximate) | 91.16 | 90.00 | 72.91 | 54.87 |
| 2 | 1.0 | 10 | 64.19 | 89.56 | 84.23 | 71.37 | 46.69 |
| 3 | 1.0 | 5 | 143.13 | 86.13 | 60.08 | 37.93 | 18.15 |

|   | TMC (wt%) | Rxn T (s) | Pure Water Flux (LMH) | R_NaCl (%) | XPS N (%) | XPS C (%) | XPS O (%) |
|---|---|---|---|---|---|---|---|
| 1 | 0.05 | 45 | 102.75 | 34.83 | 10.345 | 67.167 | 22.479 |
| 2 | 0.1 | 45 | 77.43 | 53.37 | 12.318 | 68.773 | 18.908 |
| 3 | 2.0 | 45 | 35.68 | 78.42 | 14.255 | 68.604 | 17.141 |

FIG. 62

Complexation and/or Encapsulation of Target Metal Ions [e.g. Pd(II)]

Reduction of Encapsulated Metal Ions to Produce Metallic Clusters/Nanoparticles [e.g. Pd(0)]

FILTRATION MEMBRANES, AND RELATED NANO AND/OR MICRO FIBERS, COMPOSITES, METHODS AND SYSTEMS

CROSS REFERENCE TO RELATED APPLICATIONS

The present application is a Continuation of U.S. application Ser. No. 13/570,221 filed on Aug. 8, 2012, which in turn, claims priority to U.S. Provisional Application No. 61/521,290, entitled "Low-Pressure Ion-Selective Membranes for Water Treatment and Desalination: Synthesis, Characterization and Multiscale Modeling" filed on Aug. 8, 2011, to U.S. Provisional Application No. 61/592,409, entitled "Ion-Selective Nanofiltration Membranes Based on Polymeric Nanofibrous Scaffolds and Separation Layers Consisting of Crosslinked Dendritic Macromolecules" filed on Jan. 30, 2012, and to U.S. Provisional Application No. 61/601,410, entitled "Low-Pressure Ion-Selective Membranes for Water Treatment and Desalination: Synthesis, Characterization and Multiscale Modeling" filed on Feb. 21, 2012, each of which is incorporated herein by reference in its entirety.

STATEMENT OF GOVERNMENT GRANT

This invention was made with government support under CBET0948485 awarded by the National Science Foundation. The government has certain rights in the invention.

FIELD

The present disclosure relates to filtration membrane and related nano and/or micro fibers, composites, methods and systems.

BACKGROUND

Development of efficient membranes has been a challenge in the field of fluid filtration, in particular when aimed at water treatment.

Whether for human consumption, agriculture or industry, several methods are commonly used for filtration including reverse osmosis (RO), nanofiltration (NF), ultrafiltration (UF) and microfiltration (MF) and additional methods identifiable by a skilled person.

Despite production and elaboration during the past 20 years of several filtration concepts/technologies proposed as improvements or alternatives to the above mentioned approaches, development of efficient, cost-effective and/or environmental friendly filtration methods and system has been a challenge in particular when directed at selective filtration.

SUMMARY

Provided herein are membranes and related nano- or micro-fibers, composite materials, methods and systems that allow in several embodiments to perform selective filtration of a liquid and in particular of water or aqueous solutions.

According to a first aspect, a filtration membrane is described. The filtration membrane comprises a plurality of nano and/or micro fibers, each having a polymer component and a dendrimer component. The polymer component provides a fiber scaffold for attaching the dendrimer component. The dendrimer component comprises a dendrimer nanomaterial associated to the fiber scaffold and presenting a reactive site on the fiber scaffold to allow selective filtration of a chemical capable of interaction with the reactive site. In some embodiments, in the filtration membrane, the plurality of nanofibers and/or microfibers is arranged in a mesh structure forming a layer comprised in the membrane, alone or in combination with additional layers. In some embodiments, the plurality of nanofibers and/or microfibers are arranged in a substantially parallel configuration, in particular in some of these embodiments, one or more nanofibers and/or microfibers of the plurality of the nanofibers or microfibers are hollow.

According to a second aspect, a nanofiber or microfiber is described. The nanofiber or microfiber comprises a polymeric component providing a fiber scaffold and a dendrimer component attached to the polymeric component to present reactive sites on the fiber scaffold. In some embodiments in the nanofiber or microfiber, the reactive sites are positively and/or negatively charged.

According to a third aspect, a composite material is described, which comprises a plurality of the nanofibers and/or microfibers herein described attaching a dendrimer component and presenting a reactive site. In some embodiments, in the composite material, the plurality of nanofiber and/or microfiber are arranged in a mesh structure forming a layer comprised in the membrane, alone or in combination with additional layers. In some embodiments, the plurality of nanofiber and/or microfibers are arranged in a substantially parallel configuration, in particular in some of these embodiments, one or more nanofibers and/or microfibers of the plurality of the nanofibers or microfibers are hollow.

According to a fourth aspect, a filtration system is described. The system comprises at least one filtration membranes herein described selective for a first chemical in combination with one or more additional filtration membranes each selective for the first chemical and/or additional chemicals.

According to a fifth aspect, a process for providing a nanofiber or microfiber is described. The process comprises mixing a polymer with a dendrimer to provide a liquid mixture and electrospraying and/or electrospinning the liquid mixture to provide a nanofiber or microfiber.

According to a sixth aspect a nanofiber or microfiber obtainable by the process for providing a nanofiber or microfiber herein described.

According to a seventh aspect, a process for manufacturing a composite material herein described. The process comprises aggregating nano-fiber and/or microfibers herein described.

Membranes, nano or micro fibers, composite materials and related methods and systems herein described allow in several embodiments filtration of fluids without the need for the high pressures required in conventional fluid purification methods such as reverse osmosis.

Membranes, nano or micro fibers, composite materials and related methods and systems herein described in several embodiments allow more efficient, cost-effective and/or environmentally sound technologies to filter fluids including extracting clean water and valuable chemicals (e.g. critical materials or other elements) from impaired water including wastewater, brackish water and seawater.

Membranes, nano or micro fibers, composite materials and related methods and systems herein described can be used in connection with applications wherein water filtration in particular when aimed at selective filtration is desired. Exemplary applications comprise fluid purification, and in particular water filtration, water purification and in particular water desalination and additional applications associated with industrial/environmental separations, including chemical and/or biological purifications, which are identifiable by a skilled person. Additional applications comprise gas separations, additional chemical and/or biological purifications and catalysis wherein selective absorption, inclusion or removal/conversion of one or more solutes/compounds is desired.

The details of one or more embodiments of the disclosure are set forth in the accompanying drawings and the description below. Other features, objects, and advantages will be apparent from the description and drawings, and from the claims.

BRIEF DESCRIPTION OF DRAWINGS

The accompanying drawings, which are incorporated into and constitute a part of this specification, illustrate one or more embodiments of the present disclosure and, together with the detailed description and the examples, serve to explain the principles and implementations of the disclosure.

FIGS. 2A-2C show a hyperbranched polyethyleimine (PEI) macromolecule (FIG. 2A) and related methods of cross linking (FIG. 2B) and methylation (FIG. 2C) of anion-selective hyperbranched macromolecules (1.20).

FIGS. 3A-3D show anion-exchange hyperbranched microparticles (1.21). In particular, FIG. 3A shows a schematic of an aggregate of hyperbranched macromolecules forming anion-exchange hyperbranched microparticles. FIG. 3B shows the interior microenvironment of the microparticles. FIGS. 3C and D show an embodiment where the reactive site is a quaternary ammonium center.

FIGS. 5A-5B show a laboratory scale set-up for preparing and testing anion-exchange hollow fibers according to an embodiment herein described. In particular, FIG. 5 A shows the preparation of a test membrane of hollow nanofibers. FIG. 5B shows a schematic of the apparatus for testing the hollow nanofibers according to an embodiment herein described.

FIGS. 6A-6B show a depiction of an hyperbranched macromolecules and a schematic of their use in an ion absorbing microfiltration (IAμF) membrane [Ref 5.5] according to an embodiment herein described. FIG. 6A shows a schematic representation of encapsulation of a molecule by a dendritic component as herein described. FIG. 6B shows an exemplary membrane comprising a composite material nano and/or microfiber layer in between two porous support layers.

FIG. 8A shows the sequential steps of exposing a substrate surface to different laying solutions. FIG. 8B shows a schematic of the various layers deposited by the LBL technique. FIG. 8C shows the repeating monomer subunits of the positively and negatively charged layers deposited.

FIGS. 15A-15B show a schematic depiction of an ion rejecting ultrafiltration membrane module according to an embodiment herein described. FIG. 15A shows module configuration of an exemplary module. FIG. 15B shows an exemplary cation rejecting hollow fiber. FIG. 15C shows an exemplary anion rejecting hollow fiber.

FIG. 16A shows the module configuration. FIG. 16B shows a schematic of and exemplary anion/cation absorbing hollow fiber.

FIG. 17A-17B show functionalized hyperbranched macromolecules as building blocks for ion-selective hollow fibers according to an embodiment herein described. FIG. 17A shows schematics of exemplary anion selective hyperbranched macromolecules with amine and ammonium reactive sites. FIG. 17B shows schematics of exemplary cation selective hyperbranched macromolecules with $SO_3H$ and $PO_3H_2$ reactive sites.

FIG. 18A shows a fourth generation PAMAM dendrimer and FIG. 18B shows a fifth generation PPI dendrimer.

FIGS. 23A-23B show a depiction of the exemplary nanofibrous composite (NFC) membranes according to an embodiment herein described. FIG. 23A shows hollow nanofibers with embedded dendritic molecules. FIG. 23B shows general schematic depictions of the dendritic molecules.

FIG. 24A shows a schematic example of the electrospinning and electrospraying of the nanofibers comprising the membrane. FIG. 24B shows an SEM image of the three layers. FIG. 24C shows the various chemistries and exemplary structures of the separation layers.

FIG. 25A shows an SEM image of the electrospun nanofibers from a polymer solution dissolved in DMF solvent. FIG. 25B shows and SEM image of the electrospun nanofiber from polymer solution NMP/DMF mixed solvent.

FIGS. 26A-26F show SEM images of the surfaces and cross-section morphologies of composite materials and membranes according to an embodiment herein described. FIG. 26A (surface) and FIG. 26B (cross-section) show SEM images of an NFC-PVDF-PEI-1 membrane cross linked with trimesoyl chloride. FIG. 26C (surface) and FIG. 26D (cross-section) show SEM images of NFC-PVDF-PEI-2 membrane cross linked with 1,3-dibromopropane. FIG. 26E (surface) and FIG. 26F (cross-section) show SEM images of NFC-PVDF-PEI-3 cross linked with epichlorohydrin. The length of the scale bar is equal=5 µm.

FIGS. 27A-27E show FTIR-ATR spectra of microporous supports according to an embodiment herein described. FIG. 27A shows a spectrum of a PVDF microporous support. FIG. 27 B shows a spectrum a PVDF+PEI nanofibrous scaffold. FIG. 27C shows a spectrum NFC-PVDF-PEI-1 membrane cross linked with trimesoyl chloride. FIG. 27D shows a spectrum NFC-PVDF-PEI-2 membrane cross linked with 1,3-dibromopropane. FIG. 27E shows a spectrum NFC-PVDF-PEI-3 membrane cross linked with epichlorohydrin.

FIGS. 29A-C show salt rejection at pH 4-8 and FIGS. 29D-F show permeat flux at pH 4-8.

FIG. 31A shows the distribution of desalination production capacity by process technology for the world in 2005. FIG. 31B shows the distribution of desalination production capacity by process technology for the United States in 2005. FIG. 31C shows the distribution of desalination production capacity by process technology for the Middle East in 2005 [Ref. 8.4].

FIGS. 44A-44B show the structure of hyperbranched polyethyleneimine (PEI). FIG. 44A shows the monomer subunits of and exemplary PEI molecule. FIG. 44B is a schematic depiction of an exemplary hyperbranched PEI molecule.

FIGS. 45A-45B show configuration of an exemplary membrane. FIG. 45A is a schematic depiction of the membrane and FIG. 45B is the description of the composition of the layers.

FIG. 48A shows images 20 µm scale. FIG. 48B shows images at 5 µm scale. FIG. 48C shows images at 2 µm scale. FIG. 48D shows images at 500 nm scale.

FIGS. 49A-D show images of a cross-linked PEI coating on a layer of PAN nano and microfibers.

FIGS. 50A-B show, according to an embodiment herein described, show images a top view of a cross-linked PEI coating on a layer of PAN nano and microfibers.

FIG. 53 shows a schematic (top panel, left) of an electrospinning apparatus according to some embodiments and five SEM images of nanofibers at various stages of the methods for preparing Ion-Selective filtration membranes by electrospinning using PET, PVDF and hyperbranched PEI macromolecules and nanoparticles as building blocks according to embodiments herein described. In particular, the SEM images are taken of PVDF nanofibers (top panel, middle), composite PVDF+PEI nanofibers (top panel, right), PET support paper (bottom panel, left), composite PVDF+HBPEI+PEI NP nanofibers casted onto a PET support, and cross-linked PVDF+HBPEI+PEI NP nanofibers casted onto a PET support.

FIGS. 58A-58B also indicate that the concentration of cross-linkers and reaction time can affect surface morphology in the nano-scale.

FIG. 62 shows a table of X-ray photoelectron spectroscopy data for characterization of NFC-PAN-PEI-TMC membranes. The data shows that the nitrogen ratio of the surface was increased with increasing TMC concentration. The data also shows that the more cross-linker that is used, the more dense the HPEI layer, at least in embodiments where interfacial polymerization and highly reactive cross-linkers are used.

FIG. 66A shows the reaction scheme for the formation of hyperbranched PEI nano/microparticles from hyperbranched PEI macromolecules. FIG. 66B shows a schematic depiction of the inverse miniemulsion process.

FIG. 69A shows base PEI beads. FIG. 66B shows Functionalization of Base PEI Beads with glucono-1,5-D-lactone

FIG. 71A shows a schematic representation of complexation and/or encapsulation of target metal ions including, for example, palladium (II) ions. FIG. 71B shows a schematic representation of the reduction of the metal ions, for example, the reduction of palladium (II) to catalytically active palladium (0).

DETAILED DESCRIPTION

Figures 1A, 1B, 1C:
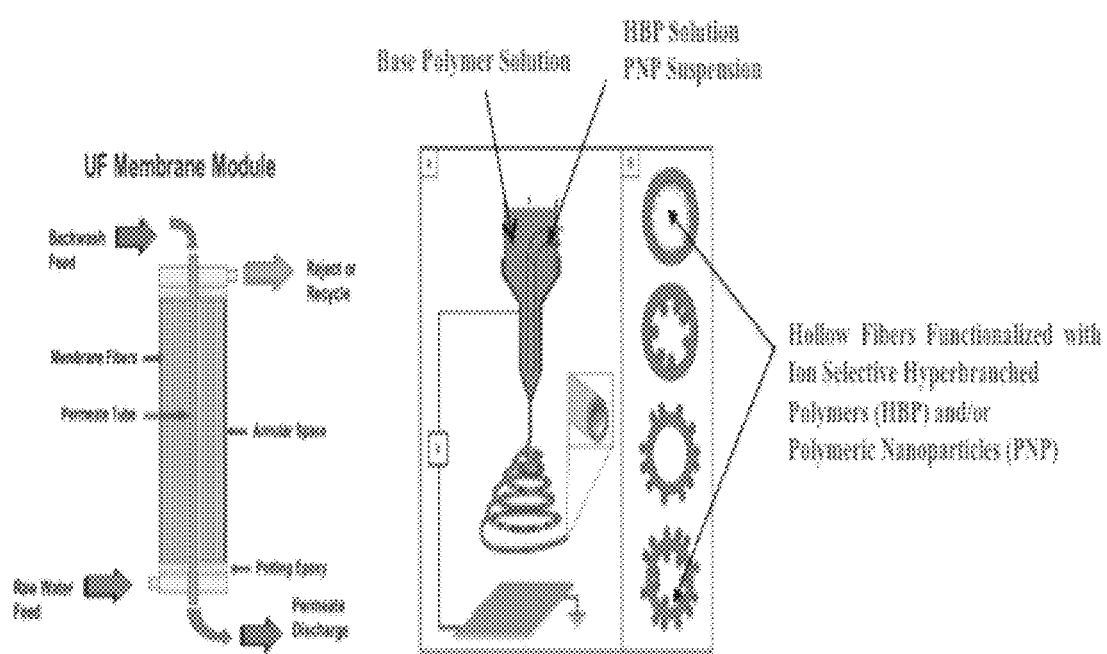
FIGS. 1A-1C are a schematic illustrating of an ion-selective UF membranes for water treatment and desalination according to an embodiment herein described and related UF membrane module (FIG. 1A), a related process of manufacturing nano- and/or micro-fibers according to an embodiment herein described (FIG. 1B) and nano- and/or micro-fibers according to an embodiment herein described (FIG. 1C.

Provided herein are membranes and related nano- or micro-fiber, composite material, methods and systems that allow in several embodiment to perform selective filtration of a liquid and in particular of water.

The term "filtration" as used herein refers to the mechanical or physical operation which can be used for separating components of a homogeneous or heterogeneous solutions. Types of filtration can be classified by the approximate sizes of chemicals to be separated and can include particle filtration, or PF (>10 μm); microfiltration, or MF (0.1-10 μm);

ultrafiltration, or UF (0.01-0.1 µm); nanofiltration, or NF (0.001-0.01 µm); and reverse osmosis, or RO (<0.001 µm).

The term "chemicals" as used herein indicates a substance with a distinct composition that is produced by or used in a chemical process. Exemplary chemicals comprise particles, molecules, metals, ions, organic compounds, inorganic compounds and mixture thereof as well as any additional substance detectable through chemical means identifiable by a skilled person. In particular, in some embodiments, the chemicals can comprise solutes dissolved in a fluid (e.g. water), and in particular dissolved ions.

The term "membrane" as used herein refers to a porous structure that is capable of separating components of a homogeneous or heterogeneous fluid. In particular, "pores" in the sense of the present disclosure indicate voids allowing fluid communication between different sides of the structure. More particular in use when a homogeneous or heterogeneous fluid is passed through the membrane, some components of the fluid can pass through the pores of the membrane into a "permeate stream", some components of the fluid can be retained by the membrane and can thus accumulate in a "retentate" and/or some components of the fluid can be rejected by the membrane into a "rejection stream". Membranes can be of various thickness, with homogeneous or heterogeneous structure. Membranes can be comprised within, for example, flat sheets or bundles of hollow fibers. Membranes can also be in various configurations, including but not limited to spiral wound, tubular, hollow fiber, and other configurations identifiable to a skilled person upon a reading of the present disclosure (see, for example the web page kochmembrane.com/Learning-Center/Configurations.aspx). Membrane can also be classified according to their pore diameter. According to IUPAC, there are three different types of pore size classifications: microporous (dp<2 nm), mesoporous (2 nm<dp<50 nm) and macroporous (dp>50 nm). Membranes can be neutral or charged, and particles transport can be active or passive. The latter can be facilitated by pressure, concentration, chemical or electrical gradients of the membrane process.

The term "fiber" as used herein indicate a material that is a continuous filament or is in a discrete elongated piece, similar to a length of thread. In particular, "nanofiber" as used herein refer to fibers with a diameter less than approximately 1000 nm and the term"microfiber" as used herein refer to fibers with a diameter between approximately 1 µm to approximately 10 µm in size. More particularly, nanofibers and microfibers in the sense of the present disclosure comprise a scaffold component providing a supporting framework for one or more additional components attached to the scaffold providing functionalities to the scaffold. The scaffold component and the additional components define features of the nanofiber and microfiber such as a diameter (or radius), a mechanical strength, chemical stability, functionalization and chemical properties which are detectable using techniques and process identifiable by a skilled person. The features of nanofibers and microfibers in the sense of the present disclosure which can also be controlled by modifying the chemical composition and structure of the fiber during manufacturing of the fiber according to techniques identifiable by a skilled person upon reading of the present disclosure.

In several embodiments, a filtration membrane herein described comprises a plurality of nano and/or micro fibers, each having a polymer component providing the fiber scaffold and a dendrimer component presenting reactive sites on the fiber scaffold the reactive site selective for a chemical.

The term "polymeric component" as used herein refers to a linear polymer comprising repeating structural unit forming long chains without branches or cross-linked structures. In some instances molecular chains of a linear polymer can be intertwined, but in absence of modification or functionalization the forces holding the polymer together are physical rather than chemical and thus can be weakened by energy applied in the form of heat. In particular, polymers forming the polymeric component in the sense of the disclosure comprise substituted or unsubstituted aliphatic polymer, a substituted or unsubstituted unsaturated polymer and a substituted or unsubstituted aromatic polymer identifiable by a skilled person.

The term "dendritic component" as used herein refers to a highly branched dendritic macromolecule or dendritic nanomaterial. The term "highly branched dendritic macromolecule" as used herein indicates a macromolecule whose structure is characterized by a high degree of branching that originates from a central core region. Exemplary highly branched dendritic macromolecules comprise dendrimers, hyperbranched polymers, dendrigraft polymers, dendronized linear polymers, tecto-dendrimers, core-shell (tecto) dendrimers, hybrid linear-dendritic copolymers, dendronized polymers and additional molecule identifiable by a skilled person (see e.g. US 2006/0021938, US 2008/0185341, US 2009/0001802, US 2010/0181257, US 2011/0315636, and US 2012/0035332 each incorporated by reference in its entirety, also describing method of making highly branched dendritic macromolecules).

The term "dendritic nanomaterial" refers to highly branched dendritic macromolecules cross linked in aggregate nanostructures and/or microstructure with a controlled composition, architecture, and/or size. Exemplary dendritic nanomaterials can include, for example, any highly branched dendritic macromolecules or mixtures thereof, in dendrimer-based supramolecular assemblies, 3-D globular nanoparticles or dendritic nano/microparticles identifiable by a skilled person (see, for example, US 2006/0021938, US 2008/0185341, US 2009/0001802, US 2010/0181257, US 2011/0315636, and US 2012/0035332 each incorporated by reference in its entirety).

In embodiments herein described, the polymer forming the polymer component has a functional group capable of interacting with a corresponding functional group on the dendrimer The term "functional group" as used herein indicates specific groups of atoms within a molecular structure that are responsible for the characteristic chemical reactions of that structure. Exemplary functional groups include hydrocarbons, groups containing halogen, groups containing oxygen, groups containing nitrogen and groups containing phosphorus and sulfur all identifiable by a skilled person. In particular, functional groups in the sense of the present disclosure include a carboxylic acid, amine, triarylphosphine, azide, acetylene, sulfonyl azide, thio acid and aldehyde. In particular, for example, the first functional group and the second functional group can be selected to comprise the following binding partners: carboxylic acid group and amine group, azide and acetylene groups, azide and triarylphosphine group, sulfonyl azide and thio acid, and aldehyde and primary amine. Additional functional groups can be identified by a skilled person upon reading of the present disclosure. As used herein, the term "corresponding functional group" refers to a functional group that can react with another functional group. Thus, functional groups that can react with each other can be referred to as corresponding functional groups. In embodiments where the corresponding functional groups are in the polymer component and in the dendrimer component the corresponding functional group react to form a covalent bond, a hydrogen bond or other bond functional to the attachment of the polymer component and the dendrimer component identifiable by a skilled person upon reading of the present disclosure.

The term "attach" or "attachment" as used herein, refers to connecting or uniting by a bond, link, force or tie in order to keep two or more components together, which encompasses either direct or indirect attachment such that, for example, a first compound is directly bound to a second compound or material, and the embodiments wherein one or more intermediate compounds, and in particular molecules, are disposed between the first compound and the second compound or material. In particular, in some embodiments, the dendritic component can be associated with the polymeric component by, for example, by being physically embedded in the polymeric component, by being covalently bonded to the polymeric component, or through a combination of both.

In some embodiments, the polymer component comprise a polymer having a formula

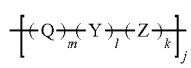
(I)

wherein:

Q, Y, and Z comprise saturated aliphatic hydrocarbon, aromatic hydrocarbon, or unsaturated aliphatic hydrocarbons;

m, l, and k independently are integers ranging between 0-50;

at least one of m, l, k is not equal to zero;

j is an integer ranging between 50-500; and at least one of Q (when Q≠0), Y (when Y≠0), or Z (when Z≠0), comprises the polymer component functional group.

The term "saturated aliphatic hydrocarbon" as used herein refers to a hydrocarbon comprising, carbon atoms that are joined together in straight chains, branched chains, or non-aromatic rings in which the carbon-carbon bonds are saturated with hydrogen (e.g. methane, ethane, propane, isobutane, and butane). For example, in saturated aliphatic hydrocarbons have a general formula of $CH_nH_{2n+2}$ for acyclic saturated aliphatic hydrocarbons and $C_nH_{2n}$ cyclic saturated aliphatic hydrocarbons. Saturated aliphatic hydrocarbon can be substituted with one or other elements, for example, N, O, S, P, F, Cl, Br, and I.

The term "aromatic hydrocarbon" as used herein refers to a hydrocarbon comprising a conjugated ring of unsaturated bonds, lone pairs, and/or empty orbitals which can exhibit a stabilization stronger than expected by the stabilization by conjugation alone. An exemplary aromatic compounds is benzene which is a six-membered ring having alternating double and single bonds between carbon atoms. Aromatic hydrocarbons can be monocyclic (MAH) (e.g. benzene) or polycyclic (PAH) (e.g. naphthalene, anthracene, pyrene). Aromatic hydrocarbons can be substituted with one or other elements, for example, N, O, S, P, F, Cl, Br, and I.

The term "unsaturated aliphatic hydrocarbon" as used herein refers to a hydrocarbon comprising carbon atoms that are joined together in straight chains, branched chains, or non-aromatic rings and comprise at least one of a double or a triple bond between adjacent carbon atoms, referred to as "alkenes" and "alkynes", respectively. An unsaturated hydrocarbon can comprise one or more of double or triple bonds. In hydrocarbons having more than one double or triple bond, the unsaturated hydrocarbon can be conjugated (e.g. 1,4-hexadiene) or can be isolated (e.g. 1,5-hexadiene). In hydrocarbons comprising internal alkenes, the alkenes can be in a "cis" or a "trans" configuration (e.g. trans-2-butene or cis-2-butene). Unsaturated aliphatic hydrocarbon can be substituted with one or other elements, for example, N, O, S, P, F, Cl, Br, and I.

In particular in some embodiments, Q, Y, and Z in formula (I) can independently selected from the following formulas:

(II)

(III)

(IV)

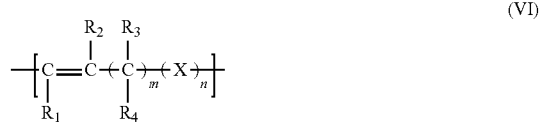
(VI)

(VII)

(VIII)

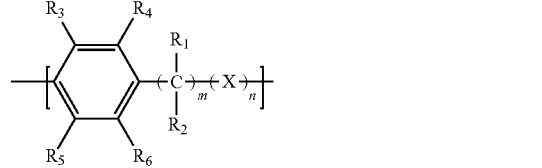
(IX)

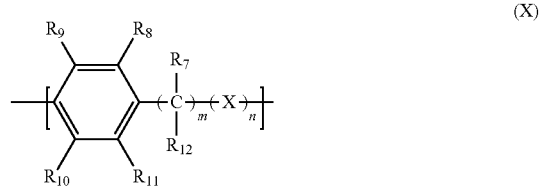
(X)

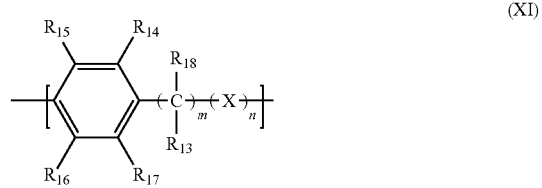
(XI)

wherein:

n=0 or 1;

m is an integer ranging from 0-15;

X is a functional group comprising an atom selected from O, S, N, P, or F; and $R_1$-$R_{18}$ are independently selected from: the polymer component functional group; hydrogen; $C_1$-$C_{20}$ linear, branched, saturated, unsaturated, or aryl hydrocarbon which are either substituted or unsubstituted with O, N, B, S, P; or substituted O, N, B, S, or P;

and at least one of $R_1$-$R_8$ is the polymer component functional group attaching the dendrimer component.

Exemplary polymer materials for polymeric components herein described comprise polysulfone (PS), polyether sulfone (PES), poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET) (see Examples 1 to 4 and 27). Additional polymers suitable as a polymer component herein described comprise polymers which can be used as base polymers in the fabrication of commercial hollow-fiber UF/MF membranes, polymer which is either partially soluble or can be dispersed in solvents with different physicochemical properties together with functionalized anion-selective HPB macromolecules and nanoparticles according to the disclosure, and polymers which can be functionalized, which are identifiable by a skilled person upon reading of the present disclosure.

Suitable dendrimer components can be selected for a given polymer component based on compatibility which can be determined based on the presence of corresponding functional group capable of attachment as well as possibly other features such as solubility of the dendritic component together with the polymeric component in a particular solvent or mixture of solvents, affinity of the dendritic component for polymeric component, and/or stability of the dendritic component in a solvent to be used in the fabrication of the fiber.

In some embodiments, the dendritic components according to some embodiments have the general formula (XII)

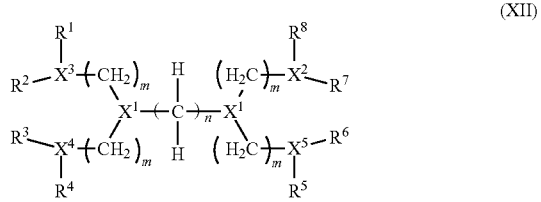

(XII)

wherein:

n and m are integers ranging from 2-5;

$R^1$-$R^8$ are independently selected from hydrogen or hyperbranched polymer moieties;

$X^1$ and $X^2$ are N; and $X^4$-$X^5$ are selected from amine, amide, imide, and carbamate.

In particular, in some embodiments, the dendritic components according to some embodiments have the general formulas XIII and XIV below:

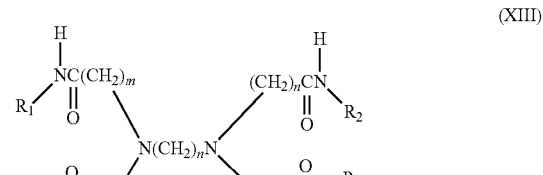

(XIII)

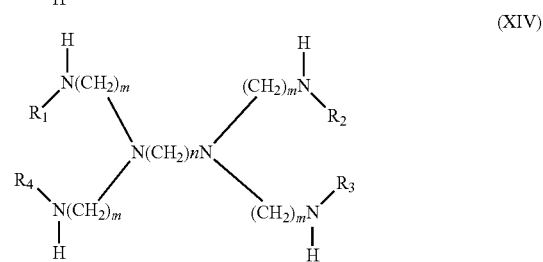

(XIV)

wherein n and m are integers from 2-5, and wherein $R_1$-$R_4$ can be independently hydrogen or hyperbranched polymer moieties including, but not limited to, polyethyleneimine (PEI) and derivatives thereof.

In some embodiments, the dendritic component comprises a core, a plurality of arms extending from the core, the arms having a hyperbranched structure, and within the hyperbranched structure, a plurality of units satisfying having the formula:

(XV)

where $R^1$ comprises no nitrogen atoms that are simultaneously bound to two or more carbon atoms, for example, secondary and tertiary amines or amides.

In some embodiments the dendritic component comprises the formula:

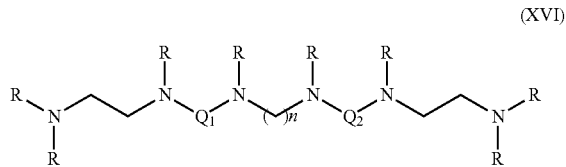

(XVI)

where n is an integer ranging from 2-5, each of $Q_1$ and $Q_2$ comprises hyperbranched polymer moiety, and R is selected from hydrogen, an alkyl group, or a 2-hydroxyalkyl group.

In particular, in some embodiments, when groups $R^1$-$R^8$ and Q of formulas XII-XV comprise hyperbranched polymer moieties with amino and/or alcohol groups, the molecules can be converted to nano/microparticles by cross linking the molecules with cross-linking reagents described herein (e.g. 1,3-dibromopropane or epichlorohydrin) using inverse micelles as described herein (see e.g. Example 33).

In particular, in some embodiments, the dendritic component can comprise various monodisperse generations of poly(amidoamine) (PAMAM) dendrimers (for example, G3, G4, or G5 PAMAM) or micro and/or nano aggregates thereof; monodisperse generations of poly(propyleneimine) (PPI) (for example, G3, G4, or G5 PPI) or micro and/or nano aggregates thereof; monodisperse generations of poly(bis (methylol)propionic acid) (MPA) (for example, G3, G4, or G5 MPA) or micro and/or nano aggregates thereof; or monodisperse generations of poly(ethyleneimine) (PEI) (for example, G3, G4, or G5 PEI) or micro and/or nano aggregates thereof. In other embodiments, the dendritic component can be polydisperse hyperbranched PEI. Hyperbranched PEI can be prepared, for example, by ring opening polymerization of aziridine also known as ethylene imine. Additional dendritic components can be selected, for example, based on compatibility with a polymeric component as described herein.

Suitable polymer components can be selected for a given dendrimer component based on compatibility which can be determined based on the presence of corresponding functional group capable of attachment as well as possibly other features such as solubility of the polymer component together with the dendrimer component in a particular solvent or mixture of solvents, affinity of the polymer component for the dendrimer component, and/or stability of the polymer component in a solvent to be used in the fabrication of the fiber.

A method of identifying a compatible polymeric component according to some embodiments, comprises selecting a dendritic component to be used for fabricating a membrane; selecting a polymeric component to be used for fabricating the membrane based on the compatibility between dendrimer component and polymer component; selecting a solvent or mixture of solvents; combining the dendritic component, polymeric component, and solvent or mixture of solvents and making a multilayer membrane according to embodiments herein described; and determining whether or not the layer of the multilayer membrane can be delaminated or peeled away, under a desired force or pressure applied. If a layer is not able to be delaminated following application of the force then the polymeric component can be considered to be compatible. If the layer is able to be delaminated under the desired force or pressure then the polymeric component can be considered as being not compatible.

In filtration membranes herein described, dendrimer component is attached to the polymer component typically through a covalent and/or a hydrogen bond. For example, in some embodiments, when the polymeric components of formulas I-XI comprise fluorine and/or carbonyl groups, dendritic components of formulas XII-XV comprising amino groups can attach to the polymeric component through hydrogen bonds from the amino hydrogen atoms to the fluorine or carbonyl oxygen atoms. In other embodiments, when the polymeric components comprise carboxylic acid groups, dendritic components comprising amino groups can attach to the polymeric component through formation of covalent amide bonds.

In particular in embodiments of the filtration membrane herein described the dendrimer component is attached to the polymer component to present reactive sites on the fiber scaffold.

The term "present" as used herein with reference to a compound or functional group indicates attachment performed to maintain the chemical reactivity of the compound or functional group as attached. Accordingly, a functional group presented on a surface, is able to perform under the appropriate conditions the one or more chemical reactions that chemically characterize the functional group.

The term "reactive site" as used herein refers to a chemical functional group capable of attracting, rejecting, and/or binding to a chemical of interest. In particular, reactive sites herein described are able to attract, reject or bind selectively a chemical to be filtered. Exemplary functional groups suitable as reactive sites include, but are not limited to, amines, quaternary ammonium groups, amides, hydroxyl groups, ethers, carboxylates, esters, sulfonates, sulfiniates, sulfonate esters, sulfinate esters, sulfonamides, sulfonamides, phosphates, carbamates, ureas, imidines, guanidines, oximes, imidazoles, pyridines, thiols, thioethers, thiocarboxylates, and phosphines.

In particular, in some embodiments, the reactive site can be located on the dendritic component (for example, amino groups on PEI) without any chemical transformation being necessary. In other embodiments, one or more reactive sites can be introduced into the dendritic component after a chemical transformation. Exemplary chemical transformations suitable for the introduction of a reactive site comprise reductive amination of amine groups to form alkylated amino groups, alkylation of amines to form quaternary ammonium groups, alkylation of hydroxyl groups to form ethers, reaction of amines or hydroxyls with haloalkyl carboxylic acids and/or derivatives (such as, for example, 2-chloroacetic acid or methyl 2-chloroacetate) to form carboxylic acids and/or derivatives, reaction of amines or hydroxyls with haloalkyl sulfonic acids and/or derivatives (such as, for example, 2-(chloromethyl)sulfonic acid or methyl 2-(chloromethyl)sulfonate) to form sulfonic acids and/or derivatives, and reaction of amines with epoxides to form alcohols. Other transformations are identifiable to a skilled person upon a reading of the present disclosure (see, for example, US 2010/0181257 and US 2011/0315636 each incorporated by reference in its entirety). In some embodiments, the chemical transformation of the reactive site on the dendritic component can be performed before the dendritic component is associated with the polymeric component as herein described. In other embodiments, the chemical transformation of the reactive site on the dendritic component can be performed after the dendritic component is associated with the polymeric component as herein described.

In embodiments herein described of filtration membrane herein described the reactive site can be selected and configured on the fiber scaffold to provide selective filtration of one or more chemicals of interest. In particular, in some embodiments, the reactive site can be selected to separate the one or more chemicals of interest in the rejection stream, permeate stream and/or retentate of the membrane. In particular, the dimension, chemical nature, and electrical charge of the reactive site as well as the location on the dendrimer component can be selected based on the dimensions, chemical nature and electrical charge of the chemical to be selectively filtered.

For example in embodiments wherein selective filtration is desired to include anions in rejection stream and 2s metal ions cations such as $Ca^{2+}$ and $Mg^{2+}$ in the retentate of the membrane, reactive sites having negatively charged O donors [Ref. 5.17] can be presented on the dendrimer component of the membrane. As another example, dendritic components having neutral oxygen donors can be used to coordinate selective retention of Is metal ions such as $Na^+$ [Ref. 5.17]. As another example, dendritic components having positively charged nitrogen atoms (e.g. quaternary ammonium groups) can be used to selectively reject cations. As another example, dendritic components comprising vicinal diol groups can be used to coordinate selective retention of boron (see e.g. Examples 31 and 35)

In some embodiment, reactive sites retaining one or more chemical of interest can then be subjected to further reactions to selectively release some or all of the chemicals forming the retentate in a permeate stream, and/or to further modify the retentate as will be understood by a skilled person upon reading of the present disclosure.

In particular, membranes herein described including a suitable retentate can be treated to convert the retentate into a catalyst thus forming a catalytic membrane. For example, in some embodiments, a retentate form by metals can be treated with suitable active agents to change the oxidation state and/or ligation state to convert the metal to a catalytically active form. For example, in an embodiment dendritic components having groups capable of retention of palladium (e.g. amines and phosphines) can be subjected to reduction (e.g. $H_2$ or other reducing agents) to reduce the Pd atoms to produce catalytically active Pd(O) sites. Additional suitable metals or other materials suitable for preparation of catalytic membrane and related activating agents and/or suitable treatments will be identifiable by a skilled person.

In some embodiments, the retentate can be subjected to a selective release before or after an additional treatment. For example dendritic components having negatively charged O donors and tertiary amine groups can be used to selectively bind $Ca^{2+}$ and $Mg^{2+}$ ions at pH ~7.0, and the ions can later be released from the dendritic component by washing the dendritic component with an acidic solution containing a small ligand such as citric acid.

In filtration membrane herein described microfiber and/or nanofiber herein described can be comprised as a composite material layer having a mesh structure comprised in the filtration membrane alone or in combination with one or more additional layers.

The term "composite material" as used herein refers to a heterogeneous material made from two or more different materials, the materials having different chemical and/or physical properties and remaining as separate and distinct materials within the composite material. For example, according to embodiments herein described, a composite material can comprise a polymer component and a dendritic component which is structurally different from the polymer component. As another example, a composite material can comprise a dendritic component wherein a portion of the dendritic component is cross linked through a cross linking agent as described here, thus providing a material having one or more cross linked portions and one or more non-cross linked portions. The composite material according to some embodiments can comprise a semi-permeable barrier made of overlapping strands of nanofibers.

In particular, the composite material comprising a plurality of nanofibers or microfibers can comprise a plurality of a same type of fiber or of two or more different types of fibers. In some embodiments, fibers can be covalently cross-linked to one another. In some embodiments, nanofibers or microfibers comprised in the composite material comprise hollow fibers herein described.

The features of the mesh such as dimension of the pores of the mesh structure, the strength and resistance of the mesh and chemical compatibility of the mesh can be controlled by selection of the diameter of the nanofiber or microfiber, number and configuration of the nanofiber and/or microfiber forming the mesh and the specific polymer component and dendrimer component of each fiber as will be understood by a skilled person upon reading of the present disclosure.

In some embodiments, filtration membranes herein described comprise one or more composite material layers herein described alone with no additional layer. In some embodiments, the filtration membrane further comprise one or more support layer and/or one or more coating layers A "support layer" in the sense of the present disclosure is an aggregate material comprising a polymer component configured to strengthen the membrane structure. Suitable polymers to be included in support layers comprise, for example, poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET) which can be aggregated by inverse casting the polymer or by electrospinning. In some embodiments the support layer includes pores. In some embodiments, the support layer can be functionalized with a dendrimer component. For example, in some embodiments, the dendrimer component can be mixed with a suitable polymer component and electrospun onto a provided support layer (see e.g. Examples 20-21). In other embodiments, after a mixture of dendritic component and polymeric component is electrospun onto a support layer, a further support layer can be electrospun to provide a top support layer for providing additional strength or for creating a bipolar membrane.

A "coating layer" in the sense of the present disclosure indicates an aggregate of a dendrimer component configured to provide a selective filtration of one or more chemicals. Suitable dendrimer components to be included in a coating layer comprise monodisperse generations poly(amidoamine) (PAMAM) dendrimers (for example, G3, G4, or G5 PAMAM) or micro and/or nano aggregates thereof; monodisperse generations of poly(propyleneimine) (PPI) (for example, G3, G4, or G5 PPI) or micro and/or nano aggregates thereof; monodisperse generations of poly(bis (methylol)propionic acid) (MPA) (for example, G3, G4, or G5 MPA) or micro and/or nano aggregates thereof; or monodisperse generations of poly(ethyleneimine) (PEI) (for example, G3, G4, or G5 PEI) or micro and/or nano aggregates thereof, which can be aggregated by crosslinking, for example by interfacial polymerization with a cross linker (e.g. trimesoyl chloride or 1,3-dibromopropane) as described herein (see, e.g. Examples 20-22)

In some embodiments, the additional layers can further comprise a scaffold layer comprising nano and/or microfibers including a polymer component and no dendrimer. The term "scaffold layer" refers to a layer of nano and/or microfibers that can comprise only the polymeric component as herein described, or the polymeric component and dendritic component as herein describe, that can serve as a scaffold for a coating layer of cross-linked dendritic component. For example, in some embodiments, a mixture of polymer component and dendritic component (e.g. PVDF and hyperbranched PEI) can be electrospun onto a support layer to provide a scaffold layer upon which a coating layer can be deposited (see e.g. Example 20). In other embodiments, a layer of polymer component (e.g. PAN) can be electrospun onto a support layer to provide a scaffold layer upon which a coating layer can be deposited (see e.g. Example 21)

In embodiments wherein filtration membrane herein described comprise one or more composite material layers and one or more additional layers, the one or more composite material layers and the additional layers can be comprised in the filtration membrane in various configurations as will be understood by a skilled person upon reading of the present disclosure. For example in some embodiments one or more composite layers can be comprised between two functionalized or unfunctionalized supporting layers. In some embodiments, one or more composite layers can be comprised between a supporting layer and a coating layer. In some of these embodiments a functionalized supporting layer can be further attached to the coating layer. In some embodiments a coating layer can be comprised between one or more composite layers a functionalized supporting layer. Additional configurations can be identified by a skilled person. In particular, selection of a configuration of the membrane can be performed by a skilled person in view of the polymer component and dendrimer component forming the composite material and/or the support layer and/or coating layer and in view of a desired selection of one or more chemicals to be filtered. (see e.g. Examples 20-22 and 27)

In embodiments, where the filtration membrane comprises a composites material layer with one or more additional layers, the polymer component and the dendritic component of the one or more composite material layers and/or of the one or more additional layer can be either the same or different. In some of these embodiments, the polymer component can be polysulfone (PS), polyether sulfone (PES), poly(vinylidene) fluoride (PVDF), poly(tetrafluoroethylene) (PTFE), poly(acrylonitrile) (PAN), poly(methyl methacrylate) (PMMA), poly(methacrylic acid) (PMAA), poly(acrylic acid) (PAA), and/or poly(vinyl methyl ketone). In some of these embodiments the dendrimer component can be a highly branched dendritic macromolecule selected from the group consisting of generation-3 poly(amidoamine) (PAMAM) dendrimer, generation-4 poly(amidoamine) (PAMAM) dendrimer, generation-5 poly(amidoamine) (PAMAM) dendrimer, generation-3 poly(propyleneimine) (PPI) dendrimer, generation-4 poly(propyleneimine) (PPI) dendrimer, generation-5 poly(propyleneimine) (PPI) dendrimer, generation-3 poly(bis(methylol)propionic acid) (MPA) dendrimer, generation-4 poly(bis(methylol)propionic acid) (MPA) dendrimer, generation-5 poly(bis(methylol)propionic acid) (MPA) dendrimer, generation-3 poly(ethyleneimine) dendrimer, generation-4 poly(ethyleneimine) dendrimer, generation-5 poly(ethyleneimine) dendrimer, and hyperbranched poly(ethyleneimine), or aggregate nanostructures and/or microstructure thereof.

In some embodiments, the filtration membranes comprise a plurality of hollow nano and/or micro fibers, arranged in a bundle configuration in which the nano and/or microfibers are substantially parallel one with another. In particular, in some embodiments, the nanofibers and/or microfibers can be hollow nanofibers comprising a lumen up to approximately 10 microns in diameter. The hollow nanofibers also comprise a polymeric component providing a fiber scaffold and a dendritic component attached to the polymeric component to present reactive sites on the fiber scaffold. In some of those embodiments the dendrimer component can be attached to the polymer component to present the reactive sites in the lumen within the fiber and/or in the outside surface of the fiber (see e.g. Example 3) In some embodiments, hollow fibers according the present disclosure can be fabricated, for example, by electrospinning the polymeric component with a bore fluid comprising the dendritic component, as exemplified in FIGS. 4A-4B and Example 3. In other embodiments, the hollow fibers can be produced by electrospinning the polymeric component with an inert bore fluid to provide hollow fibers of polymeric components which then have dendritic component attached by, for example, interfacial polymerization as described herein In some embodiments, where the filtration membrane herein described comprises hollow fibers suitable polymer component comprises PS, PES, PVDF and/or PAN can be suitable polymer components for filtration membranes according to the present disclosure, and can configured to have select chemicals selectable by UF/MF membranes [Ref. 1.8].

In particular, in some embodiments, the hollow nanofibers are ion-exchange hollow fibers comprising polymeric nano and/or micro fibers ranging from approximately 100-500 nm in diameter. In these embodiments, the fibers can have large charge densities which can allow for rejection anions and cations, for example, through the Donnan Effect [Ref. 1.7, 1.15]. In other embodiments the hollow fibers are ion-absorbing hollow fibers will comprise polymeric nano and/or micro fibers which can have a large number of binding sites which in some embodiments can selectively bind and release target cations and/or anions. Hollow-fiber configurations according to the present disclosure allow in some embodiments, large fiber packing density when used in membrane modules Hollow-fiber configurations according to the present disclosure also allow for low operating pressure (e.g. between approximately 0.3-2 bars) and pressure drop (between approximately 0.1-1 bar) across the membrane module and in some embodiments allow for backwashing of the fibers with aqueous solutions (e.g. acidic, basic or brine from membrane concentrates).

In particular, in some embodiments, the hollow nanofibers can be homogeneous anion-exchange hollow fibers or heterogeneous anion-exchange hollow fibers. The homogeneous anion-selective fibers according to the disclosure comprise hollow nanofibers with an embedded anion-selective dendrimer component (See e.g. FIGS. 2A-2C). The heterogeneous anion-exchange fibers according to the disclosure comprise hollow nanofibers with embedded anion-selective polymeric nanoparticles (NP). In particular, in these hollow fibers the polymeric components can be, for example, polysulfone (PS), polyethersulfone (PES), poly(vinylidenefluoride) (PVDF) or poly(acrylonitrile) (PAN).

Figure 11:
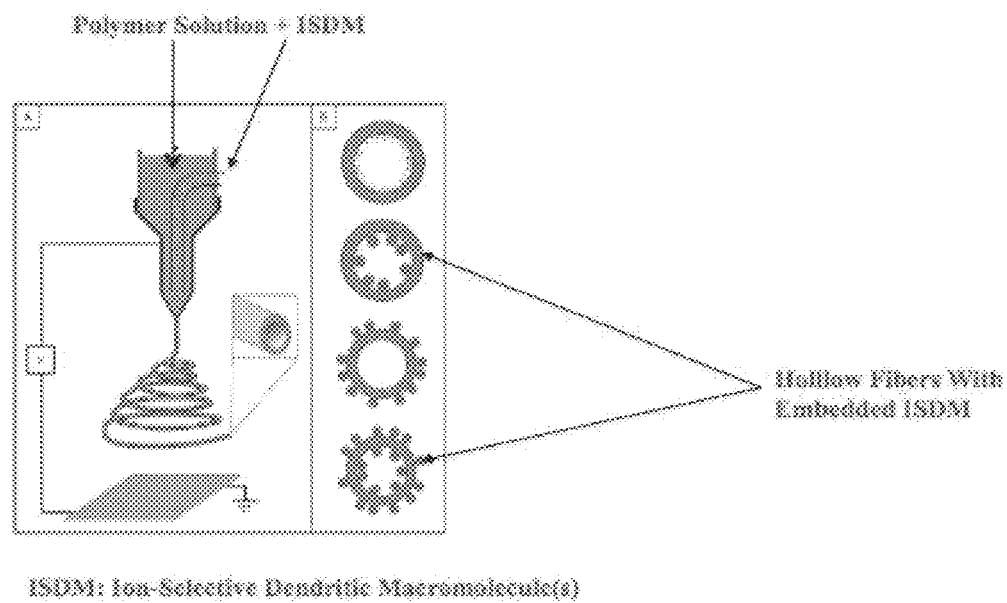
FIG. 11 shows a schematic example preparation of hollow nanofibers with embedded ion-selective dendritic macromolecules by electrospinning. (3.22) according to an embodiment herein described.

In particular, in some embodiments, the hollow nanofibers can have a dendrimer component embedded in outer and/or inner surfaces of the hollow fibers, for example using membrane surface modification techniques such as UV-induced graft copolymerization [Ref. 3.23], layer-by-layer assembly [Ref. 3.24-3.25] (followed by thermal cross-linking), or interfacial polymerization to covalently attach and/or graft dendrimer components as exemplified in FIG. 11.

In some embodiments where PES, PVDF and/or PAN are comprised as a polymer component of nanofiber or microfiber herein described in any configuration or as a polymer component of a functionalized support layer, a dendrimer component attached to the polymer component can comprise functionalized anion-selective HPB macromolecules and nanoparticles which according to some embodiments are used in conjunction with the polymeric component (See, for example, FIGS. 2A-2C and FIGS. 3A-3D and Examples 1-4) are either partially soluble (at least approximately 5-10 wt %) or can be dispersed in solvents with different physicochemical properties (e.g. boiling point and surface tension) such as tetrahydrofuran (THF), dimethyl formamide (DMF), and dimethyl acetamide (DMAc) [Ref. 1.23-1.24].

In some embodiments where PES, PVDF and/or PAN are comprised as a polymer component of nanofiber or microfiber herein described in any configuration or of the polymer component of a functionalized support layer PET, PVDF, PS and/or PAN can be further functionalized (e.g. through UV assisted surface grafting) with various functional groups (e.g. amines and/or carboxylic acids) which can be subsequently used for example, for covalent attachment of ion-selective and macromolecules and nanoparticles [Refs. 9.9-

9.10, 9.21-9.22]. The ability to functionalize can allow a wider variety of chemical structures for which the physical and chemical properties of the fibers can be varied, for example by varying spinning conditions In some embodiments, the dendritic component of nanofiber or microfiber herein described in any configuration, of the a functionalized support layer and/or of the coating layer can be formed by dendritic nanomaterials according to the present disclosure that can range from approximately 1-1000 nm in size and can in some embodiments can selectively encapsulate and release a broad range of solutes in water including but not limited to cations (e.g., copper, silver, gold and uranium), anions (e.g., chloride, perchlorate and nitrate) and organic compounds (e.g., pharmaceuticals) [Ref. 2.5-2.6].

In particular in some embodiments, the dendritic component can comprises hyperbranched PEI macromolecules, water-soluble branched macromolecules with functional N groups including for example, Gx-$NH_2$ PPI dendrimers, Gx-$NH_2$ PAMAM dendrimers, hyperbranched and dendrigraft lysine macromolecules, Hybrane hyperbranched polymers can be used as building blocks separation layers for the filtration membranes disclosed in this disclosure. Similarly, base polymers such as polysulfone (PS), polyethersulfone (PES), and/or poly(vinyl) alcohol can be used in making nanofibrous scaffolds of the filtration membranes described herein.

In some embodiments, dendritic nanomaterials can be selected to retain chemicals and to be used as nanoscale reactors and catalysts [Ref. 2.5-2.6]. In some embodiments, dendritic nanomaterial can be selected to be selective for cells, or other biological material (e.g. to reject or retain such material). For example, in some embodiments, filtration membranes herein described can be configured to bind bacteria and viruses possibly followed by a deactivation of the same [Ref 2.6]. In other embodiments, the dendritic nanomaterials can be used as scaffolds and templates for the preparation of metal-bearing nanoparticles with controllable electronic, optical and catalytic properties [Refs. 9.13-9.14]. Dendritic nanomaterials can also be used as delivery vehicles or scaffolds, for example for bioactive compounds [Ref. 9.8].

According to embodiments herein described, the dendritic component can be functionalized with surface groups can make the dendritic component soluble in selected media or bind to surfaces. According to some embodiments, a first dendritic component can be covalently linked to one or more further dendritic components or associated with one or more macromolecules to form supramolecular assemblies.

Figure 7:
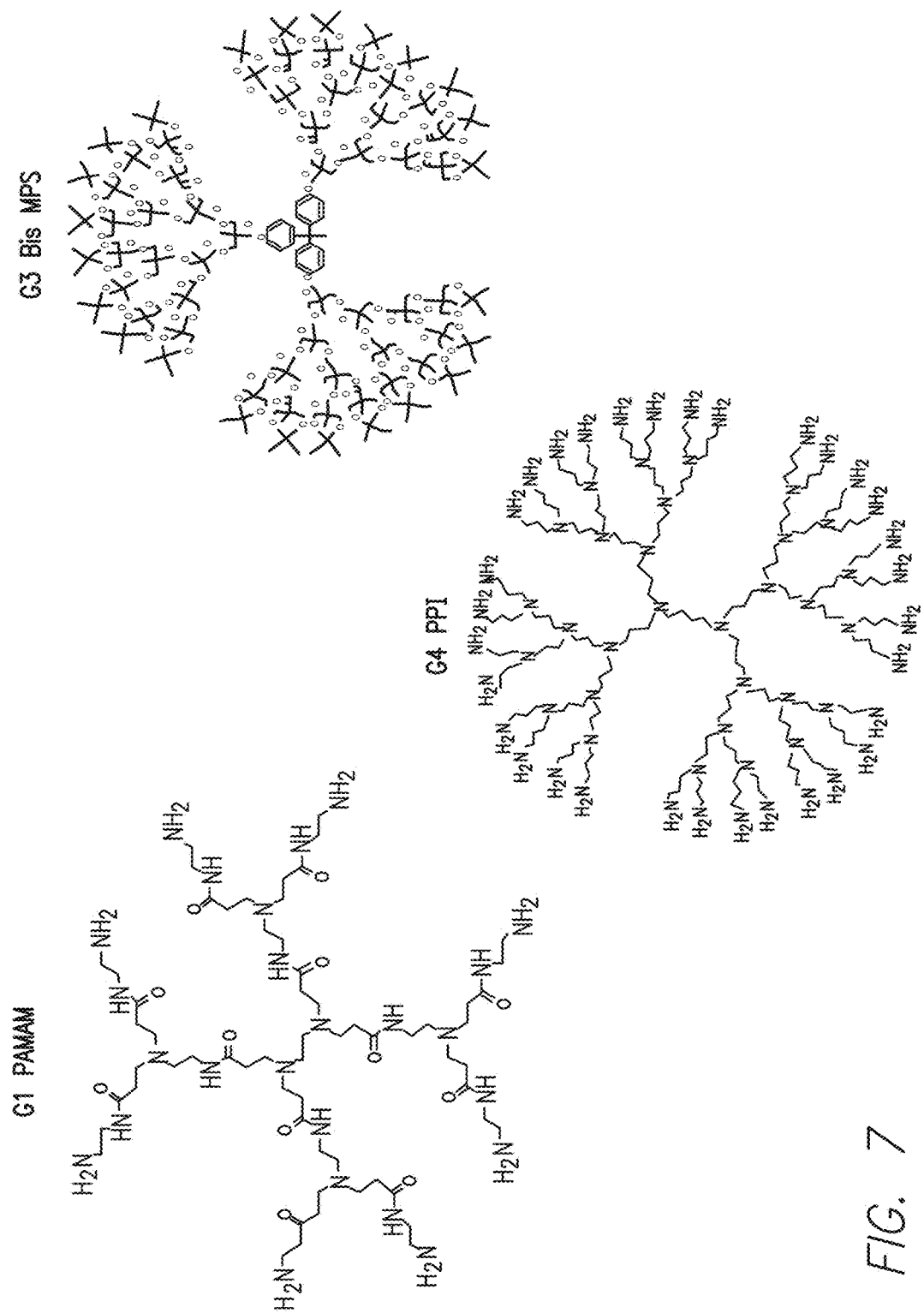
FIG. 7 shows 2-D structures of exemplary poly(amido-amine) (PAMAM), poly(propyleneimine) (PPI) and bis bis (methylol)propionic acid (MPA) dendrimers suitable in embodiments herein described.

According to some embodiments, a dendritic component can be used as functional materials, for example, for water treatment [Refs. 9.15-9.20]. According to some embodiments, the dendritic component comprises a carbon based structure functionalized with N or O. In particular, in some embodiments, the dendritic macromolecules comprise amines, carbonyls, and/or amides. In these embodiments, the N and O groups can sorb anions and/or cations. Exemplary dendritic components with N and O groups which can function as anion and cation sorbents include but is not limited to poly(amidoamine) [PAMAM], poly(propyleneimine) and bis (methylol) propionic acid (MPA) dendrimers (see, e.g. FIG. 7). Syntheses of dendritic component according to the present disclosure can be carried out, for example, by cross linking of dendritic macromolecules to form dendritic nano- and/or microparticles (See e.g. Example 33). Further syntheses of dendritic components will be apparent to a skilled person upon reading of the present disclosure (see, for example, references 2.7-2.16

According to some embodiments, the dendrimer components can bind and release cations such as $Cu^{2+}$, $Co^{2+}$, $Fe^{3+}$, $Ni^{2+}$ and $U^{6+}$] and anions such as $Cl^-$. $ClO_4^-$ and $SO_4^{2-}$, for example, through a change of solution pH [Refs. 2.7, 2.9-2.12 and 5.6-5.12]. In particular PAMAM, PPI, and MPA can in some embodiment bind and release cations such as $Cu^{2+}$, $Co^{2+}$, $Fe^{3+}$, $Ni^{2+}$ and $U^{6+}$, and anions such as $Cl^-$. $ClO_4^-$ and $SO_4^{2-}$—. In some embodiments PAMAM dendrimers are used and the dendrimer can present for example, an amide, a primary amine, a secondary amine, and/or a tertiary amine group (see e.g. [FIGS. 18A-18B] and Example 15). In some embodiments PPI dendrimers are used. In embodiments where PPI dendrimers are used, the PPI dendrimers have only primary and tertiary amine groups. In some embodiments MPA dendrimers are used. MPA dendrimers can have carbonyl and/or carboxyl groups which can allow for membranes to have a high capacity, selective, and/or recyclable ligands for $Ca^{2+}$, $Mg^{2+}$ and $Na^+$ (2.17).

According to further embodiments, dendrimers according to the present disclosure (e.g. PAMAM, PPI and MPA) can be functionalized with terminal groups which can allow the dendrimer to be soluble in a particular solvent to type of solvent, bind onto one or more targeted surfaces, or cross-link with other dendrimers to form multifunctional supramolecular assemblies (5.13-5.14) (See e.g. FIGS. 6A-6B).

In some embodiments, the dendritic macromolecules (e.g., PAMAM, PEI, and PPI dendrimers) can provide selective and recyclable high capacity macroligands for anions (for example $Cl^-$, $Br^-$; $SO_4^{2-}$; $NO_3^-$; and $ClO_4^-$) and cations (for example, $Na^+$, $Ca^{2+}$, and $Mg^{2+}$) in aqueous solutions [Refs. 1.16-1.19]. Such dendritic macromolecules can be suitable, for example, in making filtration membranes for water purification as $Na^+$, $Ca^{2+}$, and $Mg^{2+}$ cations and anions $Cl^-$ and $SO_4^{2-}$ anions make-up more than 98% of the total dissolved solids (TDS) in brackish water and seawater [Ref. 5.15].

In some embodiments, the dendrimer component comprises hyperbranched macromolecules, such as polyethyleneimine (PEI) which can behave similarly to corresponding, dendrimers] [Ref 1.20]. Hyperbranched PEI has a degree of branching at approximately 65-70%. Hyperbranched PEI are generally soluble (e.g. 5-20 wt %) in solvents such dimethyl formamide (DMF) and dimethyl acetamide (DMAc) [Refs. 9.20-9.21] Hyperbranched polyethyleneimine (PEI) can be useful as a monomer of interfacial polymerization due at least in part to its high amine density. Generally, hyperbranched PEI have a large number of amine groups per molecule (e.g. primary, secondary, and tertiary amine groups in a ratio of approximately 1:2:1), each nitrogen atom is linked each other by an ethylene group (FIGS. 44A-44B) [Ref. 8.11] which can allow for a number of unreacted amine groups, which can be sources of charges (e.g. by pH change in aqueous solution [8.24] or post-functionalization), for example, for enhancing Donnan exclusion effects.

In some embodiments, the dendritic components are capable of rejecting cations and anions. For example, dendritic components having negatively charged O donors can be used to coordinate 2s metal ions such as $Ca^{2+}$ and $Mg^{2+}$ [Ref. 5.17]. As another example, dendritic components having neutral oxygen donors can be used to coordinate with 1s metal ions such as $Na^+$ [Ref. 5.17].

In some embodiments, dendritic components containing negatively charged O donors and tertiary amine groups can be used to selectively bind $Ca^{2+}$ and $Mg^{2+}$ ions at pH ~7.0. The $Ca^{2+}$ and $Mg^{2+}$ ions can then be released from the dendritic component by washing the dendritic component with an acidic solution containing a small ligand such as citric acid. As another example, dendritic components containing neutral O donors and tertiary amine groups can selectively bind $Na^+$ ions at pH ~7.0. The $Na^+$ ions can then be released from the dendritic component by washing the dendritic component with an acidic solution containing a small complexing ligand such as citric acid. These examples are based on established trends in coordination chemistry [Ref. 5.17] and accordingly other methods of making and using dendritic components based on such trends as will be understood by a skilled person, can be implemented without departing from the scope of the present disclosure.

In some embodiments, nanofibers and/or microfibers can be made using polysulfone (PS), polyether sulfone (PES), poly(vinylidene) fluoride (PVDF), or poly(acrylonitrile) (PAN) as the polymeric component and poly(amidoamine) [PAMAM], poly(propyleneimine), bis(methylol)propionic acid (MPA), or polyethyleneimine (PEI) as the dendritic component.

In some embodiments, the dendritic component can be cross linked to one or more of another dendritic component and/or a polymeric component by using a cross linking agent. For example, a dendritic component comprising amine groups (e.g. can be combined with a cross linking agent which is capable of cross linking proximate amine groups (amine-amine cross linking agents) to form nanofibers. The amine-amine cross linking agents can be bifunctional (e.g. two sites which can form covalent bonds with amines) or multifunctional (e.g. three or more sites which can form covalent bonds with amines). The cross linking agents can include but are not limited to primary bifunctionalized alkanes having the general formula (XVI) or (XVII) below:

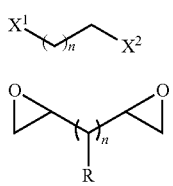

wherein $X^1$ and $X^2$, by way of example, can be independently selected from (COCl, COBr, COI, Cl, Br, I, $OSO_3CH_3$, $OSO_3C_7H_7$, n can range from 1-15, and wherein R can be H, alkyl, or epoxy substituted alkyl. Crosslinking agents can also include imidoesters (e.g. dimethyl adipimidate.2HCl (DMA), dimethyl pimelimidate.2HCl (DMP), dimethyl suberimidate.2HCl (DMS), dimethyl 3,3'-dithiobispropionimidate.2HCl (DTBP)), N-hydroxy succinimide (NHS)-esters (e.g. disuccinimidyl suberate (DSS), bis(sulfosuccinimidyl) suberate (BS3), disuccinimidyl glutarate (DSG)), and 1,5-difluoro-2,4-dinitrobenzene (DFDNB). Exemplary amine cross linking agents comprise in particular, trimesoyl chloride (TMC), 1,3-dibromopropane (DBP), and epichlorohydrin (EPC) to form nanofibers (see, e.g., Examples 20-22).

According to some embodiments, a computer aided molecular design framework can be used to guide a synthesis of ion-selective UF membranes, for example, for water treatment and desalination (See e.g. Examples 4 and 10).

In some embodiments, nanofibers and/or microfibers herein described are aggregated in a composite material herein described which is comprised of trimesoyl chloride (TMC) cross-linked polyethyleneimine (PEI) nanofiber. In another embodiment, the composite material herein described can be comprised of 1,3-dibromopropane (DBP) cross-linked polyethyleneimine (PEI) nanofibers. In another embodiment, the composite material is comprised of epichlorohydrin (ECH) cross-linked polyethyleneimine (PEI) nanofibers. In another embodiment, the composite material is comprised of nanofibers of cross-linked polyvinylidene fluoride (PVDF) nanofibers with embedded polyethyleneimine (PEI) macromolecules.

According to a further embodiment of the disclosure, a filtration membrane comprising layer of the composite material according to the disclosure in combination with a one or more additional layers is described. The additional layers can include, for example, a support layer and/or a separation layer.

In some embodiments herein described nanofibers or microfiber suitable as building blocks for nanofiltration membranes have features such as large surface area to unit volume, controllable pore size, mechanical strength, chemical stability, and an ability to be functionalized identifiable by a skilled person [Ref. 9.11-9.12]. In particular, in some embodiments, fiber dimensions and characteristics (e.g. mechanical strength, chemical stability) can be identified in view of a desired selective filtration and the assembling of the related polymer component and dendrimer component can be performed through a selection of chemical conditions and fabricating conditions described herein, the thickness of the nanofiber composite film and the chemistry of the dendritic nanomaterials, the filtration membranes described herein can in some embodiments have high water flux and water recovery.

In one embodiment, the membrane has a trimesoyl chloride (TMC) cross-linked polyethyleneimine (PEI) mesh layer on top of a polyvinylidine fluoride (PVDF) mesh layer which in turn is on top of a PVDF microporous support layer (see e.g. Example 20). In another embodiment, the membrane has a 1,3-dibromopropane (DBP) cross-linked polyethyleneimine (PEI) mesh layer on top of a poly(vinylidine fluoride) (PVDF) mesh layer which in turn is on top of a PVDF microporous support layer (see e.g. Example 20). In another embodiment, the membrane has an epichlorohydrin (ECH) cross-linked polyethyleneimine (PEI) mesh layer on top of a poly(vinylidine fluoride) (PVDF) mesh layer which in turn is on top of a PVDF microporous support layer (see e.g. Example 20). In another embodiment, the membrane has a trimesoyl chloride (TMC) cross-linked polyethyleneimine (PEI) mesh layer on top of a poly(acrylonitrile) (PAN) nanofibers mesh which in turn is on top of a polyethylene terephthalate (PET) support paper (see e.g. Example 21). In another embodiment, the membrane has a mesh of cross-linked poly(vinylidene fluoride) (PVDF) nanofibers with embedded polyethyleneimine (PEI) macromolecules and nanoparticles on top of a polyethylene terephthalate (PET) support paper (see e.g. Example 25).

In some embodiments, the membranes are assembled by layer-by-layer assembly (LBL) (See e.g. Example 5 and Example 27) LBL assembly of polyelectrolytes onto solid surface [Ref. 2.18-2.19] can be used for building multilayer thin films.

In particular, in some embodiments, methodology layer-by-layer assembly can be used to adsorb and deposit alternating layers of a dendritic component onto a layer of functionalized porous polymer support. By way of example, and not of limitation, PAMAM, PPI and/or MPA dendrimers with amino (NH$_2$) and carboxyl (COOH) can be adsorbed onto one or more layers of a functionalized porous polymer support.

In some embodiments, following a depositing of layers of the dendritic component onto the layers of porous polymer supports, a cross linking agent can be used to covalently link the sorbed layers of the dendritic component to the porous polymer support layer.

In these embodiments, cross-linkers can be selected based on the functionalization of the porous polymer support layer and the type functionalization on the dendritic component. For example, if the porous polymer support layer and the dendritic component are both functionalized with amines then the amine-amine cross-linking agents described herein with reference to crosslinking within a dendrimer component can be used. As a further example, if the porous polymer support is functionalized with carboxylic acids and the dendritic component is functionalized with amines, then cross linking agents can comprise reagents suitable for directly coupling of the amine and the carboxylic acid can be used, for example, to form an amide bond. Exemplary coupling reagents comprise, for example, known peptide coupling reagents identifiable by a skilled person (e.g. 1-ethyl-3-[3-dimethylaminopropyl]carbodiimide hydrochloride (EDC) and dicyclohexylcarbodiimide (DCC)).

According to some embodiments, a porous polymer support which is not functionalized can be functionalized according to methods identifiable by a skilled person and a functionalization can be selected based on the functionalization of a corresponding dendritic component which is selected to be adsorbed on the porous polymer support. The functionalization can further be selected based on which type of covalent linkage is to be used to attach the dendritic component to the porous polymer support. For example, if a direct cross linking between a dendritic component comprising primary or secondary amines is used and a porous polymer support is desired, the polymer can be functionalized with carboxylic acids, thus allowing for a direct cross linking (e.g. with coupling reagents). In some embodiments, functionalization of the polymer support can comprise performing a UV-induced graft copolymerization with a "2-enoic acid" (e.g. methacrylic acid) [Ref. 2.20]. The 2-enoic acids can comprise a compound according to formula (XIX):

(XIX)

where R$^1$ and R$^2$ are independently H or a C$_1$-C$_{10}$ alkyl group. Polymeric components which can be used these embodiments include but is not limited to polyethersulfone (PES and poly(vinylidene) fluoride (PVDF) [Ref. 2.20] and other suitable polymer supports according to the disclosure having an abstractable hydrogen for free radical addition (see, e.g. Example 36).

Figure 9:
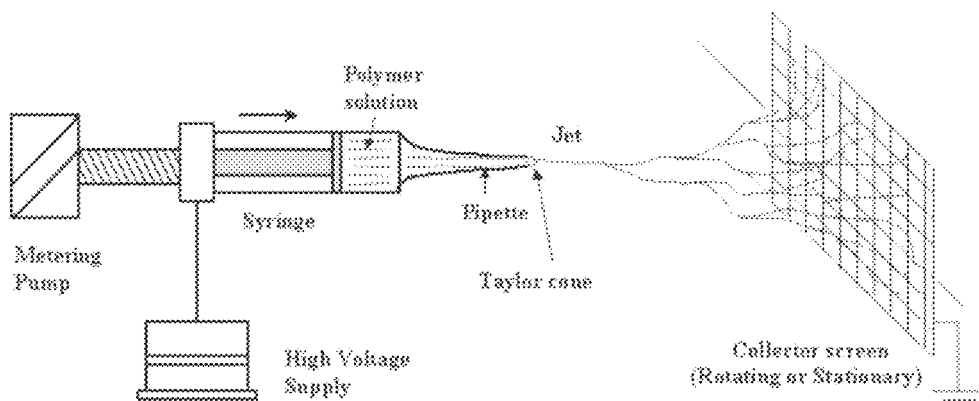
FIG. 9 shows a general schematic of nanofiber fabrication by electrospinning [Ref 2.23] according to an embodiment herein described.
Figure 10:
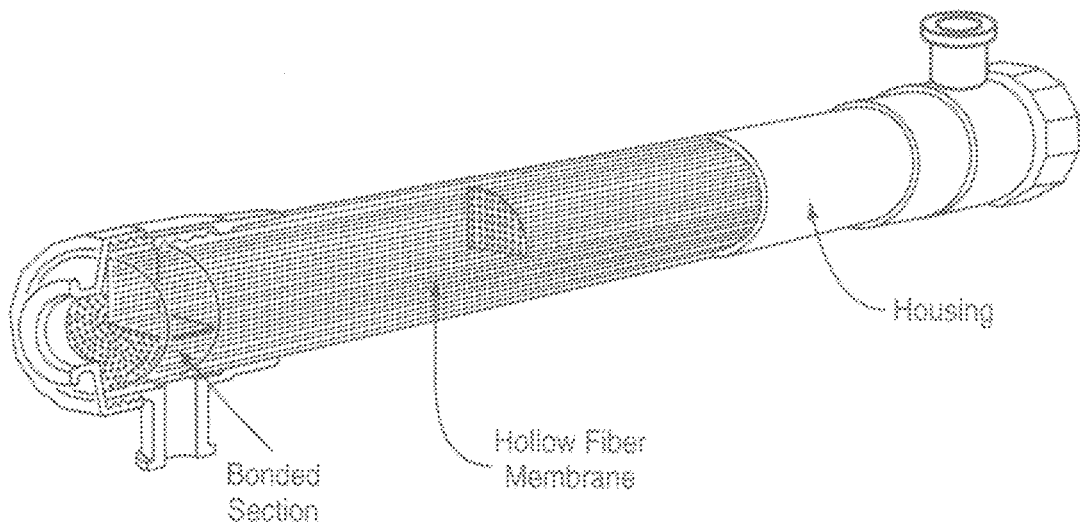
FIG. 10 shows a cutaway drawing of an embodiment of a ion-absorbing microfiltration module [Ref 3.5] according to an embodiment herein described.

In some embodiments, membranes can be fabricated using electrospinning in combination with LBL deposition and a subsequent cross linking to covalently attach the dendritic component to polymeric nanofibers. The cross-linking can be a direct cross linking (e.g. by formation of an amide bond from an amine and a carboxylic acid with coupling reagents as herein described) or can be indirect (e.g. as in an amine-amine crosslinking as herein described) depending on the functionalization of the dendritic component and on the functionalization of the polymeric fibers as will be understood by a skilled person upon reading the present disclosure. (See e.g. FIG. 9 and Example 6)

In some embodiments, membranes can be fabricated by casting a mixture of the polymer component, the dendrimer component, one or more solvents, and a cross-linking agent onto porous polymeric MF membrane supports [Ref. 2.24].

Figure 12:
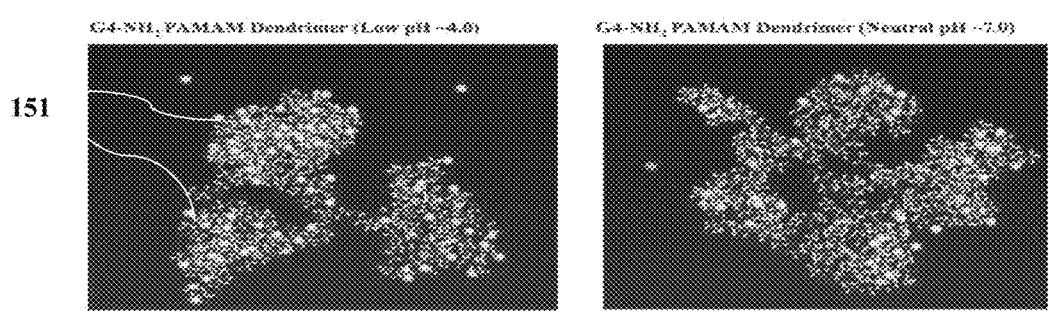
FIG. 12 shows atomistic molecular dynamics simulations of $Cl^-$ (light gray atoms (151) binding to a fourth generation ($G4-NH_2$ poly(amidoamine) (PAMAM)) dendrimer in aqueous solutions (3.19). The left image shows the dendrimer at approximate pH 4.0 and the right image shows the dendrimer at approximate pH 7.0.

Targeted atomistic molecular dynamics (MD) simulations of anion and/or cation binding to a dendritic component (e.g. PAMAM, PPI, and MPA) can be carried out using a Dreiding III force field (See e.g. Example 10, FIG. 12) [Ref. 2.25] to develop and validate a computer-aided molecular design framework that can be used to guide the synthesis of high capacity and recycle low-cost ion-selective dendritic polymers.

In some embodiments, membranes can be fabricated by using bulky hyperbranched polyethyleneimine (PEI) as a monomer of interfacial polymerization, to make an active layer of a NF membrane which in some embodiments has a relatively high charge density and mechanical flexibility. In these embodiments, the NR membrane can have good charge rejection, for example by enhancement of Donnan exclusion effects, and can have a higher water flux (see, e.g. Examples 21-22)

In these embodiments, NF membranes can be operated at lower operating pressure and can allow a higher flux compared to RO and NF membranes, which can be due to its mechanically flexible membrane structure.

NF membranes can be in the form of a nanofibrous composite (NFC) membrane which comprises a thin top layer, a nanofibrous mid layer, and a backing bottom layer. The mid layer of the NF filtration membrane comprises a polymer nanofiber mesh which can be fabricated by an electrospinning technique such that the filtration membrane can have much higher porosity, which can reduce hydraulic resistance [Ref. 8.12].

In some embodiments, poly(acrylonitrile) (PAN), can be used as a material for polymeric nanofibers and/or microfibers of the mid layer. PAN can be a suitable mid layer due to its high mechanical stability and good solvent resistance [Ref 8.13] and polyethylene terephthalate (PET) paper can be used for bottom backing layer.

In some embodiments, the membranes herein described can comprise at least two components, for example, a microfibrous polymeric support and a film of cross-linked networks of functionalized polymeric nanofibers with embedded and/or covalently attached dendritic macromolecules and nanoparticles that are functionalized with ion-selective groups including quaternary amines, carboxyl including quaternary amines, carboxylic, sulfonate and amide groups.

In some of these embodiments, the nanofibers are casted onto the microfibrous using electrospinning. For example, filtration membranes can be prepared poly(vinylidene fluoride) (PVDF), polysulfone (PS) and/or poly(acrylonitrile) (PAN) as base polymers for the nanofibers, hyperbranched polyethyleneimine (PEI) as the dendritic components and poly(ethylene terephthalate) [PET] as porous support (see e.g. FIGS. 23A-23B).

In some embodiments the nanofibers can be approximately 100-500 nm in diameter.

According to a further embodiment of the disclosure, a filtration system is described. The filtration system comprises a plurality of modules, each module comprising one or more of the filtration membranes for pretreatment of water according to embodiments herein described, charged particle rejection of water, and charged particle absorption of water is described.

The term "module" as used herein refers to a compartment comprising a filtration membrane according to the disclosure, adapted to be used in connection with other modules to perform parallel and/or sequential filtrations.

In particular, in some embodiments, a module herein described can comprise one of the filtration membranes herein described through which water can pass. For example, if the membrane in a module is charged particle rejecting, it can remove charged particles from the water passing through the membrane in the module such that the charged particles are reduced and/or substantially eliminated from water exiting the membrane. As another example, if the membrane in a module is charged particle absorbing, it can absorb charged particles from the water passing through the membrane in the module such that the charged particles are reduced or eliminated from water exiting the membrane. Exemplary membranes of the disclosure are shown in FIGS. 15A-15C and FIGS. 16A-16B (see, for example, Example 13).

In particular, in some embodiments, the filtration within the modules can operate by size exclusion and/or Donnan exclusion. The Donnan exclusion can be in operation can when sizes of charged species are much smaller than the pore size of a membrane [Ref. 8.9]. For example, a more porous membrane than a general NF membrane can be provided which simultaneously shows rejection for the charged species by enhancing the Donnan exclusion effect.

The Donnan equilibrium, also known as the Gibbs-Donnan effect, Donnan effect, or Gibbs-Donnan equilibrium, refers the behavior or distribution of charged particles through the both sides of a semi-permeable membrane when they are not distributed evenly across the membrane due to the presence of a charged substances at one side of the membrane. These charged substances are unable to pass through the membrane and thus generate an electrical potential. For membranes with fixed positive or negative charges, the Donnan Effect refers to the repulsion of co-ions, (anions or cations that have the same charges as the fixed charges of the membranes).

Figure 40:
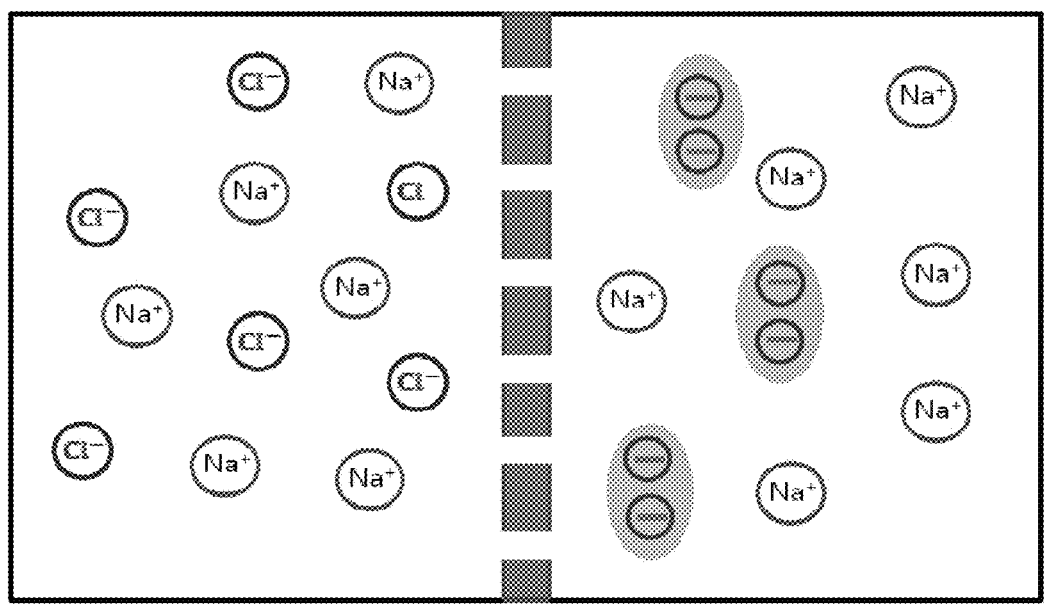
FIG. 40 shows a schematic depiction of the Donnan equilibrium at the initial stage.

At an initial stage, the numbers of ions in both sides can be represented as (See e.g. FIG. 40): left side: [Na$^+$]=6, [Cl$^-$]=6 and right side: [Na$^+$]=6

Since, the electrochemical potentials of both sides are different, Cl$^-$ at the left side can start to move through the right side. Due to the movement of anions, electrical potential is generated between each side separated by the membrane. The left side will be positively charged and the right side will be negatively charged. And the cation will also move through the membrane due to the electrical potential until this system will reach at electrochemical equilibrium.

Figure 41:
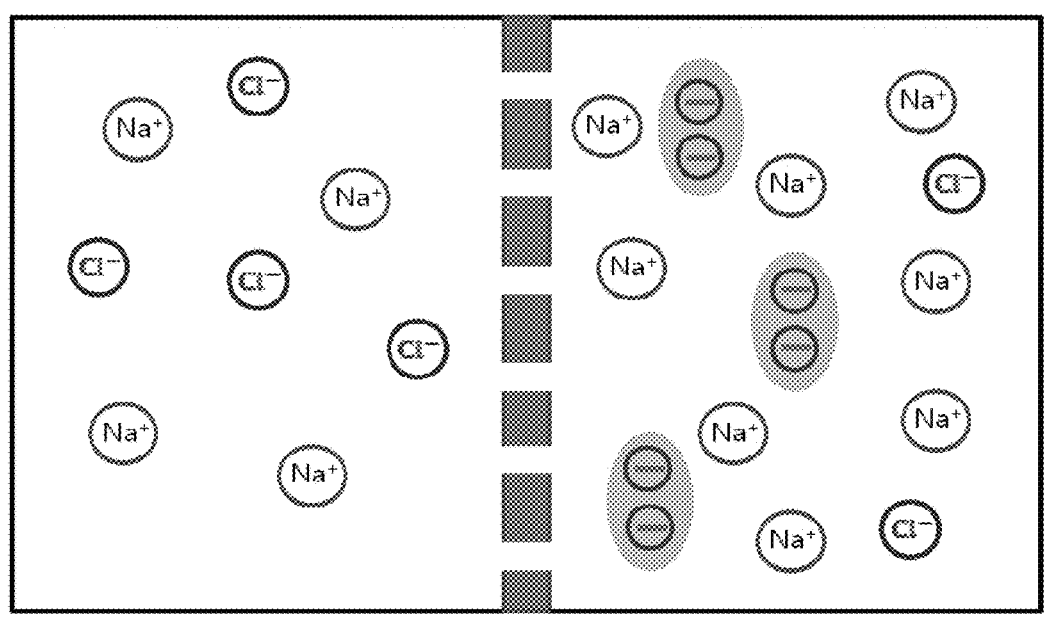
FIG. 41 shows a schematic depiction of the Donnan equilibrium at equilibrium.

At equilibrium, the numbers of ions in both sides can be represented as (FIG. 41). left side: [Na$^+$]=4,[Cl$^-$]=4 and right side: [Na$^+$]=8,[Cl$^-$]=2

In summary, net ion transport across the membrane is 2 pairs of NaCl among 6 pairs.

In this example, chloride anions are selectively rejected

Figure 42:
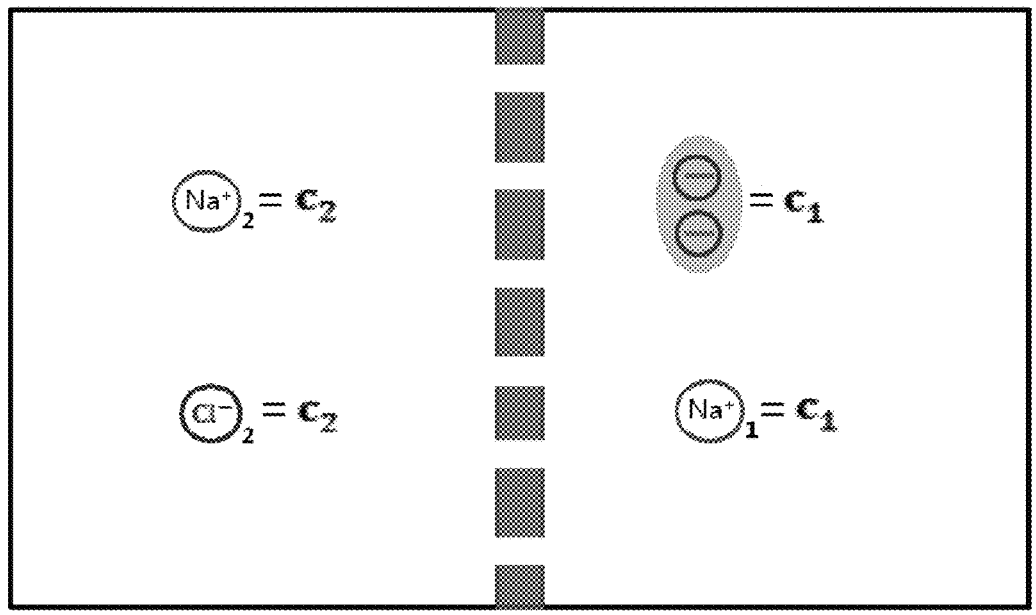
FIG. 42 shows a schematic depiction of the Donnan equilibrium under an initial condition.

Initial condition (FIG. 42) Left side: [Na$^+$]$_2$=$c_2$, [Cl$^-$]$_2$=$c_2$
Right side: [Na$^+$]$_1$=$c_1$, [P$^-$]=$c_1$
(P$^-$: Big anions which cannot penetrate the membrane)

Figure 43:
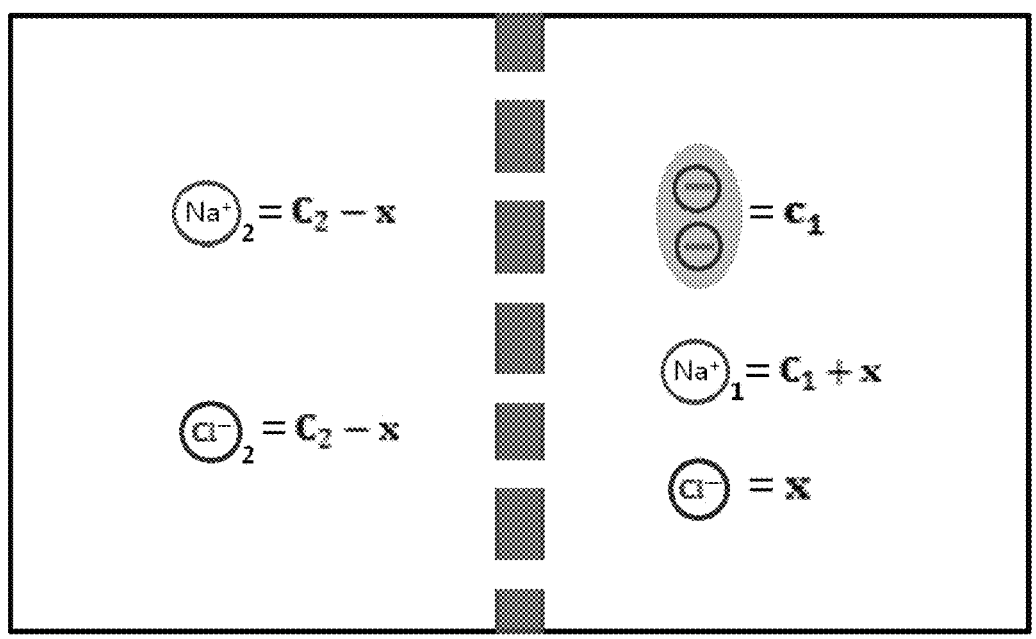
FIG. 43 shows a schematic depiction of the Donnan equilibrium at equilibrium.

At equilibrium (FIG. 43) Left side: [Na$^+$]$_2$=$c_2$-x, [Cl$^-$]$_2$=$c_2$-x Right side: [Na$^+$]$_1$=$c_1$+x, [P$^-$]=$c_1$, [Cl$^-$]=x At equilibrium; $\Delta G = \Delta G_{Na^+} + \Delta G_{Cl^-} = 0$ where $$\Delta G_{Na^+} = RT \ln \frac{[Na^+]_2}{[Na^+]_1}, \Delta G_{Cl^-} = RT \ln \frac{[Cl^-]_2}{[Cl^-]_1} \text{ and}$$

$$\Delta G = RT \ln \frac{[Na^+]_2}{[Na^+]_1} + RT \ln \frac{[Cl^-]_2}{[Cl^-]_1} = 0$$

$$RT \ln \frac{[Na^+]_2 [Cl^-]_2}{[Na^+]_1 [Cl^-]_1} = 0$$

$$\frac{[Na^+]_2 [Cl^-]_2}{[Na^+]_1 [Cl^-]_1} = 1$$

with constants and variables, $$\frac{(c_2 - x)^2}{(c_1 + x)x} = 1$$

and solving this equation for x, $$x = \frac{c_2^2}{c_1 + 2c_2}$$

is obtained.

Therefore by increasing $c_1$, in embodiments herein described, the amount of x (anions which penetrate the membrane) can be decreased.

In embodiments, when a charged membrane is used to separate ionic species in solution, Donnan effects can dominate or contribute to the separation mechanism of ions. This effect indicates a distribution of ionic species between the solution and the charged membrane. For example, if a negatively charged membrane is used, the co-ions (anions) can be affected by repelling electro-static force. Consequently, a distribution of ionic species in membrane and solution can be changed.

For example, assuming that a negatively charged membrane is in contact with a sodium chloride solution, at equilibrium, the chemical potentials of ions at the interface (solution/membrane) can be considered to be the same.

$$\mu_i = \mu_i^m$$

The electrochemical potential ($\Psi$) of an ion in solution can be described by:

$$\Psi_i = \mu_i^0 + RT \ln a_i + z_i FE$$

wherein $\mu_i^0$ represents reference state, R represents the gas constant, T represents temperature, $a_i$ represents activity of ion l, z represents valence of the ion, F represents the faraday constant, and E represents the measured potential.

The electrochemical potential of an ion in the membrane can be described by:

$$\Psi_i^m = \mu_i^{m,0} + RT \ln a_i^m + zFE^m$$

Since the concentration of the ions in solution and membrane can be different, there can be an electrical potential at the interface which is called Donnan potential ($E_{don}$) which can be described by:

$$E_{don} = E^m - E = \frac{RT}{z_1 F} \ln \frac{a_i}{a_i^m}.$$

Assuming that the chemical potential of the reference state is same in both phases:

$$\mu_i^0 = \mu_i^{m,0}$$

and assuming that the solution is a diluted solution ($a_i \cong c_i$) then the following can be obtained:

$$c_{Na^+} \times c_{Cl^-} = c_{Na^+}^m \times c_{Cl^-}^m$$

For electro-neutrality conditions, $$\Sigma z_i c_i = 0$$

Electro-neutrality equation for both solution and membrane phase are, $$c_{Na^+} = c_{Cl^-}$$

and $$c_{Na^+}^m = c_{Cl^-}^m + c_X^m$$

It can thus be obtained that $$c_{Cl}^m \times c_X^m + (c_{Cl^-}^m)^2 = (c_{Cl^-})^2 \text{ or}$$

$$\frac{c_{Cl^-}}{c_{Cl^-}^m} = \sqrt{\frac{c_X^m}{c_{Cl^-}^m} + 1}$$

where X represents membrane charge.

The above equation can be rewritten As:

$$*1\text{-}1 \text{ salt:} \frac{c_{Cl^-}^m}{c_{Cl^-}} = \frac{c_{Cl^-}}{(c_{Cl^-}^m + c_{X^-}^m)}.$$

A similar equation can be derived for a 2-1 salt and a 1-2 salt using the same method to give $$*2\text{-}1 \text{ salt:} \frac{c_{Cl^-}^m}{c_{Cl^-}} = \left(\frac{2c_{Cl^-}}{(2c_{Cl^-}^m + c_{X^-}^m)}\right)^2 \rightarrow MgCl_2 \text{ and}$$

$$*1\text{-}2 \text{ salt:} \frac{c_{SO_4^{2-}}^m}{c_{SO_4^{2-}}} = \sqrt{\frac{c_{SO_4^{2-}}}{c_{SO_4^{2-}}^m + c_{X^-}^m}} \rightarrow Na_2SO_4,$$

respectively.

In some embodiments, the filtration within a module can operate by ultrafiltration (UF) and microfiltration (MF). UF and MF membranes can have large pore size (e.g., 5-100 nm) allowing them to operate pressures between approximately 0.3-5.0 bar). UF and MF can suitable in embodiments where it desired to generate less membrane concentrates, for example compared to an RO filtration. UF and MF are particularly suitable for a pretreatment process to remove particles from saline water in the desalination of brackish water and seawater.

In some embodiments, the ion selective UF/MF membrane modules (See e.g. FIGS. 15A-15C) comprise hollow fibers (HF) according to embodiments herein described which can in some embodiments reject cations and/or anions, for example through electrostatic (Donnan) repulsion and can selectively bind and release anions and/or cations, for example, by complexation and ion exchange.

A hollow fiber (HF) module configuration can suitable, for example, because the hollow fiber (HF) module configuration can have large fiber packing density; a low operating pressure (e.g. between approximately 0.3-2 bars) and pressure drop (e.g. between approximately 0.1-1 bar) across the membrane module; and ease of backwashing the fiber to which can minimize a build-up of ions at membrane surfaces and/or release bound cations and/or anions. The hollow fibers of the hollow fiber (HF) module configuration can be fabricated, for example, using solvent spinning, electrospinning, or other methods identifiable by a skilled person. Polymers that can be used to spin the hollow fibers include polyethersulfone (PES), poly(vinylidene fluoride) (PVDF) and poly(acrylonitrile) (PAN).

In some embodiments, the filtration system can be configured to have three units: a first unit comprising a module, the module comprising a nanofiltration membrane to remove, for example, particles and dissolved organic matter; a second unit comprising a series of alternating positive and negative charged particle rejecting modules, for example, to remove a majority of the charged particles; and a third unit comprising a parallel series of modules capable of absorbing charged particles of interest.

In some embodiments of the membrane filtration system, the membranes comprised in the modules comprise hollow fibers with embedded dendritic component that can reject charged particles. In other embodiments, the ion-selective hollow fibers can be backwashed with an acid/base solution or a solution containing sufficient concentration of an anion/cation selective ligand to minimize the build-up of ions at the membrane surfaces and/or release the bound cations/anions. In other embodiments, the embedded dendritic component can be cross-linked and functionalized with N and O donors.

In some embodiments of the membrane filtration system, the membranes comprised in the modules comprise hollow fibers with embedded dendritic component that is functionalized with neutral groups [e.g. polyethylene glycol (PEG)]. In other embodiments, the ion-selective hollow fibers can be backwashed with an acid/base solution or a solution containing sufficient concentration of an anion/cation selective ligand to minimize the build-up of ions at the membrane surfaces, and/or release the bound cations/anions. In other embodiments, the embedded dendritic component can be cross-linked and functionalized with N and O donors.

In some embodiments of the filtration system, the ion-rejection filtration stage comprises a conventional nanofiltration membrane system that can reject dissolved organic matter, divalent ions and a fraction of the monovalent ions.

Also provided herein, a process for providing nanofibers or microfibers is described. In some embodiments, the process comprises mixing a polymer with a dendrimer in a suitable solvent, possibly comprising a mixture of solvents, to provide a liquid mixture and electrospraying and/or electrospinning the liquid mixture to provide a nanofiber or microfiber.

In some embodiments, the process for providing a nanofiber or microfiber comprises mixing a polymeric component dissolved in a suitable solvent or mixture of solvents with a dendritic component dissolved in a suitable solvent or mixture of solvents and applying an electrical charge to the liquid mixture of polymeric components and dendritic components until a continuous stream of the is pulled to a collector having an electrical charge opposite that of the liquid mixture of polymeric components and dendritic components. In other embodiments, the process for providing a nanofiber or microfiber comprises mixing a polymeric component having polymerizable monomer units dissolved in a suitable solvent or mixture of solvents with a dendritic component dissolved in a suitable solvent or mixture of solvents and applying an electrical charge to the liquid mixture of polymeric components and dendritic components until a continuous stream of the is pulled to a collector having an electrical charge opposite that of the liquid mixture of polymeric components and dendritic components Also provided herein are nanofibers or microfibers obtainable by the process for providing a nanofiber in accordance with the present disclosure.

Further provided herein, a process for manufacturing a composite material herein described. The process comprises aggregating nano-fiber and/or microfibers herein described.

Figure 36:
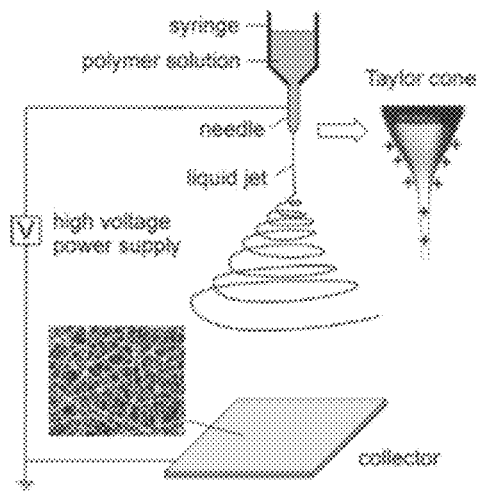
FIG. 36 shows a schematic picture of electrospinning procedure [Ref. 8.17] suitable in the preparation of fibers, composites and membranes according to an embodiment herein described.
Figure 37:
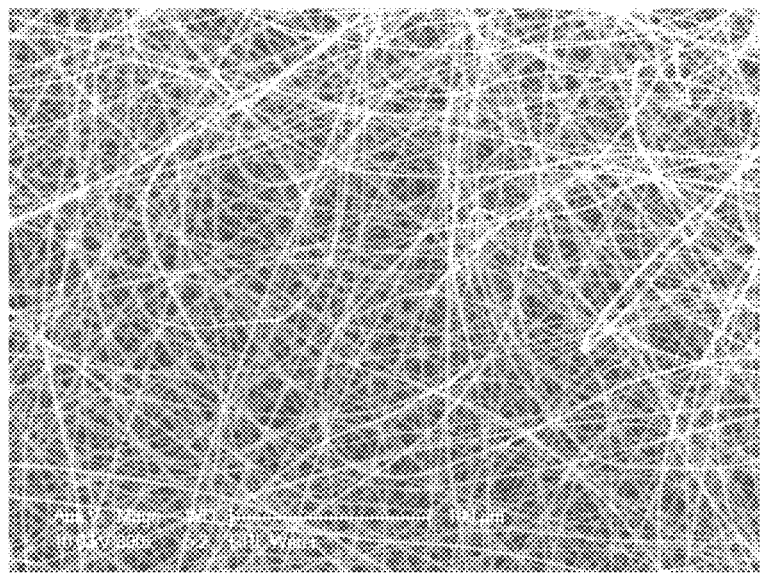
FIG. 37 shows a SEM image of electrospun polystyrene (PS) nanofibrous membrane.
Figure 38:
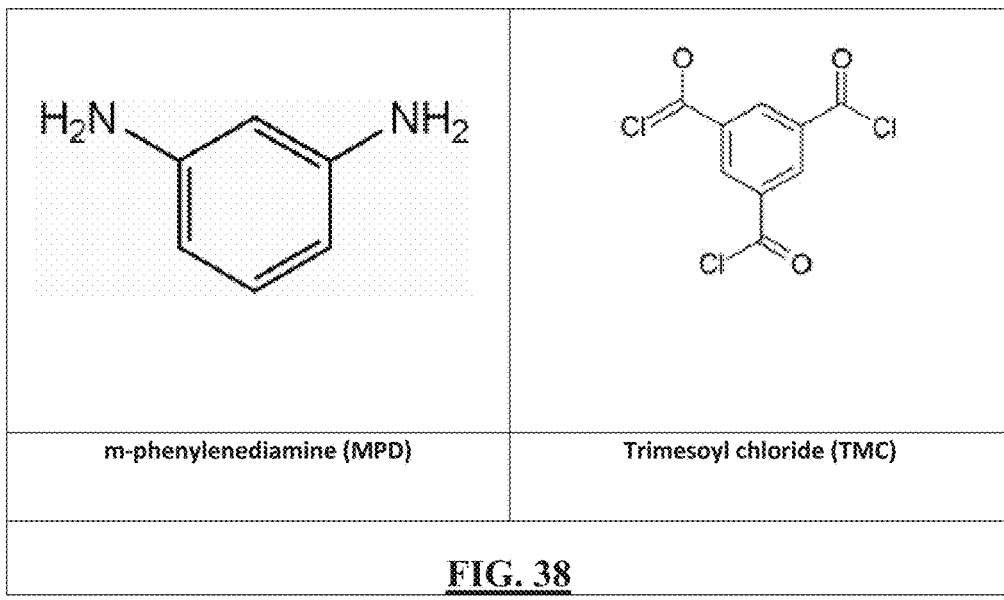
FIG. 38 shows representative monomers for interfacial polymerization in a reverse osmosis membrane
Figure 39:
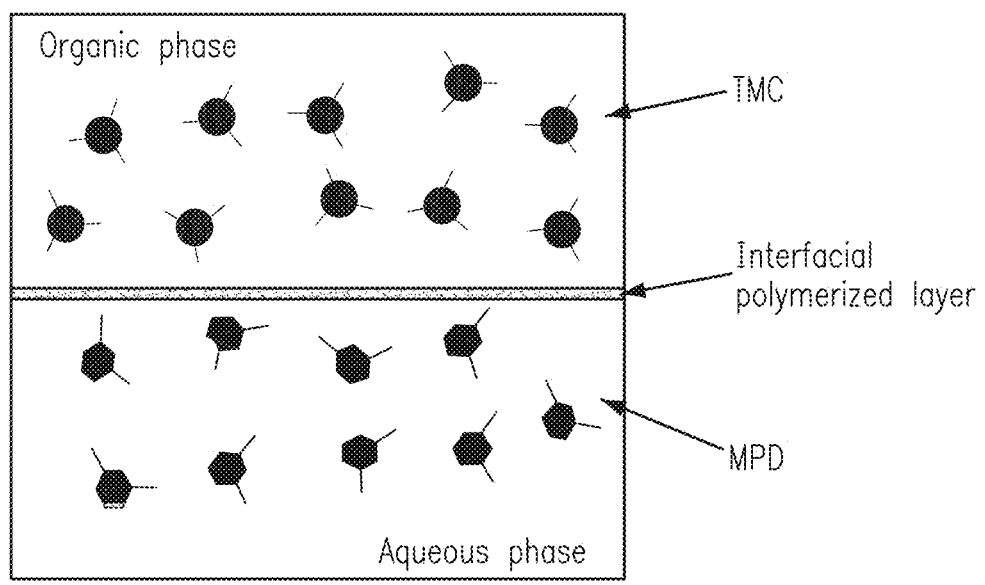
FIG. 39 shows a schematic depiction of an interfacial polymerization reaction. TMC is trimesoyl chloride and MPD is m-phenylenediamine

In some embodiments, the process for aggregating nanofibers and/or microfibers herein described comprises mixing a polymeric component having polymerizable monomer units dissolved in a suitable solvent with a dendritic component dissolved in a suitable solvent and applying an electrical charge to the liquid mixture of polymeric components and dendritic components until a continuous stream of the fibers is pulled to a rotating collector having an electrical charge opposite that of the liquid mixture of polymeric components and dendritic components such that the continuous stream forms a mesh of nanofibers Various devices can be used to manufacture and use composites and membranes herein described. FIG. 36 is a schematic design of an exemplary apparatus for the process for manufacturing the composite. It can comprise three parts: a spinneret (where the solution is ejected), a power supply (apply electrical field between the spinneret and the collector), and a collector (a grounded conductor where the electrospun nanofibers are collected) [Ref. 8.17]. When the solution is ejected by a syringe pump from the syringe which is connected to spinneret, the solution droplet (at the tip of spinneret) becomes elongated continuously due to the high voltage applied between spinneret and collector (for example, between 1 kV to 30 kV) [Ref. 8.17]. During elongation, the diameter of fibers can be reduced to as small as nanometer scale and can be controlled by several parameters including, for example, distance between the spinneret and collector, applied electrical voltage, condition of solution, flow rate of ejected solution, temperature, humidity, and additional parameters identifiable by a skilled person [see e.g. Refs. 8.17, 8.18]. The elongated fibers can be deposited onto the grounded collector with random orientations leading to the formation of the composite material as a non-woven mesh.

In particular, in some embodiments, after the nanofibers of the composite material made by the process described herein can be collected from the polymer solution, evaporation of the residual solvents of fibers can make the fibers physically bonded leading to fabrication of a strong cohesive interconnected porous structure [Ref. 8.20]. Composite material made by the process disclosed herein can have features such as, high porosity (compare to conventional phase-inverted membranes), controllable pore sizes (e.g. controlled by fiber diameter and can range from tens of nanometer to several micrometer), interconnected open pore structure, and high specific area. Due to such features, membranes comprising these composite materials can show higher water flux and much suitable functionalization capability than typical UF, MF membranes.

In some embodiments, a composite material can be coated with cross-linked additional dendritic component by interfacial polymerization. In interfacial polymerization, polymerization occurs at the interface between two immiscible solvents by the monomers (reactants) in each solvent. In particular, in some embodiments, the general procedure of interfacial polymerization comprised the steps of: immersing the composite material to be coated in an aqueous solution of the dendritic component; removing excess aqueous solution from the composite material, for example by way of a glass roller; immersing the wet composite material in an organic solvent containing the cross linker; rinsing the coated composite material with the organic solvent. (See, e.g., Examples 21, 22, and 32)

Also provided herein, a filtration method comprising, passing water to be filtered through one or more modules comprising conventional nanofiltration membranes to remove particles and dissolved organic matter, passing the water through a series of alternating positive and negative charged particle rejecting modules comprising the membranes herein described to remove a majority of the charged particles, and passing the water through a parallel series of modules capable of absorbing charged particles of interest is described.

In some embodiments, the membrane filtration system for the desalination of brackish water and seawater comprises: an ion-rejection filtration stage, wherein saline water passes through a series of alternating cation/anion selective tight UF membranes designed to reject 70-90% of dissolved ions; and an ion-absorption filtration stage, wherein the product water from the ion-rejection filtration system is split into two streams that pass through a series of ion-absorbing MF membranes designed to selectively bind target anions/cations of interest.

In some embodiments, the filtration membrane comprises of separation layers made of cross linked dendritic macromolecules that are supported by polymeric nanofibrous scaffolds electrospun onto commercial polymeric microporous membrane supports.

In some embodiments of the filtration membrane, the separation layers consist of cross linked hyperbranched PEI macromolecules that are supported by nanofibrous PVDF scaffolds electrospun onto a PVDF microfiltration membrane support.

In some embodiments of the filtration membrane, the separation layers consist of cross linked hyperbranched PEI macromolecules that are supported by nanofibrous PAN scaffolds electrospun onto a nonwoven poly(ethylene terephthalate) (PET) microporous support.

In some embodiments of the filtration membrane, the separation layers consist of cross linked low-generation dendrimers and dendrigraft macromolecules that are supported by polymeric nanofibrous scaffolds electrospun onto a polymeric microporous membrane supports.

Further advantages and characteristics of the present disclosure will become more apparent hereinafter from the following detailed disclosure by way or illustration only with reference to an experimental section.

EXAMPLES

The nanofibers and microfibers, membranes, and composite materials and related compositions, methods and systems herein described are further illustrated in the following examples, which are provided by way of illustration and are not intended to be limiting.

In particular, the following examples illustrate exemplary nanofibers and microfibers, membranes, and composite materials and related methods and systems. A person skilled in the art will appreciate the applicability and the necessary modifications to adapt the features described in detail in the present section, to additional nanofibers and microfibers, membranes, and composite materials, and related methods and systems according to embodiments of the present disclosure.

Example 1: Synthesis and Characterization of Anion-Exchange Hyperbranched Macromolecules In this example, the Applicants have utilized dendritic macromolecules (e.g., PAMAM and PPI dendrimers) as selective and recyclable high capacity macroligands for anions and cations in aqueous solutions [Refs. 1.16-1.19]. Low-cost hyperbranched macromolecules, such as polyethyleneimine (PEI), behave very similarly as the corresponding, but expensive dendrimers [Ref.1.20]. Hyperbranched PEI has a degree of branching at approximately 65-70%. They comprise of primary, secondary and tertiary amines linked by $C_2$ alkyl chains. Two features of hyperbranched PEI macromolecules are their large N content (18-20 mol/kg) and the ease of functionalization of their primary and secondary amine groups. FIGS. 2A-2C show a particular strategy for functionalizing hyperbranched PEI macromolecules with various functional groups to synthesize anion-selective macromolecules including macroligands that can selectively bind anions (e.g., $Cl^-$, $Br^-$ and $SO_4^{2-}$; $NO_3^-$; and $ClO_4^-$) at pH of approximately 5-6 and release them at pH ~9.0 [Ref.1.20]. In this Example, PEI is reacted with cross-linking agent 1,3-dibromopropane in methanol at 65° C. to form cross-linked PEI units.

The Applicants have also synthesized and characterized functionalized hyperbranched PEI macromolecules that can serve as high capacity anion-exchange ligands. The anion exchange ligands were prepared by methylation of hyperbranched PEI using an Eschweiler-Clarke reaction as shown in the bottom of FIGS. 2A-2C, followed by conversion of its tertiary amine groups to quaternary groups with permanent positive charges ($—R_4N^+$). In this example, the chemical compositions and molar masses of the synthesized hyperbranched macromolecules were characterized using the appropriate analytical techniques (e. g. NMR, SEC, MALDI-TOF MS, etc.) The exchange capacity of the anion-exchange hyperbranched macromolecules was also measured.

Example 2: Synthesis and Characterization of Anion-Exchange Polymeric Nanoparticles In this example, the use of high performance media for water treatment (patent pending) is described [Ref. 1.21]. (see U.S. Provisional Patent Application 61/665,749) The media comprise functionalized polymeric nanoparticles (PNP) which were synthesized using low-cost hyperbranched polymers HBP as precursor materials as shown in FIGS. 3A-3D. Due at least in part to their unique chemistry and hyperbranched architecture, the media were reacted with a broad variety of chemical groups to prepare ion-selective media. The Applicants have synthesized ion-selective hyperbranched microparticles with a strong base anion-exchange capacity (SBEC) of 2.0 eq/L [Ref.1.25]. In this example, the exchange capacity is larger by ~40% than that of DOWEX® SAR anion-exchange resin, which has a SBEC of 1.4 eq/L and is one of the largest anion-exchange capacity in the market (dow.com/liquidseps/prod/dx_sar.htm).

Applicants have prepared anion-exchanged polymeric nanoparticles (NP) using synthetic strategies similar to those described in reference 1.21. In this example, the physicochemical properties of the anion-exchange PNP were characterized using elemental analysis, FT-IR, SEM and TEM. The exchange capacity of the anion-exchange PNP can also be measured. The results of this example provided the building blocks for preparing heterogeneous anion-exchange hollow fibers with high charge density and Donnan potential.

Example 3: Synthesis and Characterization of Ion-Selective Hollow Fibers

The Applicants show in this example that electrospinning [Refs. 1.22-1.24] can be used to generate anion-exchange hollow polymeric nanofibers (FIGS. 4A-4B and FIG. 1B) by electrospinning a solution of the polymeric component surrounding a bore fluid comprising the dendritic component. In this example, two types of anion-selective fibers can be prepared: homogeneous anion-exchange hollow fibers and heterogeneous anion-exchange hollow fibers. The homogeneous anion-selective fibers comprise hollow nanofibers with embedded anion-selective hyperbranched macromolecules (FIGS. 2A-2C and FIG. 1C). The heterogeneous anion-exchange fibers comprise hollow nanofibers with embedded anion-selective polymeric nanoparticles (NP).

In this example, polysulfone (PS), polyether sulfone (PES), poly(vinylidene) fluoride (PVDF) and polyacrilonitrile (PAN) can be used as base polymers for spinning the hollow fibers due to their wide utilization as base polymers in the fabrication of commercial hollow-fiber UF/MF membranes (1.8) and because PS, PES, PVDF and PAN and the functionalized anion-selective HPB macromolecules and nanoparticles of interest in this example (FIGS. 2A-2C and FIGS. 3A-3D) are either partially soluble (at least 5-10 wt %) or can be dispersed in solvents with widely different physicochemical properties (e.g. boiling point and surface tension) such as tetrahydrofuran (THF), dimethyl formamide (DMF) and dimethyl acetamide (DMAc) [Refs. 1.23-1.24]. This is expected to provide many degrees of freedom for optimizing the physical and chemical properties of the fibers by selecting the appropriate spinning conditions.

Figure 4A:
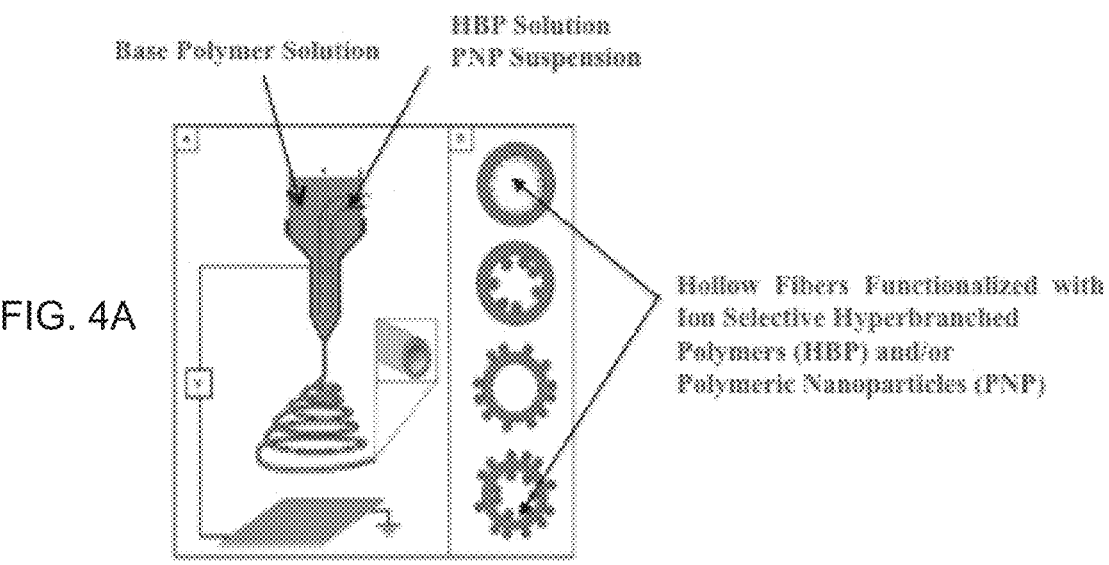
FIGS. 4A-4B show the preparation of ion-selective hollow fibers by electrospinning (FIG. 4A) and a schematic depiction of an embodiment anion exchanging/cation rejection hollow fiber (FIG. 4B). (see 1.30).
Figure 4B:
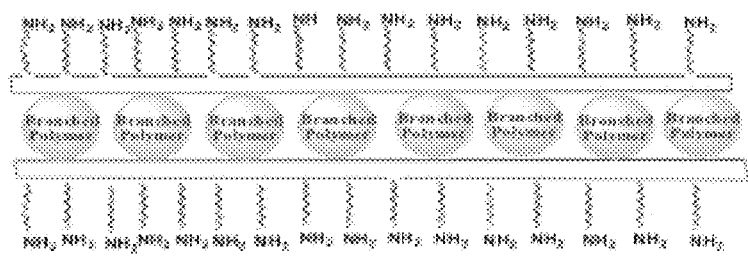

The Applicants provide in this example an exemplary method for attaching additional layers of positively charged groups on the surfaces of fibers using standard membrane surface modification techniques such as reactive coating, interfacial polymerization and layer-by-layer self-assembly [Refs.1.25-1.27]. In this Example, the anion exchange capacity, ion perm-selectivity (e.g. anion-transfer and cation rejection) and water permeability of the anion-exchange hollow fibers as shown in FIGS. 4A-4B, can be measured using standard techniques [Refs. 1.7-1.9] and the laboratory scale ultrafiltration set-up is shown in FIGS. 5A-5B. Selected experiments can be carried out to characterize the physicochemical properties (e.g. charge and hydrophobicity), structure and morphology of the fibers using electro-kinetic measurements, contact angle measurements, spectroscopy (e.g. AT-FTIR and Raman) and imaging (e.g., SEM, TEM and AFM) [Refs. 1.7, 1.9].

Example 4: Multiscale Modeling Anion-Exchange Polymeric Nanoparticles and Fibers In this example, a computer-aided molecular design framework for designing ion-selective hyperbranched macromolecules, polymeric nanoparticles and fibers is described. Using atomistic molecular dynamics (MD) simulations of the structures and physical/chemical properties of dendrimers and polymer electrolyte membranes fuel cells with embedded dendrimers [Refs. 1.28-1.29], multiscale simulations can be used to determine the structures of anion-selective hyperbranched polymeric nanoparticles (FIGS. 3A-3D) and hollow fibers (FIGS. 4A-4D) and to probe their interactions with relevant cations (e.g. $Ca^{2+}$, $Mg^{2+}$ and $Na^+$) and anions ($Cl^-$ and $SO_4^{2-}$) in water and model electrolyte solutions.

Characterization data from elemental analysis, NMR and size exclusion chromatography data can be used to build 3-D models of anion-selective hyperbranched PEI macromolecules and polymeric nanoparticles (FIGS. 2A-2C and FIGS. 3A-3D). Atomistic MD simulations of these systems in explicit water with counterions can be carried out. Following completion of these simulations, 3-D models of ion-selective hollow fibers by embedding hyperbranched PEI polymeric nanoparticles (FIGS. 3A-3D) inside matrices of selected polymers (e.g. PS, PES, PVDF and PAN) can be built. These systems can then be used to carry out multiscale modeling ion and water transport through the model ion-selective hollow fibers and UF membranes. Parameters that are expected to be determinable from these simulations include: (1) Ion membrane-water partition coefficients; (2) Ion diffusion constant and permselectivity; (3) Water transport (e.g. diffusion) and permeability; and (4) Electrostatic charge and potential distributions inside the membranes and at membrane-solution interfaces. The results are expected provide a computer aided molecular design framework that can guide the synthesis of ion-selective UF membranes for water treatment and desalination.

Example 5: Synthesis and Characterization of IAµF Membranes by Layer-by-Layer (LBL) Deposition and Cross-Linking of Dendrimers onto Porous Polymeric MF Membrane Supports This example provides an exemplary method of using LBL methodology to adsorb and deposit alternating layers of PAMAM, PPI and MPA dendrimers (FIG. 7) with amino ($NH_2$) and carboxyl (COOH) onto porous polymer supports of commercial MF membranes that have been functionalized with carboxyl groups by UV-induced graft copolymerization with methacrylic acid [Ref.2.20]. Polymer supports used in this example can include polyethersulfone (PES) and poly (vinylidene fluoride) (PVDF) [Ref. 2.20]. Following deposition of the dendrimer layers onto the porous supports, 1-ethyl-3-[3-dimethylaminopropyl]carbodiimide hydrochloride (EDC) can be used as cross-linker to covalently link the sorbed dendrimers and attach the multilayer dendrimers films to the porous polymeric MF membrane supports. Tomalia and Swanson [Ref.2.21] have shown that EDC can be used to covalently link PAMAM dendrimers with terminal $NH_2$ and COOH groups.

Example 6: Synthesis and Characterization of IAµF Membranes by LBL

This example provides an exemplary method of using LBL deposition with EDC coupling to covalently attach PAMAM, PPI and MPI dendrimers (FIG. 7) to polymeric nanofibers. This example uses electrospinning (FIG. 9) to generate the PES and PVDF nanofibers [Refs.2.22-2.23]. UV-induced graft copolymerization with methacrylic acid [Ref. 2.20] was used to functionalize the nanofibers with COOH groups prior to LBL deposition of the dendrimers.

Example 7: Synthesis and Characterization of IAµF Membranes by Phase Inversion (PI) Casting The Applicants have also synthesized and characterized IAµF membranes by phase inversion (PI) casting of dope solutions of dendritic macromolecules onto glass supports.

Example 8: Synthesis and Characterization of Ion-Selective Dendritic Macromolecules (ISDM)

The Applicants have shown that the cation/anion binding capacities of PAMAM and PPI dendrimers are very large. The Applicants have developed a facile and versatile strategy for synthesizing low-cost ISDM with protonable N groups that can selectively bind anions (e.g., $Cl^-$, $Br^-$, $NO_3^-$ and $ClO_4^-$) at pH 5-6 and release them at pH 9.0 [Refs.3.20-3.21].

Example 9: Synthesis and Characterization of Ion-Absorbing Hollow Fibers (IAHF)

This example shows the use of electrospinning to generate hollow polymeric nanofibers [Ref. 3.22] with embedded ISDM (FIG. 11). Polymers that can be used to prepare the hollow nanofibers in this example include polyethersulfone (PES), poly(vinylidene) fluoride (PVDF) and poly(acrylonitrile) (PAN).

The Applicants have outlined a standard membrane surface modification techniques (e.g. UV-induced graft copolymerization) [Ref.3.23], layer-by-layer assembly [Ref. 3.24-3.25](followed by thermal cross-linking) or interfacial polymerization to covalent attach/graft additional ISDM to the outer and/or inner surfaces of hollow fibers with embedded ISDM (FIG. 11). In this example, the physicochemical properties of these IAHF can be characterized using the appropriate analytical techniques (e.g., AFM, SEM and TEM). The ion-binding capacity and selectivity of the IAHF can be measured using standard techniques developed by the Applicants and others [Refs.3.10-3.13]. The overall results of these measurements were used to assess the extent to which the bound cations/anions can be released by washing the IAHF with acidic/basic solutions.

Example 10: Multiscale Modeling and Computer-Aided Molecular Design of Ion-Selective Dendritic Macromolecules In this example, a computer-aided molecular design framework for ion-selective dendritic macromolecules (ISDM) and ion-absorbing hollow fibers (IAHF) can be used. This example uses a modeling and simulation of the structures and properties of dendritic polymers [Refs. 3.14-3.19]. The atomistic molecular dynamics (MD) simulations of the structures and transport properties of polymer electrolyte membranes fuel cells (PEMFC) with embedded dendrimers [Ref. 3.18] and the effects of solution pH and counterions (e.g., Cl−) on the structure, size and conformation of PAMAM dendrimers in aqueous solutions (FIG. 12) [Ref.3.19] are modeled and/or simulated. Targeted atomistic MD simulations of anion/cation binding to model low-cost ISD and IAHF synthesized can be carried out. The computer-aided molecular design framework can be used to guide the synthesis of low cost ISD and IAHF with high anion/cation binding capacity and selectivity.

Figure 13:
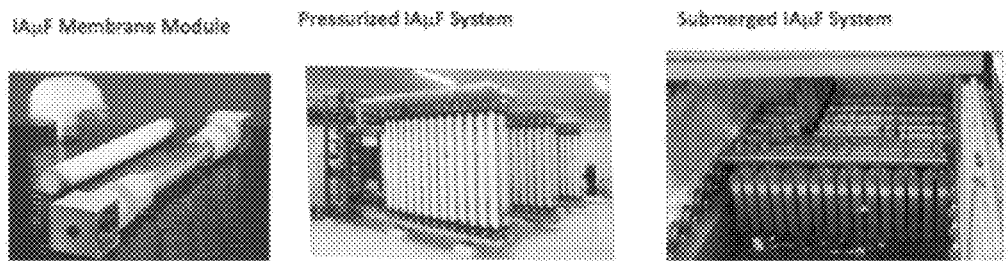
FIG. 13 shows photographs of Ion Absorbing Microfiltration (IAμF) Membrane Module and filtration systems [3.5, 3.4] suitable in embodiments herein described.

Example 11: Fabrication and Testing of IAµF Membrane Modules and Pilot Systems for Brackish Water/Seawater Desalination The Applicants expect that standard and well establish methods/procedures can be to fabricate and test IAµF membrane modules, and to design, construct, and test model filtration systems (pressurized and submerged) with IAµF membrane modules (FIG. 13).

Figure 22:
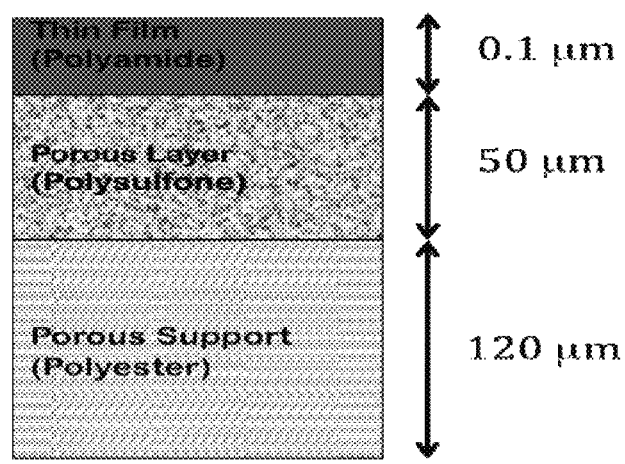
FIG. 22 shows a schematic of a commercial thin film composite (TFC) nanofiltration membrane [Ref. 6.7] suitable to be used in connection with membranes, and systems herein described.
Figure 32:
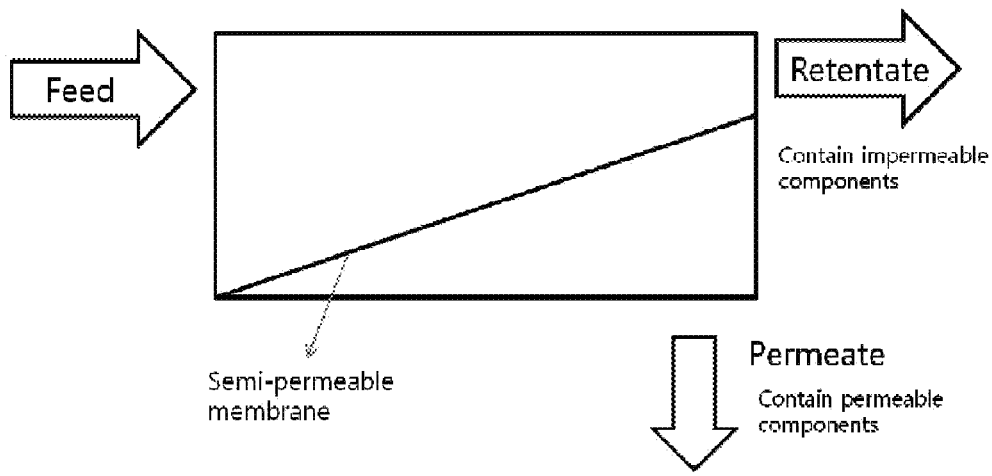
FIG. 32 shows a schematic diagram of membrane filtration processes [Ref. 8.14].
Figure 33:
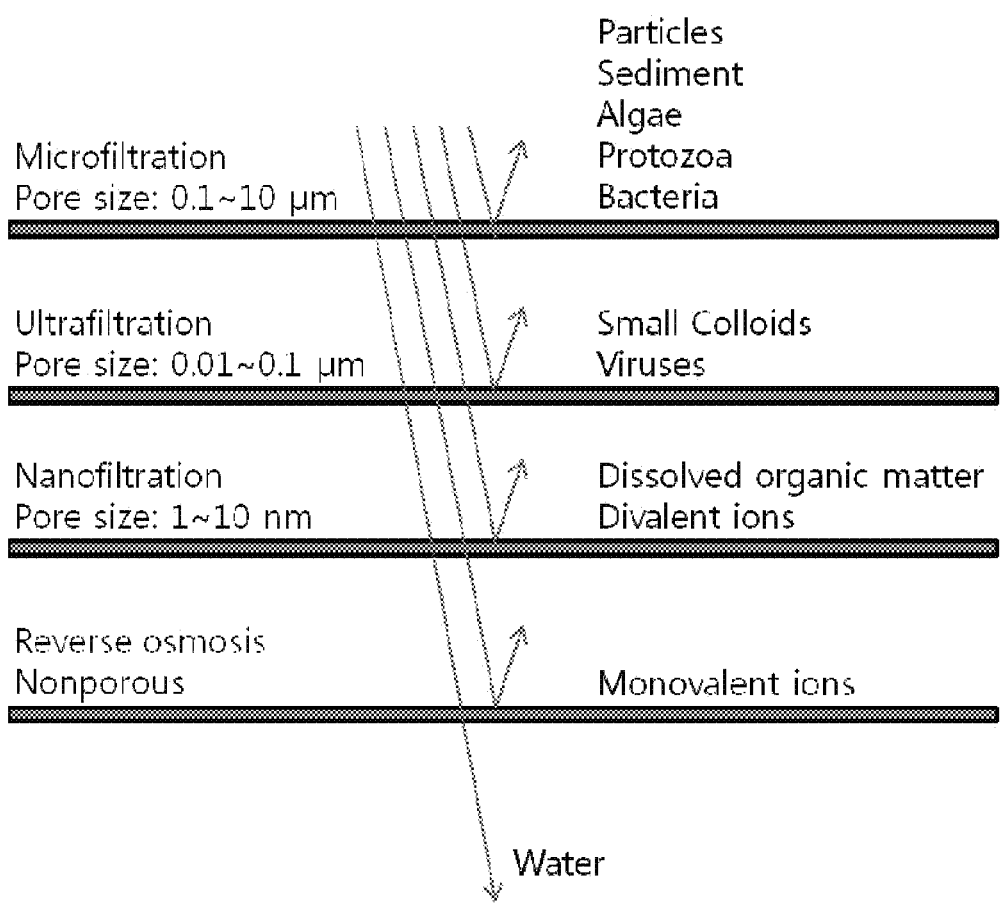
FIG. 33 shows several types of membrane filtration processes [Ref. 8.14].
Figure 34:
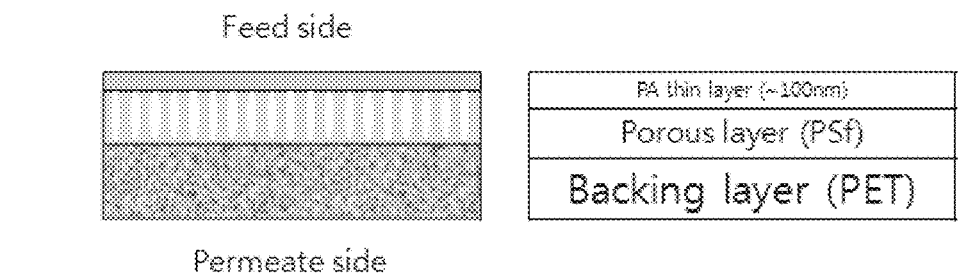
FIG. 34 shows schematic pictures of a commercial PA TFC membrane suitable in filtration methods and systems according to embodiments herein described.
Figure 35:
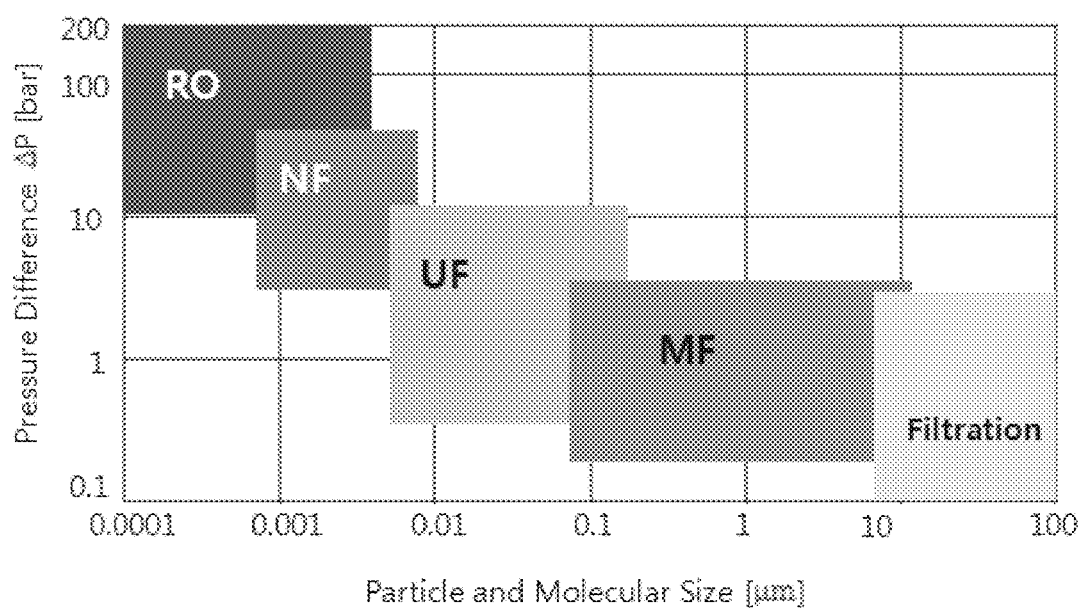
FIG. 35 shows separation capabilities of pressure-driven membrane separation processes [8.7].

Example 12: Example of a Low-Pressure Filtration System that can Desalinate Brackish Water and Seawater In this example, the Applicants have describe a low-pressure filtration system that can desalinate brackish water and seawater more efficiently and cost effectively than RO using the filtration membranes herein described. In some embodiments, the filtration systems herein described can comprise other membranes in combination with the filtration membranes herein described. For example, commercially available membranes can also be included as will be understood by a skilled person. For example, some suitable commercial RO membranes comprise a polyamide layer thin film over a porous polysulfone layer, which in turn is over a polyester support layer (FIG. 22). In some instances the polyamide layer can face the incoming feed water (see FIG. 34). In FIG. 32, a general schematic of the desalination process is shown, wherein feed water, (comprising chemicals such as dissolved NaCl that is to be removed) passes through a membrane and the permeate (e.g. water) is passed through the membrane and the retentate (e.g. NaCl and other salts in seawater) and can be diverted to a waste stream or elsewhere to recover the dissolved material not passed by the membrane. The types of the chemicals to be separated from the feed water depends on the relative size of the chemicals (FIG. 33 and FIG. 35) In particular, FIGS. 14A-14B show a typical process configuration of a desalination system.

Figure 14A:
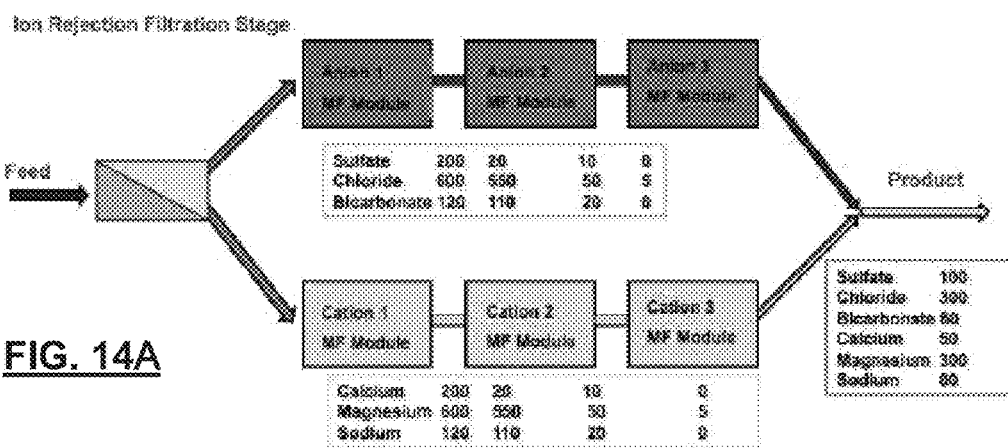
FIGS. 14A-14B show a schematic diagram of an exemplary configuration for a low-pressure membrane filtration system and related method for desalination according to an embodiment herein described.
Figure 14B:
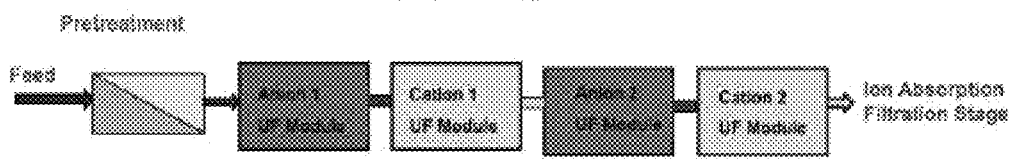
Figures 16A, 16B:
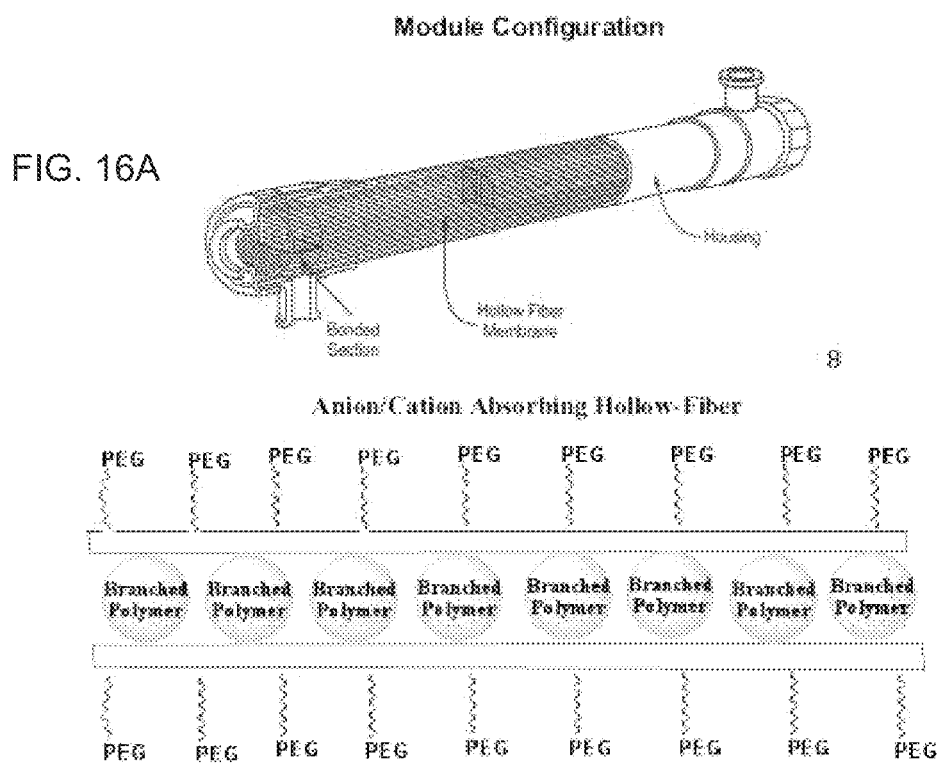
FIGS. 16A-16B show a depiction of an exemplary ion absorbing microfiltration membrane module according to an embodiment herein described.

The desalination system illustrated in FIGS. 14A-14B can comprise three units: 1) a pretreatment system to remove particles and dissolved organic matter, 2) an ion-rejection ultrafiltration (UF) system and 3) an ion-absorption microfiltration (MF) system. Various membranes can be included in the three systems, as will be understood by a skilled person. For example, cation-rejecting and anion rejecting hollow fibers herein described can be comprised as a part of the ion-rejection ultrafiltration (UF system) of FIGS. 14A-14B. In particular the fibers shown in FIG. 15B-C, and exemplary ion-absorbing hollow fibers (using, for example, dendritic component functionalized with poly(ethylene glycol) (PEG)) can be seen in FIGS. 16A-16B (bottom) can be comprised in said system. Additional membrane and modules can also be used in the system.

For example in the first unit, saline water can be pretreated by to remove particulate and dissolved organic matter using standard pretreatment technologies such as microfiltration and cartridge filtration. In the second unit, the pretreated saline water can be passed through a series of alternating cation/anion selective tight UF membranes designed to reject 70-90% of dissolved ions. Because of the ion-selective UF membranes can be backwashed intermittently to control the build-up of ions at the membrane surfaces, they can be operated at significantly lower pressure (e.g. 4-10 bar) and much higher water recovery (~80-90%) than RO membranes. Moreover, they are expected to produce significantly less wastes (e.g. backwash water+dissolved ions) than RO membranes which generate large amounts of brine (e.g. membrane concentrates). In the third unit, the product water from the ion-rejection UF system can be split into two streams and passed through a series of ion-absorbing MF membranes designed to selectively bind target anions/cations of interest.

Figure 31A:
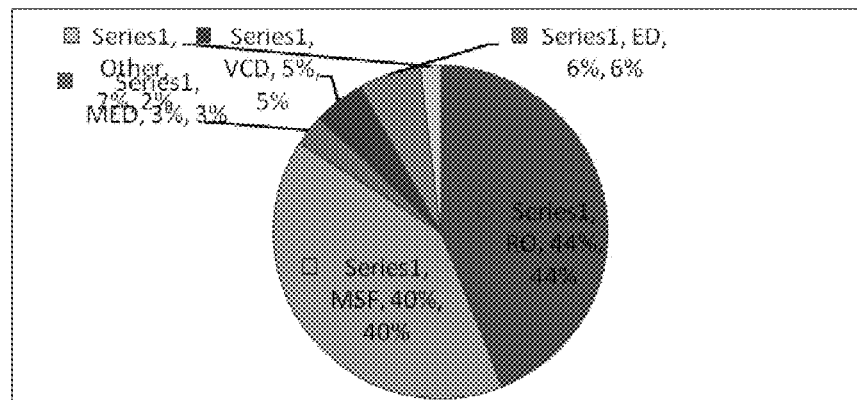
FIGS. 31A-31C show the distribution of desalination production capacity by process technology in the word and various regions of the world where membranes and systems herein described can find application, where MSF is multi-stage flash distillation, MED is multi-effect distillation, VCD is vapor composition distillation, RO is osmosis, NF is nanofiltration, and ED is electrodialysis.
Figure 31B:
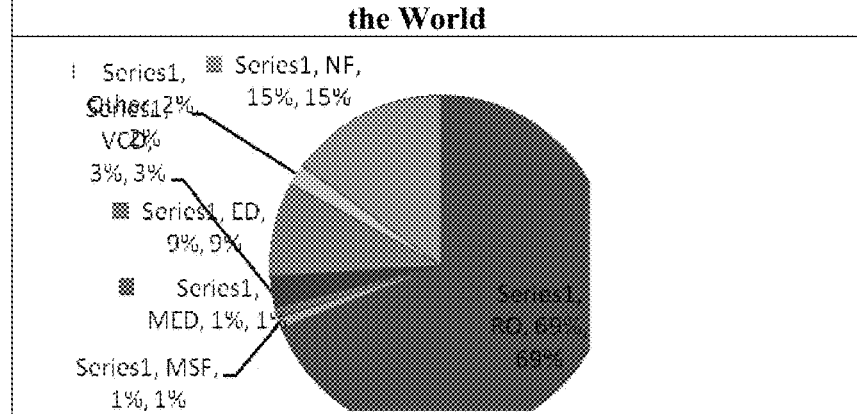
Figure 31C:
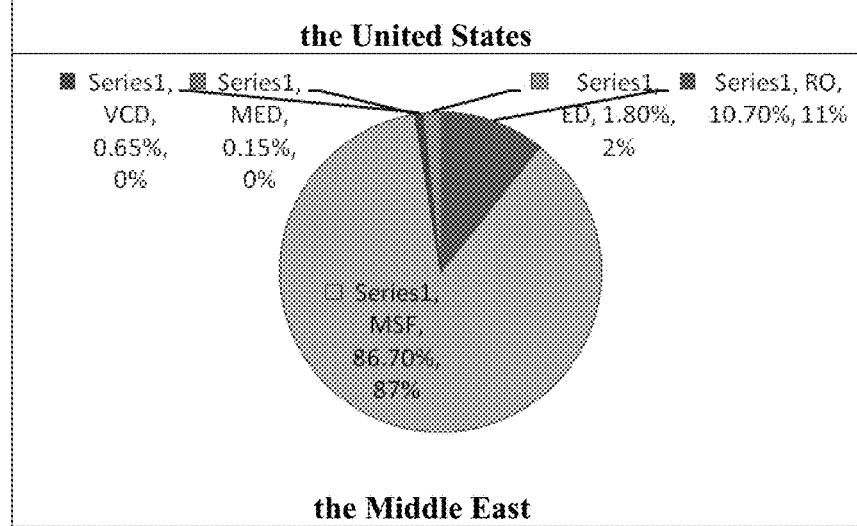

The ion-selective MF membranes is also expected to be operable at low pressure (e.g. 0.5-2.0 bar). Moreover, the bound anions/cations is expected to be released by intermittently backwashing the MF membranes with an acidic/basic solution, or a solution containing sufficient concentration of an anion/cation selective ligand (e.g., citric acid). Following treatment, the streams from the ion-absorbing MF systems is be expected to yield a product water with a specified ionic concentration when the streams are mixed together. The filtration system described is expected to able widely applicable throughout the world, and in particular in arid regions such as the Middle East (FIGS. 31A-31C)

Example 13: Ion Selective UF/MF Membrane Modules

The Applicants have developed the basic methodology and building blocks to fabricate ion selective UF/MF membrane modules (FIG. 10 and FIGS. 15A-15C) comprising hollow fibers (HF) containing that can reject cations/anions primarily through electrostatic (Donnan) repulsion and selectively bind/release anions/cations through various mechanisms including complexation and ion exchange.

In this example, the membranes are expected to be fabricated using solvent spinning or electrospinning. Polymers that expected to be useful for spinning the HF in this example include polyethersulfone (PES), poly(vinylidene) fluoride (PVDF) and polyacrylonitrile (PAN). An exemplary membrane module suitable in UF filtration is schematically illustrated in FIG. 1A, which also schematically shows the configuration and possible operation to perform ultrafiltration of backwash feed to obtain a permeate using a filtration membrane including hollow fibers (FIG. 1A.)

Example 14: Possible Variations and Modifications on the Low-Pressure Membrane Desalination System The low-pressure membrane desalination system shown FIGS. 14A-14B was designed to be flexible, scalable and reconfigurable. The user can select the number and chemistry of the ion-selective UF/MF modules that will be deployed to achieve the desired product water composition. In some cases, a user can select to use a conventional or improved nanofiltration (NF) membrane system as the first stage to reject dissolved organic matter, divalent ions and a fraction of the monovalent ions.

Figure 18A:
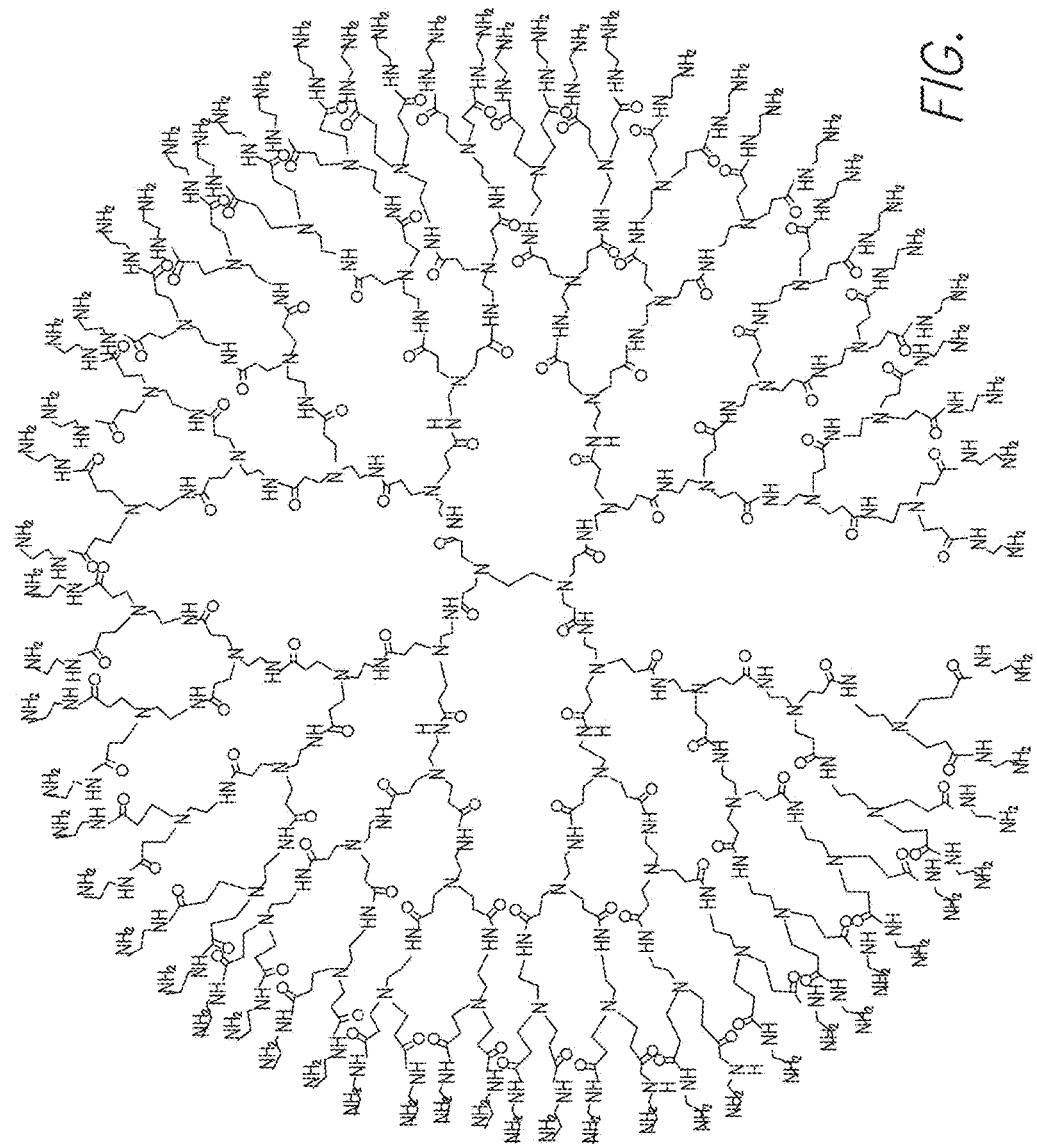
FIGS. 18A-18B show the 2-D structures of selected poly(amidoamine) (PAMAM), poly(propyleneimine) (PPI) dendrimers suitable in embodiments herein described.
Figure 18B:
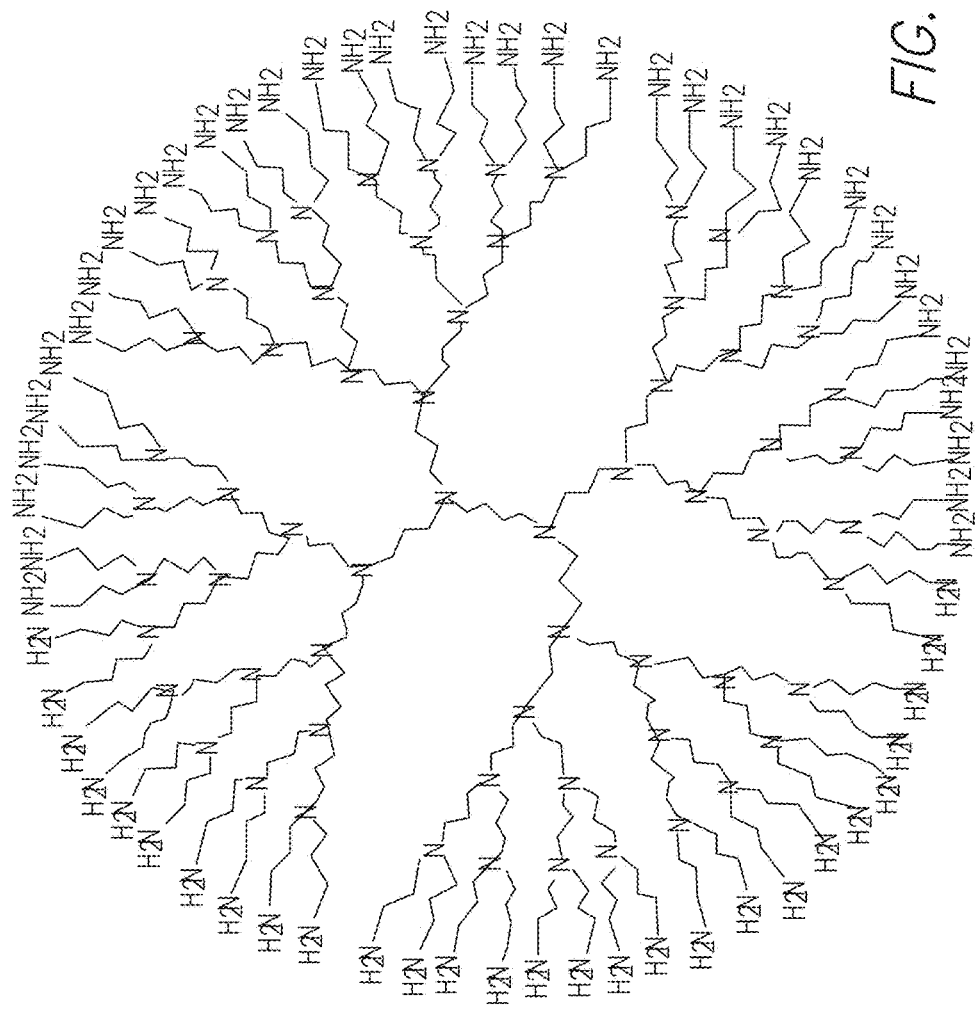

Example 15: Synthesis and Characterization of Ion-Absorbing Hollow-Fibers (IAHF) with Embedded Hyperbranched Macromolecules that Selectively Bind and Release Anions and Cations from Aqueous Solutions The Applicants have developed the methods/procedures and building blocks to synthesize ion-absorbing hollow-fibers (IAHF) with embedded hyperbranched macromolecules that selectively bind and release anions (e.g., $Cl^-$ and $SO_4^{2-}$) and cations (e.g., $Na^+$, $Ca^{2+}$ and $Mg^{2+}$) from aqueous solutions by intermittently backwashing the hollow-fibers with acidic/basic solutions. This example was based in part on previous experiments and multiscale modeling of the supramolecular chemistry of cation and anion binding to poly(amidoamine) [PAMAM] and poly(propyleneimine) [PPI] dendrimers in aqueous solutions that were carried out by the Applicants. PAMAM dendrimers possess amide, tertiary and primary amine groups; whereas PPI dendrimers have only primary and tertiary amine groups (FIGS. 18A-18B). PAMAM and PPI dendrimers can bind and release a broad range cations (e.g., $Cu^{2+}$, $Co^{2+}$, $Fe^{3+}$, $Ni^{2+}$ and $U^{6+}$) and anions (e.g., $Cl^-$, $ClO_4^-$ and $SO_4^{2-}$) through a simple change of solution pH [Refs. 5.6-5.12]. Moreover, dendrimers such as PAMAM and PPI can be functionalized with terminal groups that make them soluble in appropriate solvents, bind onto targeted surfaces or cross-link with other dendrimers to form multifunctional supramolecular assemblies [Refs. 5.13-5.14].

Example 16: Synthesis and Characterization of Ion-Selective Hyperbranched Macromolecules and Microparticles PAMAM and PPI dendrimers can serve as selective and recyclable high capacity macroligands for anions and cations in aqueous solutions [Refs. 5.6-5.12]. Low-cost hyperbranched macromolecules, such as polyethyleneimine (PEI), behave very similarly as the corresponding, but expensive dendrimers [Refs. 5.15-5.16]. Hyperbranched PEI has a degree of branching at approximately 65-70%. Industrial scale quantities of hyperbranched PEI macromolecules with various molecular weights (MW) ranging from about 1,000 to several million Daltons are commercially available from several suppliers. This example shows a strategy for functionalizing hyperbranched PEI macromolecules (FIGS. 2A-2C) to prepare macroligands with very large molar mass that can selectively bind anions such as $Cl^-$, $Br^-$ and $SO_4^{2-}$ at pH ~6 and release them at pH ~9.0 (5.15-5.16).

The Applicants have also synthesized and characterized functionalized hyperbranched PEI macromolecules and microparticles that can selectively bind cations ($Na^+$, $Ca^{2+}$ and $Mg^{2+}$) and anions ($Cl^-$ and $SO_4^{2-}$) in aqueous solutions and release them through a simple change of solution acidity/basicity. These ions make-up more than 98% of the total dissolved solids (TDS) in brackish water and seawater [Ref.5.15]. In this example, further to the synthetic routes shown in FIGS. 2A-2C for preparing hyperbranched macromolecules that selectively bind and release $Cl^-$ and $SO_4^{2-}$, recyclable hyperbranched macromolecules that can selectively bind $Na^+$, $Ca^{2+}$ and $Mg^{2+}$ were synthesized.

2s metal ions such as $Ca^{2+}$ and $Mg^{2+}$ have a strong preference to coordinate with ligands containing negative O donors [Ref. 5.17]. Is metal ions such as Na+ prefer to coordinate with ligands containing neutral oxygen donors [Ref.5.17]. Thus, the following guidelines (based on these well-established trends in coordination chemistry [Ref.5.17]) provides the conceptual framework for the synthesis of recyclable and selective hyperbranched macroligands for $Na^+$, $Ca^2$ and $Mg^{2+}$:

1. Guideline 1. Hyperbranched macromolecules containing negative O donors and tertiary amine groups will selectively bind $Ca^{2+}$ and $Mg^{2+}$ ions at pH ~7.0 and release them by washing with an acid solution containing a small ligand such as citric acid.

2. Guideline 2. Hyperbranched macromolecules containing neutral O donors and tertiary amine groups will selectively bind Na+ at pH ~7.0 and release them by washing with an acid solution containing a small complexing ligand such as citric acid.

Figure 19:
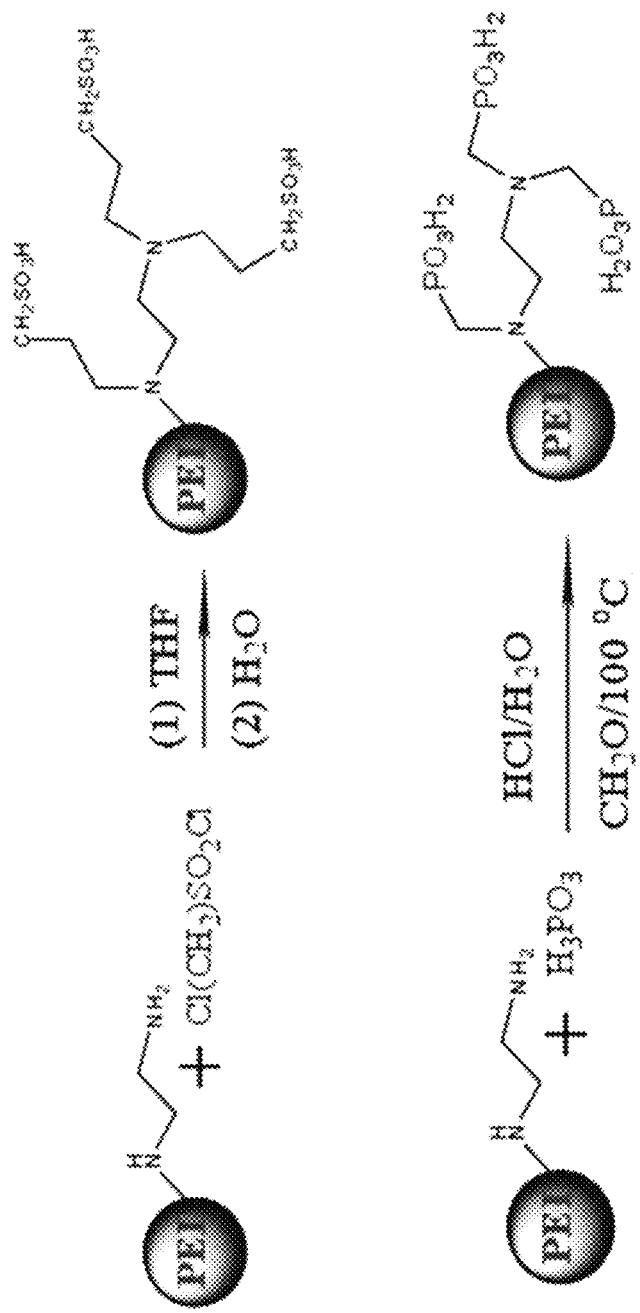
FIG. 19 shows a reaction scheme for the synthesis of the cation-selective macromolecules of FIG. 17 by functionalization of hyperbranched poly(ethyleneimine) PEI Macromolecules [Ref. 5.16] suitable in embodiments herein described.

To prepare hyperbranched macromolecules containing tertiary amine and negative O donors, primary/secondary amine groups of hyperbranched PEI (FIGS. 2A-2C) were reacted with the appropriate functional groups (e.g. sulfonate and phosphonate) (FIG. 19).

Figure 20A:
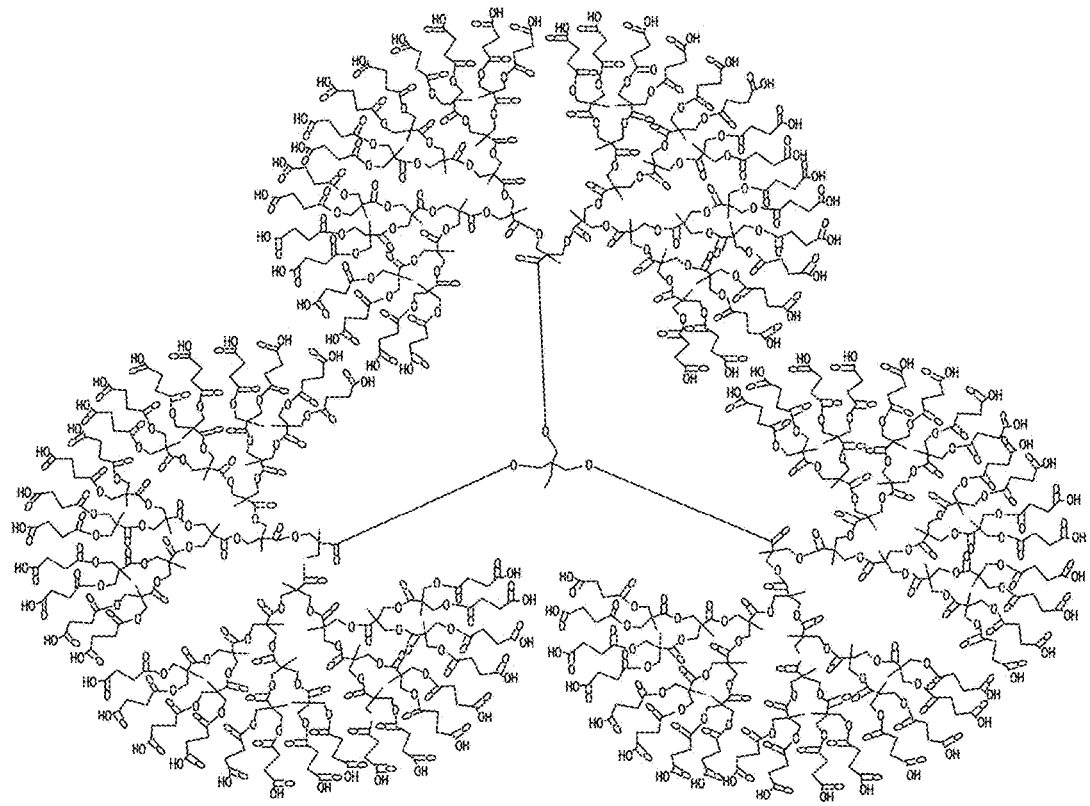
FIGS. 20A-20B show an example of a cation-selective bis(methylol)propionic acid (MPA) dendrimer (FIG. 20A) and an example of its synthesis (FIG. 20B) [Ref. 5.16] suitable in embodiments herein described.
Figure 20B:
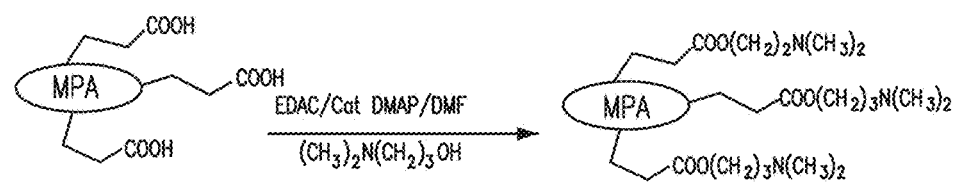

For the preparation of hyperbranched macromolecules with neutral O donors, it is expected that commercially available 2,2-bis(methylol)propionic acid (MPA) hyperbranched macromolecules can be as starting materials. MPA dendritic macromolecules (FIGS. 20A-20B) have large numbers of internal O groups and terminal OH groups [Ref. 5.18]. The terminal OH groups of an MPA hyperbranched macromolecule (with 64 terminal OH groups) [Ref. 5.18] can be reacted with the appropriate functional groups (e.g. alcohols, amines) and is expected to yield hyperbranched macromolecules containing internal O groups and terminal tertiary amine groups [FIGS. 20A-20B].

Example 17: Synthesis and Characterization of Ion-Absorbing Hollow Fibers (IAHF)

Figure 21:
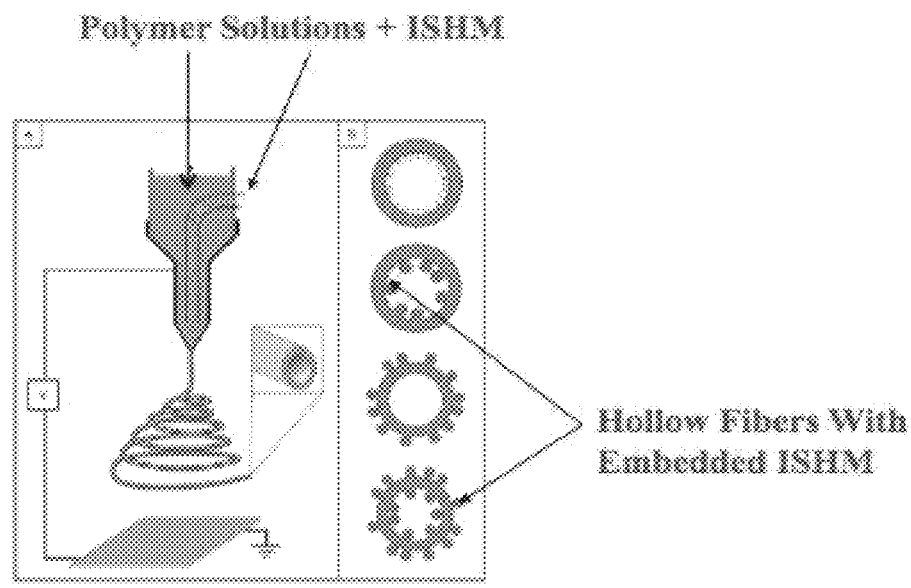
FIG. 21 shows a schematic representation of a apparatus, process and system the preparation of ion-absorbing hollow fibers by Electrospinning [Ref. 5.19].

This example illustrates the use of electrospinning to generate hollow polymeric nanofibers [Ref. 5.19] with embedded ISHM as shown in FIG. 21). In this example, PVDF is expected to be useable as base polymer for the hollow polymeric nanofibers because it is widely used as base polymer in the fabrication of commercial hollow-fiber UF/MF membranes and because PVDF and the functionalized PEI/MPA hyperbranched macromolecules (FIGS. 2A-2C to FIGS. 20A-20B) are partially soluble (at least 5-10 wt %) in polar solvents with widely different physicochemical properties (e.g. boiling point and surface tension) such as tetrahydrofuran (THF), dimethyl formamide (DMF) and dimethyl acetamide (DMAc) [Refs. 5.17, 5.20-5.21]. This is expected to provide many degrees of freedom for optimizing the physicochemical properties of the proposed IAHF (FIG. 21) by selecting the appropriate solvents and fiber spinning conditions [Ref. 5.19].

Example 20: Synthesis, Characterization, and Performance Evaluation of Ion-Selective Nanofibrous Composite Membranes Using PVDF and Hyperbranched PEI Macromolecules as Building Blocks This example shows the synthesis of nanofibrous composite (NFC) membranes using polyvinylidene fluoride (PVDF) and hyperbranched polyethylenimine (PEI) as building blocks. These NFC-PVDF-PEI membranes comprise cross linked hyperbranched PEI separation layers supported by PVDF nanofibrous scaffolds that are electrospun onto commercial PVDF MF membrane supports (FIGS. 24A-24C) which in this example allows for fabrication of positively charged NF membranes with high water flux and improved rejection for monovalent cations. In order to obtain such membranes, the effects of cross linker chemistry on membrane properties (morphology, composition, hydrophobicity and zeta potential) and membrane performance (salt rejection and permeate flux) was first evaluated. Three cross linkers tested in this example included trimesoyl chloride (TMC), 1,3-dibromo propane (DBP) and epichlorohydrin (ECH). Four salts (NaCl, $MgCl_2$, $Na_2SO_4$, and $MgSO_4$). The results of this example indicated that PVDF nanofibers and hyperbranched PEI were suitable s building blocks for the fabrication of high performance NF membranes for water purification.

Materials:

Poly(vinylidene fluoride) (PVDF) MF membrane supports (0.45 μm pore size) were purchased from Millipore (USA). PVDF powder (Kynar 761) was provided by Arkema (USA). Hyperbranched polyethyleneimine (PEI) [Mw: 25,000 and Mn: 10,000] was provided by BASF (Germany). Dimethylformamide (DMF), n-methyl-2-pyrrolidone (NMP), trimesoyl chloride (TMC), 1,3-dibromo propane (DBP) and epichlorohydrin (ECH) were purchased from Sigma-Aldrich. Analytical grade NaCl, $MgCl_2$, $Na_2SO_4$, $MgSO_4$, were purchased from Samchon Chemicals (Korea). The chemicals in this example were used as received. Deionized water (18.2 MΩ·cm resistivity) was used to rinse the membranes and prepare the salt solutions.

Figures 24A, 24B:
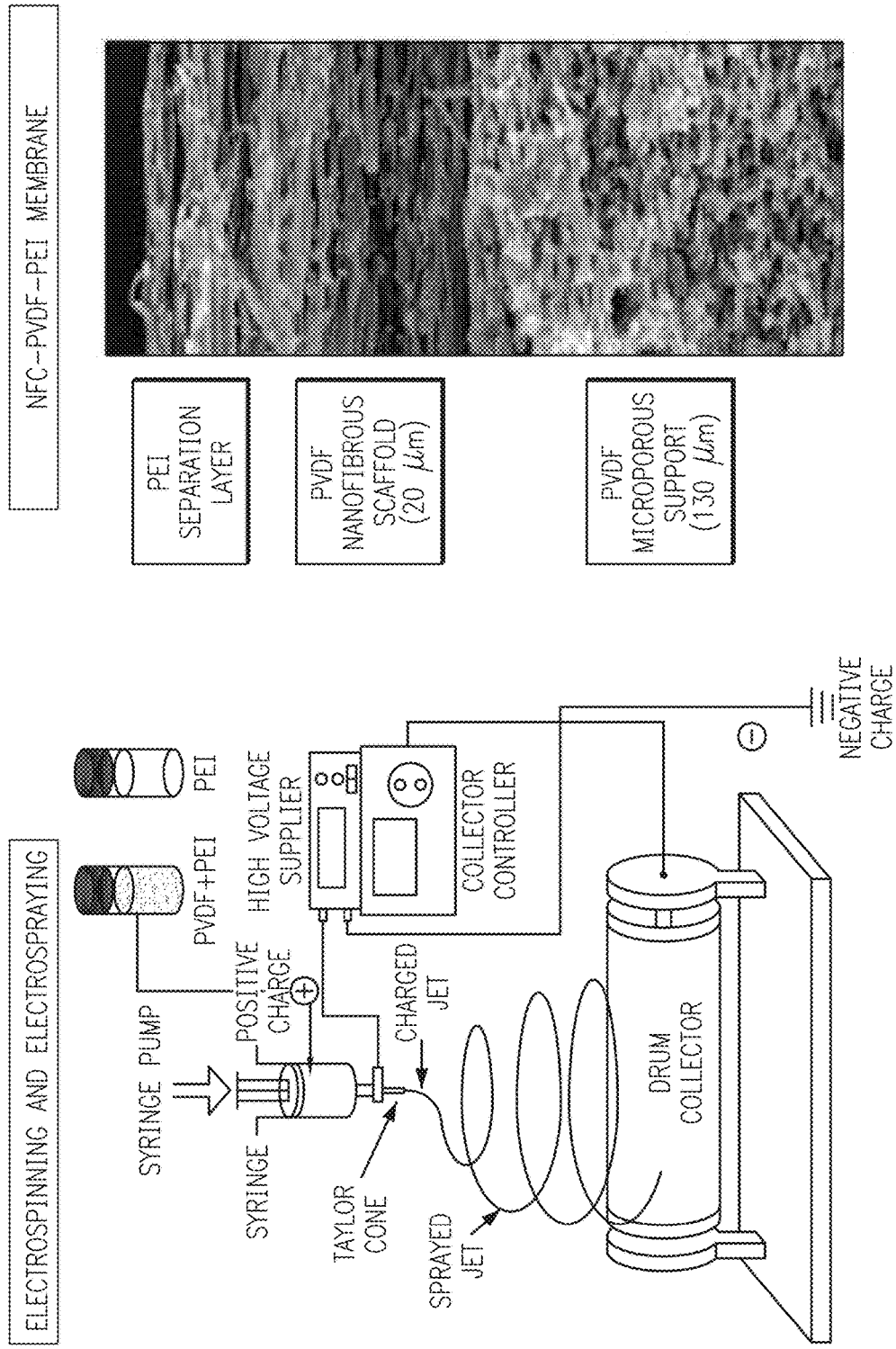
FIGS. 24A-24C show a schematic diagram of the fabrication of nanofibrous composite (NFC-PVDF-PEI) membranes with PVDF microporous support, PVDF nanofibrous scaffolds and cross linked PEI separation layers according to an embodiment herein described.
Figure 24C:
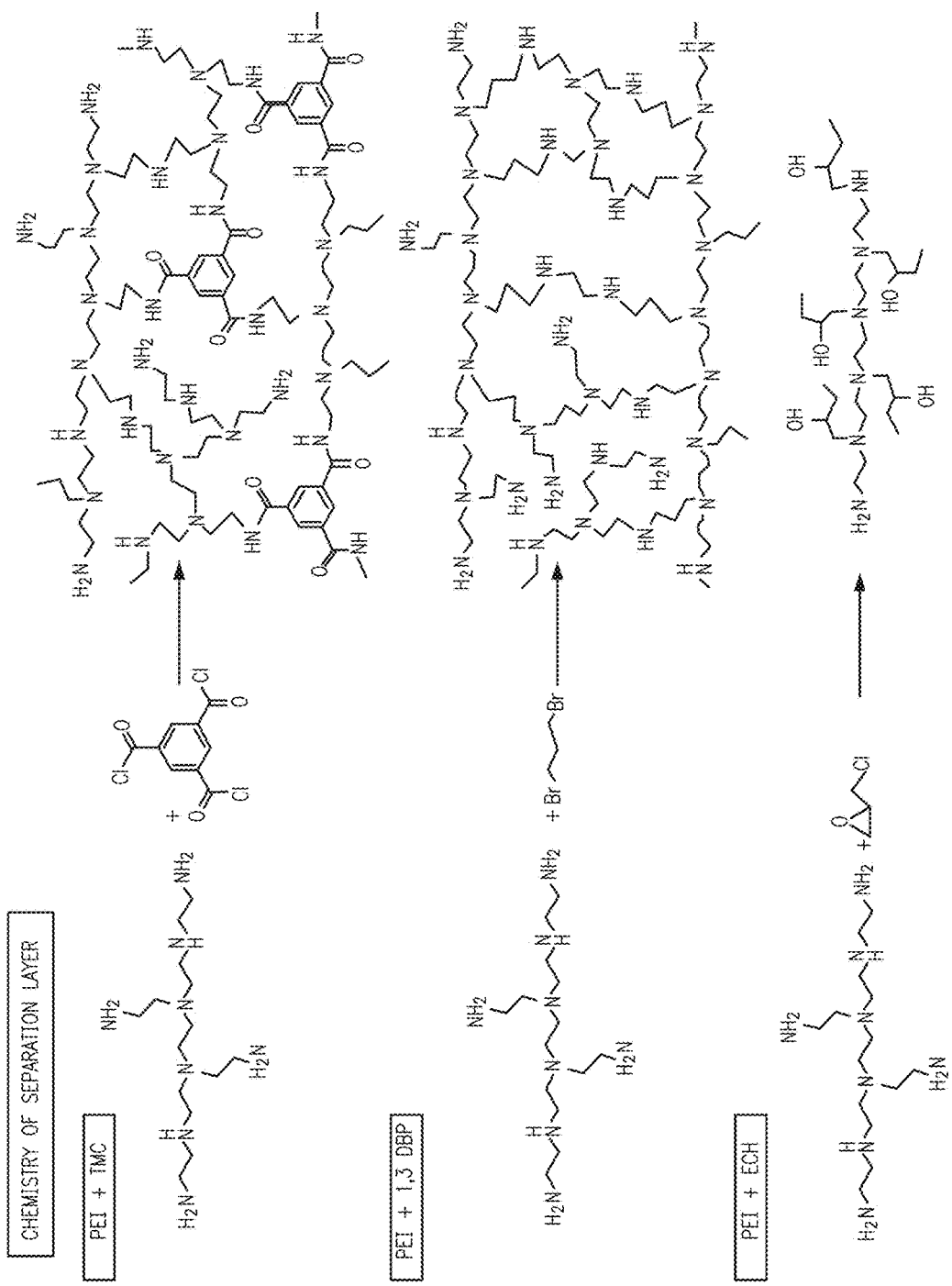

Nanofiber and Membrane Synthesis:

The Applicants utilized blends of PVDF+PEI to spin the nanofibrous scaffolds of the NFC-PVDF-PEI membranes. A typical polymer blend was prepared by dissolving PVDF (18.5 wt %) and PEI (2.5 wt %) in a mixture of DMF and NMP (1:1 w/w). The mixture was sonicated for 4 hours to obtain a homogeneous PVDF/PEI solution. A NANON-01A electrospinning (ES) machine (MECC, Japan) was used to spin the PVDF nanofibrous scaffold of each membrane. The PVDF MF support was first mounted on the NANON-01A drum collector. Following this, the PVDF/PEI blend was electrospun onto the PVDF membrane support using a solution flow rate of 0.7 mL/h and a voltage of 29 kV. During the ES process, the distance between the needle and the collector drum was kept constant at 7.5 cm. The speed of the collector was also kept constant 500 rpm. After the completion of the ES process, 1.0 mL of a solution of hyperbranched PEI in methanol (50 wt %) was electrosprayed onto the electrospun nanofibrous PVDF membranes using a solution flow rate 0.3 mL/h, a voltage of 29 kV, a needle to collector distance of 7.5 cm and a collector speed of 2500 rpm. TABLE 1 lists the process parameters used to (i) spin the PVDF nanofibers and (ii) spray them with PEI. Following electrospraying, the PEI-coated PVDF nanofibrous scaffolds were reacted with the cross linkers to generate three different types of membranes (FIGS. 24A-24C). To synthesize the NFC-PVDF-PEI-1 membranes, the PEI-coated nanofibrous scaffolds were reacted with a solution of TMC in toluene (1% w/v) in a glass vessel at room temperature for 5 minutes (FIGS. 24A-24C). Similarly, the NFC-PVDF-PEI-2 and NFC-PVDF-PEI-3 membranes were synthesized by reacting the PEI-coated PVDF nanofibrous scaffolds, respectively, with 20 wt % solutions of 1,3-DBP and ECH in toluene for one hour at 45° C. Following this, the membranes were rinsed three times with deionized (DI) water and stored in DI water at room temperature.

TABLE 1

Table 1: List of electrospinning and electrospraying process parameters

| Process Parameters | Electrospinning | Electrospraying |
|---|---|---|
| Concentration of Polymer Solution | PVDF (18.5 wt) + PEI (2.5 wt %) in mixtures of DMF and NMP (1:1 w/w) | 50-wt % solution of PEI in methanol |
| Amount of Polymer Solution | 6 mL | 1 mL |
| Solution Flow Rate | 0.7 mL/hr | 0.3 mL/hr |
| Applied Voltage | 29 kV | 29 kV |
| Needle Diameter (mm) | 0.394 mm | 0.394 mm |
| Needle Collector Distance | 7.5 cm | 7.5 cm |
| Drum Collector Speed | 500 rpm | 2500 |

Nanofiber and Membrane Characterization:

The morphology, chemical composition, hydrophobicity and zeta potential of the PVDF nanofibers and NFC-PVDF-PEI membranes were characterized using various analytical tools. The cross-sectional and surface morphologies of the nanofibers and membranes were imaged using a field emission scanning electron microscope (FESEM, FEI, SIRION-100, USA). Before imaging, the samples in this example were coated with gold at 30 mA for 120 seconds to minimize the charging effect. To obtain the cross-sectional FESEM images, the membranes were frozen and fractured following immersion in liquid nitrogen. The SEM images were subsequently analyzed to estimate the thickness of the membrane surface layers using the Image J Version 1.45m image processing/analysis software. The compositions of the surface layers of the NFC-PVDF-PEI membranes were characterized by attenuated total reflectance Fourier transform infrared spectroscopy (ATR-FTIR) using a JASCO 4100 FT-IR spectrometer (Japan).

All samples in this example were scanned from 500 $cm^{-1}$ to 4000 $cm^{-1}$ with a scanning speed of 2 mm/sec using a zinc selenide ATR crystal plate with an aperture angle of 45°. The hydrophobicity of each NFC-PEI membrane was determined from contact angle measurements using a Phoenix 300 contact angle analyzer (SEO cooperation, Korea). A microsyringe was utilized to place a water droplet on the surface of each membrane. After 30 seconds, the image was captured and analyzed using the instrument's image processing software. Each reported contact angle is the average of ten different measurements. The zeta potentials of the membranes were determined using the electrophoresis method [Ref. 7.28].

This involves measuring the electrophoretic mobility of monitoring particles inside an electrophoresis chamber having a membrane and quartz cells [Ref. 7.28]. Due to the sorption and accumulation of ions at the surface of the membranes, an electroosmotic flow occurs inside the electrophoresis chamber. This induced electroosmotic flow causes the particles to undergo electrophoretic flow (7.28). An ELS-8000 electrophoretic light scattering spectrophotometer with a plate quartz cell (Otsuka Electronics, Japan) was used to measure the electrophoretic mobility of the monitoring particles in 0.01 M KCl solutions as a function of pH. The monitoring particles consisted of polystyrene (PS) latex particles (Otsuka Electronics, Japan) with a hydroxy propyl cellulose surface coating and diameter of 520 nm. The PS particles were dispersed in 0.01 N KCl solutions. The pH of the KCl solutions was adjusted with 0.1 N HCl or KOH as needed.

The measured electrophoretic mobilities (U) [$cm^2$ $V^{-1}$ $s^{-1}$] was converted to zeta potentials ($\zeta_{EP}$) [mV] using the Smoluchowski equation as given below (7.28):

$$\zeta_{EP} = 4\pi\eta U/\varepsilon_r\varepsilon_0 \quad \text{Eq 1}$$

where η is the liquid viscosity (0.89×$10^{-3}$ Pa s), $\varepsilon_r$ is the relative permittivity of the liquid (78.38) and $\varepsilon_0$ is the vacuum permittivity (8.854×$10^{-12}$ s $m^{-1}$).

Filtration Experiments:

A custom-built filtration system with an effective membrane area of 24 $cm^2$ was used to measure the salt rejection and permeate flux of each NFC-PVDF-PEI membrane. During each filtration experiment, the Applicants used a feed solution of 10 L with a salt concentration of 2000 mg/L. The pH of the feed solution was adjusted with a solution of 0.1 N HCl or 0.1 N NaOH as needed. The filtration experiments in this example were carried out at room temperature and at a constant pressure of 7.0 bar. The salt rejection (R) of each membrane was assayed by electric conductivity measurements. R was expressed as:

$$R=(1-C_p/C_f)\times 100 \quad \text{Eq. 2}$$

where $C_f$ and $C_p$ are, respectively, the conductivity of the feed and permeate solutions. The permeate flux (J) [L m$^{-2}$ hr$^{-1}$] at time t through each membrane was expressed as:

$$J=V_p/(A\times\Delta t) \quad \text{Eq. 3}$$

where $V_p$ is the volume of permeate [L] collected during the sampling time $\Delta t$ [hr] and A is the effective membrane [m$^2$].

Nanofiber Synthesis and Characterization:

Hyperbranched polyethyleneimine (PEI) and poly(vinylidene fluoride) (PVDF) were selected as building blocks for the separation layers, nanofibrous scaffolds and microporous supports of the filtration membranes (FIGS. 24A-24C). Due its high density of reactive amine groups and ready availability from commercial sources [Refs. 7.13, 2010; 7.9], hyperbranched PEI is a versatile building block for preparing ion-selective thin films. Other work has shown that hyperbranched PEI can be used to synthesize NF membranes with positively charged separation layers [Refs. 7.1; 7.5]. In this example, PVDF was selected as base polymer to fabricate the nanofibrous scaffolds and microporous supports of the filtration membranes at least in part because PVDF is widely used as base polymer in the fabrication of commercial UF/MF membrane because of its high thermal/chemical resistance and tensile strength [Refs. 7.20; 7.6] and because PVDF is soluble in a broad range of solvents including dimethylformamide (DMF), n-methyl-2-pyrrolidone (NMP) and dimethyl acetamide (DMAc) (Gopal. 2006; 7.6). This provides many degrees of freedom for optimizing the properties of the microporous supports and nanofibrous scaffolds of the filtration membranes (FIGS. 24A-24C by selecting appropriate synthetic conditions. However, optimization should take into account features of the chemical to be selected. For example, id a membrane is provided for filtering ions, optimization should take into account that in some instances proteins and other hydrophobic macromolecular assemblies present in water/wastewater can foul PVDF membranes due to their hydrophobicity.

Figures 25A, 25B:
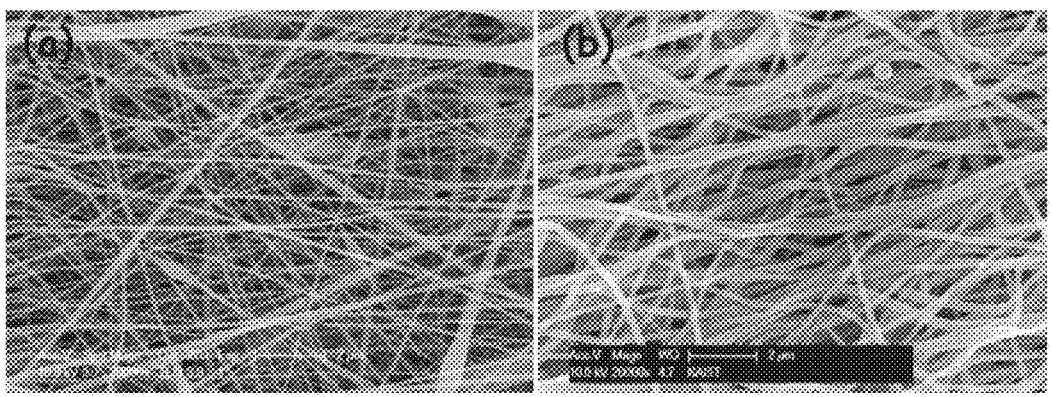
FIGS. 25A-25B show images of electrospun nanofibers from polymer solution according to an embodiment herein described.

Compared to membrane surface treatment methods such as chemical oxidation, plasma treatment and polymer grafting [Ref.7.29], blending hydrophobic polymers such as PVDF with more hydrophilic polymers can be used as a method for decreasing the hydrophobicity of polymeric membranes [Ref. 7.19]. Because hyperbranched PEI and PVDF are both soluble in DMF and NMP, the blends of PVDF (18.5 w %) and PEI (2.5 w %) were used to synthesize the nanofibrous scaffolds of the NFC-PVDF-PEI membranes (FIGS. 24A-24C). The blends were prepared by dissolving the required amounts of PVDF and PEI in mixtures of DMF and NMP (1:1 w/w). Consistent with literature data [Ref. 7.22], the Applicants found that the average diameter (155.8 nm±44.4 nm) of PVDF nanofibers electrospun using mixtures DMF/NMP (1:1 w/w) was larger than that of the corresponding PVDF nanofibers (81.4 nm±21.4 nm) that were prepared using pure DMF (FIGS. 25A-25B).

The utilization of mixtures of solvents for electrospinning was suitable for this example for at least two reasons [Refs. 7.22; 7.40]. First, using a mixture of solvents can eliminate the formation of beaded nanofibers [Ref. 7.22]. Beads are defects that are formed during the electrospinning of polymeric nanofibers (PNFs) when low-viscosity solvents are utilized to dissolve the base polymers [Ref. 7.22]. In filtration membranes, beaded nanofibers decrease the membrane porosity and interrupt the flow of water through the membrane nanofibrous scaffolds [Ref. 7.22]. The viscosity of NMP (1.7 cps) is larger than that of DMF (0.9 cps). Consistent with the observations of Ramakrishna et al. (2005), the Applicants have found the use of pure DMF as spinning solvent, in this example, resulted in the formation of beaded PVDF nanofibers (FIG. 25A). In contrast, in this example, no beaded nanofibers were observed when mixtures of DMF and NMP (1:1 w/w) were used as spinning solvents (FIG. 25B). Second, the use of mixtures as spinning solvents can also increase both the adhesion/tensile strength of PNFs as well as the strength of their adhesion to nonwoven microporous supports. Yung et al. [Ref. 7.40], regarding adhesion/tensile strength of polymeric nanofibers (PNFs) and their delamination from nonwoven microporous polymeric supports reported that the adhesion between polyethersulfone (PES) nanofibrous layers and a nonwoven poly(ethylene terephthalate) (PET) microporous support was stronger when the base PES polymer was dissolved in mixtures of DMF and NMP (6:4 w/w). Applicants have also found that the use of mixtures of DMF and NMP increases the adhesion strength of PVDF nanofibers to PVDF microporous supports. Consistent with the observations of Yung et al. [Ref.7.40], the Applicants have found the use of pure DMF in this example as spinning solvent resulted in the formation of PVDF nanofibrous scaffolds that are easily peeled off by hand from the PVDF microporous supports and substantially none of the PVDF nanofibrous scaffolds in this example can be peeled off by hand from their supports when the fibers were electrospun using mixtures of DMF and NMP (1:1 w/w).

Figure 28:
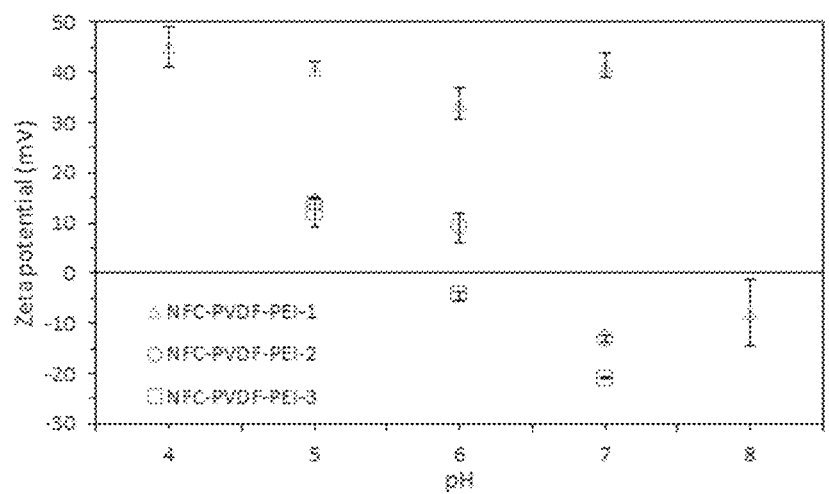
FIG. 28 shows zeta potentials of NFC-PVDF-PEI membranes according to an embodiment herein described in aqueous solutions as a function pH.
Figure 29A:
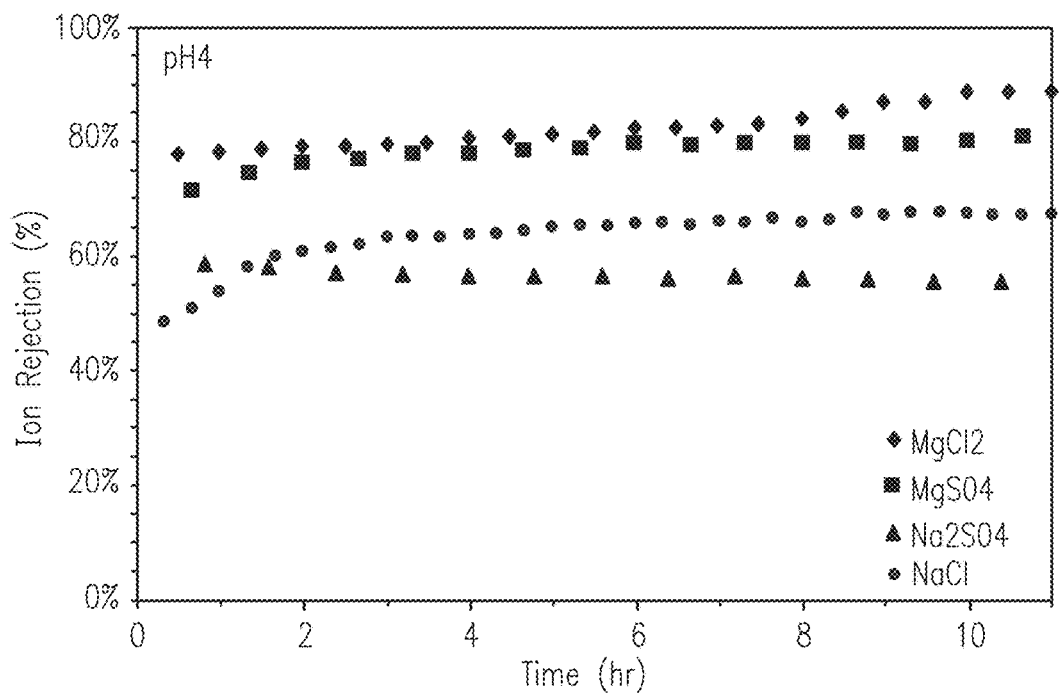
FIGS. 29A-29F show a graph of a salt rejection and permeate flux of NFC-PVDF-PEI-1 at pH 4, 6 and 8 as a function of time.
Figure 29B:
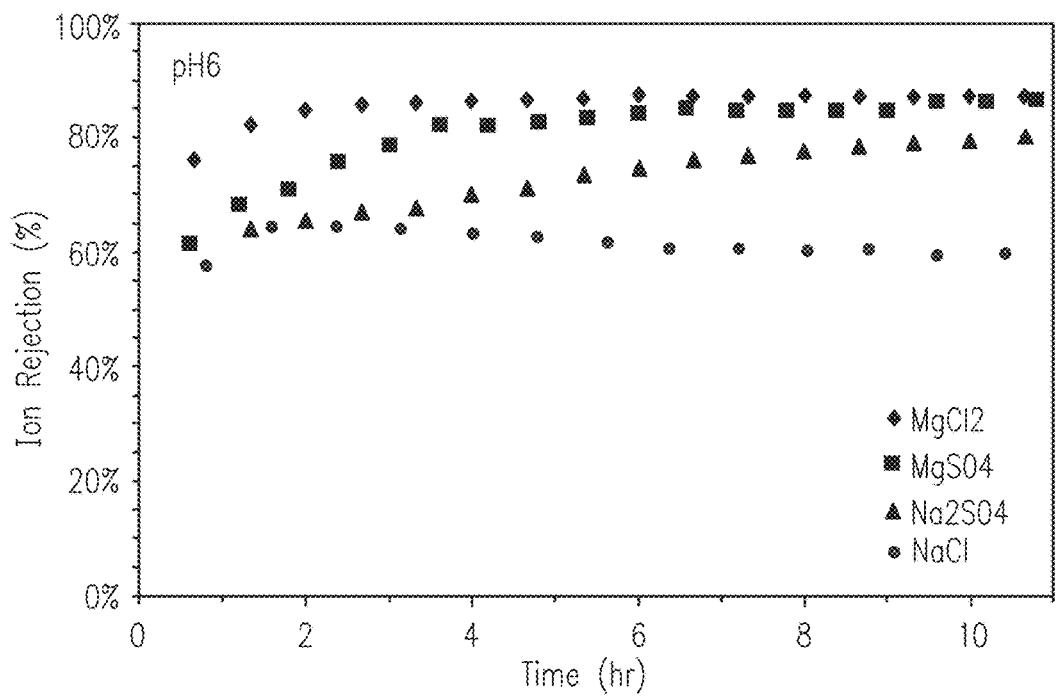
Figure 29C:
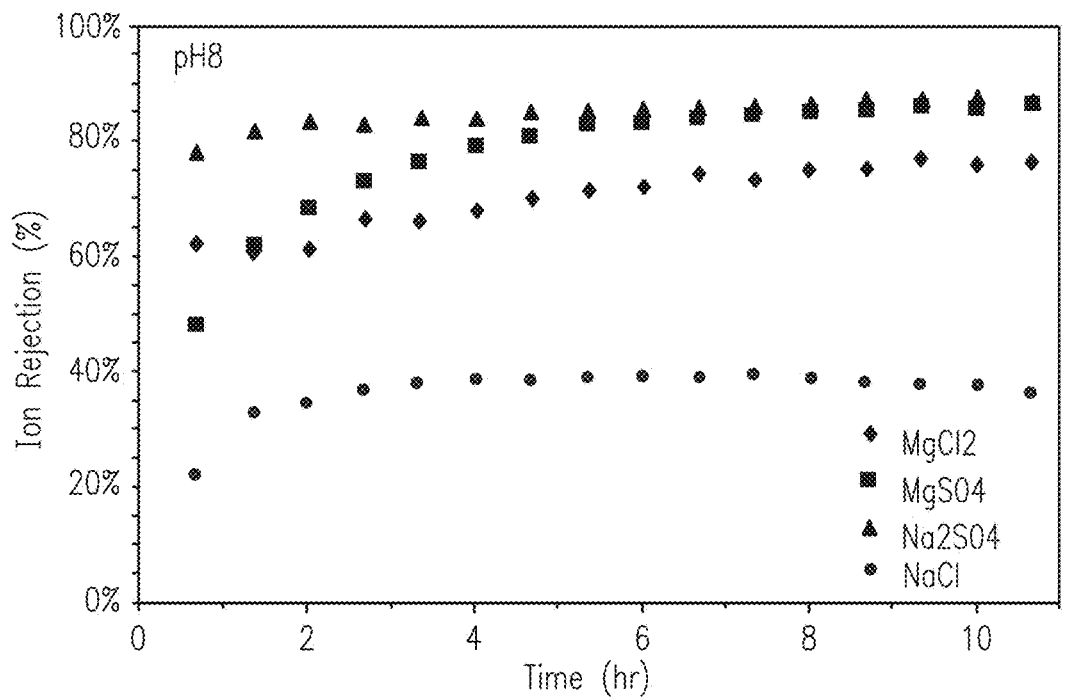
Figure 29D:
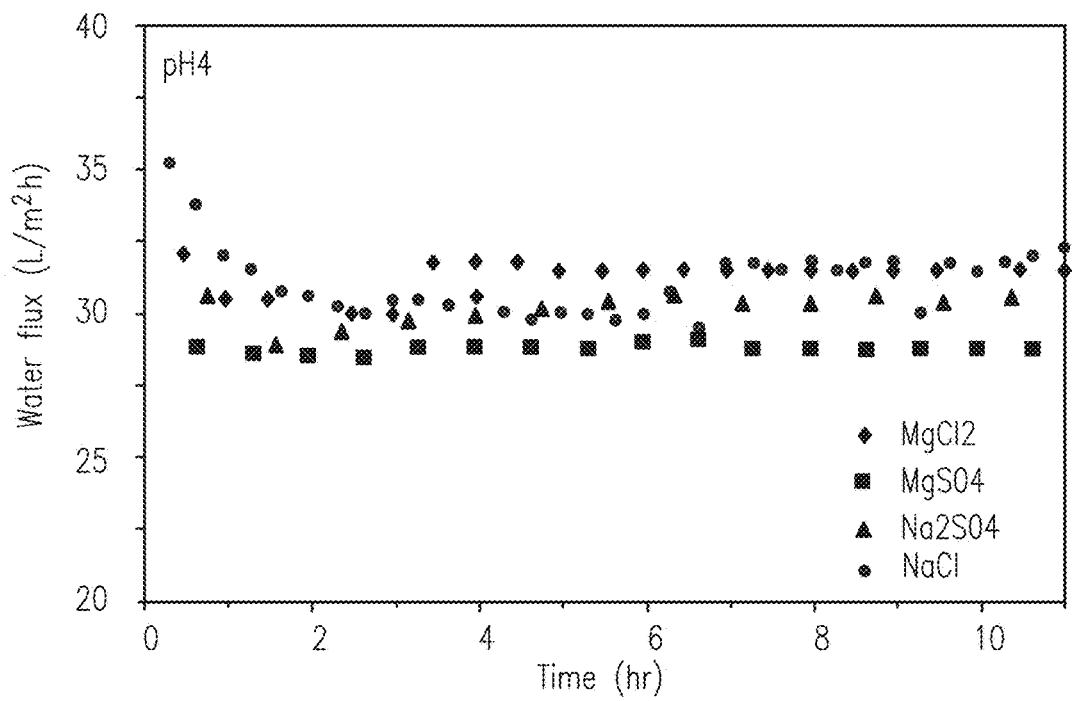
Figure 29E:
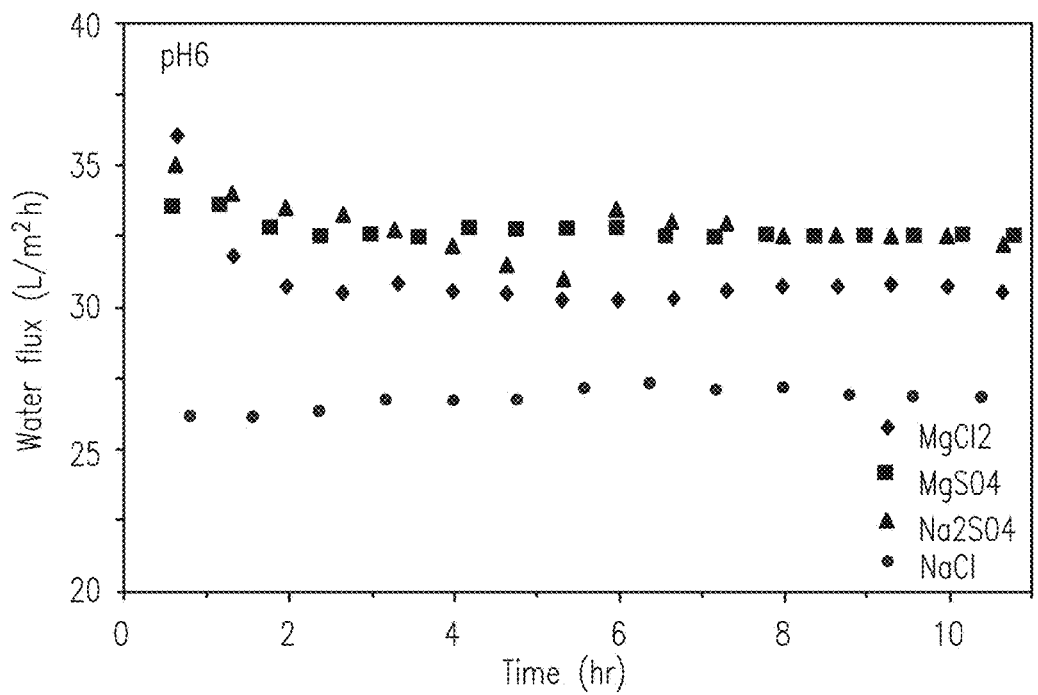
Figure 29F:
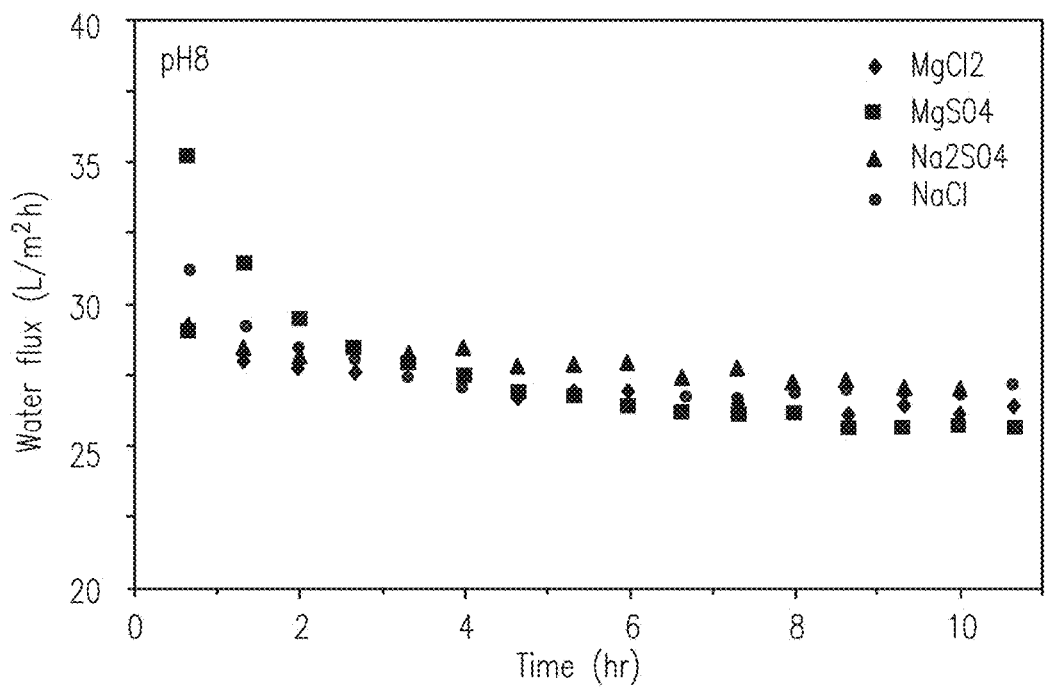

Membrane Synthesis and Characterization:

To fabricate ion-selective filtration membranes (FIGS. 24A-24C), electrospraying was used to deposit films of hyperbranched PEI onto PVDF nanofibrous scaffolds that were electrospun onto commercial PVDF microfiltration membrane supports using mixtures of DMF and NMP (1:1 w/w). Electrospraying can be a suitable technique for depositing films onto a broad range of substrates including polymeric membranes (Jaworek and Sobczyk, 2008). The films can be deposited from solutions or suspensions of microparticles and/or nanoparticles with controlled thickness ranging from approximately 10 nm to 100 µm. Roso et al. (2008) have combined electrospinning with electrospraying to fabricate catalytic membranes having polysulfone nanofibrous scaffolds with embedded TiO$_2$ nanoparticles. TABLE 1 lists the process parameters used to spray the PVDF nanofibrous scaffolds with hyperbranched PEI. Based on SEM images (data not shown), the Applicants found the surfaces of the PVDF nanofibrous scaffolds can be fully covered by spraying them with 1.0 mL of a 50-wt % solution of PEI in methanol. Following electrospraying, the PEI-laden nanofibrous PVDF were reacted, respectively, with trimesoyl chloride (TMC), 1, 3-dibromopropane (DBP) and epichlorohydrin (ECH) to produce filtration membranes with cross linked PEI separation layers (FIGS. 24A-24C) as described in this example. TABLE 2 lists selected properties of the NFC-PVDF-PEI membranes that were measured in this example including contact angle, zeta potential, isoelectric point and surface layer thickness. FIGS. 26A-26F shows the FESEM images of the surface and cross-section morphology of the NFC-PVDF-PEI membranes. As shown in FIG. 26A and FIG. 26B, the surface of the NFC-PVDF-PEI-1 membrane (with TMC cross linker) consists of a film of PVDF nanofibers with cross linked PEI macromolecules. Due to its rough/wiggly surface morphology, it was difficult to measure the thickness of the surface layer of the NFC-PVDF- PEI-1 membrane with high precision. Using the Image J Version 1.45m image processing/analysis software, the thickness of the membrane surface layer was estimated as being equal to 240 nm±100 nm (TABLE 2). This value is within the range of the observed thickness (150-2000 nm) of the surface layers of conventional polymeric NF membranes [Refs. 7.2; 7.18]. FIGS. 26A-26F shows that both the surface of the NFC-PVDF-PEI-2 membrane (with DBP cross linker) and that of the NFC-PVDF-PEI-3 membrane (with ECH cross linker) consist also of films of PVDF nanofibers with cross linked PEI macromolecules. The thickness of the separation layers of the NFC-PVDF-PEI-2 and NFC-PVDF-PEI-2 membranes can be estimated, respectively, as approximately equal to 10 μm and 13 μm (TABLE 2). The large thickness of the surface of these membranes can be attributed to longer crosslinking reaction times (1 hour) at higher temperature (45° C.) in the presence of excess reagents (e.g. solutions of 20 wt % of DBP/ECH in toluene).

contact angle of the PVDF membrane support is equal to 130.2°+0.9° thereby indicating that the support is very hydrophobic. In contrast, the contact angles for the NFC-PVDF-PEI-1, NFC-PVDF-PEI-2 and NFC-PVDF-PEI-3 membranes are equal, respectively, to 38.6±1.4°, 54.9±0.50, and 50.2±1.3° thereby indicating these membranes are hydrophilic and less susceptible to fouling via sorption of proteins and other hydrophobic macromolecular assemblies present in water/wastewater. It is worth mentioning that the contact angle of the NFC-PVDF-PEI-1 membrane (38.6°±1.40) is smaller by ~10-20° than those of commercial thin film composite polyamide NF/RO membranes with cross linked polyamide separation layers. These membranes have contact angles of 50-60° [Ref. 7.11]. FIG. 28 shows the zeta potentials of the NFC-PVDF-PEI membranes measured at various pH. TABLE 2 lists their estimated isoelectric points and zeta potentials. The isoelectric points of the NFC-PVDF-PEI-1, NFC-PVDF-PEI-2 and NFC-PVDF-

TABLE 2

Table 2: Selected properties of the NFC-PVDF-PEI membranes synthesized in this example

| Membrane | Surface Layer | [a]Contact Angle | Isoelectric Point | Zeta Potential (pH 6) | Surface Layer Thickness |
|---|---|---|---|---|---|
| NFC-PVDF-PEI-1 | Cross linked PEI/TMC | 38.6 ± 1.4° | 7.8 | 39.7 ± 3.7 mV | 240 ± 100 nm |
| NFC-PVDF-PEI-2 | Cross linked PEI/DBP | 54.9 ± 0.5° | 6.4 | 9.0 ± 3.0 mV | 10 μm |
| NFC-PVDF-PEI-3 | Cross linked PEI/ECH | 50.2 ± 1.3° | 5.7 | −4.5 ± 0.9 mV | 13 μm |

[a]All the contact angles were measured in water. The contact angle of the PVDF MF membrane support is equal to 130.2° ± 0.9°.

FIGS. 27A-27E show the ATR-FTIR spectra of a PVDF membrane support, a blended PVDF/PEI nanofibrous scaffold and those of the NFC-PVDF-PEI membranes. FIG. 27A highlights several characteristic peaks of PVDF surfaces including $CF_2$ bending (615 and 766 $cm^{-1}$), $CH_2$ rocking (840 $cm^{-1}$), CH stretching (976 $cm^{-1}$) and CF stretching (1234 and 1279 $cm^{-1}$) (7.3). FIG. 27B shows that the blended PVDF/PEI nanofibrous scaffold exhibits two major peaks including (i) $NH_2$ bending (1655 $cm^{-1}$) from primary amines and (ii) NH stretching (3255 $cm^{-1}$) from primary/secondary amines. The Applicants assign these peaks to PEI macromolecules that are embedded in the PVDF nanofibrous scaffold (FIGS. 24A-24C). As shown in FIG. 27C, the FT-IR spectrum of the NFC-PVDF-PEI-1 membrane exhibits some characteristic features of NF membranes with amide groups including CN stretching (1641 $cm^{-1}$) and C=O stretching (1532 $cm^{-1}$) (Setiawan et al., 2011; Sun et al., 2011). These amide groups are generated when the PEI macromolecules that are embedded in the membrane PVDF nanofibrous scaffold react with TMC cross linkers (FIGS. 24A-24C. The FT-IR spectrum of the NFC-PVDF-PEI-2 membrane (FIG. 27D) shows no new characteristic peak. This observation is consistent with the understanding that mostly secondary/tertiary amines are generated when the embedded PEI macromolecules of the membrane PVDF nanofibrous scaffold reacts with 1,3-DBP cross linkers (FIGS. 24A-24C). In contrast, the FT-IR spectrum of the NFC-PVDF-PEI-3 membrane exhibits a new peak, for OH stretching at 3257 $cm^{-1}$ indicating that hydroxyl groups are produced when the PEI macromolecules that are embedded in the membrane PVDF nanofibrous scaffold reacts with ECH cross linkers (FIGS. 24A-24C). TABLE 2 shows significant differences between the hydrophilicity and zeta potential potentials of NFC-PVDF-PEI membranes. The PEI-3 membranes are respectively, equal to 7.8, 6.4 and 5.7. Their zeta potentials at pH 6 are equal to 39.7±3.7 mV, 9.0±3.0 mV, and −4.5±0.9 mV, respectively.

Figure 30:
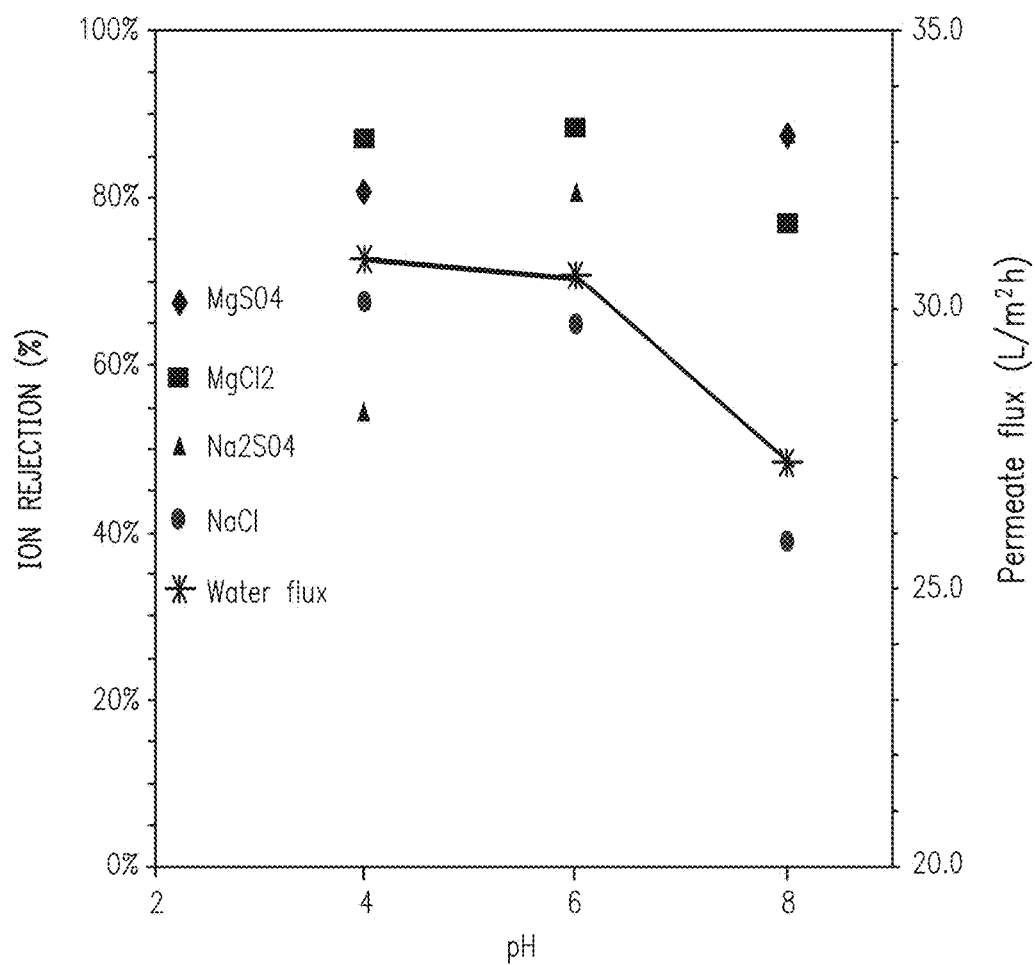
FIG. 30 shows a diagram illustrating salt rejection and permeate flux of a NFC-PVDF-PEI-1 membrane as a function of pH according to an embodiment herein described.

Evaluation of Membrane Performance:

The overall results of the characterization experiments indicate that the NFC-PVDF-PEI-1 membrane (with TMC cross linker) is more hydrophilic than commercial TFC-PA RO/NF membranes. The large and positive zeta potential of the NFC-PVDF-PEI-1 membrane at pH 6-7 (FIG. 28) indicates that it has good potential for high water flux and improved rejection for monovalent cations. To evaluate the performance of this membrane, cross-flow filtration experiments were performed to measure its ion rejection and permeate flux in saline solutions as described in this example. Aqueous solutions (2000 mg/L) of four salts (NaCl, $MgCl_2$, $Na_2SO_4$, and $MgSO_4$) were evaluated. FIGS. 29A-29F show the salt rejection and permeate flux of the NFC-PVDF-PEI-1 membrane during the course of a typical 12-hr filtration experiment. In this, the membrane salt rejection and permeate flux reached constant values after 2 hour of filtration. FIG. 30 shows that the NFC-PVDF-PEI-1 membrane exhibits higher rejections for the 2-1 salt ($MgCl_2$) and 2-2 salt ($MgSO_4$) than for the 1-1 salt (NaCl) and 1-2 salt ($Na_2SO_4$) at pH 4 and 6. This result is consistent with that of a Donnan exclusion membrane with a positive surface charge [Ref. 7.23]. As indicated in TABLE 2, the NFC-PVDF-PEI-1 membrane has an isoelectric point of 7.8. The isoelectric point of a membrane is the pH at which it has no net charge in solution. Thus, the NFC-PVDF-PEI-1 membrane is (i) positively charged at pH 4 and 6 and (ii) negatively charged at pH 8 (FIGS. 29A-29F). Consistent with the Donnan effect, the NFC-PVDF-PEI-1 membrane will have a higher rejection for divalent cations (e.g. $Mg^{2+}$) over monovalent cations (e.g. $Na^+$) at pH 4 and 6 [Refs.

7.23; 7.12; 7.4]. A positively charged membrane will also reject an equivalent amount of anions to maintain overall solution electroneutrality. Because of this, the Applicants expected the rejection of a magnesium salt ($MgCl_2$, $MgSO_4$) by a NFC-PVDF-PEI-1 membrane will be larger than that of a sodium salt (e.g. $Na_2SO_4$) in aqueous solutions at pH 4 and 6. At pH 8, however, FIG. 30 shows that the salt rejection order of the NFC-PVDF-PEI-1 membrane is $Na_2SO_4$>$MgCl_2$>NaCl. In this example, the $MgCl_2$ rejection of the NFC-PVDF-PEI-1 membrane decreased from 87.2% to 76.7% as solution pH water increased from 4 to 8. In contrast, its $Na_2SO_4$ rejection increased significantly from 54.5% to 88.0% with increasing pH from 4 to 8. This higher $Na_2SO_4$ rejection is consistent with that of Donnan exclusion membranes with negative surface charges including thin film composite polyamide NF membranes [Refs. 7.23; 7.34; 7.21] and asymmetric sulfonated polyethersulfone NF membranes [Refs. 7.32; 7.24].

The salt rejections and permeate fluxes of the NFC-PVDF-PEI-2 and NFC-PVDF-PEI-3 membranes were also measured (TABLE 3). TABLE 3 lists the $MgCl_2$/NaCl rejections and permeate fluxes of the NFC-PVDF-PEI membranes at pH 6. The $MgCl_2$/NaCl rejections and permeate fluxes of selected nanofiltration membranes with positively charged surface layers are also listed in TABLE 3 [Ref. 7.18]. As shown in TABLE 3, the $MgCl_2$ rejection of the NFC-PVDF-PEI-1 membrane (87.8%) is higher than those of the NFC-PVDF-PEI-2 membrane (75.5%) and NFC-PVDF-PEI-3 membrane (76.4%).

The NaCl rejections of the NFC-PVDF-PEI-1 and NFC-PVDF-PEI-3 membranes are comparable. They are equal to 64.8% and 62.6%, respectively. However, the NaCl rejection of the NFC-PVDF-PEI-2 is lower and equal to 22.9%. TABLE 3 indicates that the permeate flux of the NFC-PVDF-PEI-3 membrane is relatively low (8-9.0 L m$^{-2}$ h$^{-1}$). In contrast, the permeate flux of the NFC-PVDF-PEI-1 membrane is relatively high (27-30 L m$^{-2}$ h$^{-1}$). As shown in TABLE 3, the permeate flux of the NFC-PVDF-PEI-2 membrane (25-30 L m$^{-2}$ h$^{-1}$) is comparable to that of the NFC-PVDF-PEI-1 membrane. This result is surprising as the NFC-PVDF-PEI-1 membrane has a higher surface charge at pH 6 (39.7 mV versus 9.0 mV) with a lower contact angle (38.6° versus 54.90) and a thinner surface layer (200 nm versus 10 μm). The overall results of this example indicate that nanofibrous composite (NFC) membranes with PVDF nanofibrous scaffolds and cross linked PEI separation layers are promising building blocks for the fabrication of high performance NF membranes for water purification. Without optimization, the NFC-PVDF-PEI-1 membrane (FIGS. 24A-24C) already exhibits a high water flux (~30 L m$^{-2}$ h$^{-1}$) and good rejections for $MgCl_2$ (~88%) and NaCl (~65%) rejection in salt solutions (2000 mg/L) at pH 6 using a pressure of 7 bar (TABLE 3). The nanofiltration membranes listed in TABLE 3 that have higher $MgCl_2$/NaCl rejections that those of NFC-PVDF-PEI-1 membrane have also lower permeate fluxes (~15.0-19.0 L m$^{-2}$ h$^{-1}$).

TABLE 3

| Membrane | $R_{MgCl2}$ (%) | $J_{MgCl2}$ (L m$^{-2}$ h$^{-1}$) | $J_{NaCl}$ (%) | $J_{NaCl}$ (L m$^{-2}$ h$^{-1}$) | Separation Layer | Experimental conditions | Reference |
|---|---|---|---|---|---|---|---|
| NFC-PVDF-PEI-1 | 87.8 | 30.5 | 64.8 | 27.1 | Cross linked PEI/TMC | 2000 ppm $MgCl_2$; 2000 ppm NaCl; 7.0 bar | Example 20 |
| NFC-PVDF-PEI-2 | 75.5 | 29.8 | 22.9 | 24.8 | Cross linked PEI/1,3-DBP | 2000 ppm $MgCl_2$; 2000 ppm NaCl; 7.0 bar | Example 20 |
| NFC-PVDF-PEI-3 | 76.4 | 9.3 | 62.6 | 8 | Cross linked PEI/ECH | 2000 ppm $MgCl_2$; 2000 ppm NaCl; 7.0 bar | Example 20 |
| PPO | 73 | 63 | 36 | 63 | Poly(2,6-dimethyl-1,4-phenylene oxide) | 1000 ppm $MgCl_2$; 1000 ppm NaCl; 3.5 bar | 7.31 |
| PDMAEMA/PSF | 98 | 8.3 | 77.8 | 7.6 | Poly (N,N-dimethylaminoethyl methacrylate) | 1000 ppm $MgCl_2$; 1000 ppm NaCl; 8.0 bar | 7.10 |
| HACC/PAN NF-1 | 94.1 | 6.9 | 47.3 | 12.9 | 2-hydroxypropyltrimethyl ammonium chloride chitosan/hexane diacid/acetic anhydride | 2000 ppm $MgCl_2$; 2000 ppm NaCl; 5.0 bar | 7.15 |
| QAPPESK | 84 | 49 | 31 | 54 | Quaternized poly(phthalazinone ether sulfone ketone) | 1000 ppm $MgCl_2$; 1000 ppm NaCl; 4.0 bar | 7.37 |
| GCTACC/PAN | 91.7 | 8.5 | 57 | 8.6 | A graft copolymer of trimethylallyl ammonium chloride onto chitosan | 2000 ppm $MgCl_2$; 2000 ppm NaCl; 12.0 bar | 7.16 |
| PEI modified membrane | 91.2 | 15 | 82.2 | 15 | PEI coating on polyamide thin film composite membrane | 75 ppm $MgCl_2$; 90 ppm NaCl; 8.0 bar | 7.42 |
| PCNFM3 | 94.3 | 19.1 | 60.7 | 20.6 | Poly(2-methacryloyloxy ethyl trimethylammonium chloride-co-2-hydroxyethyl acrylate) | 1000 ppm $MgCl_2$; 1000 ppm NaCl; 6 bar | 7.18 |
| M-40 | 63.3 | 30.2 | 36.6 | 30.2 | Poly(arylene ether sulfone) with pendant tertiary amine group | 1000 ppm $MgCl_2$; 1000 ppm NaCl; 5 bar | 7.41 |

Example 21: Synthesis, Characterization, and Performance Evaluation of Ion-Selective Nanofibrous Composite Membranes Using PAN and Hyperbranched PEI Macromolecules as Building Blocks This example show a fabrication of an ion-selective NFC-PAN-PEI filtration membrane comprising three parts (FIGS. 45A-45B): (1) a bottom layer; (2) a mid layer; and (3) a top layer was fabricated.

1) Bottom Layer Fabrication:

A poly(ethylene terephthalate) (PET) support paper (3153TH-80S, Basis Weight=80.1 g/m$^3$, Thickness=109 μm, Air Permeability=2.71 cc/cm$^2$/sec, Porosity=5.34 ft$^3$/ft$^2$/min) was used as a bottom layer.

2) Mid Layer Fabrication:

Onto the PET paper, the polyacrylonitrile (PAN) mesh mid layer was fabricated which is composed of PAN nanofibers using electrospinning technique.

(a) Materials

Poly(acrylonitrile) (PAN, powder, M$_w$=150,000 g/mol), 1,3,5-Benzenetricarbonyl trichloride (trimesoyl chloride or TMC, 98%) were purchased from Sigma-Aldrich (USA). N,N-dimethylformamide (DMF, 99.5%), 1-Methyl-2-Pyrrolidone (NMP, 99.5%) were purchased from Dae Jung Chemicals and Metals Co. Ltd (Korea). Toluene (99.5%) was purchased from Samchun Pure Chemicals Co. Ltd (Korea). Hyperbranched Polyethyleneimine (PEI, M$_n$=10,000 g/mol) was purchased from Nippon Shokubai Co. Ltd (Japan) and the name of product was SP-200. The reagents and solvents in this example were used without further purification.

(b) Preparation of PAN Solution for Electrospinning.

1. PAN powder was added into a 30 ml glass vial. 2. DMF and NMP solvent was added into the vial to make PAN solution. 3. The solution was put in an oven for 6 h at 80° C. until the solution become clear. 4. The solution was put in a sonicator for 3 h to make homogeneous solution.

(c) Fabrication Procedure of Electrospun PAN Mid Layer

PAN mesh mid layer was fabricated using an electrospinning machine, 'eS-robot' model from NanoNC company. First, a PET support paper was attached onto the drum collector, and electrospun PAN nanofibers directly fabricated onto it. Here are the typical conditions for electrospinning of PAN solution. The applied voltage is 27 kV, and the distance between the tip and the collector is 10 cm, and the inner diameter of tip is 0.51 mm, and the rotation speed of drum is 100 rpm, and the flow rate is 1 ml/h. Total spinning time is depended on the flow rate of spinning solution and total volume of electrospun solution. Also, the thickness of nanofiber mesh is depended on the area of the electrospun mesh and total volume of electrospun solution. The fabricated membrane was heated 150° C. for 1 day in oven.

3) Top Layer Fabrication:

The top layer of the NFC-PAN-PEI membrane was synthesized by interfacial polymerization onto the electrospun PAN nanofibrous mesh, using PEI 25 k as a monomer of aqueous solution and TMC as a monomer of organic solution. First, a membrane (the one after finishing electrospinning) was immersed in the aqueous PEI 25 k solution for 1 h. After that, gently removed the excess solution on the membrane by glass roller, then it was immersed in the TMC solution (use Toluene as a organic solvent) for a required reaction time. After polymerization, the membrane was immersed in the pure TMC solution for 2 min to get rid of left TMC in it. Subsequently, the membrane was air-dried for 30 min and it was stored in DI water before its testing.

4) Scanning Electron Microscopy (SEM)

Figure 46:
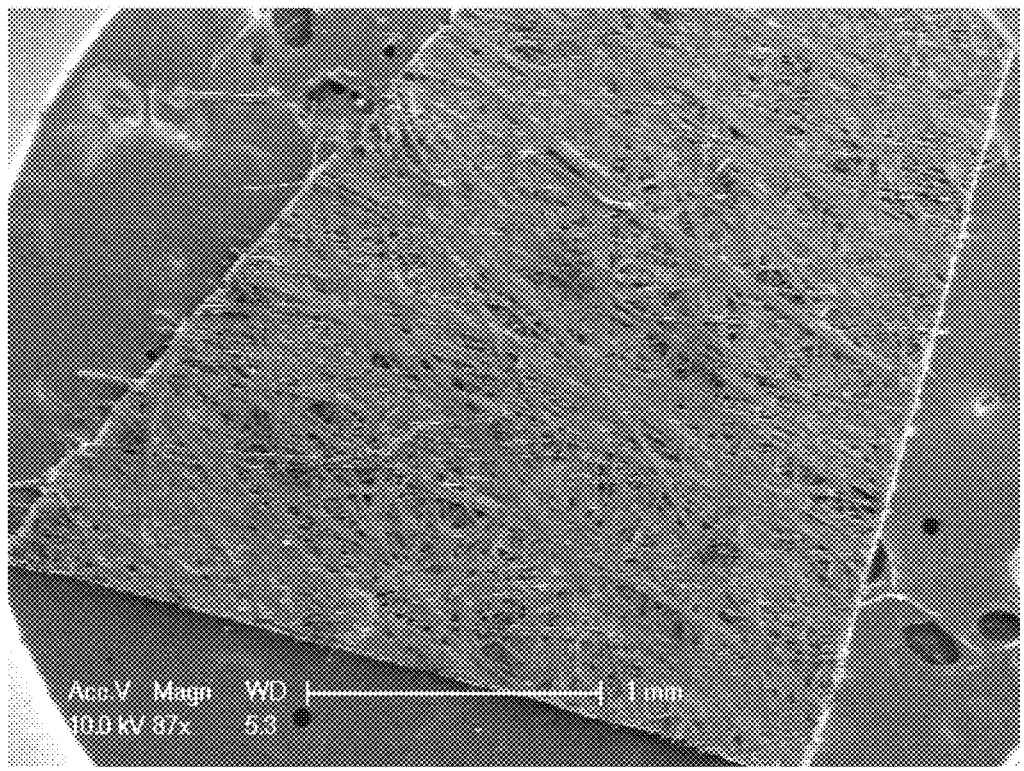
FIG. 46 shows an SEM picture of the PET paper of an exemplary membrane as depicted in FIG. 45 at low magnification.
Figure 47:
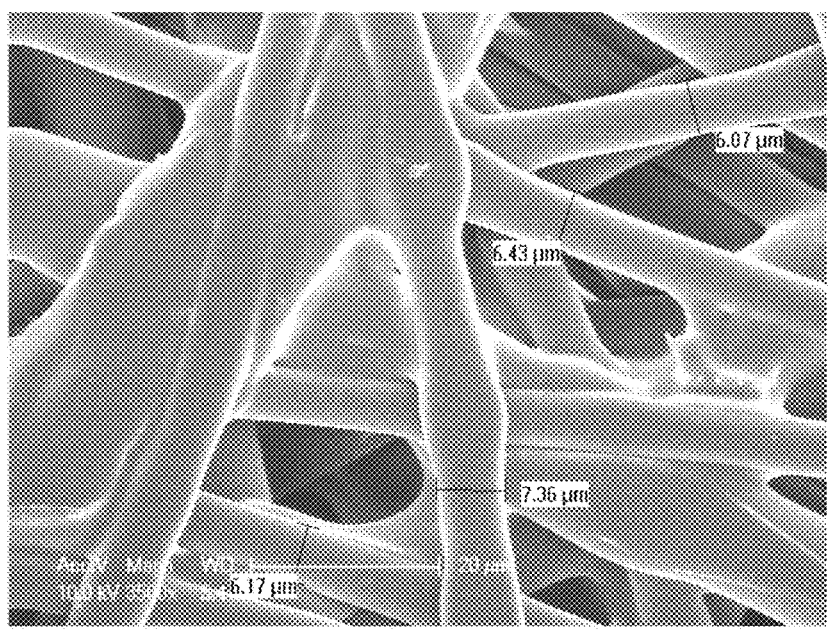
FIG. 47 shows an SEM image of the PET paper of an exemplary membrane as depicted in FIG. 45 at high magnification.
Figure 48A:
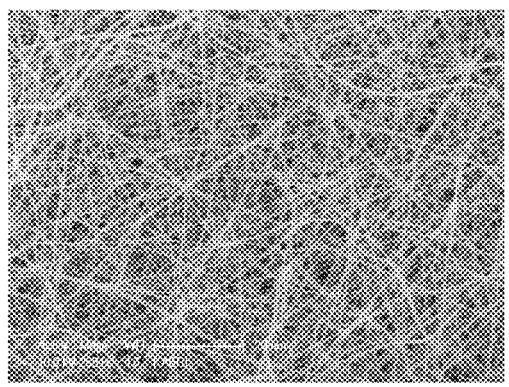
FIGS. 48A-48D show SEM images of electrospun PAN nanofibers from FIG. 45 at different magnifications.
Figure 48B:
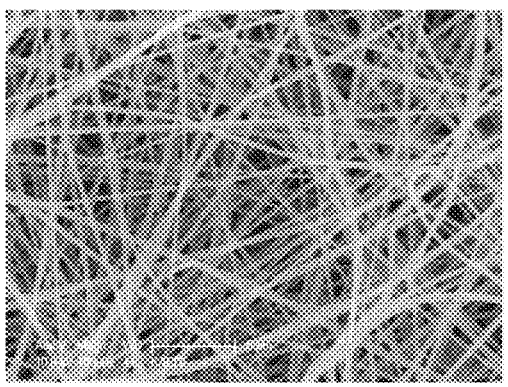
Figure 48C:
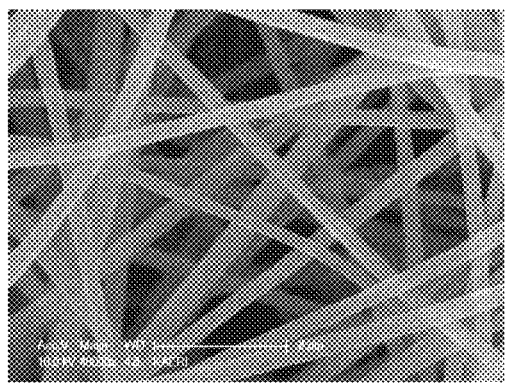
Figure 48D:
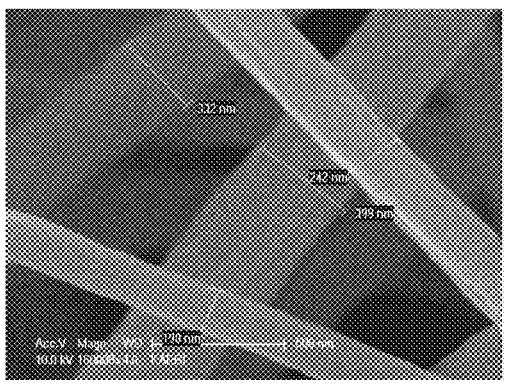
Figure 49A:
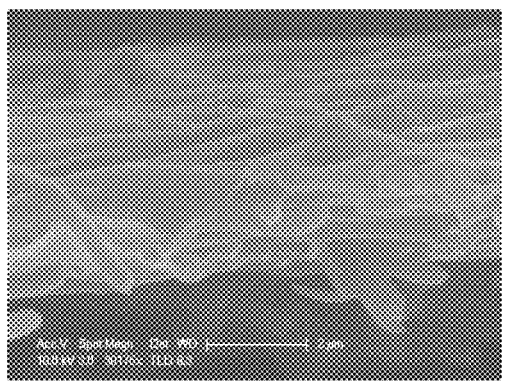
FIGS. 49A-49D show SEM images of interfacial polymerized top PEI thin layers (Cross-section views) from an exemplary membrane as depicted in FIGS. 45A-45B according to an embodiment herein described.
Figure 49B:
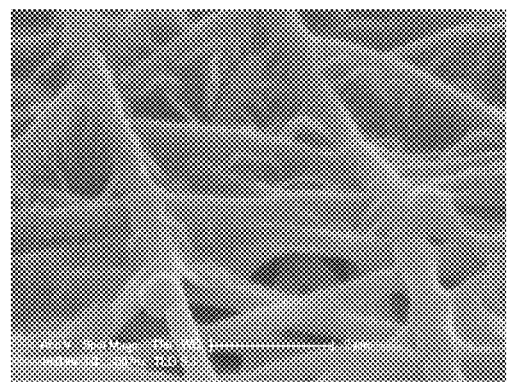
Figure 49C:
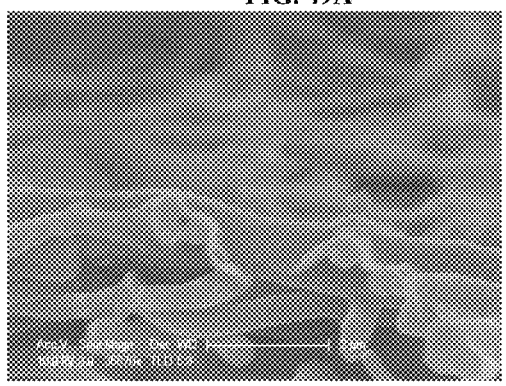
Figure 49D:
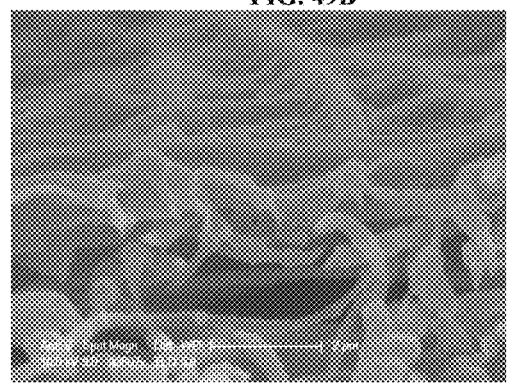
Figure 50A:
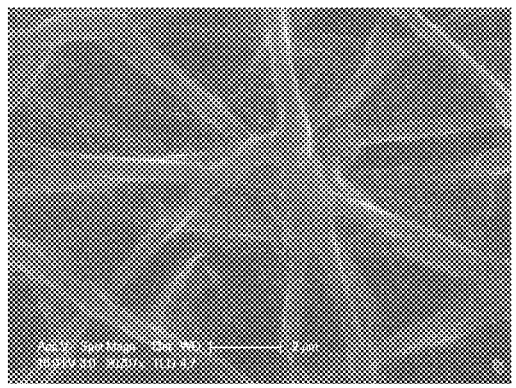
FIGS. 50A-50B show SEM images of interfacial polymerized PEI thin layers from an exemplary membrane as depicted in FIGS. 45A-45B.
Figure 50B:
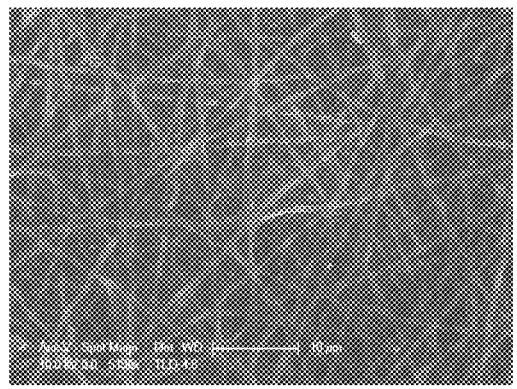

The morphology of the each layer of the filtration membrane was investigated by scanning electron microscopy The NFC-PAN-PEI membrane fabricated was then characterized as shown below 1) Bottom Layer Characterization The PET support paper gives a major mechanical strength to the filtration membrane, during not only practical water filtration processes but also fabrication processes. The diameter of fibers is approximately around 6-7 μm as can be seen in the exemplary schematic illustration of FIG. 46 and FIG. 47.

2) Mid Layer Characterization

The necessity of mid layer of TFC or filtration membrane comes from that the thin top layer cannot be fabricated directly onto PET due to the huge pore size (the empty space between each fibers) of the PET paper. The smaller pore size in this specific case associated to a smaller diameter of the fibers, (approximately 200-400 nm), as can be seen from the depiction of FIG. 48A-D The electrospun nanofiber mesh was used to narrow down the pore size of the membrane's top part where the synthesis of thin layer actually occurs. As the diameter of nanofibers is decreased, the pore size of the nanomesh is also decreased which leads to successful interfacial polymerization in uniform. Among the conditions of electrospinning, the diameter of nanofiber is strongly related with the concentration of polymer solution. In this research, the minimum concentration for successful electrospinning was 6 wt %.

(a) Adhesion Between PAN Nanomesh and PET Support.

A good adhesion between PAN nanomesh and PET paper is can be important for further fabrication steps and the filtration test. If adhesion force is not strong enough, PAN mid layer is expected to be easily delaminated during the interfacial polymerization step. Since there are no strong chemical or physical bonds between PAN mid layer and PET paper, the only major interaction that can utilize is van der Waals forces. When DMF was solely used as a solvent for PAN solution, the adhesion was weak due to the highly volatile nature of DMF (Vapor pressure: 3.85 mmHg at 25° C.) which makes electrospun fibers too dry even before they arrive on the PET surface. It is obvious that the good adhesion cannot be obtained between dry PAN nanofibrous mesh and PET paper. In this point of view, the Applicants added another solvent, NMP, which is not only mixable with DMF but also the less volatile (Vapor pressure: 0.5 mmHg at 25° C.) and also PET is soluble to NMP. Through many experiments, it was concluded that the appropriate ratio of these two solvents in PAN solution in this example is 6:4 (v/v). NMP solvent made electrospun fibers somewhat wet even after they arrived at the PET surface and residual NMP solvents contributed to allowing for good adhesion by increasing a total contact area between PAN electrospun fibers and PET paper. The adhesion between each nanofiber was also increased which can contribute to increase the total mechanical integrity of the membrane.

Electrospinning conditions also influenced adhesion. When the mid layer was above certain thickness, the mid layer delaminated naturally during the air drying after finishing electrospinning. This happened due to the shrinkage of mid layer with natural evaporation of organic solvents. When the thickness of the mid layer was small, the shrinkage of the mid layer was also small which was not enough to make membrane delaminate. If the thickness of the mid layer was too small, interfacial polymerization cannot be successfully done. The thickness of the mid layer was controlled by controlling total spinning volume. The speed of drum collector and flow rate also set to certain value to obtain the membrane with smooth surface and having good adhesion. Finally, the membrane was heated to 120° C. for a day. This process significantly increased the adhesion between mid-layer and PET paper which can due to re-melting process of PAN nanofibers.

3) Top Layer Characterization

The top layer of membrane can be important to membrane performances such as water flux and ion rejection. Different from typical interfacial polymerization, bulky hyper-branched PEI 25 k was used as a monomer in aqueous solution. The concentration of hyperbranched PEI 25 k can be at least 10 wt % for successful interfacial polymerization which means the covering up of the top part of PAN nanofibrous layer without cracks. This minimum concentration can be because there is a certain number of monomer molecules, depending on the area of pore size, which are needed at the interface to fully cover up each pore. To be successful in interfacial polymerization process without cracks, the pore size of nanofibrous mid layer has to be as small as possible. The concentration of TMC monomer in Toluene was set to 0.1 wt % which is typical. The toluene was used since solubility of PEI 25 k in Toluene is quite higher than any other organic solvents. The reaction time was set to 10 min. This is quite long reaction time compared to typical interfacial polymerization.

In SEM images, clear evidence of top thin layer was formed onto nanofibrous mid layer can be seen. The thickness of PEI thin film seems less than 100 nm. The conditions of interfacial polymerization in FIGS. 49A-49D and FIGS. 50A-50B are PEI 5 wt %, TMC 0.1 wt %, reaction time 10 min.

Example 22: NFC-PAN-PEI Membrane Evaluation

The performance of the NFC-PAN-PEI membranes were evaluated using a custom-made cross-flow filtration equipment. The effective membrane area of this system was 24 cm$^2$. The membranes in this example were operated at 100 psi and an applied cross flow rate was 1.5 LPM. The feed solutions (NaCl, MgSO$_4$, Na$_2$SO$_4$, MgCl$_2$) in this example were prepared by dissolving each salt in distilled water with a concentration of 2000 ppm. NaCl (99.0%) was purchased from Sigma-Aldrich (USA) and MgSO$_4$ (99.0%), Na$_2$SO$_4$ (99.0%/), MgCl$_2$ (98.0%) were purchased from Dae Jung Chemicals Co. Ltd (Korea).

The water permeability of each membrane was measured in LMH unit, based on the data of permeate water volume for certain time. The salt concentration in permeate solutions was measured by a conductivity measurement equipment (Eutech Instruments, CON 510). Based on the data of each concentration of permeate ($C_p$) and feed (Cf), the rejection (R) was calculated by the equation below $$R(\%) = \left[1 - \left(\frac{c_p}{c_f}\right)\right] \times 100.$$

Figure 51:
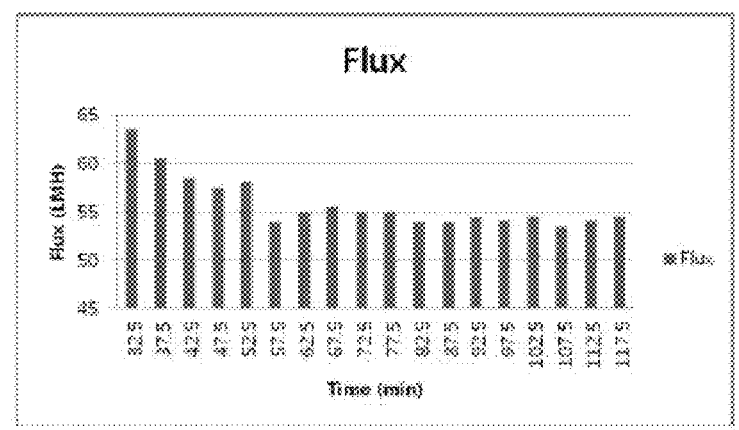
FIG. 51 shows a permeable flux of an exemplary membrane as depicted in FIGS. 45A-45B according to an embodiment herein described.
Figure 52:
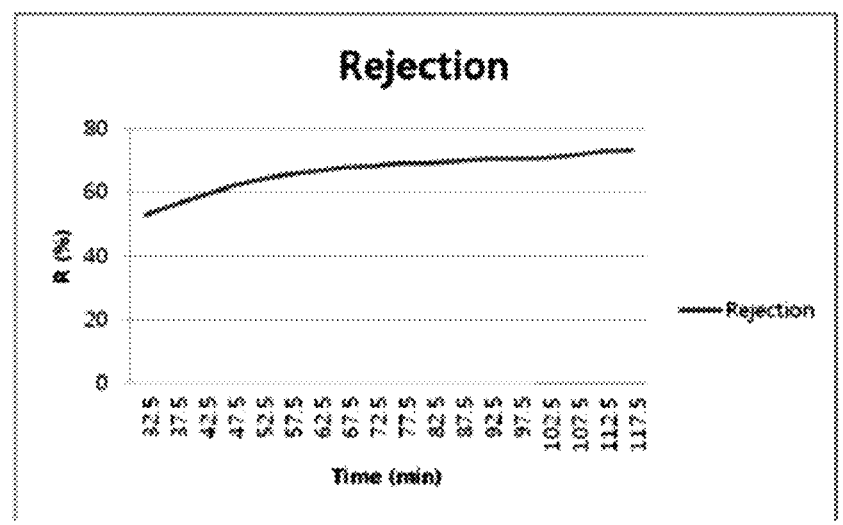
FIG. 52 shows a ion rejection trends of an exemplary membrane as depicted in FIG. 45A-45B according to an embodiment herein described.

Permeability Characteristics of NFC-PAN-PEI Membranes:

Based on the results in this example, it was found that the water permeability reached at steady state after the 1 h filtration time which can be due to the membrane, particularly the active layer, being compacted by pressure. This compaction can increase the density of thin active layer which led to the decrease of the water flux. However, the compaction of active layer led to the increase of ion rejection FIG. 51 and FIG. 52 show a typical water permeability characteristic and a ion rejection trends with operating time in the HPEI-filtration membrane.

Interfacial Polymerization onto Nanofibrous Mid-Layer:

Typically interfacial polymerization is done onto UF level membranes which apparently has a much smaller pore size than electrospun nanofibrous mid-layer. In these examples, somewhat different monomers and the mid-layer (nanofibrous support) were applied, which made the conditions of interfacial polymerization for the PAN filtration membrane to be much different from typical conditions of interfacial polymerization for commercial RO or NF membranes. The conditions of interfacial polymerization were evaluated by water filtration test using MgSO$_4$ solution (500 ppm) in terms of ion rejection and water flux.

Morphology of PAN Mid-Layer:

Since the concentration of PAN spinning solution strongly affects the fiber diameter of PAN nanofibers, which determines the pore size of the PAN mid-layer, the performance of membranes were tested by using the membranes which fabricated by different spinning solutions.

(A) 10 wt % PAN solution: the chance of successful interfacial polymerization was inconsistent (at PEI 10 wt %). Ion rejection (MgSO$_4$) was limited to around 70%. (300~500 nm)

(B) 6 wt % PAN solution: the chance of successful interfacial polymerization was consistent (at PEI 10 wt %) Ion rejection (MgSO$_4$) can be increased to over 90%. (150~200 nm)

The limitation of ion rejection for the 10 wt % PAN membrane can be due to the uncovered pores (cracks) in the membrane. Also, the 10 wt % PAN membrane showed much higher water flux compared to the 6 wt % PAN membrane at same conditions due to same reason, the existence of uncovered pores.

Based on the difference of fiber diameter between 10 wt % PAN membrane and 6 wt % PAN membrane, the Applicants concluded that the nanofibrous membrane with smaller diameter is better for successful interfacial polymerization.

Concentration of PEI 25 k in Aqueous Solution:

Generally, 1 or 2 wt % of monomers (diamines) are dissolved in aqueous solution for interfacial polymerization. In this research, the Applicants observed no ion rejection when using below 10 wt % of PEI 25 k regardless of the reaction time and cross linker concentration. The reason of this phenomenon might be that there is minimum number of monomer molecules at the interface in the interfacial polymerization. Due to the difference of molecular weight between diamines and PEI 25 k, which is approximately 1:80, the Applicants need to dissolve 80 times more to meet the number of monomers at the interface by simple math. However, the molecular size of PEI 25 k is approximately 4-5 times larger (by radius assuming that PEI is spherical) so that the concentration can be increased around 10-20 wt % to meet the number of monomers. In this example, at least 10 wt % of PEI 25 k aqueous solution when 6 wt % PAN membrane was used. If the monomer is changed to one that has large molecular weight, the aqueous solution can be more concentrated then 10 wt %.

TABLE 4

| PAN Solution | PEI Conc. | TMC Conc. | Rxn Time | Performance (Flux, Ion rejection) (MgSO$_4$ 2000 ppm, pH4, 100 psi) |
|---|---|---|---|---|
| 6 wt % | 10 wt % | 0.1 wt % | 10 min | 42 LMH, 90% |
| 6 wt % | 5 wt % | 0.1 wt % | 10 min | 77 LMH, 79% |

As shown in TABLE 4, the ion rejection of the membrane generally cannot reached 80% when 5 wt % PEI was used. Even with increased reaction time, the ion rejection of this membrane did not increase very much, largely only the flux was decreased.

Reaction Time:

Typical reaction time of interfacial polymerization in this example is finished in 1-2 min. Typical reaction time was 10 min to obtain maximum ion rejection. When the reaction time was decreased, the water flux was much increased; however the ion rejection was decreased.

TABLE 5

| PAN Solution | PEI Conc. | TMC Conc. | Rxn Time | Performance (Flux, Ion rejection) (MgSO$_4$ 2000 ppm, pH4, 100 psi) |
|---|---|---|---|---|
| 6 wt % | 10 wt % | 0.1 wt % | 7.5 min | 60 LMH, 77% |
| 6 wt % | 10 wt % | 0.1 wt % | 10 min | 40 LMH, 90% |

The reaction time determines the thickness of the active layer. When the 10 min. reaction time, compared to 7.5 min reaction, the active layer was formed thicker which led to less water flux and better ion rejection.

Concentration of Cross-Linker (7MC):

The concentration of cross-linker in toluene was 0.1 wt %. The purpose was fabrication of a less cross-linked positive charged membrane using PEI 25 k, so the cross-linker was used as little as possible. When the monomers are diamine groups, which sizes are much smaller compared to PEI 25 k, there will be no left active sites of TMC unreacted after the interfacial polymerization of active layer if diamine molecules are enough. However, PEI 25 k molecules are quite larger and bulky, there is a high possibility to have unreacted active sites of TMC in active layer even if PEI 25 k molecules are enough during the interfacial polymerization reaction. Because of steric hindrances between PEI 25 k, all of the TMC molecules cannot contribute to make links each PEI 25 k molecule. These unreacted active sites of TMC, which are acyl groups, turned into carboxylic acid groups when they met water. The carboxylic acids are a possible source of negative charges at certain operating pH, the number of these left active sites need to be decreased as much as possible to make more positive charged membranes. Also, the amine groups in PEI 25 k, which are sources of positive charge, was not able to survive during the interfacial polymer reaction if there are a lot of TMC molecules at the reaction interface.

Without being limited to a particular hypothesis, it is thought that when high concentration of TMC was used in interfacial polymerization reaction, a lot of TMC molecules are attached to each PEI 25 k, which not only induce more dense physical structure but also decreased the number of amine groups, and unreacted active sites in each TMC will be converted to carboxylic acid groups having negative charges. On the contrary, when low concentration of TMC solution was used, the reaction rate was slow, however, a lot of amine groups in each PEI were saved and less cross-linked structure can be obtained. Also, the number of unreacted active sites of TMC can be decreased since there is not much TMC attached to single PEI 25 k molecule.

Ion Rejection Characteristics:

The ion rejection of a PAN filtration membrane was tested by using four different salts (NaCl, MgSO$_4$, Na$_2$SO$_4$, and MgCl$_2$). The feed solutions in this example were prepared by dissolving each salt in distilled water with a concentration of 2000 ppm. The membrane was made from 6 wt % PAN support and interfacial polymerized at 10 wt % PEI, 0.1 wt % TMC, and 10 min reaction time.

TABLE 6

| | Permeate Flux (LMH) | Ion Rejection (%) |
|---|---|---|
| MgCl$_2$ | 29 | 93 |
| MgSO$_4$ | 36 | 90 |
| NaCl | 35 | 75 |
| Na$_2$SO$_4$ | 34 | 60 |

The flux of permeate flow was around 30-35 LMH at 100 psi, which is similar to commercial NF membranes although the rejection of MgSO$_4$ (90%) was lower (97-99% rejection in commercial NF membranes). However, the rejection of NaCl (75%) was quite higher than commercial NF membranes (<50% rejection in commercial NF membranes). The value of permeate flux can be further increased by controlling reaction time. The record of permeate flux was 42 LMH at same rejection level (90% rejection for MgSO$_4$, 77% rejection for NaCl). The PAN filtration membrane showed good rejection not only for divalent ions but also for monovalent ions. Moreover, it is expected that the performance of the membranes, in terms of permeation flux, can be further increased by changing conditions of interfacial polymerization.

The order of the salt rejection was MgCl$_2$>MgSO$_4$>NaCl>Na$_2$SO$_4$, which showed typical rejection order of positively charged membranes with Donnan exclusion effects. For positively charged membranes, divalent cations (Mg$^{2+}$) is more strongly rejected than monovalent cations (Na$^+$) since both ions have similar mass but different amount of charge (2 times). Consequently, the ion rejections of magnesium based salt (MgCl$_2$, MgSO$_4$) solutions are larger than sodium based salt (NaCl, Na$_2$SO$_4$) solutions because divalent cations feel two times larger electrostatic repulsion forces than monovalent cations. Another important phenomenon behind this rejection order is an electro-neutrality condition. When cations are rejected from a positive charged membrane, some of the anions are also rejected to make an electro-neutrality condition. Between MgCl$_2$ and MgSO$_4$, MgCl$_2$ is expected to be rejected better since two chloride ions (in MgCl$_2$), other than one sulfate ions (in MgSO$_4$), are repelled when one magnesium ion is rejected. In the rejection order between NaCl and Na$_2$SO$_4$, NaCl is expected to be rejected better because of the same electro-neutrality principle.

There was no evidence about the effects of size exclusion among the various ion rejection mechanisms. If the size exclusion effect was one of the ion rejection mechanisms in this membrane, the ion rejection of Na$_2$SO$_4$, which has a large sulfate ion, is expected to be higher than or even similar to the ion rejection of NaCl.

Example 23: Procedures Expected to be Suitable for Evaluating Features of NFC-PAN-PEI Membranes 1. Increase of Permeate Flux:

The increase of permeate flux can be done by controlling the conditions of interfacial polymerization. For example, the reaction time can be decreased to increase the permeate flux. Maintaining the same level of rejection should also be considered.

2. Membrane's pH Dependent Performance:

This experiment can be used to figure out a relationship between pH of a feed solution and the ion rejection performance of the membrane because protonation of amine groups in hyperbranched PEI can be directly related to a membrane's charge density and can be largely dependent on pH.

3. Pore Size Determination:

A pore size of a membrane can be determined by testing the rejection of one or more PEG molecules having different molecular weights.

4. Surface Morphology of the Filtration Membrane:

Surface morphology of the filtration membrane can be analyzed by AFM. From this data, information about the interfacial polymerization reaction can be obtained.

5. Zeta Potential Measurement in Filtration Membrane:

Using a zeta potential measurement system, the relation between pH and membrane charge can be determined. Also from the absolute value of zeta potential, the conditions of interfacial polymerization which can affect the membrane's charge density can be determined. For example, a quantitative relationship between the concentration of TMC and the membrane's charge density can be obtained. These data can help to understand the nature of reaction characteristics of interfacial polymerization, for example due to the monomer being bulky.

6. Using Bulkier Monomers:

Different monomers can be used in interfacial polymerization including higher molecular weight of PEI molecules. They can form a more loose structure in top layer which can lead to higher flux good rejection.

Example 25: Synthesis, Characterization, and Performance Evaluation of Ion-Selective Nanofibrous Composite Membranes Using PET, PVDF, PEI Macromolecules and PEI Nanoparticles as Building Blocks A NANON-01A electrospinning machine was used to fabricate an ion-selective filtration membrane with a PET backing paper and a film of cross-linked PVDF nanofibers with embedded PEI macromolecules and nanoparticles (FIG. 53). Commercially available PVDF (Kynar 761) provided by Arkema was used to spin the nanofibers. First, different amounts (15, 18.5, 20 wt %) of PVDF were dissolved in a mixture (8:2 v/v) of dimethyl formamide (DMF) and acetone solution. The mixture was stirred overnight to obtain a homogeneous PVDF solution. Aliquots of the PVDF solutions were then fed into a 10 mL syringe with a needle of 20 g size. During the electrospinning, the flow rate of polymer solution was varied from 0.3 to 2 mL/h and the applied voltage was varied from 25 kV to 29 kV. The distance between needle and collector was kept constant at 15 cm. The drum collector operated at 1000 rpm and covered with a PET support paper placed on an aluminum foil.

After the completion of the electrospinning, the PVDF nanofibers were left on the collector to dry overnight at room temperature. Following this, a solution of hyperbranched PEI (50 wt %) in methanol was electrosprayed on the PVDF-laden PET support. In this case, the sample of commercial hyperbranched PEI [Epomin SP-006 with $M_n$=600 g/mole] was provided by Nippon Shokubai, LTD. Epomin SP-006 hyperbranched PEI was used to synthesize the nanoparticles via an inverse suspension polymerization process [Refs.9.26-9.27]. Subsequently, a suspension (10 wt %) of PEI nanoparticles (500 nm-1000 nm) in DMF was sonicated and electrosprayed onto the PEI-coated PVDF-laden support (FIG. 53). The filtration membrane was then reacted with 1,3-dibromopropane at 40° C. to produce a film of network of cross-linked PEI macromolecules and nanoparticles on the membrane surface. FIG. 53 shows the SEM images of the filtration membrane and its components including the PET support, the PVDF nanofibers and the composite film of PVDF nanofibers with embedded cross-linked PEI macromolecules and nanoparticles.

Example 27: Increasing Ion-Rejection Capability of NFC Membranes

In order to increase the ion-rejection capability of NFC membranes, two basic strategies can be used: (1) Covalent attachment of PEI macromolecules and NP on the filtration membranes using layer-by-layer assembly followed by cross-linking to increase the density of reactive amine groups on the filtration membrane films; and (2) Functionalization of the amine groups of the PEI macromolecules and nanoparticles with charged groups including quaternary amines, carboxylic, sulfonate and amide groups to increase their charge density.

Figure 54:
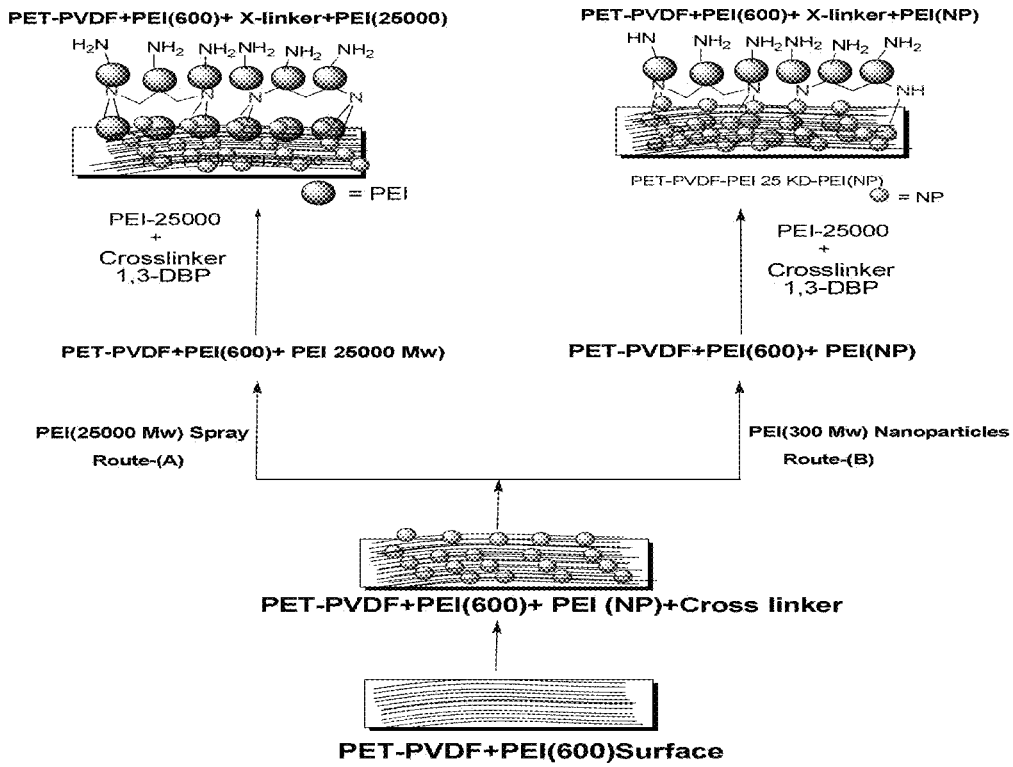
FIG. 54 shows a schematic flow diagram of various steps according to some methods herein described. Route-(A) schematically illustrates a first method according to some embodiments herein described. The method comprises depositing PEI macromolecules and nanoparticles on filtration membrane surfaces. Route-(B) schematically illustrates a second method according to some embodiments herein described. The method comprises covalently attaching PEI macromolecules and nanoparticles on filtration membrane surfaces.

In this example, the density of reactive amine groups in the filtration membrane films can be increased by deposition and covalent attachment of PEI macromolecules with molar mass ($M_w$=25000) or by deposition and covalent attachment of PEI nanoparticles (FIG. 54).

Figure 55:
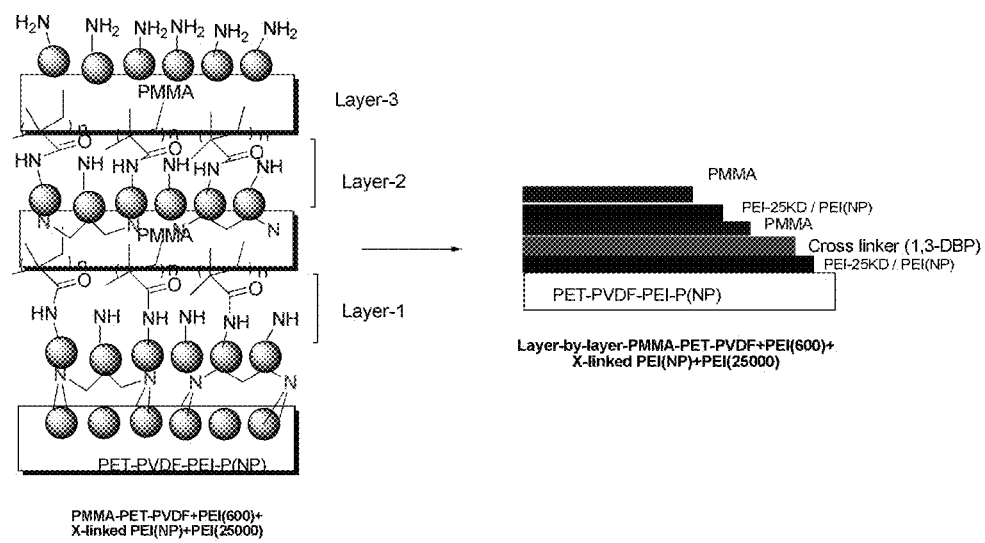
FIG. 55 shows a schematic illustrating components a film assembled by a layer-by-layer (LBL) assembly of PEI macromolecules or nanoparticles according to embodiments of the present disclosure. In this schematic, the method by which the layer-by-layer assembly was performed was mediated by a deposition of poly(methyl methacrylate) [PMMA] followed by thermal amidation at 110° C. (for 10 hours under nitrogen) to produce films of cross-linked PVDF nanofibers with high density of reactive amine groups of the surface of the NF membranes.

In both cases, layer-by-layer (LBL) assembly of PEI macromolecules or nanoparticles (28) mediated by the deposition of poly(methyl methacrylate) [PMMA] followed by thermal amidation (29) at 110 C (for 10 hours under nitrogen) can be employed to produce films of cross-linked PVDF nanofibers with high density of reactive amine groups of the surface of the NF membranes (FIG. 55).

The amine groups of the PEI films of the filtration membranes can be subsequently reacted with the appropriate functional groups to produce films with high density of charged groups including quaternary amines, carboxylic, sulfonate and amide groups to increase their charge density (FIG. 56) using synthetic methods as described in references 9.23-9.27 to functionalize the membranes.

Example 28: Further Development of Ion-Selective Filtration Membranes

Figure 56:
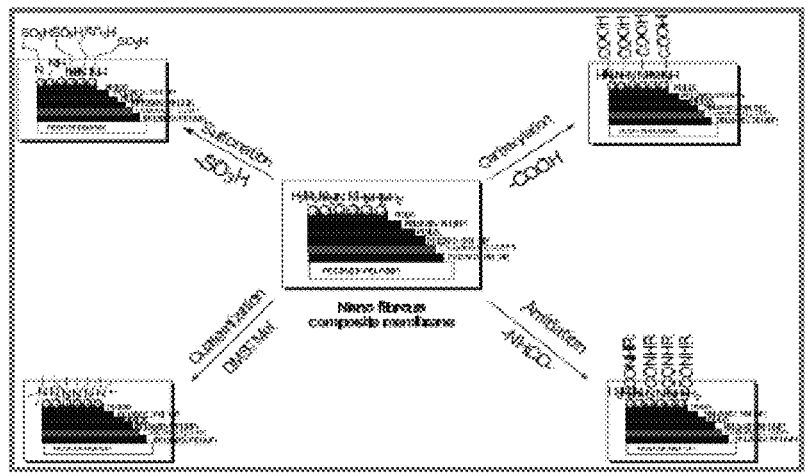
FIG. 56 shows a schematic diagram illustrating various functionalizations of NFC Membranes according to some embodiments, including sulfonation, carboxylation, quaternization, and amidation. As shown here, amine groups of the PEI films of the filtration membranes can be reacted with functional groups to produce films with high density of charged groups including quaternary amines, carboxylic, sulfonate and amide groups to increase their charge density.

Synthesis and characterization of low-pressure and ion-selective filtration membranes can also be performed using polysulfone (PS) and polyacrylonitrile (PAN) as base polymers for the nanofibers. Graft polymerization can be used (e.g. UV induced polymerization of methylacrylate) to activate the surface of the PS and PAN nanofibers prior to covalent attachment and functionalizing of PEI macromolecules and nanoparticles (FIG. 54, to FIG. 56).

Example 29: More HPEI-Filtration Membrane Fabrication and Characterization

The Applicants have fabricated a HPEI-filtration membrane comprising three parts: (1) a bottom layer; (2) a mid layer; and (3) a top layer (FIGS. 45A-45B).

1) Bottom Layer Fabrication:

A poly(ethylene terephthalate) (PET) support paper (3153 TH-80S, Basis Weight=80.1 g/m² Thickness=109 μm Air Permeability=2.71 cc/cm²/sec, Porosity=5.34 ft³/ft²/min) was used as a bottom layer.

2) Mid Layer Fabrication:

Onto the PET paper, the poly(acrylonitrile) (PAN) mesh mid layer was fabricated which is composed of PAN nanofibers using electrospinning technique.

(a) Materials:

Poly(acrylonitrile) (PAN, powder, $M_w$=150,000 g/mol), 1,3,5-Benzenetricarbonyl trichloride (Trimesoyl chloride or TMC, 98%) were purchased from Sigma-Aldrich (USA). N,N-Dimethylforamide (DMF, 99.5%), 1-Methyl-2-Pyrrolidone (NMP, 99.5%) were purchased from Dae Jung Chemicals and Metals Co. Ltd (Korea). Toluene (99.5%) was purchased from Samchun Pure Chemicals Co. Ltd (Korea). Hyperbranched Polyethyleneimine (PEI, $M_n$=10,000 g/mol) was purchased from Nippon Shokubai Co. Ltd (Japan) and the name of product was SP-200. The reagents and solvents in this example were used without further purification.

(b) Fabrication of Electrospun PAN Mid Layer:

PAN mesh mid layer was fabricated using an electrospinning machine, 'eS-robot' model from NanoNC company. First, a PET support paper was attached onto the drum collector, and electrospun PAN nanofibers directly fabricated onto it. Here are the typical conditions for electrospinning of PAN solution. PAN solution (9 wt %) was prepared by dissolving PAN powder into the mixed solvent (7:3 DMF:NMP). The applied voltage is 17 kV, and the distance between the tip and the collector is 13 cm, and the inner diameter of tip is 0.51 mm, and the rotation speed of drum is 120 rpm, and the flow rate is 0.9 ml/h. Total spinning time is depended on the flow rate of spinning solution and total volume of electrospun solution. Also, the thickness of nanofiber mesh is depended on the area of the electrospun mesh and total volume of electrospun solution.

3) Top Layer Fabrication:

The top layer of the HPEI-filtration membrane was synthesized by interfacial polymerization onto the electrospun PAN nanofibrous mesh, using PEI 25K as a monomer of aqueous solution and TMC as a monomer of organic solution. First, a membrane (the one after finishing electrospinning) was immersed in the aqueous 10 wt % of PEI 25 k solution for 1 h. After that, gently removed the excess solution on the membrane by glass roller, then it was immersed in the TMC solution (0.05-2 wt %) (use Toluene as an organic solvent) for a required reaction time. After polymerization, the membrane was immersed in the pure TMC solution for 1 min to get rid of left TMC in it. Subsequently, the membrane was immersed in ethanol to wash TMC solvent in the membrane. At last, the membrane was air-dried for 30 min and it was stored in DI water for 24 hr before its testing.

Figure 57A:
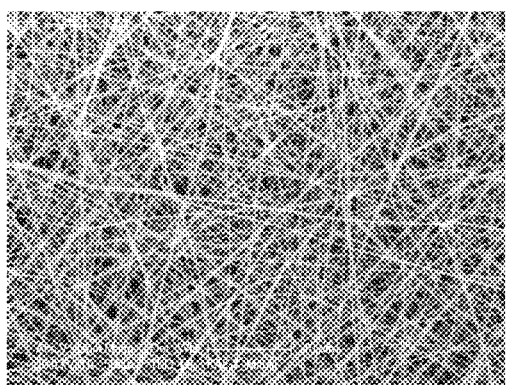
FIGS. 57A-57B show SEM images of a PAN nanofibrous mid layer of an HPEI-filtration membrane at two different magnification levels showing that the average diameter of each PAN fiber in this example, is approximately 250 nm.
Figure 57B:
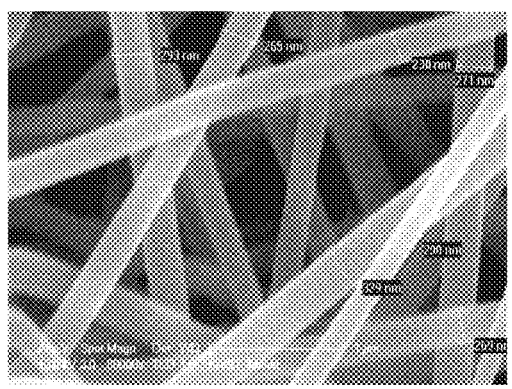

Results: According to SEM analysis, the average diameter of each PAN fiber was approximately 250 nm (FIGS. 57A-57B).

Figure 58A:
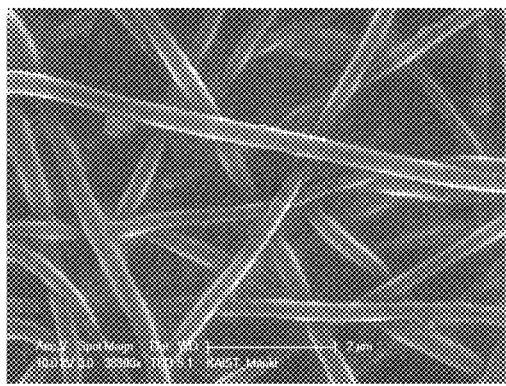
FIGS. 58A-58B show a SEM image of an interfacial polymerized top layer (FIG. 58A) and a SEM image of an HPEI top layer of an HPEI-filtration membrane (FIG. 58B) which show that micro-sized pores from PAN nanofibrous layers were fully covered by the HPEI-TMC cross-linked layer by interfacial polymerization in this example.
Figure 58B:
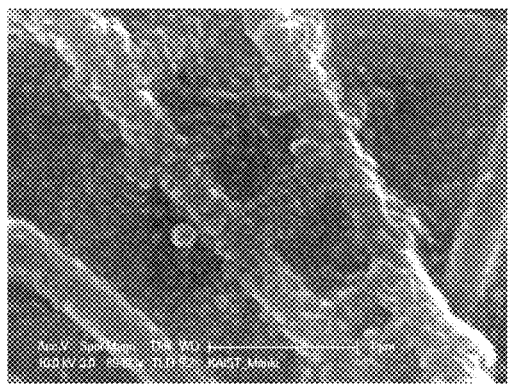

From the SEM analysis, it was confirmed that the micro-sized pores from PAN nanofibrous layer were fully covered by HPEI-TMC cross linked layer by interfacial polymerization. By changing the concentration of cross linkers and reaction time, different surface morphology (in nano-scale) was observed (FIGS. 58A-58B).

Figure 59:
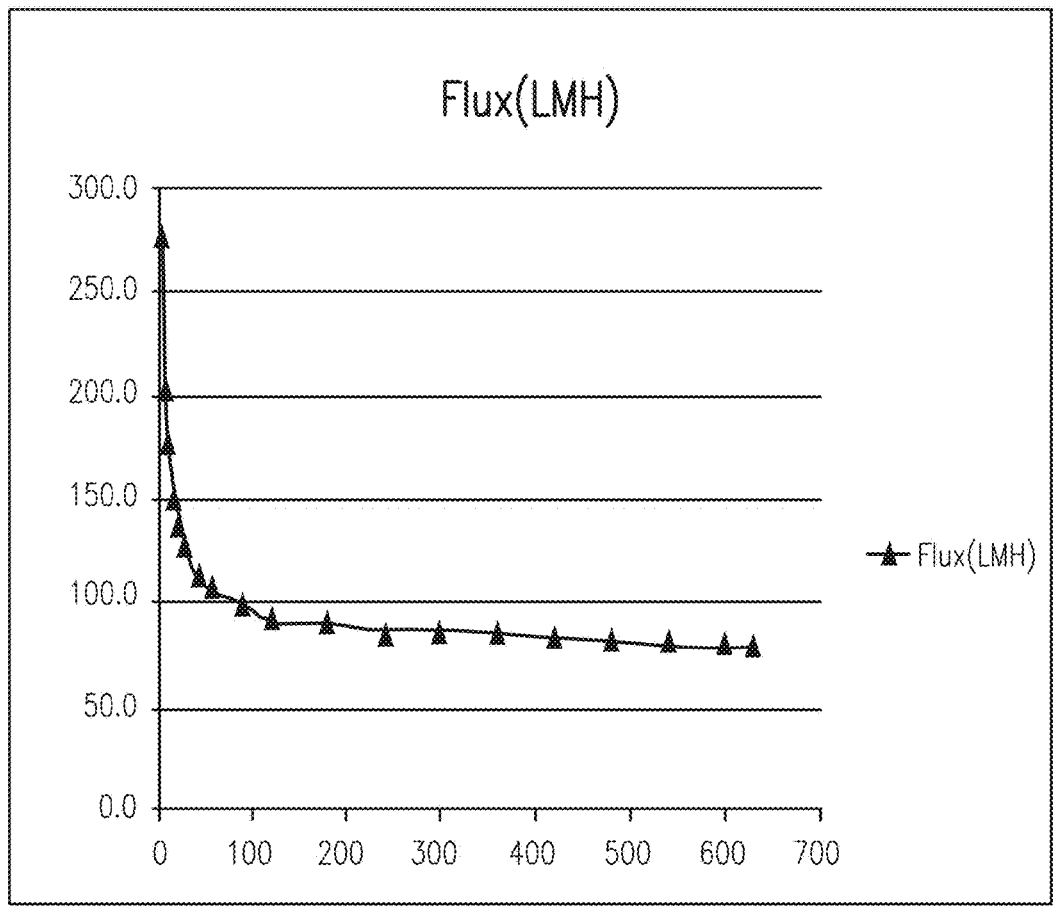
FIG. 59 shows a graph which is a typical graph for pure water flux versus time (0.05 wt % TMC, 45 s) which can be due to compaction of HPEI-TMC cross-linked layer by hydraulic pressure. Stable data of pure water can be obtained after at least 3 hr of filtration time.

A water flux vs. time graph is shown in FIG. 59. This is a typical pure water flux vs. time graph. It is most likely due to compaction of HPEI-TMC cross linked layer by hydraulic pressure. The stable data of pure water flux was obtained after at least 3 h filtration time (FIG. 59).

Figure 60:
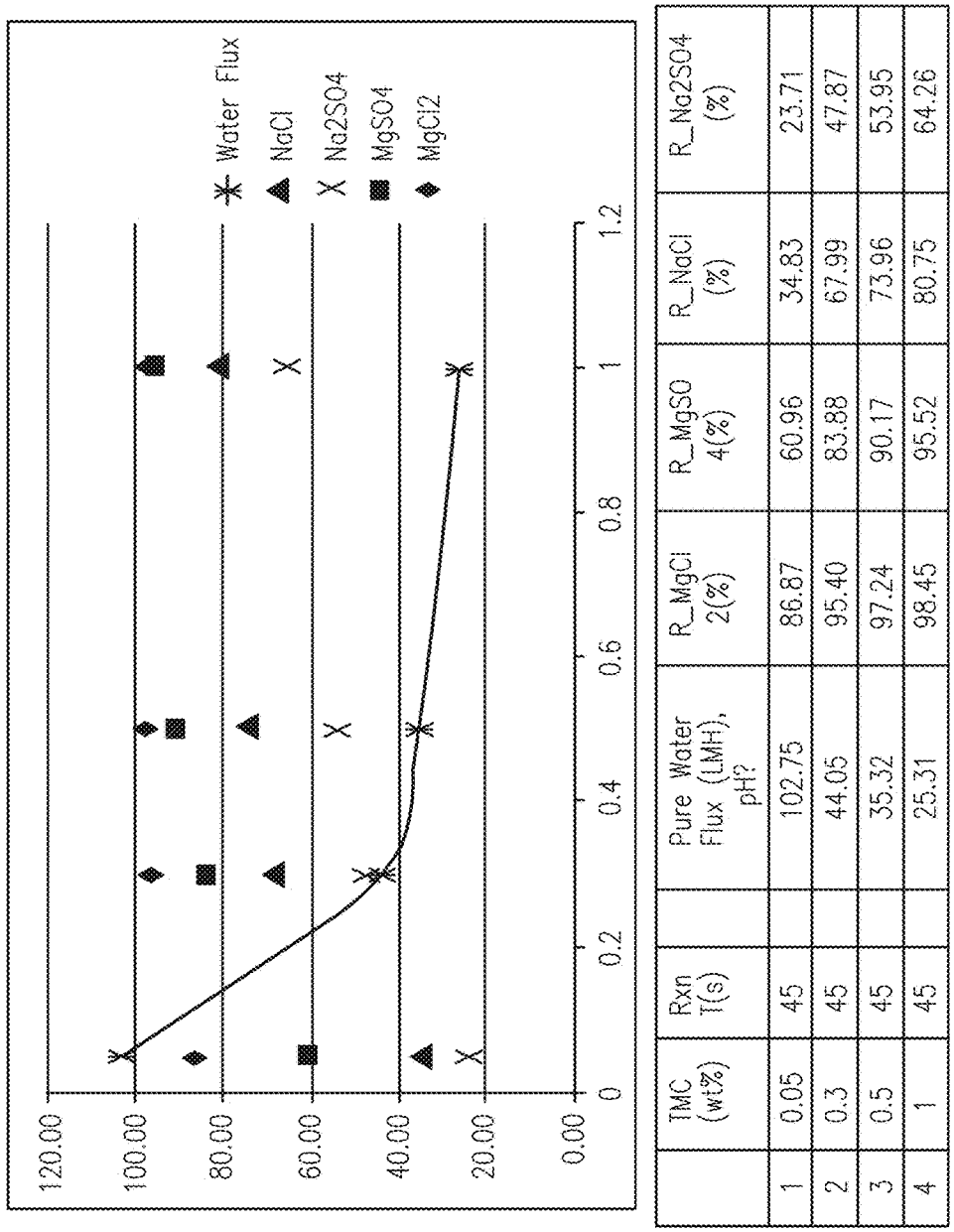
FIG. 60 shows a plot of TMC concentration versus ion rejection (around pH 6, no acid or base added) and a corresponding data table. The plot shows increasing values of ion rejection by using more TMC due to formation of a dense top layer.

The ion rejection values were increasing by using more TMC due to formation of dense top layer. A saturated concentration of TMC is expected to be around 1 wt %. It is expected that nitrogen ratio at the surface and zeta potential value will be increased with increasing TMC concentration (FIG. 60).

Figure 61:
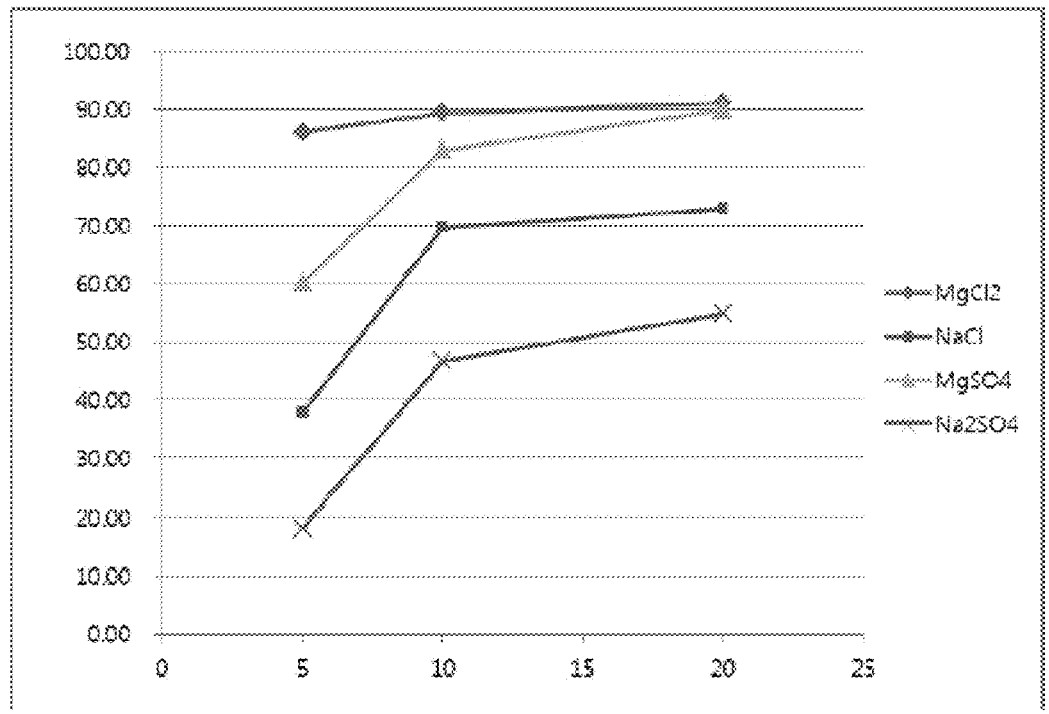
FIG. 61 shows a plot of ion rejection versus time (saturated TMC condition, 1 wt %), pH 4, which shows that in this embodiment, the best performance of the membrane can be obtained at saturated TMC condition in a short time and that there was not much difference in the rejection of $MgCl_2$ and NaCl between 20 seconds reaction time and 10 seconds reaction time.

It was observed that the best performance can be obtained at saturated TMC condition in short time. Also, there were not much differences of rejection of $MgCl_2$, NaCl between 20 s rxn time and 10 s rxn time. So, partial conclusion is assembling HPEI in dense and thin, to make optimized membrane toward $MgCl_2$, NaCl (FIG. 61).

Nitrogen ratio of surface was increased with increasing TMC concentration (FIG. 62).

It can be interpreted in this example that the more cross linker that is used, the denser HPEI layer. This interpretation is only applied to interfacial polymerization which highly-reactive cross linkers are used.

Figure 63:
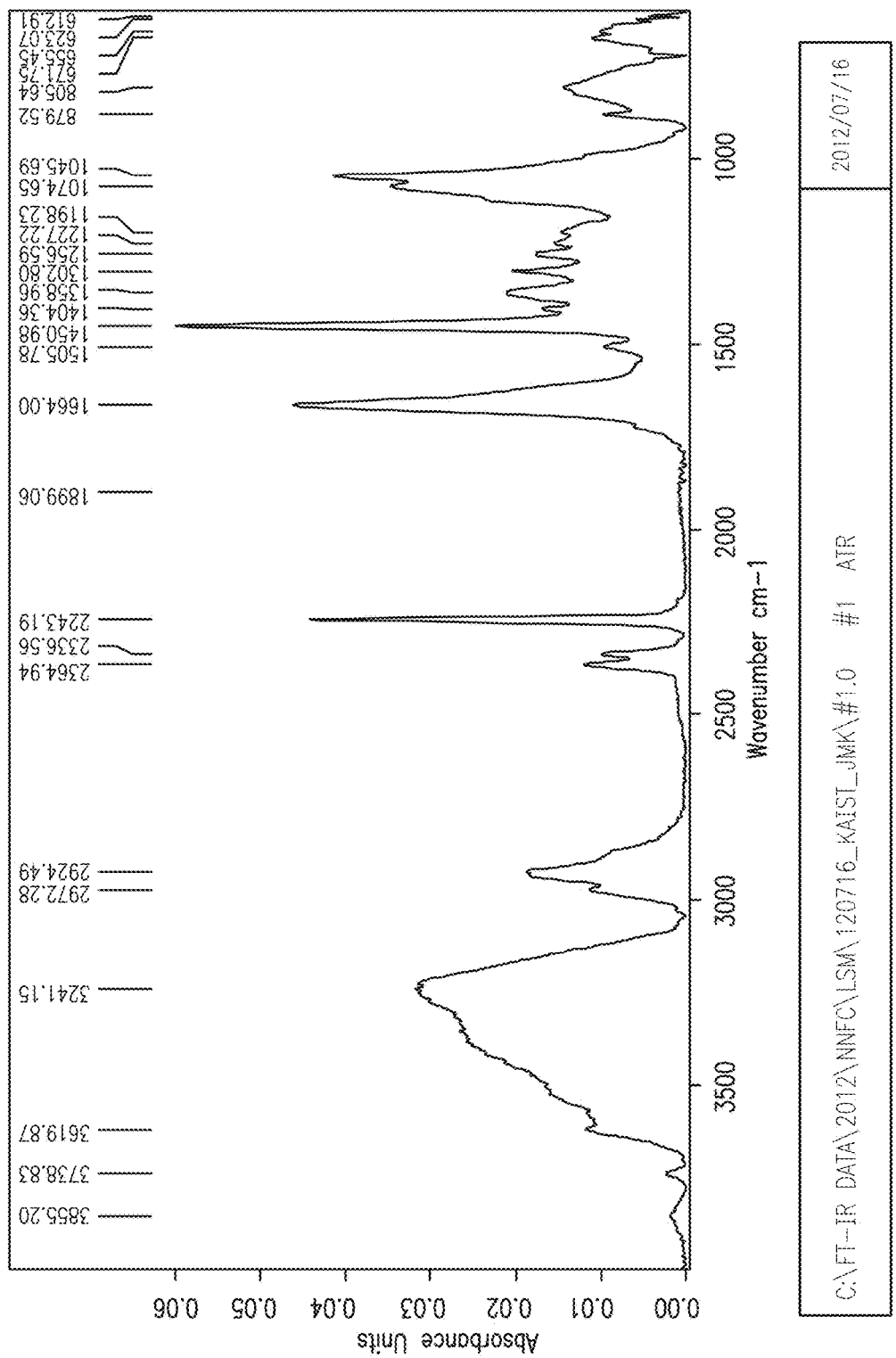
FIG. 63 shows ATR FT-IR spectrum of PAN support layer with no active layer. The ATR FT-IR spectrum shows a nitrile group at 2243 $cm^{-1}$ and no characteristic bands of amide groups.

In FIG. 63 it is shown that no characteristic bands of amide groups were found.

Figure 64:
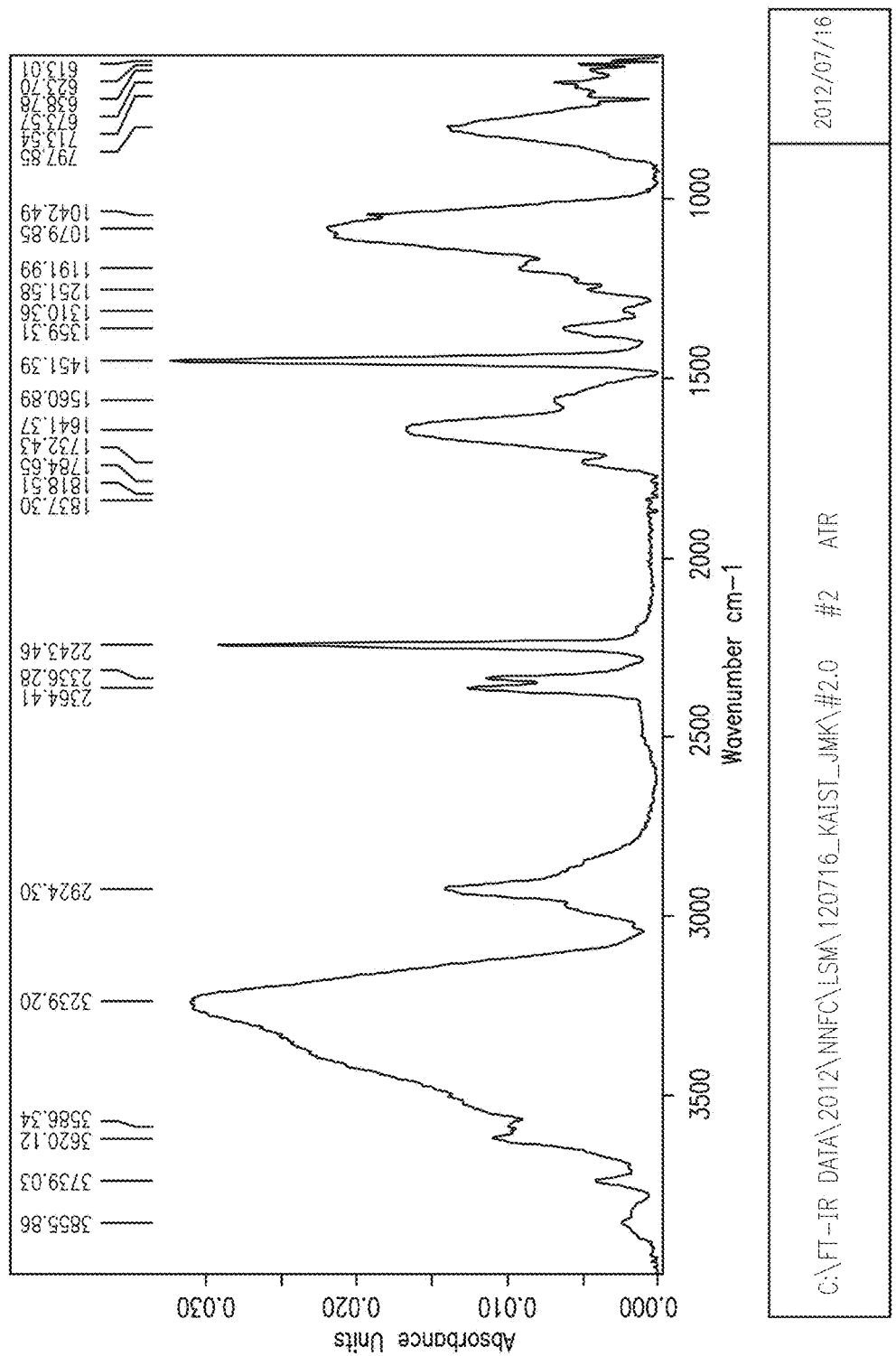
FIG. 64 shows the ATR FT-IR spectrum of HPEI-filtration membrane, HPEI 10 wt %, 0.05 wt %, 45s. The ATR FT-IR spectrum shows characteristic bands of amide groups at 1642 $cm^{-1}$ (C=O stretch), 1560 $cm^{-1}$ (N—H stretch).

In FIG. 64 it is shown that characteristic bands of amide groups were found: 1642 cm$^{-1}$ (C=O stretch), 1560 cm$^{-1}$ (N—H stretch).

Figure 65:
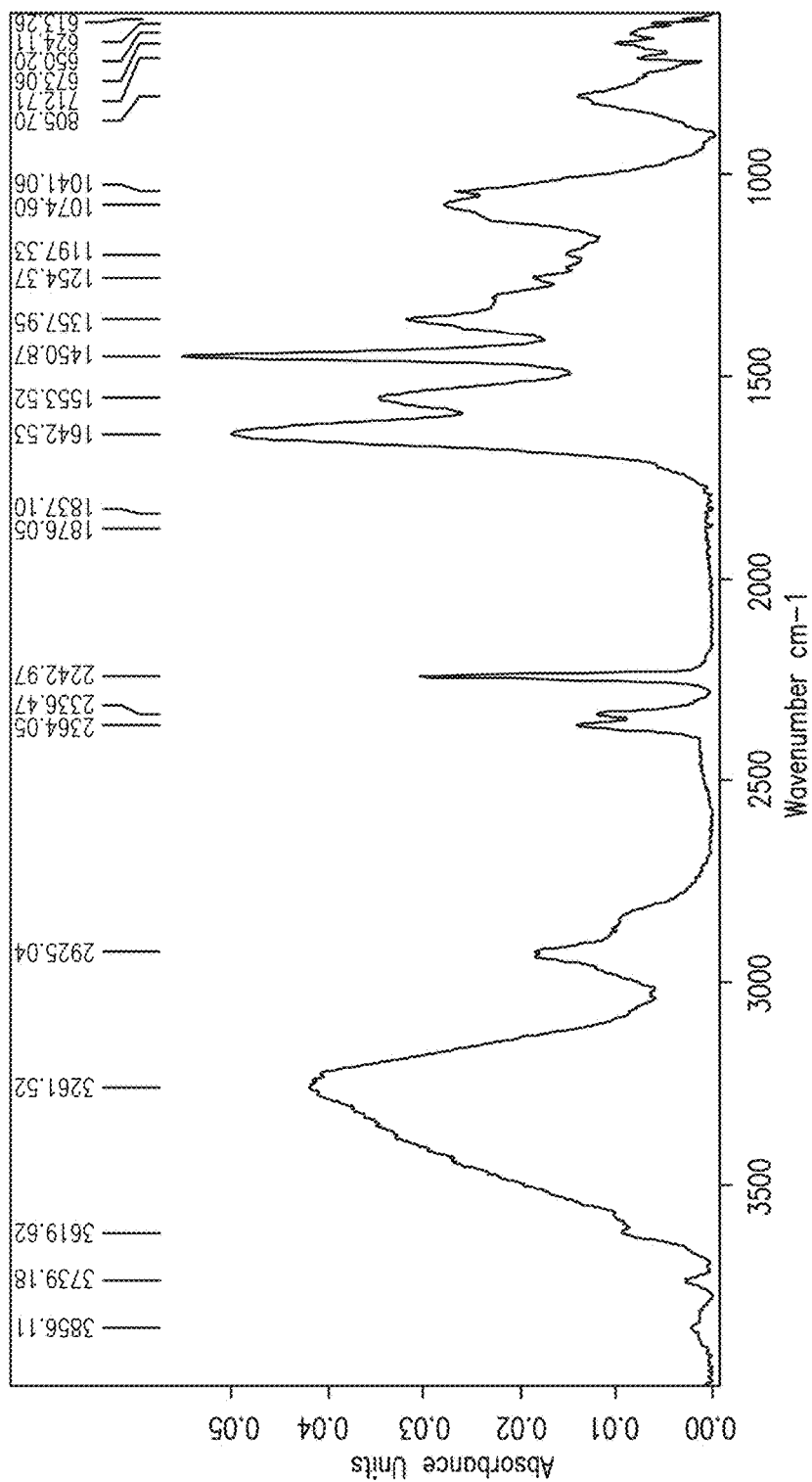
FIG. 65 shows the ATR FT-IR spectrum of HPEI-filtration membrane, HPEI 10 wt %, 2.0 wt %, 45 s at an increased TMC concentration compared to FIG. 64. The ATR FT-IR spectrum shows characteristic bands of amide groups at 1642 $cm^{-1}$ (C=O stretch), 1560 $cm^{-1}$ (N—H stretch).

In FIG. 65 it is shown that characteristic bands of amide groups were found: 1642 cm$^{-1}$ (C=O stretch), 1560 cm$^{-1}$ (N—H stretch). The intensity of the amide bands also increased.

Example 33: Synthesis and Characterization of Branched PEI Micro/Nanoparticles

Figure 66A:
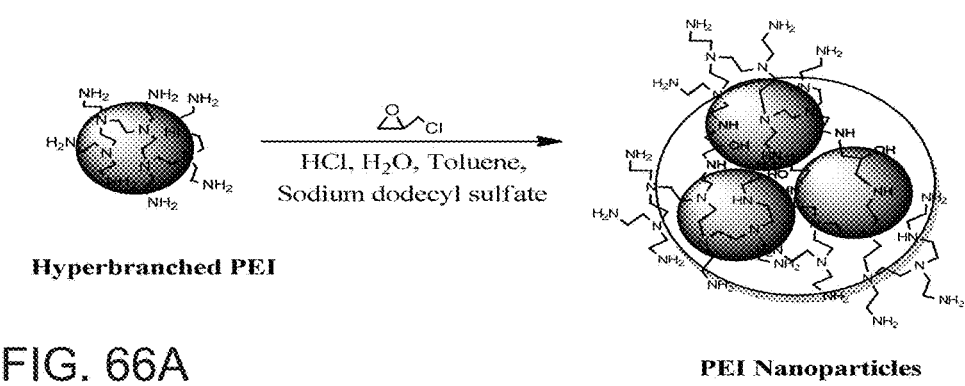
FIGS. 66A-66B show a schematic showing the synthesis of hyperbranched PEI nanoparticles using inverse minemulsion.
Figure 66B:
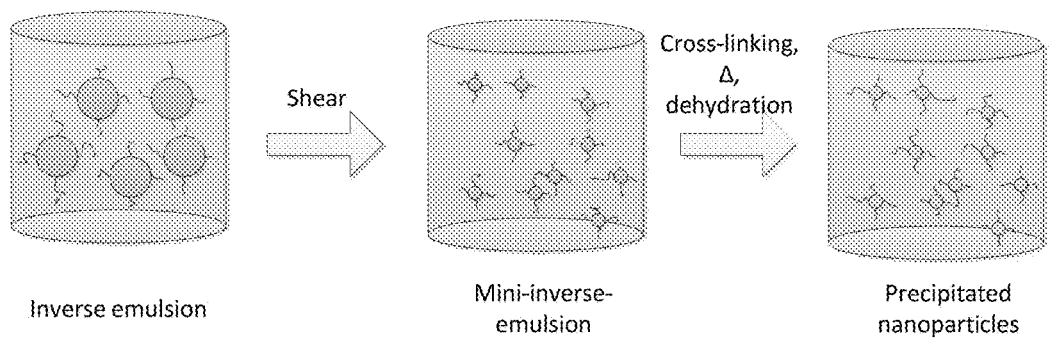

Applicants have developed a route for synthesizing dendritic micro/nanoparticles with controllable size using low-cost hyperbranched polymers as building blocks (FIGS. 66A-66B; U.S. Provisional Patent Application 61/665,749). As an example of this methodology, the synthesis and characterization of hyperbranched poly(ethyleneimine) (PEI) nanoparticles (NPs) is described.

Nanoparticle Synthesis:

Because hyperbranched PEI macromolecules are water-soluble, a surfactant-stabilized inverse suspension of water-in-toluene was used to prepare the base PEI beads with high density of amine groups. The reaction vessel is charged with hyperbranched polyethyleneimine (PEI) polymer as the desired amount of HCl is added over the course of 30 min to an hour under ambient temperature. Water and surfactant (sodium dodecyl benzene sulfonate or sodium dodecyl sulfate) is added, followed by addition of toluene, which serves as continuous phase. The mixture is stirred for 1 hour until a turbid solution was attained. The solution was homogenized to induce high shearing and formation of stable mini emulsions using a stator rotor type homogenizer. The mixture is then heated to 70-80° C. and followed by drop-wise addition of cross-linker (epichlorohydrin or dibromopropane). After 2 hours, the reaction was heated to 120° C. to commence dehydration of the solution. The reaction end point was considered to be reached when all the water from the system has been removed. After, the temperature of the reaction vessel was cooled to ambient temperature and the suspended particles are collected. The nanoparticles suspension was separated by centrifugation. Nanoparticles were neutralized to pH 7 and dialyzed with water to wash away excess HCl or surfactant.

Figure 67:
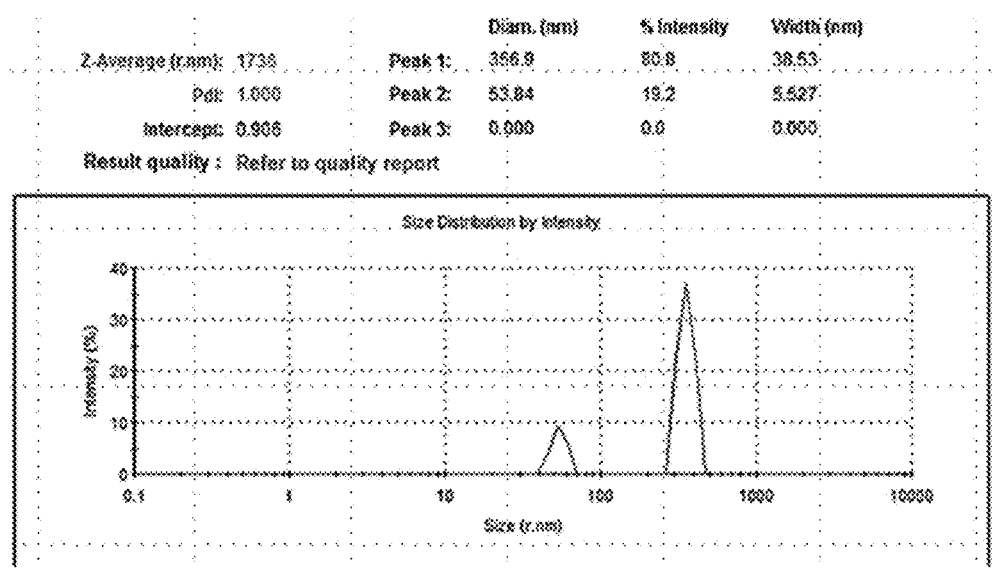
FIG. 67 shows a plot indicating a size distribution by dynamic light scattering of PEI nano/microparticles produced by inverse miniemulsion.

Nanoparticle Characterization:

Dynamic light scattering (DLS) was used to characterize the size of the PEI nanoparticles. FIG. 67 shows that the PEI NPs have a bimodal size distribution with the majority of the particles having an average particle size of 365 nm.

Example 34: Synthesis of Quaternized PEI Microparticles

Applicants have developed synthetic strategies for functionalizing PEI macromolecules and PEI microparticles to weak base and strong base resins with anion high exchange capacity and controllable size (US Patent Application US 2010/0181257 A1, US Patent Application US 2011/0315636 A1 and U.S. Patent Application 61/665,749). These strategies can be used to convert membranes to anion-transfer membranes that can reject cations while allowing anions to pass through the membranes. As an example of this methodology, the quaternized PEI microparticles by alkylation of base PEI microparticles that were synthesized using a inverse emulsion/suspension process is described (FIG. 17A, FIGS. 66A-66B and FIG. 68).

Alkylation of PEI Microparticles

Figure 68:
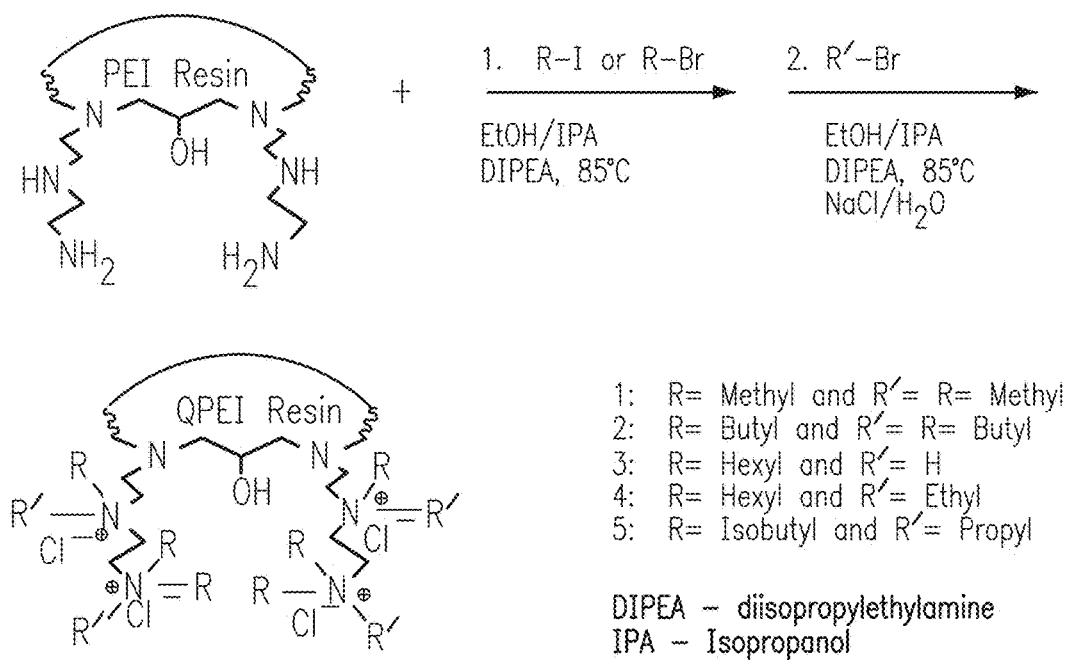
FIG. 68 shows a schematic showing a general reaction scheme of the synthesis of quaternized PEI nano/microparticles.

Microparticles were prepared with high anion-exchange capacity by alkylation of cross linked PEI beads (FIG. 68) that were synthesized using an inverse suspension process and a precursor branched PEI macromolecule with molar mass $M_n$=10,000 Da. Two classes of QPEI resins with monofunctional exchange sites (1-3) and bifunctional exchange sites (4-5) were prepared (FIG. 68). What follows is a typical preparation procedure for the quaternized PEI resins (QPEI) with monofunctional exchange sites. Approximately 20 g of cross-linked PEI beads were mixed with excess amounts of alkylating reagent (R—I or R—Br) in ethanol (EtOH) or isopropanol (IPA). 3-5 mL of a proton scavenger (i. e. diisopropylethylamine [DIPEA]) was added to the mixture, which was subsequently heated at 75° C. in a pressure vessel for 24 h. For QPEI resins with bifunctional exchange sites (3 and 4 in FIG. 68), the PEI beads were first alkylated with a bromoalkane with longer alkyl chain (e.g. hexyl or isobutyl) followed by reaction with a bromoalkane with shorter alkyl chain (e.g. ethyl or propyl). The second alkylation step for the QPEI-3 resin was designed to increase the conversion of amines to quaternary ammonium groups (QPEI-4).

Example 35: Synthesis of Boron-Selective PEI Microparticles

Figure 69A:
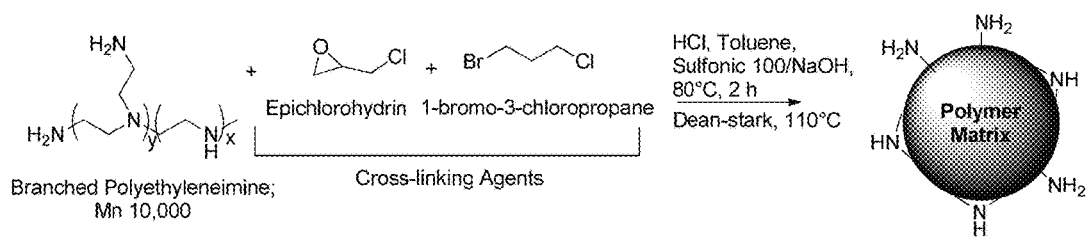
FIGS. 69A-69B show a schematic showing general reaction schemes of the synthesis of boron-selective PEI nano/microparticles.
Figure 69B:
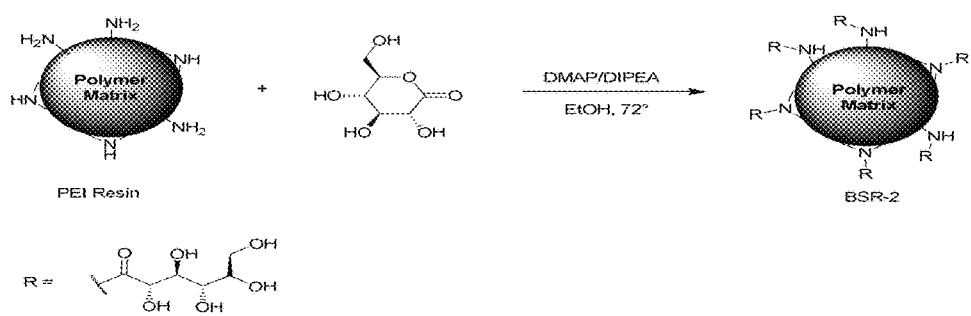

Applicants have developed synthetic strategies for functionalized PEI microparticles and macromolecules with boron-selective groups. These strategies can be used to convert membranes to regenerable and boron chelating membranes. FIGS. 69A-69B show the functionalization of base PEI microparticles with organic compounds (e.g. 2-oxiranylmethanol and glucono-1, 5-D-lactone) containing boron chelating vicinal diol groups. Here again, the base PEI microparticles were synthesized using an inverse emulsion/ suspension process (FIGS. 66A-66B and FIG. 68).

Example 36: Synthesis of Cation-Selective PEI Microparticles

Figure 70:
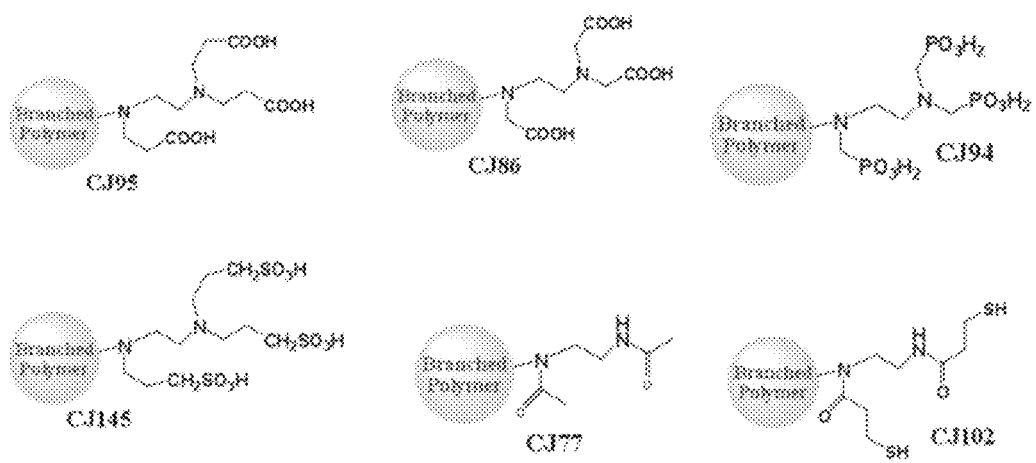
FIG. 70 shows a schematic showing exemplary cationic-selective PEI nano/microparticles.

Applicants have developed synthetic strategies for functionalized PEI microparticles and macromolecules with cation-selective groups (FIG. 17B, FIG. 70). Representative cation-selective ligands that can be linked to PEI microparticles include compounds with N, O and S donors (FIG. 70) such as carboxylic acid, carbamate, urea, sulfonic acid, sulfanic acid, amide, imidine, guanidine, oxime, imidazole, pyridine, thiol, thio-ether, thio-carboxylic acid. The chemistry for linking these groups to the primary/secondary amines of base PEI microparticles (FIG. 19, FIGS. 66A-66B, and FIGS. 69A-69B) can be readily implemented due the superior nucleophilicity of amino groups. This can include halide substitutions, Michael additions and addition to carboxylates. These strategies can used to convert membranes to cation transfer membranes or cation-chelating membranes.

Example 37: Synthesis of Hybrid Inorganic-Organic NFC-PVDF-PEI Membranes

The NFC-PVDF-PEI membrane platform in this example allows for building a family of hybrid inorganic-organic membranes. This example shows an exemplary method of a strategy for synthesizing such hybrid inorganic-organic NFC-PVDF-PEI. This can include the following steps (FIG. 54):

1. Synthesizing of NFC-PVDF-PEI membranes (FIG. 54)
2. Functionalizing of NFC-PVDF-PEI membranes with selective ligands for the target metal ions of interest (e.g. Cu(II), Ag(I), Fe(II)/Fe(III), Pd(II), Pt(II)] (FIG. 56)
3. Contacting and saturating the functionalized NFC-PVDF-PEI membranes with aqueous solutions of the target metal ions (e.g. Cu(II), Ag(I), Fe(II)/Fe(III), Pd(II), Pt(II)]
4. Reacting the metal ion laden with reducing agents such as $H_2$ to produce NFC-PVDF-PEI membranes with metallic clusters/nanoparticles.

Figure 71A:
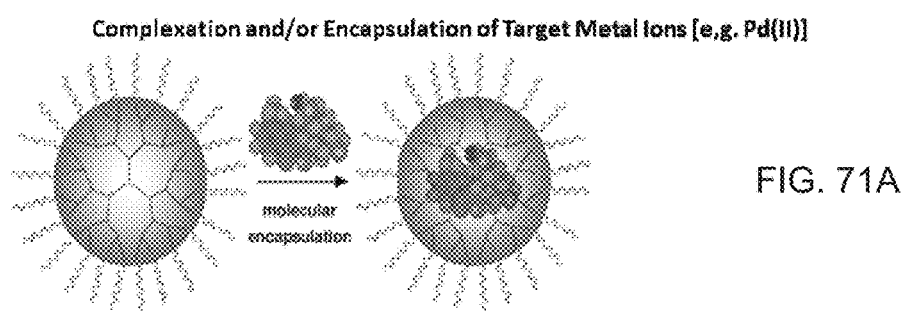
FIGS. 71A-71B show a schematic representation of generation of metallic clusters/nanoparticles inside NFC-PET-PVDF-PEI membranes by complexation/encapsulation of target metal ions followed by reaction with reducing agents (e.g. $H_2$).
Figure 71B:
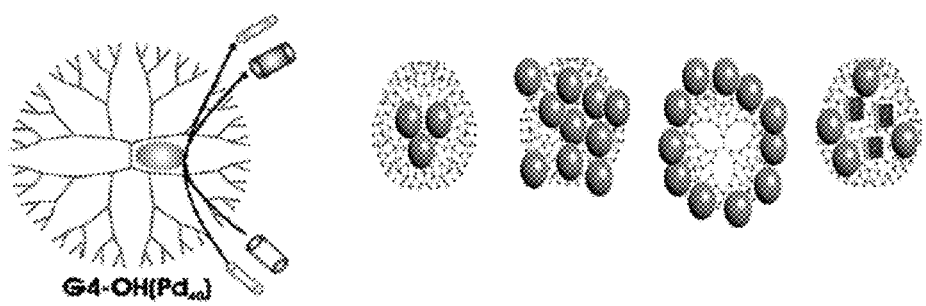

In this example (FIG. 54), a PET support was to fabricate the NFC-PET-PVDF NFC membranes. PVDE can be used as a building block for both the microfibrous support and nanofibrous scaffold of the NFC-PVDF-PEI membranes (FIG. 54) due to its high thermal/chemical resistance and tensile strength, and solubility in a broad range of solvents including dimethyl formamide (DMF), N-methyl-2-pyrrolidone (NMP) and dimethyl acetamide (DMAc). These properties of PVDF provide degrees of freedom for controlling the properties of the microporous supports and nanofibrous scaffolds of NFC membranes (FIG. 54) by selecting the appropriate synthesis conditions. Further the functionalized NFC-PVDF-PEI membranes in this example can also be loaded with prepared inorganic particles (e.g. metal oxide/ sulfide nanoparticles). By controlling the structure and chemistry of the membranes and embedded inorganic nanoparticles (e.g. $TiO_2$) and/or metal clusters [e.g. Pd(O), Pt(O) and Fe(O)Pd(O)], other hybrid inorganic-organic membranes can be fabricated with controllable catalytic/redox activity and, affinity for gases such as $H_2$. Such membranes can also be useful in a broad range of sustainability applications such as water purification, gas separations, energy conversion and storage, and chemical manufacturing, for example (FIGS. 71A-71B).

Example 38 Further Assembly of Multilayer Membrane by Layer-by-Layer Assembly

Figure 8A:
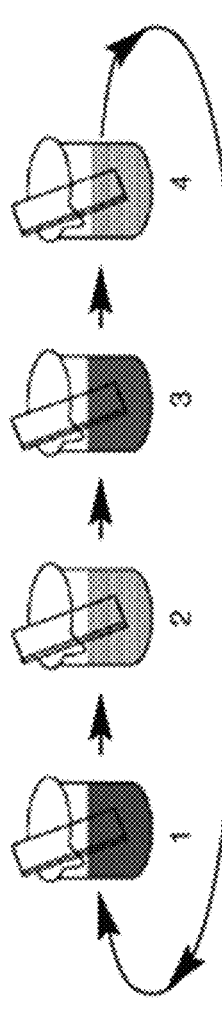
FIGS. 8A-8C show a schematic representation of LBL Assembly of Polyelectrolytes [Ref 2.18]. In particular.
Figure 8B:
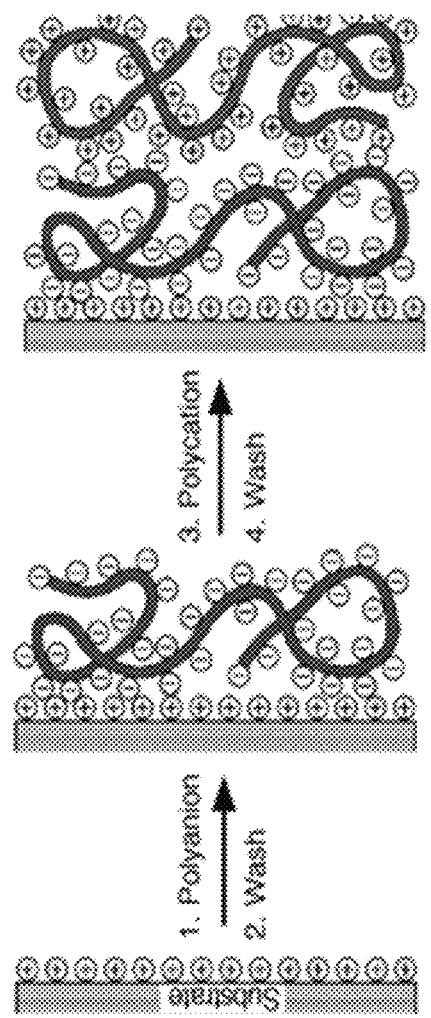
Figure 8C:
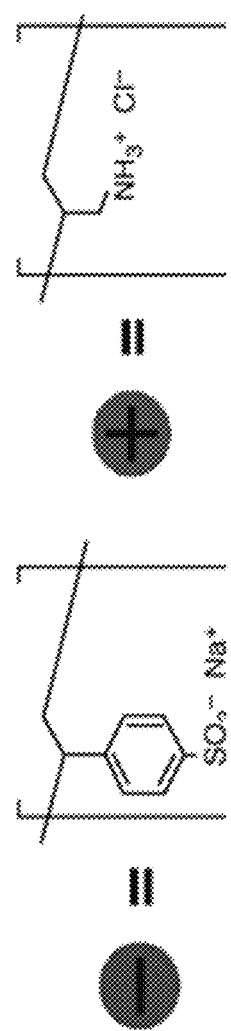

In this example, fabrication of a multilayer membrane by layer-by-layer assembly is described. In this example, a positively charged surface (e.g. a layer of nano and/or microfibers with positively charged dendritic components such as, for example, quaternary ammonium groups; FIG. 8B, left) is submerged in a solution containing negatively charged components (e.g. nanofibers and/or microfibers with negatively charged dendritic components such as, for example, sulfonate groups, FIG. 8A beaker 1 and FIG. 8C) and then washed (FIG. 8A beaker 2) to afford a new layer comprising the negatively charged component (FIG. 8B, center). The process is then repeated using a positively charged component (FIG. 8A, beakers 3 and 4, and FIG. 8C right) to afford another layer comprising the positively charge component (FIG. 8B, right). This process can be repeated to afford a multi-layer alternating positive and negative layers.

Example 39 Fabrication of a Membrane with Two Support Layers

In this example a membrane with two support layers is described. The membrane can be fabricated by, for example, electrospinning a support layer (for example, with a polymeric component and dendritic component as herein described), then electrospinning a composite layer of nano and/or microfibers (comprising, for example, ion-absorbing dendritic component), and then electrospinning a second support layer which can comprise the same components as the first support layer. An example of this type of membrane is shown in FIG. 6B using ion-absorbing dendritic component (FIG. 6A).

In summary, in several embodiments a filtration membrane is described comprising polymeric nanofibers and/or microfibers attaching dendrimer component presenting reactive sites selective for chemicals to be filtered, and related nanofibers and microfibers, composite materials, compositions, methods and systems.

The examples set forth above are provided to give those of ordinary skill in the art a complete disclosure and description of how to make and use the embodiments of filtration membranes and related, fibers, composites, compositions methods and systems of the disclosure, and are not intended to limit the scope of what the Applicants regard as their disclosure. Modifications of the above-described modes for carrying out the disclosure can be used by persons of skill in the art, and are intended to be within the scope of the following claims.

The entire disclosure of each document cited (including patents, patent applications, journal articles, abstracts, laboratory manuals, books, or other disclosures) in the Background, Summary, Detailed Description, and Examples is hereby incorporated herein by reference. All references cited in this disclosure are incorporated by reference to the same extent as if each reference had been incorporated by reference in its entirety individually. However, if any inconsistency arises between a cited reference and the present disclosure, the present disclosure takes precedence.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the disclosure claimed Thus, it should be understood that although the disclosure has been specifically disclosed by preferred embodiments, exemplary embodiments and optional features, modification and variation of the concepts herein disclosed can be resorted to by those skilled in the art, and that such modifications and variations are considered to be within the scope of this disclosure as defined by the appended claims.

It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

When a Markush group or other grouping is used herein, all individual members of the group and all combinations and possible subcombinations of the group are intended to be individually included in the disclosure. Every combination of components or materials described or exemplified herein can be used to practice the disclosure, unless otherwise stated. One of ordinary skill in the art will appreciate that methods, device elements, and materials other than those specifically exemplified can be employed in the practice of the disclosure without resort to undue experimentation. All art-known functional equivalents, of any such methods, device elements, and materials are intended to be included in this disclosure. Whenever a range is given in the specification, for example, a temperature range, a frequency range, a time range, or a composition range, all intermediate ranges and all subranges, as well as, all individual values included in the ranges given are intended to be included in the disclosure. Any one or more individual members of a range or group disclosed herein can be excluded from a claim of this disclosure. The disclosure illustratively described herein suitably can be practiced in the absence of any element or elements, limitation or limitations which is not specifically disclosed herein.

A number of embodiments of the disclosure have been described. The specific embodiments provided herein are examples of useful embodiments of the disclosure and it will be apparent to one skilled in the art that the disclosure can be carried out using a large number of variations of the devices, device components, methods steps set forth in the present description. As will be obvious to one of skill in the art, methods and devices useful for the present methods can include a large number of optional composition and processing elements and steps.

In particular, it will be understood that various modifications may be made without departing from the spirit and scope of the present disclosure. Accordingly, other embodiments are within the scope of the following claims.

REFERENCES 1.1. Shannon, M. A.; Bohn, P. W.; Elimelech, M.; Georgiadis, J., Marinas, B. J and Mayes, A. Science and technology for water purification in the coming decades. Nature. 2008, 54, 301-310.

1.2. Savage, N. and Diallo, M. S. Nanomaterials and Water Purification. Journal of Nanoparticle Research. 2005, Volume 7, No 4-5, pp 331-342.

1.3. American Water Works Association. Reverse Osmosis and Nanofiltration (M46). Second Edition, Denver, 2007.

1.4. Diallo, M S. and Goddard, W. A. III. Ion Absorbing Microfiltration Membranes for Water Treatment and Desalination. US Patent Application (Pending).

1.5. KAIST Graduate School of Energy, Environment, Water and Sustainability [http://eewseng.kaist.ac.kr/introduction/Introduction.php].

1.6. KAIST EEWS Initiative [http://eews.kaist.ac.kr/new/work/index.htm]

1.7. Schaefer, A.; Fane, A. G. and Waite, T. D (Eds). Nanofiltration: Principles and Applications. Elsevier: New York, 2005.

1.8. American Water Works Association. Microfiltration and Ultrafiltration Membranes (M53). Second Edition, Denver, 2005.

1.9. Zeman, L. J. and Zydney, A. L. M. Microfiltration and Ultrafiltration. Principles and Applications. Marcel Dekker, Inc. New York, 1996.

1.10. Kim, S-J, Ko, S-H, Kang, K-H an Han, J. Direct seawater desalination by ion concentration polarization", Nature Nanotechnology. Published online: 21 Mar. 2010.

1.11. Jeong, B. H., E. M. V. Hoek, Y. Yan, X. Huang, A. Subramani, G. Hurwitz, A. K. Ghosh, and A. Jawor. Interfacial Polymerization of Thin Film Nanocomposites: A New Concept for Reverse Osmosis Membranes. Journal of Membrane Science 294 (2007) 1-7.

1.12. Ho D, Chu B, Schmidt J J, Brooks E K, Montemagno C D. Hybrid protein-polymer biomimetic membranes. IEEE Trans. Nanotech. 2004; 3(2):256-263.

1.13. Holt J K, Park H G, Wang Y, Stadermann M, Artyukhin A B, Grigoropoulos C P, et al. Fast Mass Transport Through Sub-2-Nanometer Carbon Nanotubes. Science. 2006, 312 pp. 1034-1037.

1.14. McGinnis R. L and Elimelech, M. Global Challenges in Energy and Water Supply: The Promise of Engineered Osmosis. Environmental Science and Technology. 2008, 42, pp. 8625-8629.

1.15. Helfferich, F. Ion Exchange. MacGraw-Hill Book Company: New York, 1962.

1.16. Diallo, M. S., Wondwossen, A.; Johnson, J. H. Jr. and Goddard, W. A. III. Dendritic Chelating Agents 2. U(VI) Binding to Poly(amidoamine) and Poly(propyleneimine) Dendrimers in Aqueous Solutions. Environmental Science and Technology. 2008, 42, 1572-1579.

1.17. Diallo, M. S.; Falconer, K.; Johnson, J. H. Jr. and Jr., Goddard, W. A. Dendritic Anion Hosts: Perchlorate Binding to G5-NH2 Poly(propyleneimine) Dendrimer in Aqueous Solutions. Environmental Science and Technology. 2007, 41, 6521-6527.

1.18. Diallo, M. S.; Chritie, S.; Swaminathan, P.; Johnson, J. H. Jr. and Goddard, W. A. III. Dendrimer Enhanced Ultrafiltration. 1. Recovery of Cu(II) from Aqueous Solutions Using Gx-NH2 PAMAM Dendrimers with Ethylene Diamine Core. Environmental Science and Technology. 2005, 39 (5), 1366-1377.

1.19. Diallo, M. S.; Chritie, S.; Swaminathan, P.; Balogh, L.; Shi, X.; Um, W.; Papelis, L.; Goddard, W. A. III and Johnson, J. H. Jr. Dendritic Chelating Agents 1. Cu(II) Binding to Ethylene Diamine Core Poly(amidoamine) Dendrimers in Aqueous Solutions. Langmuir 2004, 20 (7), 2640-2651.

1.20. Frechet, J. M. J., Boz, E., Diallo. M. S. and Chi, Y. Extraction of Anions from Solutions and Mixtures Using Hyperbranched Macromolecules. US Patent Application (Pending)

1.21. Diallo. M. S. Yu, C J and Frechet, J. M. J. Y. Anion-Selective Hyperbranched Polymeric Microparticles. US Patent Application (Pending)

1.22. Li, D., McCarn, J. T. and Xia, Y. Use of Electrospinning to Directly Fabricate Hollow Nanofibers with Functionalized Inner and Outer surfaces. Small. 2005, 1, 83-86.

1.23. Ramakrishna, S., Fujihara, K., Teo, W-E., Lim, T-C and Ma, Z. An Introduction to Electrospinning and Nanofibers. World Scientific Publishing Co. Pte: Hackensack, N.J., 2005.

1.24. Andrady, A. L. Science and Technology of Polymer Nanofibers. John Wiley & Sons: Hoboken, N.J., 2008.

1.25. Ulbricht, M. Advanced Functional Polymer Membranes. Polymer 47. 2006, pp. 2217-2262.

1.26. Bruening, M. L.; Dotzaeur, D. M.; Jain, P.; Ouyang, L. and Baker, G. L. Creation of functional membranes using polyelectrolyte multilayer's and polymer brushes. Langmuir. 2008, 24, 7663-7673.

1.27. Bergbreiter, D. E. and Kippenberger, A. M. Hyperbranched Surface Graft Polymerizations. Advances in Polymer Science. 2006, 198, pp. 1-49.

1.28. Liu, Yi.; Bryantsev, V. S.; Diallo, M. S. and Goddard, W. A. III. PAMAM Dendrimers Undergo pH Responsive Conformational Changes without Swelling. J. Am. Chem. Soc. 2009, 131 (8), pp 2798-2799.

1.29. Jang, S-S. and Goddard, W. A. III. Structures and Transport Properties of Hydrated Water-Soluble Dendrimer-Grafted Polymer Membranes for Application to Polymer Electrolyte Membrane Fuel Cells: Classical Molecular Dynamics Approach. J. Phys. Chem. C. 2007, 111, 2759-2769.

2.1. Shannon, M. A.; Bohn, P. W.; Elimelech, M.; Georgiadis, J., Marinas, B. J and Mayes, A. Science and technology for water purification in the coming decades. Nature. 2008, 54, 301-310.

2.2. Savage, N. and Diallo, M. S. Nanomaterials and Water Purification. Journal of Nanoparticle Research. 2005, Volume 7, No 4-5, pp 331-342.

2.3. American Water Works Association. Reverse Osmosis and Nanofiltration (M46). Second Edition, Denver, 2007.

2.4. American Water Works Association. Microfiltration and Ultrafiltration Membranes (M53). Second Edition, Denver, 2005.

2.5. Fréchet, J. M. J., Tomalia, D. A. Dendrimers and other Dendritic Polymers (Eds) 2001, J. Wiley and Sons: New York, 2001.

2.6. Tomalia, D. A., Henderson, S. A. and Diallo, M. S. Dendrimers—an enabling synthetic science to controlled organic nanostructures. In Handbook of Nanoscience, Engineering and Technology. Second Edition; Goddard, W. A. III.; Brenner, D. W.; Lyshevski, S. E. and Iafrate, G. J.; Eds.; CRC Press: Boca Raton, 2007.

2.7. Diallo, M. S., Wondwossen, A.; Johnson, J. H. Jr. and Goddard, W. A. III. Dendritic Chelating Agents 2. U(VI) Binding to Poly(amidoamine) and Poly(propyleneimine) Dendrimers in Aqueous Solutions. Environmental Science and Technology. 2008, 42, 1572-1579.

2.8. Diallo, M. S. Water Treatment by Dendrimer-Enhanced Filtration: Principles and Applications. In Nanotechnology Applications for Clean Water. Editors: Diallo, M. S., Duncan, J.; Savage, N; Street, A. and Sustich, R. 2008. William Andrew Applied Science Publishers. November 2008. In Press.

2.9. Diallo, M. S.; Falconer, K.; Johnson, J. H. Jr. and Jr., Goddard, W. A. Dendritic Anion Hosts: Perchlorate Binding to G5-NH$_2$ Poly(propyleneimine) Dendrimer in Aqueous Solutions. Environmental Science and Technology. 2007, 41, 6521-6527.

2.10. Diallo, M. S. Water Treatment by Dendrimer Enhanced Filtration. US Patent Pending; Publication No.: US 1006/0021938 A1 and Publication Date: Feb. 2, 2006.

2.11. Diallo, M. S.; Chritie, S.; Swaminathan, P.; Johnson, J. H. Jr. and Goddard, W. A. III. Dendrimer Enhanced Ultrafiltration. 1. Recovery of Cu(II) from Aqueous Solutions Using Gx-NH$_2$ PAMAM Dendrimers with Ethylene Diamine Core. Environmental Science and Technology. 2005, 39 (5), 1366-1377.

2.12. Diallo, M. S.; Chritie, S.; Swaminathan, P.; Balogh, L.; Shi, X.; Um, W.; Papelis, L.; Goddard, W. A. III and Johnson, J. H. Jr. Dendritic Chelating Agents 1. Cu(II) Binding to Ethylene Diamine Core Poly(amidoamine) Dendrimers in Aqueous Solutions. Langmuir 2004, 20 (7), 2640-2651.

2.13. Maiti P. K. and Goddard. W. A. III. Solvent quality changes the structure of G8 PAMAM dendrimer, a disagreement with some experimental interpretations. J. Phys. Chem. B 110 (51): 25628-25632 (2006).

2.14. Maiti, P. K., Cagin T, Lin, S. T. and Goddard W. A III. Effect of solvent and pH on the structure of PAMAM dendrimers. Macromolecules. 2005, 38 (3): 979-991.

2.15. Lin, S. T., Jang, S. S., Cagin. T., Goddard, W. A. III. Thermodynamic Stability of Zimmerman Self-Assembled Dendritic Supramolecules from Atomistic Molecular Dynamics Simulations. J. Phys. Chem. B. 2004, 108, 10041.

2.16. Li, Y. Y., Lin, S. T., Goddard W. A. Efficiency of Various Lattices from Hard Ball to Soft Ball: Theoretical Study of Thermodynamic Properties of Dendrimer Liquid Crystal from Atomistic Simulation. J. Am. Chem. Soc. 2004, 126, 1872.

2.17. Martell, A. E. and Hancock, R. D. Metal Complexes in Aqueous Solutions. Plenum Press, New York, 1996.

2.18. Decher, G. Fuzzy nanoassemblies: Toward layered polymeric multicomposites. Sci. 1997, 277, 1232-1237.

2.19. Bruening, M. L.; Dotzaeur, D. M.; Jain, P.; Ouyang, L. and Baker, G. L. Creation of functional membranes using polyelectrolyte multilayer's and polymer brushes. Langmuir. 2008, 24, 7663-7673.

2.20. Ulbricht, M. Advanced functional polymer membranes. Polymer. 2006, 46, 2217-2262.

2.21. Tomalia, D. A and Swanson, D. R. Laboratory synthesis and characterization of megamers: core-shell tecto (dendrimers). In Dendrimers and other Dendritic Polymers. Fréchet, J. M. J., Tomalia, D. A. (Eds) 2001, J. Wiley and Sons: New York, 2001, 617-633.

2.22. Ramakrishna, R.; Fujihara, K.; Teo, W. E.; Lim, T. C. and Ma, Z. An introduction to electospinning and nanofibers. World Scientific, New Jersey, 2005.

2.23. Electrospinning (che.vt.edu/Wilkes/electrospinning/electrspinning.html)

2.24. Zhao, Y-H.; Zhu, B-K.; Ma, X-T and Xu, Y-Y. Porous membranes modified by hyperbranched polymers 1. Preparation and characterization of PVDF membranes using hyperbranched polyglycerol additive. J. Mem. Sci. 2007, 290, 222-229.

2.25. Yi. L., V. Bryantsev, M. Diallo, and W. A. Goddard III. In Preparation.

2.26. Global Water Intel (globalwaterintel.com/pictureShow.php?pictureld=285)

3.1. Shannon, M. A.; Bohn, P. W.; Elimelech, M.; Georgiadis, J., Marinas, B. J and Mayes, A. Science and technology for water purification in the coming decades. Nature. 2008, 54, 301-310.

3.2. Diallo, M. S., Duncan, J.; Savage, N., Street, A. and Sustich, R. Nanotechnology Solutions for Improving Water. In Nanotechnology Applications for Clean Water. Editors: Savage, N., Diallo, M. S., Duncan, J.; Street, A. and Sustich, R. 2008. William Andrew Applied Science Publishers. 2009, 585-587.

3.3. American Water Works Association. Reverse Osmosis and Nanofiltration (M46). Second Edition, Denver, 2007.

3.4. American Water Works Association. Microfiltration and Ultrafiltration Membranes (M53). Second Edition, Denver, 2005.

3.5. Diallo, M S. and Goddard, W. A. III. Ion Absorbing Microfiltration Membranes for Water Treatment and Desalination. U.S. Patent Application 61/199,575.

3.6. Frechet, J. M. J., Tomalia, D. A. Dendrimers and other Dendritic Polymers (Eds) 2001, J. Wiley and Sons: New York, 2001.

3.7. Tomalia, D. A., Henderson, S. A. and Diallo, M. S. Dendrimers—an enabling synthetic science to controlled organic nanostructures. In Handbook of Nanoscience, Engineering and Technology. Second Edition; Goddard, W. A. III.; Brenner, D. W.; Lyshevski, S. E. and Iafrate, G. J.; Eds.; CRC Press: Boca Raton, 2007.

3.8. Diallo, M. S. Water Treatment by Dendrimer Enhanced Filtration. U.S. Pat. No. 7,470,369. This patent was issued on Dec. 30, 2008.

3.9. Diallo, M. S. Water Treatment by Dendrimer-Enhanced Filtration: Principles and Applications. In Nanotechnology Applications for Clean Water. Editors: Savage, N., Diallo, M. S., Duncan, J.; Street, A. and Sustich, R. 2008. William Andrew Applied Science Publishers, 2009, 143-155.

3.10. Diallo, M. S., Wondwossen, A.; Johnson, J. H. Jr. and Goddard, W. A. III. Dendritic Chelating Agents 2. U(VI) Binding to Poly(amidoamine) and Poly(propyleneimine) Dendrimers in Aqueous Solutions. Environmental Science and Technology. 2008, 42, 1572-1579.

3.11. Diallo, M. S.; Falconer, K.; Johnson, J. H. Jr. and Jr., Goddard, W. A. Dendritic Anion Hosts: Perchlorate Binding to G5-$NH_2$ Poly(propyleneimine) Dendrimer in Aqueous Solutions. Environmental Science and Technology. 2007, 41, 6521-6527.

3.12. Diallo, M. S.; Chritie, S.; Swaminathan, P.; Johnson, J. H. Jr. and Goddard, W. A. III. Dendrimer Enhanced Ultrafiltration. 1. Recovery of Cu(II) from Aqueous Solutions Using Gx-$N_H$, PAMAM Dendrimers with Ethylene Diamine Core. Environmental Science and Technology. 2005, 39 (5), 1366-1377.

3.13. Diallo, M. S.; Chritie, S.; Swaminathan, P.; Balogh, L.; Shi, X.; Um, W.; Papelis, L.; Goddard, W. A. III and Johnson, J. H. Jr. Dendritic Chelating Agents 1. Cu(II) Binding to Ethylene Diamine Core Poly(amidoamine) Dendrimers in Aqueous Solutions. Langmuir 2004, 20 (7), 2640-2651.

3.14. Maiti P. K. and Goddard. W. A. III. Solvent quality changes the structure of G8 PAMAM dendrimer, a disagreement with some experimental interpretations. J. Phys. Chem. B. 110 (51): 25628-25632 (2006).

3.15. Maiti, P. K., Cagin T, Lin, S. T. and Goddard W. A III. Effect of solvent and pH on the structure of PAMAM dendrimers. Macromolecules. 2005, 38 (3): 979-991.

3.16. Lin, S. T., Jang, S. S., Cagin, T., Goddard, W. A. III. Thermodynamic Stability of Zimmerman Self-Assembled Dendritic Supramolecules from Atomistic Molecular Dynamics Simulations. J. Phys. Chem. B. 2004, 108, 10041.

3.17. Li, Y. Y., Lin, S. T., Goddard W. A. Efficiency of Various Lattices from Hard Ball to Soft Ball: Theoretical Study of Thermodynamic Properties of Dendrimer Liquid Crystal from Atomistic Simulation. J. Am. Chem. Soc. 2004, 126, 1872.

3.18. Jang, S-S. and Goddard, W. A. III. Structures and Transport Properties of Hydrated Water-Soluble Dendrimer-Grafted Polymer Membranes for Application to Polymer Electrolyte Membrane Fuel Cells: Classical Molecular Dynamics Approach. J. Phys. Chem. C. 2007, 111, 2759-2769.

3.19. Liu, Yi.; Bryantsev, V. S.; Diallo, M. S. and Goddard, W. A. III. PAMAM Dendrimers Undergo pH Responsive Conformational Changes without Swelling. December 2008. Submitted.
3.20. Frechet, J. M. J., Boz, E., Chi, Y. and Diallo, M. S. Extraction of Anions from Solutions and Mixtures Using Hyperbranched Macromolecules. U.S. Patent Application 61/102,792.
3.21. C J Yu and Diallo, M. S. Extraction of Anions from Water and Wastewater Using Functionalized Hyperbranched Macromolecules. U.S. Patent Application 61/200,872.
3.22. Li, D., McCarn, J. T. and Xia, Y. Use of Electrospinning to Directly Fabricate Hollow Nanofibers with Functionalized Inner and Outersurfaces. Small. 2005, 1, 83-86.
3.23. Ulbricht, M. Advanced functional polymer membranes. Polymer. 2006, 46, 2217-2262.
3.24. Decher, G. Fuzzy nanoassemblies: Toward Layered Polymeric Multicomposites. Sci. 1997, 277, 1232-1237.
3.25. Bruening, M. L.; Dotzaeur, D. M.; Jain, P.; Ouyang, L. and Baker, G. L. Creation of Functional Membranes Using Polyelectrolyte Multilayer's and Polymer Brushes. Langmuir. 2008, 24, 7663-7673.
3.26. Doosan Hydro Technology. U.S. Based Subsidiary of Doosan Heavy Industries & Construction [doosanhydro.com/about].
4.1. Service, R. F. Desalination Freshens Up. Science. 2006, Volume 313, 1088-1090
5.1. Shannon, M. A.; Bohn, P. W.; Elimelech, M.; Georgiadis, J., Marinas, B. J and Mayes, A. Science and technology for water purification in the coming decades. Nature. 2008, 54, 301-310.
5.2. Savage, N. and Diallo, M. S. Nanomaterials and Water Purification. Journal of Nanoparticle Research. 2005, Volume 7, No 4-5, pp 331-342.
5.3. American Water Works Association. Reverse Osmosis and Nanofiltration (M46). Second Edition, Denver, 2007.
5.4. American Water Works Association. Microfiltration and Ultrafiltration Membranes (M53). Second Edition, Denver, 2005.
5.5. Diallo, M S and Goddard, W. A. III. Ion Absorbing Microfiltration Membranes for Water Treatment and Desalination. US Patent Application (Pending).
5.6. Diallo, M. S., Frechet, J. M. J and Boz, E. Extraction of Actinides from Mixtures and Ores Using Dendritic Macromolecules. US Patent Application (Pending). WO 2009/045237. International Publication Date: 9 Apr. 2009.
5.7. Diallo, M. S., Wondwossen, A.; Johnson, J. H. Jr. and Goddard, W. A. Ill. Dendritic Chelating Agents 2. U(VI) Binding to Poly(amidoamine) and Poly(propyleneimine) Dendrimers in Aqueous Solutions. Environmental Science and Technology. 2008, 42, 1572-1579.
5.8. Diallo, M. S. Water Treatment by Dendrimer-Enhanced Filtration: Principles and Applications. In Nanotechnology Applications for Clean Water. Editors: Savage, N., Diallo, M. S., Duncan, J.; Street, A. and Sustich, R. 2008. William Andrew Applied Science Publishers, 2009, 143-155.
5.9. Diallo, M. S.; Falconer, K.; Johnson, J. H. Jr. and Jr., Goddard, W. A. Dendritic Anion Hosts: Perchlorate Binding to G 5-$NH_2$ Poly(propyleneimine) Dendrimer in Aqueous Solutions. Environmental Science and Technology. 2007, 41, 6521-6527.
5.10. Diallo, M. S. Water Treatment by Dendrimer Enhanced Filtration. U.S. Pat. No. 7,470,369. This patent was issued on Dec. 30, 2008.
5.11. Diallo, M. S.; Chritie, S.; Swaminathan, P.; Johnson, J. H. Jr. and Goddard, W. A. III. Dendrimer Enhanced Ultrafiltration. 1. Recovery of Cu(II) from Aqueous Solutions Using Gx-$NH_2$ PAMAM Dendrimers with Ethylene Diamine Core. Environmental Science and Technology. 2005, 39 (5), 1366-1377.
5.12. Diallo, M. S.; Chritie, S.; Swaminathan, P.; Balogh, L.; Shi, X.; Urn, W.; Papelis, L.; Goddard, W. A. III and Johnson, J. H. Jr. Dendritic Chelating Agents 1. Cu(II) Binding to Ethylene Diamine Core Poly(amidoamine) Dendrimers in Aqueous Solutions. Langmuir 2004, 20 (7), 2640-2651.
5.13. Frechet, J. M. J., Tomalia, D. A. Dendrimers and other Dendritic Polymers (Eds) 2001, J. Wiley and Sons: New York, 2001.
5.14. Tomalia, D. A., Henderson, S. A. and Diallo, M. S. Dendrimers—an enabling synthetic science to controlled organic nanostructures. In Handbook of Nanoscience, Engineering and Technology. Second Edition; Goddard, W. A. Ill.; Brenner, D. W.; Lyshevski, S. E. and Iafrate, G. J.; Eds.; CRC Press: Boca Raton, 2007.
5.15. Frechet, J. M. J., Boz, E., Chi, Y. and Diallo, M. S. Extraction of Anions from Solutions and Mixtures Using Hyperbranched Macromolecules. US Patent Application (Pending).
5.16. CJ Yu and Diallo, M. S. Extraction of Anions from Water and Wastewater Using Functionalized Hyperbranched Macromolecules. US Patent Application (Pending).
5.17. Martell, A. E. and Hancock, R. D. Metal Complexes in Aqueous Solutions. Plenum Press, New York, 1996.
5.18. Polymer Factory (polymerfactory.com/). 2,2-bis(methylol)propionic acid (MPA) hyperbranched macromolecules.
5.19. Li, D., McCarn, J. T. and Xia, Y. Use of Electrospinning to Directly Fabricate Hollow Nanofibers with Functionalized Inner and Outersurfaces. Small. 2005, 1, 83-86.
6.1. Shannon, M. A.; Bohn, P. W.; Elimelech, M.; Georgiadis, J., Marinas, B. J and Mayes, A. Science and technology for water purification in the coming decades. Nature. 2008, 54, 301-310.
6.2. Savage, N. and Diallo, M. S. Nanomaterials and Water Purification. Journal of Nanoparticle Research. 2005, Volume 7, No 4-5, pp 331-342.
6.3. American Water Works Association. Reverse Osmosis and Nanofiltration (M46). Second Edition, Denver, 2007.
6.4. American Water Works Association. Microfiltration and Ultrafiltration Membranes (M53). Second Edition, Denver, 2005.
6.5. Schaefer, A.; Fane, A. G. and Waite, T. D (Eds). Nanofiltration: Principles and Applications. Elsevier: New York, 2005
7.1. Ba C, Langer J. Economy J (2009) Chemical modification of P84 copolyimide membranes by polyethylenimine for nanofiltration. J. Membr. Sci. 327: 49-58.
7.2. Baker R W (2004) Membrane technology and applications, 2nd edn. John Wiley & Sons Ltd., Chichester.
7.3. Bormashenko Ye, Pogreb R, Stanevsky O, Bormashenko Ed (2004) Vibrational spectrum of PVDF and its interpretation. Polym. Test. 23: 791-796.
7.4. Cheng S, Oatley D L, Williams P M, Wright C J (2011) Positively charged nanofiltration membranes: Review of current fabrication methods and introduction of a novel approach. Adv. Colloid Interface Sci. 164: 12-20.

7.5. Chiang Y-C, Hsub Y-Z, Ruaan R-C, Chuang C-J, Tung K-L (2009) Nanofiltration membranes synthesized from hyperbranched polyethyleneimine. J. Membr. Sci. 326: 19-26.

7.6. Choi H, Kwon Y, Jung Y, Hong S, Tak T (2011) Preparation and characterization of antifouling poly(vinylidene fluoride) blended membranes. J. Appl. Polym. Sci. 123: 286-291.

7.7. Déon S, Escoda A, Fievet P (2011) A transport model considering charge adsorption inside pores to describe salts rejection by nanofiltration membranes. Chem. Eng. Sci. 66: 2823-2832.

7.8. Diallo M S, Brinker J C (2011) Nanotechnology for Sustainability: Environment, Water, Food, Minerals and Climate. In: Roco M C, Mirkin C, Hersham M (ed) Nanotechnology Research Directions for Societal Needs in 2020: Retrospective and Outlook. Springer, pp 221-259.

7.9. Diallo M S, Yu C (2011) Soluble Anion Exchangers from Hyperbrannched Macromolecules. US Patent Application Pub. No: 2011/0315636 A1.

7.10. Du R, Zhao J (2004) Properties of poly (N,N-dimethylaminoethyl methacrylate)/polysulfone positively charged composite nanofiltration membrane. J. Membr. Sci. 239: 183-188.

7.11. Elimelech M, Philipp W A (2011) The future of seawater desalination: energy, technology and the environment. Science 333: 712-717.

7.12. Escoda A, Lanteri Y, Fievet P, Deon S, Szymczyk A (2010) Determining the dielectric constant inside pores on nanofiltration membranes from membrane potential measurements. Langmuir 26: 14628-14635.

7.13. Frechet J M J, Boz E, Diallo M S, Chi Y (2010) Extraction of anions from solutions and mixtures using hyperbranched macromolecules. US Patent Application No: 20100181257.

7.14. Gopal R, Kaur S, Ma Z W, Chan C, Ramakrishna S, Matsuura, T (2006) Electrospun nanofibrous filtration membrane. J. Membr. Sci. 281: 581-586.

7.15. Huang R, Chen G, Sun M, Gao C (2008) Preparation and characterization of quaterinized chitosan/poly(acrylonitrile) composite nanofiltration membrane from anhydride mixture cross-linking. Sep. Purif. Technol. 58: 393-399.

7.16. Huang, R., Chen, G., Sun, M., Gao, C. (2009) Preparation and characterization of composite NF membrane from a graft copolymer of trimethylallyl ammonium chloride onto chitosan by toluene diisocyanate cross-linking. Desalination 238: 38-45.

7.17. Jaworek A, Sobczyk A T (2008) Electrospraying route to nanotechnology: An overview. J. Electrostat. 66: 197-219.

7.18. Ji Y, An Q, Zhao Q, Chen H, Gao C (2011) Preparation of novel positively charged copolymer membranes for nanofiltration. J. Membr. Sci. 376: 254-265.

7.19. Mansouri J, Harrisson S, Chen V (2010) Strategies for controlling biofouling in membranefiltration systems: challenges and opportunities. J. Mater. Chem. 20: 4567-4586.

7.20. Oh S J, Kim N, Lee Y T (2009) Preparation and characterization of PVDF/TiO2 organic-inorganic composite membranes for fouling resistance improvement. J. Membr. Sci. 345: 13-20.

7.21. Pontié M, Dach H, Leparc J, Hafsi M, Lhassani A (2008) Novel approach combining physico-chemical characterizations and mass transfer modelling of nanofiltration and low pressure reverse osmosis membranes for brackish water desalination intensification. J. Membr. Sci. 221: 174-191.

7.22. Ramakrishina S, Fujihara K, Teo W-E, Lim T-C, Ma Z (2005) An introduction to electrospinning and nanofibers. World Scientific Publishing Co., Singapore.

7.23. Schäefer A, Fane A G, Waite, T D (2005). Nanofiltration: Principles and Applications. Elsevier, New York.

7.24. Schaep J, Bruggen B V D, Vandecasteele C, Wilms D (1998) Influence of ion size and charge in nanofiltration. Sep. Purif. Technol. 14: 155-162.

7.25. Service R F (2006) Desalination freshens up. Science 313: 1088-1090.

7.26. Setiawan L, Wang R, Li K, Fane A G (2011) Fabrication of novel poly(amide-imide) forward osmosis hollow fiber membranes with a positively charged nanofiltration-like selective layer. J. Membr. Sci. 369: 196-205.

7.27. Shannon M A, Bohn P W, Elimelech M, Georgiadis J, Marinas B J, Mayes A (2008) Science and technology for water purification in the coming decades. Nature 54: 301-310.

7.28. Shim Y, Lee H J, Lee S Y, Moon S H, Cho J (2002) Effects of natural organic matter and ionic species on membrane surface charge. Environ. Sci. Technol. 36: 3864-3871.

7.29. Strathmann H (2011) Introduction to membrane science and technology. Wiley-VCH Verlag & Co.

7.30. Sun S P, Hatton A T, Chung T S (2011) Hyperbranched polyethyleneimine induced cross-linking of polyamide-imide nanofiltration hollow fiber membranes for effective removal of ciprofloxacin. Environ. Sci. Technol. 45: 4003-4009.

7.31. Tongwen X, Weihua Y (2003) A novel positively charged composite membranes for nanofiltration prepared from poly(2,6-dimethyl-1,4-phenylene oxide) by in situ amines crosslinking. J. Membr. Sci. 215: 25-32.

7.32. Tsuru T, Urairi M, Nakao S, Kimura S (1991) Negative rejection of anions in the loose reverse osmosis separation of mono- and divalent ion mixture. Desalination 81: 219-227.

7.33. UNEP (2006) Challenges to international waters—Regional assessments in a global perspective. United Nations Environment Programme, Nairobi, Kenya.

7.34. Verissimo S, Peinemann K V, Bordado J (2005) New composite hollow fiber membrane for nanofiltration. Desalination 184: 1-11.

7.35. Vezzani D, Bandini S (2002) Donnan equilibrium and dielectric exclusion for characterization of nanofiltration membranes. Desalination 149: 477-483.

7.36. Wang X, Chen X, Yoon K, Fang D, Hsiao B S, Chu B (2005) High flux filtration medium based on nanofibrous substrate with hydrophilic nanocomposite coating. Environ. Sci. Technol. 39: 7684-7691.

7.37. Yan C, Zhang S, Yang D, Jian X (2008) Preparation and characterization of chloromethylated/quaternized poly(phthalazinone ether sulfone ketone) for positively charged nanofiltration membranes. J. Appl. Polym. Sci. 107: 1809-1816.

7.38. Yoon K, Hsiao B S, Chu B (2008) Functional nanofibers for environmental applications. J. Mater. Chem. 18: 5326-5334.

7.39. Yoon K, Hsiao B S, Chu B (2009) High flux ultrafiltration nanofibrous membranes based on polyacrylonitrile electrospun scaffolds and cross linked polyvinyl alcohol coating. J. Membr. Sci. 338: 145-152.

7.40. Yung L, Ma H, Wang X, Yoon K, Wang R, Hsiao B S, Chu B (2010) Fabrication of thin-film nanofibrous composite membranes by interfacial polymerization using ionic liquids as additives. J. Membr. Sci. 365: 52-58.

7.41. Zhang Q, Wang H, Zhang S. Dai L (2011) Positively charged nanofiltration membrane based on cardo poly (arylene ether sulfone) with pendant tertiary amine groups. J. Membr. Sci. 375: 191-197.

7.42. Zhou Y, Yu S, Gao C, Feng X (2009) Surface modification of thin film composite polyamide membranes by electrostatic self-deposition of polycations for improved fouling resistance. Sep. Sci. Technol. 66: 287-294.

8.1. Service, R. F. (2006). "Desalination freshens up." Science, 313(5790): 1088-1090.

8.2. Shannon, M. A., P. W. Bohn, et al. (2008). "Science and technology for water purification in the coming decades." Nature, 452(7185): 301-310.

8.3. King, C. W. and M. E. Webber (2008). "Water Intensity of Transportation." Environmental Science & Technology, 42(21): 7866-7872.

8.4. Greenlee, L. F., D. F. Lawler, et al. (2009). "Reverse osmosis desalination: Water sources, technology, and today's challenges." Water Research, 43(9): 2317-2348.

8.5. Li, D. and H. T. Wang (2010). "Recent developments in reverse osmosis desalination membranes." Journal of Materials Chemistry, 20(22): 4551-4566.

8.6. Lee, K. P., T. C. Arnot, et al. (2011). "A review of reverse osmosis membrane materials for desalination-Development to date and future potential." Journal of Membrane Science, 370(1-2): 1-22.

8.7. Fritzmann, C., J. Lowenberg, et al. (2007). "State-of-the-art of reverse osmosis desalination." Desalination, 216(1-3): 1-76.

8.8. Schäfer, A. I., Fane, A. G., Waite, T. D. (2005). Nanofiltration: Principles and Applications, Elsevier, U.K., 560 pages.

8.9. Chiang, Y. C., Y. Z. Hsub, et al. (2009). "Nanofiltration membranes synthesized from hyperbranched polyethyleneimine." Journal of Membrane Science, 326(1): 19-26.

8.10. Hoek, E. M. V., A. K. Ghosh, et al. (2008). "Impacts of reaction and curing conditions on polyamide composite reverse osmosis membrane properties." Journal of Membrane Science. 311(1-2): 34-45.

8.11. Meszaros, R., L. Thompson, et al. (2003). "Interaction of sodium dodecyl sulfate with polyethyleneimine: Surfactant-induced polymer solution colloid dispersion transition." Langmuir, 19(3): 609-615.

8.12. Yung, L., H. Y. Ma, et al. (2010). "Fabrication of thin-film nanofibrous composite membranes by interfacial polymerization using ionic liquids as additives." Journal of Membrane Science. 365(1-2): 52-58.

8.13. Musale, D. A. and A. Kumar (2000). "Solvent and pH resistance of surface cross linked chitosan/poly(acrylonitrile) composite nanofiltration membranes." Journal of Applied Polymer Science, 77(8): 1782-1793.

8.14. MWH, Inc. (2005). Water Treatment: Principles and Design. $2^{nd}$ Edition, J. Wiley, 1948 pages.

8.15. Gopal, R., S. Kaur, et al. (2006). "Electrospun nanofibrous filtration membrane." Journal of Membrane Science, 281(1-2): 581-586.

8.16. Elimelech, M. and W. A. Phillip (2011). "The Future of Seawater Desalination: Energy, Technology, and the Environment." Science, 333(6043): 712-717.

8.17. Li, D. and Y. N. Xia (2004). "Electrospinning of nanofibers: Reinventing the wheel?" Advanced Materials, 16(14): 1151-1170.

8.18. Ramakrishna, S., Fujihara, K., Teo, W. E., Lim. T. C., and Ma, Z. (2005). An Introduction to Electrospinning and Nanofibers, World Scientific, Singapore, 382 pages.

8.19. Kaur, S., R. Gopal, et al. (2008). "Next-generation fibrous media for water treatment." MRS Bulletin, 33(1): 21-26.

8.20. Wang, X. F., X. M. Chen, et al. (2005). "High flux filtration medium based on nanofibrous substrate with hydrophilic nanocomposite coating." Environmental Science & Technology. 39(19): 7684-7691.

8.21. Gopal, R., S. Kaur, et al. (2007). "Electrospun nanofibrous polysulfone membranes as pre-filters: Particulate removal." Journal of Membrane Science, 289(1-2): 210-219.

8.22. W. J. Lau, et al. (2011). "A recent progress in thin film composite membrane, A review" Desalination, in press.

8.23. Donnan, F. G. (1995). "Theory of Membrane Equilibria and Membrane-Potentials in the Presence of Non-Dialyzing Electrolytes—a Contribution to Physical-Chemical Physiology (Reprinted from Zeitshrift Fur Elektrochemie Und Angewandte Physikalische Chemie, Vol 17, Pg 572, 1911)." Journal of Membrane Science, 100(1): 45-55.

8.24. Koper, G. J. M. and M. Borkovec (2010). "Proton binding by linear, branched, and hyperbranched polyelectrolytes." Polymer, 51(24): 5649-5662.

9.1. Savage, N. and Diallo, M. S. Nanomaterials and Water Purification. Journal of Nanoparticle Research. 2005, Volume 7, No 4-5, 331-342

9.2. Diallo, M. S. and Brinker, J. Nanotechnology for Sustainability: Environment, Water, Food and Climate in "Nanotechnology Research Directions for Societal Needs in 2020" (M. Roco, C. Mirkin and M. Hersam, eds.), Springer, Boston, 2010 (also available on the website: www.wtec.org/nano2)

9.3. UNEP United Nations Environment Programme. 2006. Challenges to international waters—Regional assessments in a global perspective. Nairobi, Kenya: UNEP 9.4. IPCC (Intergovernmental Panel on Climate Change). 2008. Climate Change and Water. Bates, B. C., Z. W. Kundzewicz, S. Wu and J. P. Palutikof, Eds. Technical Paper of the Intergovernmental Panel on Climate Change, IPCC Secretariat, Geneva, 210 pp.

9.5. Shannon, M. A.; Bohn, P. W.; Elimelech, M.; Georgiadis, J., Marinas, B. J and Mayes, A. Science and technology for water purification in the coming decades. Nature. 2008, 54, 301-310.

9.6. Schaefer, A.; Fane, A. G. and Waite, T. D (Eds). Nanofiltration: Principles and Applications. Elsevier: New York, 2005

9.7. Geise, G. M., Lee, H-S., Miller, D. L., Freeman, B. D., McGrath, J. E. and Paul, D. Water Purification by Membranes: The Role of Polymer Science. J. Polym. Sc. Part B: Polymer Physics, 2010, Vol. 48, 1685-1718.

9.8. KAIST EEWS Initiative [http://eews.kaist.ac.kr/new/work/index.htm]

9.9. Ramakrishna, S., Fujihara, K., Teo, W-E., Lim, T-C and Ma, Z. An Introduction to Electrospinning and Nanofibers. World Scientific Publishing Co. Pte: Hackensack, N.J., 2005.

9.10. Andrady, A. L. Science and Technology of Polymer Nanofibers. John Wiley & Sons: Hoboken, N.J., 2008.

9.11. Ramakrishna, S., Jose, R., Archana, P. S., Nair, A. S, Balamurugan, R., Venugopal, J., and Teo, W. E. Science and Engineering of Electrospun Nanofibers for Advances in Clean Energy, Water Filtration, and Regenerative Medicine. J. Mater. Sci. 2010, 45, 6283-6312.

9.12. Gopal, R., Kaur, R., Ma, Z., Chan, C., Ramakrishna, S. and Matsuura, T. Electrospun Nanofibrous Filtration Membranes. J. Memb. Sci. 2006, 281, 581-586.

9.13. Frechet, J. M. J., Tomalia, D. A. Dendrimers and other Dendritic Polymers (Eds) 2001, J. Wiley and Sons: New York, 2001.

9.14. Tomalia, D. A., Henderson, S. A. and Diallo, M. S. Dendrimers—An Enabling Synthetic Science To Controlled Organic Nanostructures. Chapter 24. Handbook of Nanoscience, Engineering and Technology. 2nd Edition. 2007. Second Edition; Goddard, W. A. III.; Brenner, D. W.; Lyshevski, S. E. and Iafrate, G. J.; Eds.; CRC Press: Boca Raton.

9.15. Diallo, M. S. Water Treatment by Dendrimer Enhanced Filtration. U.S. Pat. No. 7,470,369. This patent was issued on Dec. 30, 2008.

9.16. Diallo, M. S. Water Treatment by Dendrimer-Enhanced Filtration: Principles and Applications. In Nanotechnology Applications for Clean Water. Editors: Savage, N., Diallo, M. S., Duncan, J.; Street, A. and Sustich, R. 2008. William Andrew Applied Science Publishers, 2009, 143-155.

9.17. Diallo, M. S., Wondwossen, A.; Johnson, J. H. Jr. and Goddard, W. A. III. Dendritic Chelating Agents 2. U(VI) Binding to Poly(amidoamine) and Poly(propyleneimine) Dendrimers in Aqueous Solutions. Environmental Science and Technology. 2008, 42, 1572-1579.

9.18. Diallo, M. S.; Falconer, K.; Johnson, J. H. Jr. and Jr., Goddard, W. A. Dendritic Anion Hosts: Perchlorate Binding to G5-NH2 Poly(propyleneimine) Dendrimer in Aqueous Solutions. Environmental Science and Technology. 2007, 41, 6521-6527.

9.19. Diallo, M. S.; Chritie, S.; Swaminathan, P.; Johnson, J. H. Jr. and Goddard, W. A. III. Dendrimer Enhanced Ultrafiltration. 1. Recovery of Cu(II) from Aqueous Solutions Using Gx-NH2 PAMAM Dendrimers with Ethylene Diamine Core. Environmental Science and Technology. 2005, 39 (5), 1366-1377.

9.20. Diallo, M. S.; Chritie, S.; Swaminathan, P.; Balogh, L.; Shi, X.; Um, W.; Papelis, L.; Goddard, W. A. III and Johnson, J. H. Jr. Dendritic Chelating Agents 1. Cu(II) Binding to Ethylene Diamine Core Poly(amidoamine) Dendrimers in Aqueous Solutions. Langmuir 2004, 20 (7), 2640-2651

9.21. Ulbricht, M. Advanced Functional Polymer Membranes. Polymer 47. 2006, 2217-2262.

9.22. Yoo, H. S., Kim, T. G. and Park, T. G. Surface-functionalized Electrospun Nanofibers for Tissue Engineering. Adv. Drug. Del. Rev. 2009, 61, 1033-1042.

9.23. Frechet, J. M. J., Boz, E., Diallo. M. S. and Chi, Y. Extraction of Anions from Solutions and Mixtures Using Hyperbranched Macromolecules. US Patent Application 20100181257. Publication Date: Jul. 22, 2010.

9.24. Diallo, M. S., Frechet, J. M. J and Boz, E. Extraction of Actinides from Mixtures and Ores Using Dendritic Macromolecules. US Patent Application Pub. No.: 2009/001802 A1. Pub. Date: Jan. 1, 2009.

9.25. Diallo, M. S and Yu, C. J. Soluble Anion Exchangers from Hyperbranched Macromolecules. US Patent Application (Pending).

9.26. Frechet, J. M. J., Diallo. M. S., Yu, C J and Boz, E. High Capacity Anion Exchange Resins from Branched Macromolecules. US Patent Application (Pending).

9.27. Diallo, M. S., Yu, C J. and Chen, D. P. Anion-Selective Resins from Branched Macromolecules. US Patent Application (Pending).

9.28. Bruening, M. L.; Dotzaeur, D. M.; Jain, P.; Ouyang, L. and Baker, G. L. Creation of functional membranes using polyelectrolyte multilayers and polymer brushes. Langmuir. 2008, 24, 7663-7673.

9.29. Gooßen, L. J, Ohlmann, D. M. and Lange, P. L. The Thermal Amidation of Carboxylic Acids Revisited. SYNTHESIS, 2009, No. 1, pp 0160-0164.

10.1. Elimelech, M.; Phillip, W. A., The Future of seawater desalination: energy, technology, and the environment. Science. 2011, 333, 712-717.

10.2. Xu, Y; Jiang, J. Q., Technologies for boron removal. Ind. Eng. Chem. Res. 2008, 47, 16-24.

10.3. Grinstead, R. R., Removal of boron and calcium from magnesium chloride brines by solvent-extraction. Ind. Eng. Chem. Prod. Rd. 1972, 11, 454-460.

10.4. Ocken, H., An Evaluation Report of Enriched Boric Acid in European PWRs. Electric Power Research Institute. EPRI Report 1003124. 2001.

10.5. Blevins, D. G; Lukaszewski, K. M., Boron in plant structure and function. Annu. Rev Plant. Phys. 1998. 49, 481-500.

10.6. Campbell, S. A., The Science and Engineering of Microelectronic Fabrication. Oxford University Press, USA; $2^{nd}$ Edition. 2001.

10.7. Smith, B. F.; Robison, T. W.; Carlson, B. J.; Labouriau, A.; Khalsa, G R. K.; Schroeder, N. C.; Jarvinen, G D.; Lubeck, C. R.; Folkert, S. L.; Aguino, D. I., Boric acid recovery using polymer filtration: studies with alkyl monool, diol, and triol containing polyethylenimines. J. Appl. Polym. Sci. 2005, 97, 1590-1604.

10.8. Vogel, A. I.; Svehla, G, Quantitative Inorganic Analysis. Longman, 1987.

10.9. Simonnot, M. O.; Castel, C.; Nicolai, M.; Rosin, C.; Sardin, M.; Jauffret, H., Boron removal from drinking water with a boron selective resin: Is the treatment really selective? Wat. Res. 2000, 34, 109-116.

10.10. Kaftan, O.; Acikel, M.; Eroglu, A. E.; Shahwan, T.; Artok, L.; Ni, C. Y, Synthesis, characterization and application of a novel sorbent, glucamine-modified MCM-41, for the removal/preconcentration of boron from waters. Anal. Chim. Acta. 2005, 547, 31-41.

10.11. Gazi, M.; Galli, G; Bicak, N., The rapid boron uptake by multi-hydroxyl functional hairy polymers. Sep. Pur. Technol. 2008, 62, 484-488.

10.12. Xiao, Y. K.; Liao, B. Y.; Liu, W. G; Xiao, Y.; Swihart, G H., Ion exchange extraction of boron from aqueous fluids by Amberlite IRA 743 resin. Chinese J. Chem. 2003, 21, 1073-1079.

10.13. Rasband, W. S. ImageJ, U. S. National Institutes of Health, Bethesda, Md., USA. Available online at http://imagej.nih.gov/ij/.

10.14. ASTM D2187-9 Standard Test Methods for Physical and Chemical Properties of Particulate Ion-Exchange Resins. Available online at http://www.astm.org/Standards/D2187.htm.

10.15. Harland, C. E., Ion-exchange: theory and practice. Royal Society of Chemistry. London, 2nd, Ed. 1994.

10.16. Sherrington, D. C., Preparation, structure and morphology of polymer supports. Chem. Comm. 1998, 2275-2286.

10.17. Frechet, J. M. J.; Boz, E.; Chi, Y; Diallo, M. S. Extraction of Anions from Solutions and Mixtures Using Hyperbranched Macromolecules. US Patent Application 2010/0181257 A1. Publication Date: Jul. 22, 2010.

10.18. Diallo, M. S.; Yu, C J. Soluble Anion Exchangers from Hyperbranched Macromolecules. US Patent Application 2011/0315636. A1. Publication Date: Dec. 29, 2011.

10.19. Chang, H. T.; Charmot, D. and Zard, S. P. Polyamine Polymers. U.S. Pat. No. 7,342,083 B2. 2008.

10.20. WaveMetrics. *IGOR Pro* 6. Available online at http://www.wavemetrics.com/.
10.21. Hydranautics. IMSDesign. Available online at http://www.membranes.com/index.php?pagename=imsdesign
10.22. Hershey, J. P.; Fernandez, M.; Milne, P J; Millero, F J, The ionization of boric acid in NaCl, Na—Ca—Cl and Na—Mg—Cl solutions at 25° C. *Geochim. Cosmochim. Acta* 1986, 50, 143-148.
10.23. Yoshimura, K.; Miyazaki, Y.; Ota, F.; Matsuoka, S.; Sakashita, H., Complexation of boric acid with the N-methyl-D-glucamine group in solution and in cross linked polymer. *J. Chem. Soc. Faraday T.* 1998, 94, 683-689.
10.24. Busch, M., Boron removal in sea water desalination. Available online at http://www.idswater.com/Common/Paper/Paper_58/Paper_MarkusBusch.pdf
10.25. Roh, J.; Bartels, C.; Wilf, M. Use of Dendrimers to Enhance Selective Separation of Nanofiltration and Reverse Osmosis Membranes. 2009. Desalination and Water Purification Research and Development Report No. 140. Available online at http: www.usbr.gov/pmts/water/publications/reportpdfs/report 140.pdf.
11.1. Hershey, J. P.; Fernandez, M.; Milne, P. J. and Millero, F. J. The ionization of boric acid in NaCl, Na—Ca—Cl and Na—Mg—Cl solutions at 25° C. Geochimica et Cosmochimica Acta, 1986, 50, 143-148.

The invention claimed is:

1. A filtration membrane comprising:
a plurality of fibers comprising nanofibers, microfibers, or a combination thereof, each plurality of fibers having a polymer component and a dendrimer component,
wherein the polymer component provides a fiber scaffold and the dendrimer component is attached to the polymer component and presents reactive sites on the fiber scaffold, and
wherein the dendrimer component comprises dendrimers covalently cross-linked to one another to form water-insoluble dendritic particles.

2. The filtration membrane of claim 1, wherein the plurality of fibers are arranged in a composite material layer having a mesh structure, the composite material layer comprised in the filtration membrane alone or in combination with one or more additional layers.

3. The filtration membrane of claim 2, wherein the one or more additional layers comprise a supporting layer comprising a supporting layer polymer component, the supporting layer attached to the composite material layer.

4. The filtration membrane of claim 3, wherein the supporting layer is functionalized with highly branched dendritic macromolecule or dendritic nanomaterial.

5. The filtration membrane of claim 2, wherein the one or more additional layers comprise a coating layer attached to the composite material layer, the coating layer comprising a coating layer dendrimer component comprising cross linked highly branched dendritic macromolecule or dendritic nanomaterial.

6. The filtration membrane of claim 3, wherein the composite material layer polymer component and the supporting layer polymer component are formed by a same polymer.

7. The filtration membrane of claim 5, wherein the one or more additional layers further comprise a supporting layer polymer component attached to the coating layer and comprising dendritic nanomaterial.

8. The filtration membrane of claim 2, further comprising a scaffold layer comprising nanofibers, microfibers, or a combination thereof including a polymer component and no dendrimer.

9. The filtration membrane of claim 2, wherein the one or more additional layers comprise one or more composite material layers having a mesh structure, wherein the dendrimer component of the one or more composite material layers is either the same or different.

10. The filtration membrane of claim 1, wherein the plurality of fibers are hollow fibers, arranged in a bundle configuration in which the fibers are substantially parallel one with another.

11. The filtration membrane of claim 1, wherein the polymer component is selected from the group consisting of a substituted or unsubstituted aliphatic polymer, a substituted or unsubstituted unsaturated polymer and a substituted or unsubstituted aromatic polymer, and the dendrimer component is selected from a highly branched dendritic macromolecule or an aggregate nanostructure and/or microstructure thereof, wherein the polymer component and the dendrimer component are attached through binding of corresponding functional group forming a hydrogen bond or a covalent bond.

12. The filtration membrane of claim 1, wherein the polymer component is selected from the group consisting of polysulfone (PS), polyether sulfone (PES), poly(vinylidene) fluoride (PVDF), poly(tetrafluoroethyelene) (PTFE), poly (acrylonitrile) (PAN), poly(methyl methacrylate) (PMMA), poly(methacrylic acid) (PMAA), poly(acrylic acid) (PAA), poly(vinyl methyl ketone), and poly(ethylene terephthalate) (PET).

13. The filtration membrane of claim 11, wherein the dendrimer component comprises one or more highly branched dendritic macromolecule selected from the group consisting of generation-3 poly(amidoamine) (PAMAM) dendrimer, generation-4 poly(amidoamine) (PAMAM) dendrimer, generation-5 poly(amidoamine) (PAMAM) dendrimer, generation-3 poly(propyleneimine) (PPI) dendrimer, generation-4 poly(propyleneimine) (PPI) dendrimer, generation-5 poly(propyleneimine) (PPI) dendrimer, generation-3 poly(bis(methylol)propionic acid) (MPA) dendrimer, generation-4 poly(bis(methylol)propionic acid) (MPA) dendrimer, generation-5 poly(bis(methylol)propionic acid) (MPA) dendrimer, generation-3 poly(ethyleneimine) dendrimer, generation-4 poly(ethyleneimine) dendrimer, generation-5 poly(ethyleneimine) dendrimer, and hyperbranched poly(ethyleneimine), or aggregate nanostructures and/or microstructure thereof.

14. The filtration membrane of claim 1, wherein the reactive sites are selected to retain a chemical of interest.

15. The filtration membrane of claim 1, wherein reactive sites are selected to reject a chemical of interest.

16. The filtration membrane of claim 1, wherein the reactive sites are electrically charged.

17. A nanofiber or microfiber comprising:
a polymeric component providing a fiber scaffold; and
a dendrimer component attached to the polymeric component to present reactive sites on the fiber scaffold,
wherein the dendrimer component comprises dendrimers covalently cross-linked to one another to form water-insoluble dendritic particles.

18. The nanofiber or microfiber of claim 17, wherein the dendrimer component is formed by one or more highly branched dendritic macromolecules, aggregate nanostructures, microstructure or combinations thereof.

19. The nanofiber or microfiber of claim 17, wherein the dendrimer component attaches the polymer component through hydrogen bond between corresponding functional groups in the dendrimer component and in the polymer component.

20. The nanofiber or microfiber of claim 17, wherein the dendrimer component attaches the polymer component through covalent bond between corresponding functional groups in the dendrimer component and in the polymer component.

21. The nanofiber or microfiber of claim 17, wherein the polymer component has a formula:

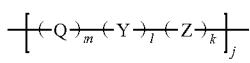
(I)

wherein:
Q, Y, and Z comprise saturated aliphatic hydrocarbon, aromatic hydrocarbon, or unsaturated aliphatic hydrocarbons;
m, l, and k independently are integers ranging between 0-50;
at least one of m, l, or k is not equal to zero;
j is an integer ranging between 50-500; and
at least one of Q (when Q≠0), Y (when Y≠0), or Z (when Z≠0), comprises the polymer component functional group.

22. The nanofiber or microfiber of claim 21, wherein Q, Y, and Z are independently selected from the following formulas:

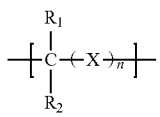
(II)

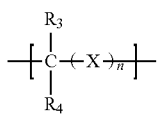
(III)

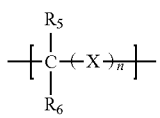
(IV)

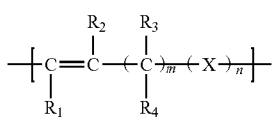
(VI)

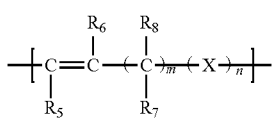
(VII)

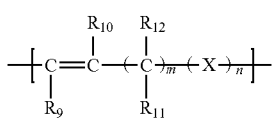
(VIII)

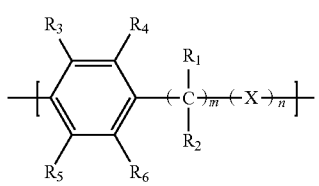
(IX)

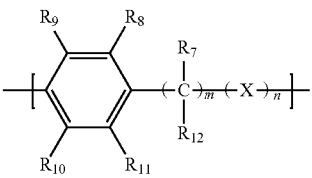
(X)

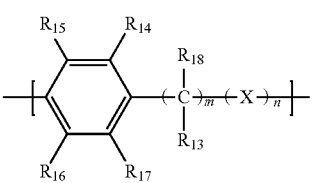
(XI)

wherein:
n=0 or 1;
m is an integer ranging from 0-15;
X is a functional group comprising an atom selected from O, S, N, P, or F; and
$R_1$-$R_{18}$ are independently selected from: the polymer component functional group; hydrogen; C1-C20 linear, branched, saturated, unsaturated, or aryl hydrocarbon which are either substituted or unsubstituted with O, N, B, S, P; or substituted O, N, B, S, or P
at least one of $R_1$-$R_{18}$ the polymer component functional group.

23. The nanofiber or microfiber of claim 17, wherein the polymer component comprises polysulfone (PS), polyether sulfone (PES), poly(vinylidene) fluoride (PVDF), poly(tetrafluoroethyelene) (PTFE), poly(acrylonitrile) (PAN), poly(methyl methacrylate) (PMMA), poly(methacrylic acid) (PMAA), poly(acrylic acid) (PAA), and/or poly(vinyl methyl ketone).

24. The nanofiber or microfiber of claim 17, wherein the dendrimer component has a formula:

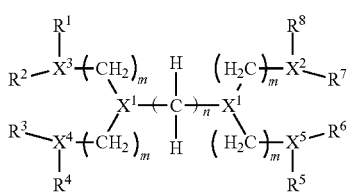
(XII)

wherein:
n and m are integers ranging from 2-5;
$R^1$-$R^8$ are independently selected from hydrogen or hyperbranched polymer moieties;
$X^1$ is N; and
$X^2$-$X^5$ are selected from amine, amide, imide, and carbamate.

25. The nanofiber or microfiber of claim 24, wherein the dendrimer component further comprises a second dendrimer component of formula (XIII), or a third dendrimer component of formula (XIV), or a combination thereof

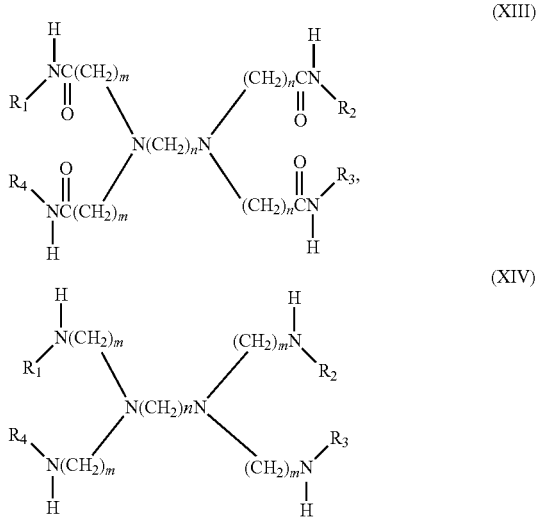

wherein n and m are integers ranging from 2-5, and wherein $R_1$-$R_4$ can be independently selected from hydrogen or hyperbranched polymer moieties.

26. The nanofiber or microfiber of claim 17, wherein the dendrimer component comprises polyethyleneimine (PEI).

27. The nanofiber or microfiber of claim 17, wherein the reactive sites are positively charged, negatively charged, or a combination of positively charged and negatively charged reactive sites.

28. The nanofiber or microfiber of claim 17, wherein the reactive sites comprise N donors, 0 donors, S donors or a combination thereof.

29. The nanofiber or microfiber of claim 17, wherein the reactive sites comprise functional groups selected from the group consisting of amines, quaternary ammonium groups, amides, hydroxyl groups, ethers, carboxylates, esters, sulfonates, sulfiniates, sulfonate esters, sulfinate esters, sulfonamides, phosphates, carbamates, ureas, imidines, guanidines, oximes, imidazoles, pyridines, thiols, thioethers, and thiocarboxylates.

30. A composite material comprising:
a plurality of the nanofibers or microfibers of claim 17.

31. The composite material of claim 30, wherein the plurality of nanofibers or microfibers are arranged in a mesh structure or in a bundle configuration in which the plurality of nanofibers or microfibers or a combination thereof are substantially parallel one with the another.

32. A filtration system comprising:
at least one filtration membrane according to claim 1 selective for a first chemical in combination with one or more additional filtration membranes, each selective for the first chemical, an additional chemical, or combinations thereof.

33. The filtration system of claim 32, wherein the at least one filtration membrane and the one or more additional filtration membranes are arranged in units, wherein a first unit comprises an alternating series of membranes configured to reject cations and membranes configured to reject anions, and a second unit comprises a parallel series of membranes configured to absorb ions of interest.

34. The filtration system of claim 32, wherein the at least one filtration membrane and/or the one or more additional filtration membranes comprise a plurality of nanofibers, a plurality of microfibers or a plurality of nanofibers or microfibers, arranged in a mesh structure or in a bundle configuration in which the plurality of fibers are substantially parallel with each other.

35. A process for manufacturing a composite material comprising:
aggregating a plurality of nanofibers or microfibers according to claim 17 in a mesh structure or in a bundle configuration in which the nanofibers or microfibers are substantially parallel one with each other.

36. The process of claim 35, wherein the aggregating the plurality of nanofibers or microfibers in a mesh structure is performed by
mixing a polymeric component dissolved in a suitable solvent with a dendritic component dissolved in a suitable solvent, and
applying an electrical charge to the liquid mixture of polymeric components and dendritic components until a continuous stream of the liquid mixture of polymeric components and dendritic components is pulled to a rotating collector having an electrical charge opposite that of the liquid mixture of polymeric components and dendritic components such that the continuous stream forms a mesh of nanofibers.

37. A filtration method comprising:
filtering a liquid through a filtration membrane of claim 1.

38. The filtration method of claim 37, wherein the filtration membrane is formed by a plurality of filtration membranes each selective for one or more chemicals and the filtering is performed by passing the liquid through the plurality of filtration membranes to remove and/or absorb the one or more chemicals in a controlled fashion.

39. The filtration method of claim 38, wherein at least one of the plurality of filtration membranes comprises electrically charged reactive sites and the filtering is performed by passing the liquid through the plurality of filtration membranes to remove or absorb electrically charged chemicals.

40. The filtration method of claim 38, wherein the at least one of the plurality of filtration membranes comprises alternating positive and negative charged filtration membranes arranged in a configuration suitable to remove charged chemicals from the liquid.

41. The filtration method of claim 38 wherein the at least one of the plurality of filtration membranes comprises alternating positive and negative charged filtration membranes arranged in a configuration suitable to absorb charged chemicals from the liquid.

42. The filtration method of claim 37, further comprising filtering the liquid through one or more conventional nanofiltration membranes to remove particles and dissolved organic matter.

43. The filtration method of claim 37, wherein the liquid is water.

44. The filtration membrane of claim 1, wherein the dendrimer component is attached to a surface of the polymeric component to present reactive sites on the fiber scaffold.

45. The filtration membrane of claim 1, wherein the dendritic particles have an average particle size larger than 300 nm.

* * * * *